US012764727B2

(12) United States Patent
Gong et al.

(10) Patent No.: US 12,764,727 B2
(45) Date of Patent: Oct. 13, 2026

(54) INFORMATION TRANSMISSION METHOD, COMMUNICATION APPARATUS, STORAGE MEDIUM, CHIP, AND PROGRAM PRODUCT

(71) Applicant: HUAWEI TECHNOLOGIES CO., LTD., Shenzhen (CN)

(72) Inventors: Bo Gong, Shenzhen (CN); Mengshi Hu, Shenzhen (CN); Chenchen Liu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/584,595

(22) Filed: Feb. 22, 2024

(65) Prior Publication Data

US 2024/0205899 A1 Jun. 20, 2024

Related U.S. Application Data

(63) Continuation of application No. PCT/CN2022/114061, filed on Aug. 22, 2022.

(30) Foreign Application Priority Data

Aug. 24, 2021 (CN) ......................... 202110977323.6

(51) Int. Cl.
*H04W 72/0453* (2023.01)
*H04L 5/00* (2006.01)

(52) U.S. Cl.
CPC ....... *H04W 72/0453* (2013.01); *H04L 5/0092* (2013.01)

(58) Field of Classification Search
CPC .............. H04W 72/0453; H04W 84/12; H04L 5/0092; H04L 5/0053; H04L 5/0094; H04L 5/0041; H04L 5/0044; H04L 5/0048
See application file for complete search history.

(56) References Cited

U.S. PATENT DOCUMENTS

2020/0014509 A1* 1/2020 Asterjadhi ............ H04L 5/0041
2021/0143955 A1 5/2021 Yang et al.
2023/0006782 A1 1/2023 Montreuil et al.

FOREIGN PATENT DOCUMENTS

CN 114071725 A 2/2022
CN 115842610 A 3/2023
(Continued)

OTHER PUBLICATIONS

IEEE Std 802.11a—1999,Part 11:Wireless LAN Medium Access Control (MAC) and Physical Layer (PHY) specifications:High-speed Physical Layer in the 5 GHZ Band,Sep. 16, 1999,total 90 pages.

(Continued)

*Primary Examiner* — Natasha W Cosme
(74) *Attorney, Agent, or Firm* — WOMBLE BOND DICKINSON (US) LLP

(57) ABSTRACT

Embodiments of this disclosure provide an information transmission method, a communication apparatus, a storage medium, a chip, and a program product. The method includes: receiving, by a first device, a trigger-based frame from a second device, where the trigger-based frame includes distributed resource unit indication information; determining one or more distributed resource blocks based on the distributed resource unit indication information, where each distributed resource block includes N1 data subcarriers and N2 pilot subcarriers, and an absolute value of an index difference between every two data subcarriers of N3 data subcarriers in the N1 data subcarriers is greater than or equal to 4; and sending a response to the trigger-based frame to the second device on the one or more distributed resource blocks.

20 Claims, 9 Drawing Sheets

(56) References Cited

FOREIGN PATENT DOCUMENTS

| | | | |
|---|---|---|---|
| JP | 2023007482 | A | 1/2023 |
| WO | 2023025113 | A1 | 3/2023 |

OTHER PUBLICATIONS

IEEE Std 802.11ac™—2013,Part 11:Wireless LAN Medium Access Control (MAC) and Physical Layer (PHY) specifications,Amendment 4:Enhancements for Very High Throughput for Operation in Bands below 6 GHz,Dec. 11, 2013,total 425 pages.

IEEE Std 802.11ax™—2021,Part 11:Wireless LAN Medium Access Control (MAC) and Physical Layer (PHY) specifications,Amendment 1:Enhancements for High-Efficiency WLAN,Feb. 9, 2021,total 37 pages.

IEEE Std 802.11b—1999,Part 11:Wireless LAN Medium Access Control (MAC) and Physical Layer (PHY) specifications:Higher-Speed Physical Layer Extension in the 2.4 GHz Band,Sep. 16, 1999,total 97 pages.

IEEE Std 802.11n™—2009,Part 11:Wireless LAN Medium Access Control (MAC) and Physical Layer (PHY) specifications,Amendment 5: Enhancements for Higher Throughput,Oct. 29, 2009,total 536 pages.

IEEE Std 802.11g™—2003,Part 11: Wireless LAN Medium Access Control (MAC) and Physical Layer (PHY) specifications,Amendment 4:Further Higher Data Rate Extension in the 2.4 GHz Band,Jun. 27, 2003,total 78 pages.

IEEE P802.11be™/D0.1, Part 11: Wireless LAN Medium Access Control (MAC) and Physical Layer (PHY) specifications,Amendment 8:Enhancements for extremely high throughput (EHT),Sep. 2020,total 299 pages.

* cited by examiner

FIG. 3
300
12 guard subcarriers
5 DC
23 DC
5 DC
11 guard subcarriers
26-tone RU
52-tone RU
106-tone RU
242-tone RU
484-tone RU
996-tone RU
26
52
106
242
484
996 + 5 DC
Tone: subcarrier
Null subcarrier

INFORMATION TRANSMISSION METHOD, COMMUNICATION APPARATUS, STORAGE MEDIUM, CHIP, AND PROGRAM PRODUCT

CROSS-REFERENCE TO RELATED APPLICATIONS

This application is a continuation of International Application No. PCT/CN2022/114061, filed on Aug. 22, 2022, which claims priority to Chinese Patent Application No. 202110977323.6, filed on Aug. 24, 2021. The disclosures of the aforementioned applications are hereby incorporated by reference in their entireties.

TECHNICAL FIELD

This disclosure relates to the communication field, and more specifically, to an information transmission method, a communication apparatus, a storage medium, a chip, and a program product.

BACKGROUND

The 802.11 standards of a wireless local area network (WLAN) system are evolving. The evolution starts from 802.11a/b/g and goes through 802.11n, 802.11ac, 802.11ax, and 802.11be. The 802.11ax standard is referred to as high efficiency (HE), the 802.11be standard is referred to as extremely high throughput (EHT), and the standards later than the 802.11be are represented by EHT+.

Starting from the 802.11ax and the 802.11be, multi-user transmission is supported. However, due to a limitation of a maximum power and a maximum power spectral density, a power of each transmission in current multi-user transmission is low, and consequently, transmission efficiency is not high.

SUMMARY

Embodiments of this disclosure provide an information transmission solution, to support multi-user transmission and implement high transmission efficiency.

According to a first aspect, an information transmission method is provided. A first device receives a trigger-based frame from a second device, where the trigger-based frame includes distributed resource unit (DRU) indication information, and the distributed resource unit indication information indicates information about a distributed resource unit allocated to the first device; the first device determines one or more distributed resource blocks based on the distributed resource unit indication information, where each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1; and the first device sends a response to the trigger-based frame to the second device on the one or more distributed resource blocks.

Therefore, in this embodiment of this disclosure, the distributed resource unit is used for information transmission. In this way, at a limited power spectral density, finite subcarriers can be discrete on a larger bandwidth, and a transmit power can be increased. Therefore, compared with a continuous resource unit (RU), the resource unit in this embodiment of this disclosure includes the subcarriers discrete on a larger bandwidth. When the discrete RU is used for data transmission, the transmit power can be increased without increasing a power spectral density, to obtain a higher gain.

According to a second aspect, an information transmission method is provided. A second device sends a trigger-based frame to a first device, where the trigger-based frame includes distributed resource unit indication information, and the distributed resource unit indication information indicates information about a distributed resource unit allocated to the first device; and the second device receives a response to a trigger-based frame from the first device on one or more distributed resource blocks, where the one or more distributed resource blocks are determined based on the distributed resource unit indication information, each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1.

According to a third aspect, this disclosure provides a communication apparatus. The communication apparatus may be a station or a chip in a station, for example, a Wi-Fi chip. The communication apparatus includes: a receiving unit, configured to receive a trigger-based frame from a second device, where the trigger-based frame includes distributed resource unit indication information, and the distributed resource unit indication information indicates information about a distributed resource unit allocated to the communication apparatus; a determining unit, configured to determine one or more distributed resource blocks based on the distributed resource unit indication information, where each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1; and a sending unit, configured to send a response to the trigger-based frame to the second device on the one or more distributed resource blocks.

According to a fourth aspect, this disclosure provides a communication apparatus. The communication apparatus may be an access point or a chip in an access point, for example, a Wi-Fi chip. The communication apparatus includes: a sending unit, configured to send a trigger-based frame to a first device, where the trigger-based frame includes distributed resource unit indication information, and the distributed resource unit indication information indicates information about a distributed resource unit allocated to the first device; and a receiving unit, configured to receive a response to the trigger-based frame from the first device on one or more distributed resource blocks, where the one or more distributed resource blocks are determined based on the distributed resource unit indication information, and each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1.

According to a fifth aspect, a communication apparatus is provided. The communication apparatus includes: a transceiver, a processor, and a memory. The memory stores instructions executed by the processor. When the instructions are executed by the processor, the communication apparatus receives a trigger-based frame from a second device by using the transceiver, where the trigger-based frame includes distributed resource unit indication information, and the distributed resource unit indication information indicates information about a distributed resource unit allocated to the communication apparatus; determines one or more distributed resource blocks based on the distributed resource unit indication information, where each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1; and sends a response to the trigger-based frame to the second device on the one or more distributed resource blocks by using the transceiver.

According to a sixth aspect, a communication apparatus is provided. The communication apparatus includes: a transceiver, a processor, and a memory. The memory stores instructions executed by the processor. When the instructions are executed by the processor, the communication apparatus sends a trigger-based frame to a first device by using the transceiver, where the trigger-based frame includes distributed resource unit indication information, and the distributed resource unit indication information indicates information about a distributed resource unit allocated to the first device; and receives a response to the trigger-based frame from the first device on one or more distributed resource blocks by using the transceiver, where the one or more distributed resource blocks are determined based on the distributed resource unit indication information, each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1.

In some embodiments of any one of the foregoing aspects, the trigger-based frame may include a type of control frame, referred to as a trigger frame, for example, a trigger frame in the 802.11be, in a medium access control (MAC) frame specified in a standard, or may be another MAC frame with a trigger function. The another MAC frame with a trigger function may also be referred to as a MAC frame with a triggered response scheduling (TRS) function, and the function is generally implemented by using a TRS control subfield included in the MAC frame. In some embodiments, the DRU indication information may be carried in an RU allocation field in a user information field in the trigger frame, or may be carried in an RU allocation field in a TRS control subfield in another MAC frame.

In some embodiments of any one of the foregoing aspects, the DRU indication information may indicate a size and a location of the DRU allocated to the first device. The size of the DRU may be a quantity of subcarriers in the DRU, and the location of the DRU may be a location of a subcarrier in the DRU in frequency domain. For example, the DRU indication information may be carried in at least one of an RU allocation subfield, an uplink bandwidth subfield, an uplink bandwidth extension subfield, and a primary-secondary 160 subfield.

In some embodiments of any one of the foregoing aspects, the one or more distributed resource blocks may be determined from a predetermined quantity of distributed resource blocks, where the predetermined quantity of distributed resource blocks is predefined or preconfigured. In some embodiments, a specific value of the predetermined quantity is related to a bandwidth and a size of the distributed resource block.

In some embodiments of any one of the foregoing aspects, an operating bandwidth of the first device is 40 MHz. The predetermined quantity of distributed resource blocks includes 18 distributed resource blocks DRU26 whose subcarrier quantity is 26, where an index of a subcarrier included in each DRU26 satisfies Table 5 in the description of embodiments below. Details are not described herein again. The predetermined quantity of distributed resource blocks includes eight distributed resource blocks DRU52 whose subcarrier quantity is 52, where an index of a subcarrier included in each DRU52 satisfies Table 6 in the description of embodiments below. Details are not described herein again. The predetermined quantity of distributed resource blocks includes four distributed resource blocks DRU106 whose subcarrier quantity is 106, where an index of a subcarrier included in each DRU106 satisfies Table 8 in the description of embodiments below. Details are not described herein again.

In some embodiments of any one of the foregoing aspects, an operating bandwidth of the first device is 80 MHz. The predetermined quantity of distributed resource blocks includes 36 distributed resource blocks DRU26 whose subcarrier quantity is 26, where an index of a subcarrier included in each DRU26 satisfies Table 16 in the description of embodiments below. Details are not described herein again. The predetermined quantity of distributed resource blocks includes 16 distributed resource blocks DRU52 whose subcarrier quantity is 52, where an index of a subcarrier included in each DRU52 satisfies Table 17 in the description of embodiments below. Details are not described herein again. The predetermined quantity of distributed resource blocks includes eight distributed resource blocks DRU106 whose subcarrier quantity is 106, where an index of a subcarrier included in each DRU106 satisfies Table 19 in the description of embodiments below. Details are not described herein again. The predetermined quantity of distributed resource blocks includes four distributed resource blocks DRU242 whose subcarrier quantity is 242, where an index of a subcarrier included in each DRU242 satisfies Table 21 in the description of embodiments below. Details are not described herein again.

In some embodiments of any one of the foregoing aspects, an operating bandwidth of the first device is 160 MHz. The predetermined quantity of distributed resource blocks includes 72 distributed resource blocks DRU26 whose subcarrier quantity is 26, where an index of a subcarrier included in each DRU26 satisfies Table 26 in the description of embodiments below. Details are not described herein again. The predetermined quantity of distributed resource blocks includes 32 distributed resource blocks DRU52 whose subcarrier quantity is 52, where an index of a subcarrier included in each DRU52 satisfies Table 27 in the description of embodiments below. Details are not described herein again. The predetermined quantity of distributed resource blocks includes 16 distributed resource blocks DRU106 whose subcarrier quantity is 106, where an index of a subcarrier included in each DRU106 satisfies Table 29 in the description of embodiments below. Details are not described herein again. The predetermined quantity of distributed resource blocks includes eight distributed resource blocks DRU242 whose subcarrier quantity is 242, where an index of a subcarrier included in each DRU242 satisfies Table 31 in the description of embodiments below. Details are not described herein again. The predetermined quantity of distributed resource blocks includes four distributed resource blocks DRU484 whose subcarrier quantity is 484, where an index of a subcarrier included in each DRU484 satisfies Table 34 in the description of embodiments below. Details are not described herein again.

In some embodiments of any one of the foregoing aspects, an operating bandwidth of the first device is 320 MHz. The predetermined quantity of distributed resource blocks includes 144 distributed resource blocks DRU26 whose subcarrier quantity is 26, where an index of a subcarrier included in each DRU26 satisfies Table 37 in the description of embodiments below. Details are not described herein again. The predetermined quantity of distributed resource blocks includes 64 distributed resource blocks DRU52 whose subcarrier quantity is 52, where an index of a subcarrier included in each DRU52 satisfies Table 38 in the description of embodiments below. Details are not described herein again. The predetermined quantity of distributed resource blocks includes 32 distributed resource blocks DRU106 whose subcarrier quantity is 106, where an index of a subcarrier included in each DRU106 satisfies Table 40 in the description of embodiments below. Details are not described herein again. The predetermined quantity of distributed resource blocks includes 16 distributed resource blocks DRU242 whose subcarrier quantity is 242, where an index of a subcarrier included in each DRU242 satisfies Table 42 in the description of embodiments below. Details are not described herein again. The predetermined quantity of distributed resource blocks includes eight distributed resource blocks DRU484 whose subcarrier quantity is 484, where an index of a subcarrier included in each DRU484 satisfies Table 45 in the description of embodiments below. Details are not described herein again. The predetermined quantity of distributed resource blocks includes four distributed resource blocks DRU996 whose subcarrier quantity is 996, where an index of a subcarrier included in each DRU996 satisfies Table 47 in the description of embodiments below. Details are not described herein again.

In some embodiments of any one of the foregoing aspects, when N1=24, N2=2. When N1=48, N2=4. When N1=102, N2=4. When N1=234, N2=8. When N1=468, N2=16. When N1=980, N2=16. In some embodiments of any one of the foregoing aspects, when N1=24 and N2=2, the DRU is referred to as a 26-tone DRU. When N1=48 and N2=4, the DRU is referred to as a 52-tone DRU. When N1=102 and N2=4, the DRU is referred to as a 106-tone DRU. When N1=234 and N2=8, the DRU is referred to as a 242-tone DRU. When N1=468 and N2=16, the DRU is referred to as a 484-tone DRU. When N1=980 and N2=16, the DRU is referred to as a 996-tone DRU.

In some embodiments of any one of the foregoing aspects, when a bandwidth is 40 MHz, 80 MHz, 160 MHz, or 320 MHz, N1=24, N2=2, and N3=24, or when a bandwidth is 80 MHz, 160 MHz, or 320 MHz, N1=48, N2=4, and N3=48, or when a bandwidth is 160 MHz or 320 MHz, N1=102, N2=4, and N3=96, or when a bandwidth is 320 MHz, N1=234, N2=8, and N3=192, the N3 data subcarriers satisfy: If the N3 data subcarriers are divided into N3/6 groups in ascending order of indices, every six data subcarriers form one group, and an absolute value of an index difference between two adjacent data subcarriers in a same group is 18.

In some embodiments of any one of the foregoing aspects, when a bandwidth is 40 MHz, 80 MHz, 160 MHz, or 320 MHz, N1=24, N2=2, and N3=24, or when a bandwidth is 80 MHz, N1=48, N2=4, and N3=48, or when a bandwidth is 160 MHz, N1=102, N2=4, and N3=96, or when a bandwidth is 320 MHz, N1=234, N2=8, and N3=192, absolute values of index differences between two most adjacent data subcarriers in two adjacent groups of the N3/6 groups are alternately 33 and 43.

In some embodiments of any one of the foregoing aspects, if a bandwidth is 160 MHz, N1=48, and N3=48, absolute values of index differences between two most adjacent data subcarriers in two adjacent groups of the N3/6 groups are sequentially 33, 43, 33, 555, 33, 43, and 33.

In some embodiments of any one of the foregoing aspects, if a bandwidth is 320 MHz, N1=48, and N3=48, absolute values of index differences between two most adjacent data subcarriers in two adjacent groups of the N3/6 groups are sequentially 33, 43, 33, 1579, 33, 43, and 33.

In some embodiments of any one of the foregoing aspects, if a bandwidth is 320 MHz, N1=102, and N3=96, absolute values of index differences between two most adjacent data subcarriers in two adjacent groups of the N3/6 groups are sequentially 33, 43, 33, 555, 33, 43, 33, 555, 33, 43, 33, 555, 33, 43, and 33.

In some embodiments of any one of the foregoing aspects, when a bandwidth is 40 MHz, N1=48, N2=4, and N3=48, or when a bandwidth is 80 MHz, N1=102, N2=4, and N3=96, or when a bandwidth is 160 MHz, N1=234, N2=8, and N3=192, or when a bandwidth is 320 MHz, N1=468, N2=16, and N3=384, the N3 data subcarriers satisfy: If the N3 data subcarriers are divided into N3/12 groups in ascending order of indices, every 12 data subcarriers form one group, an absolute value of an index difference between two adjacent data subcarriers in a same group is 9, and absolute values of index differences between two most adjacent data subcarriers in two adjacent groups are alternately 24 and 34.

In some embodiments of any one of the foregoing aspects, when a bandwidth is 40 MHz, N1=102, N2=4, and N3=96, or when a bandwidth is 80 MHz, N1=234, N2=8, and N3=192, or when a bandwidth is 160 MHz, N1=468, N2=16, and N3=384, or when a bandwidth is 320 MHz, N1=980, N2=16, and N3=768, the N3 data subcarriers satisfy: If the N3 data subcarriers are divided into N3/24 groups in ascending order of indices, every 24 data subcarriers form one group, absolute values of index differences between two adjacent data subcarriers in a same group are alternately 5 and 4, and absolute values of index differences between two most adjacent data subcarriers in two adjacent groups are alternately 19 and 29.

In some embodiments of any one of the foregoing aspects, when the bandwidth is 80 MHz, 160 MHz, or 320 MHz, N1=234, N2=8, N3=192, and N4=24, or when the bandwidth is 160 MHz or 320 MHz, N1=468, N2=16, N3=384, and N4=48, or when the bandwidth is 320 MHz, N1=980, N2=16, N3=768, and N4=96, N4 data subcarriers of remaining data subcarriers other than the N3 data subcarriers in the N1 data subcarriers satisfy: If the N4 data subcarriers are divided into N4/6 groups in ascending order of indices, every six data subcarriers form one group, an absolute value of an index difference between two adjacent data subcarriers in a same group is 18, the absolute value N4 of the index difference is a positive integer, N4<N3, and N3+N4<N1.

In some embodiments of any one of the foregoing aspects, if N1=234, N3=192, and N4=24, absolute values of index differences between two most adjacent data subcarriers in two adjacent groups of N4/6 groups are sequentially and alternately 33 and 43.

In some embodiments of any one of the foregoing aspects, a lowest-frequency index of a data subcarrier at a lowest frequency in the N3 data subcarriers satisfies: When the bandwidth is 40 MHz, the lowest-frequency index is −a−128; when the bandwidth is 80 MHz, the lowest-frequency index is −a−128−256; when the bandwidth is 160 MHz, the lowest-frequency index is −a−128−256−512; or when the bandwidth is 320 MHz, the lowest-frequency index is −a−128−256−512−1024; and a is any positive integer from 110 to 122.

In some embodiments of any one of the foregoing aspects, a is 115. In this way, subcarriers in a same transmission resource block can be fully discrete.

In some embodiments of any one of the foregoing aspects, an absolute value of an index difference between every two pilot subcarriers in the N2 pilot subcarriers is greater than 1, thereby implementing frequency domain diversity.

According to a seventh aspect, a computer-readable storage medium is provided. The computer-readable storage medium stores a computer program. When the computer program is executed by a processor, an operation of the method according to any one of the first aspect or the second aspect, or the implementations of the first aspect or the second aspect is implemented.

According to an eighth aspect, a chip or a chip system is provided. The chip or the chip system includes a processing circuit, and is configured to perform an operation of the method according to any one of the first aspect or the second aspect, or the implementations of the first aspect or the second aspect.

According to a ninth aspect, a computer program or a computer program product is provided. The computer program or the computer program product is tangibly stored in a computer-readable medium and includes computer-executable instructions. When the computer-executable instructions are run on a computer, the computer is enabled to perform an operation of the method according to any one of the first aspect or the second aspect, or the implementations of the first aspect or the second aspect.

According to a tenth aspect, a communication system is provided. The system includes a first device and a second device. The first device may implement an operation of the method according to any one of the first aspect or the implementations of the first aspect, and the second device may implement an operation of the method according to any one of the second aspect or the implementations of the second aspect.

In some embodiments of the tenth aspect, the first device includes the communication apparatus in the third aspect or the communication apparatus in the fifth aspect, and the second device includes the communication apparatus in the fourth aspect or the communication apparatus in the sixth aspect.

In some embodiments of the tenth aspect, the first device is a station device, and the second device is an access point device.

BRIEF DESCRIPTION OF DRAWINGS

The foregoing and other features, advantages, and aspects of embodiments of this disclosure become more obvious with reference to the accompanying drawings and with reference to the following detailed descriptions. In the accompanying drawings, same or similar reference numerals represent same or similar elements.

DESCRIPTION OF EMBODIMENTS

Figure 1:
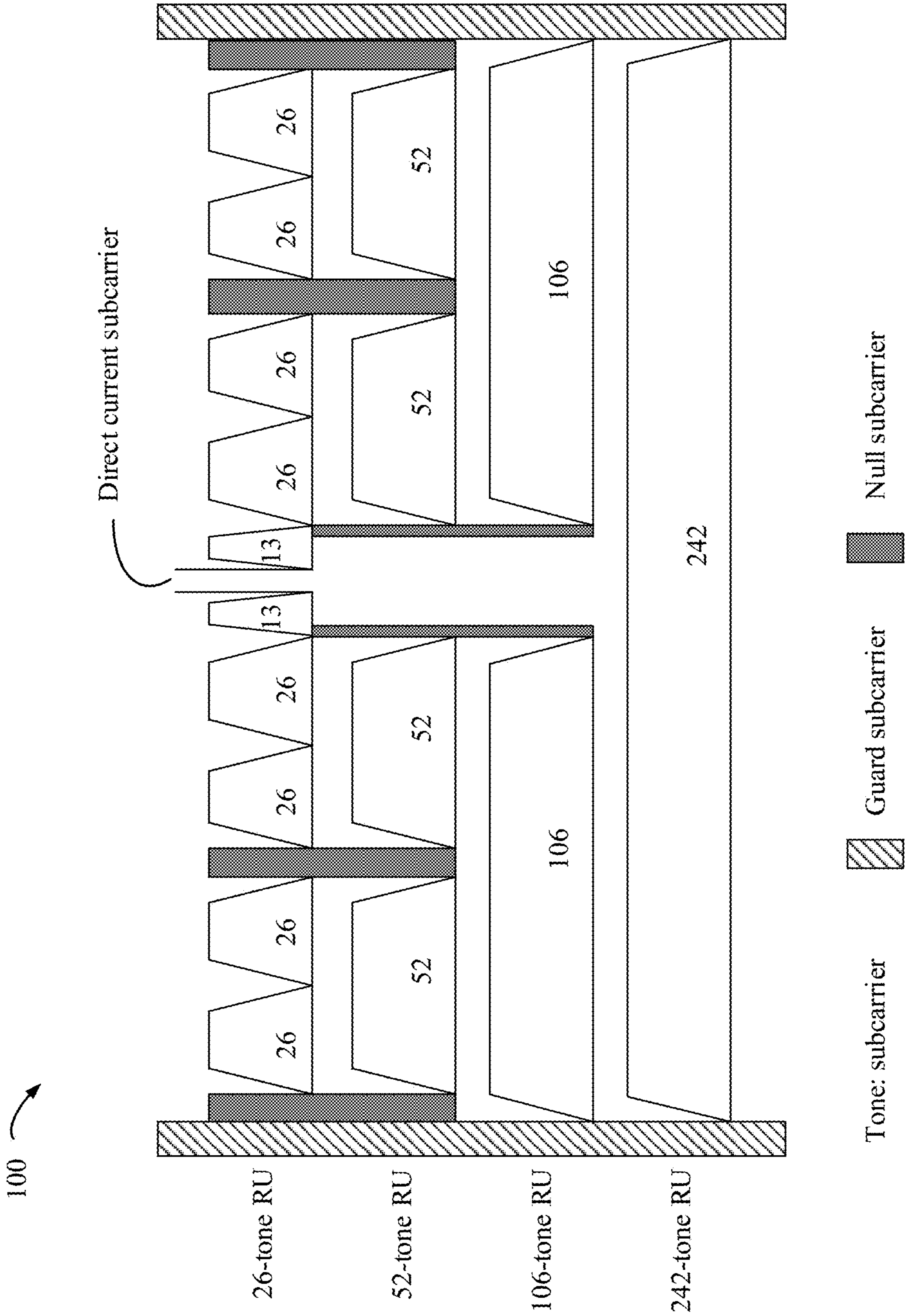
FIG. 1 is a schematic diagram of RU distribution when a bandwidth is 20 MHz.

The following describes embodiments of this disclosure in detail with reference to the accompanying drawings. Although some embodiments of this disclosure are shown in the accompanying drawings, it should be understood that this disclosure may be implemented in various forms, and should not be construed as being limited to the embodiments described herein. On the contrary, these embodiments are provided so that this disclosure will be thoroughly understood. It should be understood that the accompanying drawings and embodiments of this disclosure are merely used as examples, but are not intended to limit the protection scope of this disclosure.

In descriptions of embodiments of this disclosure, the term “include” and similar terms thereof should be understood as open inclusion, that is, “include but are not limited to”. The term “based” should be understood as “at least partially based”. The terms “one embodiment” or “the embodiment” should be understood as “at least one embodiment”. The terms “first”, “second”, and the like may indicate different or same objects. Other explicit and implicit definitions may also be included below.

In descriptions of this disclosure, unless otherwise specified, “/” means “or”. For example, A/B may represent A or B. A term “and/or” in this specification describes only an association relationship between associated objects and indicates that there may be three relationships. For example, A and/or B may represent the following three cases: Only A exists, both A and B exist, and only B exists. In addition, “at least one” means one or more, and “a plurality of” means two or more. “At least one of the following items (pieces)” or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

In the description of this disclosure, the terms such as “first” and “second” do not limit a quantity and an execution sequence, and the terms such as “first” and “second” do not indicate a definite difference.

In this disclosure, the terms such as “example” or “for example” are used to represent giving an example, an illustration, or descriptions. Any embodiment or design scheme described by using “example”, “in an example”, or “for example” in this disclosure shall not be construed as being more preferred or having more advantages than another embodiment or design scheme. Exactly, use of the word such as “example”, “in an example”, or “for example” is intended to present a related concept in a specific manner.

It should be understood that, in this disclosure, "when" and "if" mean that an apparatus performs corresponding processing in an objective situation, and are not intended to limit time. The terms do not mean that the apparatus is required to have a determining action during implementation, and do not mean any other limitation.

In this disclosure, an element represented in a singular form is intended to represent "one or more", but does not represent "one and only one", unless otherwise specified.

It should be understood that, in embodiments of this disclosure, "B corresponding to A" indicates that B is associated with A, and B may be determined based on A. However, it should be further understood that, determining B based on A does not mean that B is determined only based on A, and B may also be determined based on A and/or other information.

In this disclosure, unless otherwise specified, for same or similar parts in the embodiments or implementations, refer to each other. In embodiments of this disclosure and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this disclosure are not intended to limit the protection scope of this disclosure.

In the context of this disclosure, the term "wireless communication system" may be, for example, a wide area network system or a wireless local area network (WLAN) system. The wireless communication system may support a plurality of WLAN communication protocols, for example, the 802.11ac/802.11ax/802.11be in the Institute of Electrical and Electronics Engineers (IEEE) 802.11 series protocols, or any protocol in future IEEE 802.11 series. For ease of description, embodiments of this application use the WLAN as an example for description. A WLAN may include a plurality of basic service sets (BSS). A BSS may have a basic service set identifier (BSSID). A node of the BSS includes an access point station and a non-access point station (Non-AP STA).

The term "access point (AP)" may also be referred to as the access point station. The AP is an apparatus having a wireless transceiver function, and may provide a service for the station. The AP may also be referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge connecting a wired network and a wireless network. Main functions of the AP are to connect STAs together and then connect the wireless network to the wired network. Optionally, the AP may be a terminal device or a network device with a wireless fidelity (Wi-Fi) chip. For example, the AP may be a communication server, a router, a switch, or a bridge. Optionally, the AP may be a device that supports the 802.11 standard in the current network system or the future network system.

The term "station (STA)" may be an apparatus having a wireless transceiver function, and may access a wireless local area network based on an access point. The STA may be a wireless communication chip, a wireless sensor, or a wireless communication terminal. For example, the STA may also be referred to as a system, a subscriber unit, an access terminal, a mobile station, a remote station, a remote terminal, a mobile device, a user terminal, a terminal, a wireless communication device, a user agent, a user apparatus, or user equipment (UE). The STA may be a wireless communication chip, a wireless sensor, or a wireless communication terminal. For example, the STA is a mobile phone, a tablet computer, a set-top box, a smart television set, a smart wearable device, a vehicle-mounted communication device, a computer that supports a Wi-Fi communication function, and the like. Optionally, the STA may be a device that supports the 802.11 standard in the current network system or a future network system.

The term "multiple input multiple output (MIMO) technology" is a technology that can use a plurality of antennas to generate additional spatial degree of freedom, to multiply a system throughput and effectively improve a rate of a communication system. In addition, a transmit end may send data to a plurality of users over a plurality of spatial streams, to implement concurrent transmission of multi-user (MU) data and improve data transmission concurrency, which may also be referred to as MU-MIMO.

802.11 standards of a WLAN system are evolving from the 802.11a/b/g, to the 802.11n, 802.11ac, 802.11ax, and 802.11be. Only single user single input single output (SU-SISO) is supported in standards earlier than the 802.11n. Single user multiple input multiple output (SU-MIMO) is supported since the 802.11n. In addition, the MU-MIMO is supported since the 802.11ac and 802.11ax. Before 802.11ax, the 802.11 standard supports orthogonal frequency division multiplexing (OFDM) transmission. Since 802.11ax, the orthogonal frequency division multiple access (OFDMA) technology is introduced. The entire bandwidth can be divided into multiple resource units (RU). The MU-MIMO and OFDMA are supported in the 802.11be that is currently under research, where an extremely high throughput multi-user physical layer protocol data unit (EHT MU PPDU) is defined.

With evolution of the WLAN 802.11, a transmission bandwidth allowed by the WLAN 802.11 is also gradually changed. A transmission bandwidth allowed by the 802.11a/g standard is 20 MHz, a transmission bandwidth allowed by the 802.11n standard is 20 MHz or 40 MHz, a transmission bandwidth allowed by the 802.11ax standard is 20 MHz, 40 MHz, 80 MHz, or 160 MHz, and a bandwidth supported by the 802.11be standard is expanded to 320 MHz. In this case, a peak throughput can be significantly improved, and a transmission rate can be further improved.

In a current WLAN standard, resource allocation is performed on resource units. A quantity of subcarriers (tones or subcarriers) included in an entire bandwidth (any one of 20 MHz, 40 MHz, 80 MHz, 160 MHz, and 320 MHz) is fixed. For example, in 20 MHz, there are 256 subcarriers in total. All subcarriers in the entire bandwidth may be numbered sequentially. For example, from a low frequency to a high frequency, each subcarrier has a corresponding index (index). The entire bandwidth may be divided into a low-frequency band and a high-frequency band. The low-frequency band and the high-frequency band are relative to a central location of the entire bandwidth. An index of a subcarrier at the central location is 0. Starting from the central location, an index of a subcarrier in a high-frequency direction is a positive number and gradually increases, and an index of a subcarrier in a low-frequency direction is a negative number and an absolute value gradually increases.

For example, a subcarrier range corresponding to 256 subcarriers within 20 MHz is [−128, 127], and a subcarrier range corresponding to 512 subcarriers within 40 MHz is [−256, 255].

RUs of different sizes may be designed for different bandwidths. RUs of different sizes mean that the RUs include different quantities of subcarriers. RUs supported by the WLAN may include a 26-tone RU, a 52-tone RU, a 106-tone RU, a 242-tone RU, a 484-tone RU, and a 996-tone RU in ascending order. In addition, the WLAN may further support a combined multiple resource unit (MRU). For example, a 52-tone RU and a 26-tone RU form a (52+26)-tone MRU, a 106-tone RU and a 26-tone RU form a (106+26)-tone MRU, a 996-tone RU and a 484-tone RU form a (996+484)-tone MRU, and two 996-tone RUs and a 484-tone RU form a (2×996+484)-tone MRU, three 996-tone RUs form a 3×996-tone MRU, and three 996-tone RUs and one 484-tone RU form a (3×996+484)-tone RU.

Each RU includes data subcarriers and pilot subcarriers. The data subcarrier is used to carry data information, and the pilot subcarrier is used to estimate a phase offset and/or a frequency offset. Specifically, the 26-tone RU includes 24 data subcarriers and two pilot subcarriers, the 52-tone RU includes 48 data subcarriers and four pilot subcarriers, the 106-tone RU includes 102 data subcarriers and four pilot subcarriers, the 242-tone RU includes 234 data subcarriers and eight pilot subcarriers, the 484-tone RU includes 468 data subcarriers and 16 pilot subcarriers, and the 996-tone RU includes 980 data subcarriers and 16 pilot subcarriers.

In addition, in addition to the RU, the entire bandwidth may further include at least one of a guard subcarrier, a null subcarrier, and a direct current (DC) subcarrier. The following describes RU distribution in different bandwidths with reference to FIG. 1 to FIG. 3.

FIG. 1 is a schematic diagram of RU distribution 100 when a bandwidth is 20 MHz. In FIG. 1, from left to right in a horizontal direction may be understood as from a low frequency to a high frequency. There are several guard subcarriers at a low-frequency edge and a high-frequency edge. For example, there are six guard subcarriers at a low-frequency edge, and there are five guard subcarriers at a high-frequency edge. As shown in FIG. 1, the 20 MHz bandwidth may include one 242-tone RU, two 106-tone RUs, four 52-tone RUs, or nine 26-tone RUs.

Figure 2:
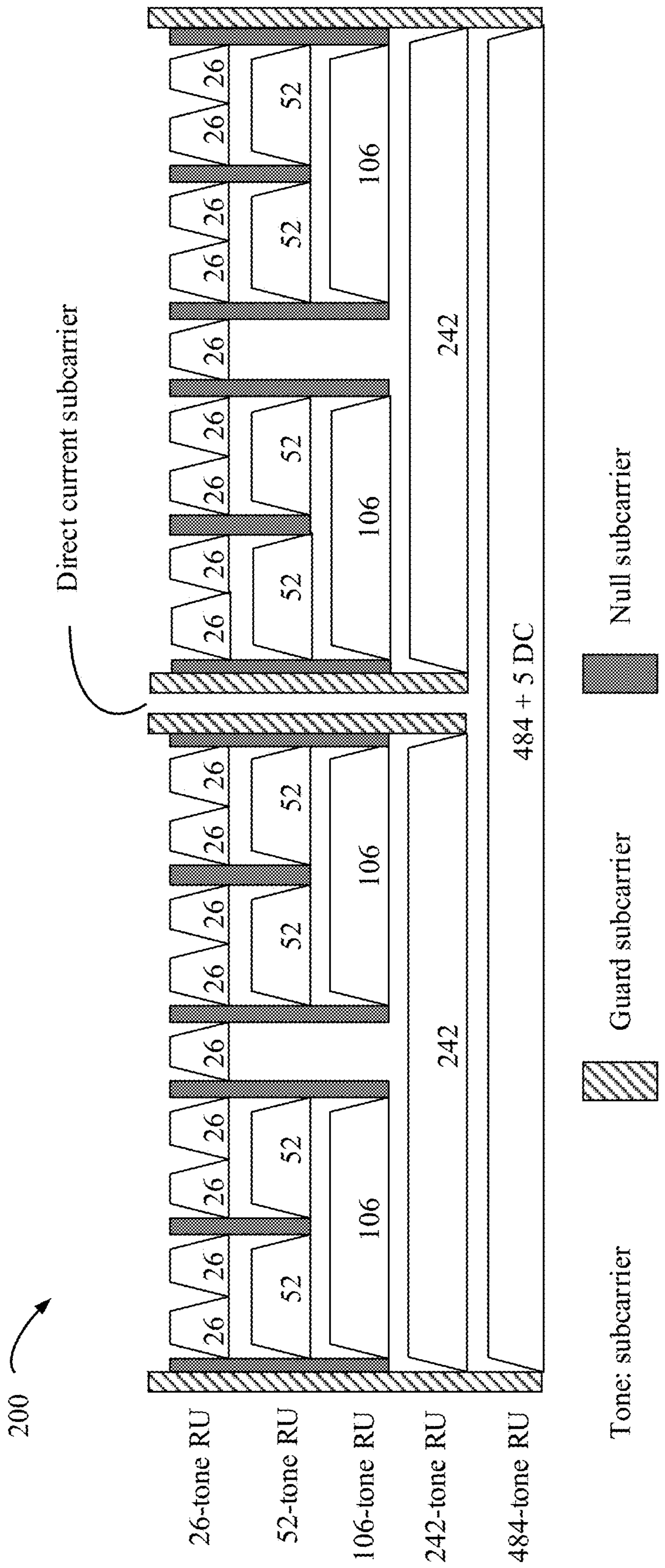
FIG. 2 is a schematic diagram of RU distribution when a bandwidth is 40 MHz.

FIG. 2 is a schematic diagram of RU distribution 200 when a bandwidth is 40 MHz. In FIG. 2, there are 12 guard subcarriers at a low-frequency edge, and there are 11 guard subcarriers at a high-frequency edge. As shown in FIG. 2, the 40 MHz bandwidth may include one 484-tone RU, two 242-tone RUs, four 106-tone RUs, eight 52-tone RUs, or 18 26-tone RUs.

Figure 3:
FIG. 3 is a schematic diagram of RU distribution when a bandwidth is 80 MHz.

FIG. 3 is a schematic diagram of RU distribution 300 when a bandwidth is 80 MHz. In FIG. 3, there are 12 guard subcarriers at a low-frequency edge, and there are 11 guard subcarriers at a high-frequency edge. As shown in FIG. 3, the 80 MHz bandwidth may include one 996-tone RU, two 484-tone RUs, four 242-tone RUs, eight 106-tone RUs, 16 52-tone RUs, or 36 26-tone RUs.

RU distribution when a bandwidth is 160 MHz may be understood as two replications of 80 MHz RU distribution. To be specific, the 160 MHz bandwidth may include two 996-tone RUs or include various combinations of 26-tone RUs, 52-tone RUs, 106-tone RUs, 242-tone RUs, 484-tone RUs, and 996-tone RUs. RU distribution when a bandwidth is 320 MHz may be understood as four replications of 80 MHz RU distribution. To be specific, the 320 MHz bandwidth may include four 996-tone RUs or include various combinations of 26-tone RUs, 52-tone RUs, 106-tone RUs, 242-tone RUs, 484-tone RUs, and 996-tone RUs. In view of a limitation of space, details are not described herein again.

In addition, a plurality of RUs of a same size in a bandwidth may be sequentially numbered from a low frequency to a high frequency. For example, the 40 MHz bandwidth may include eight 52-tone RUs. Therefore, from a low frequency to a high frequency, for example, in a direction from left to right in FIG. 2, the 52-tone RUs may be sequentially numbered as a 52-tone RU 1, a 52-tone RU 2, . . . , and a 52-tone RU 8.

It should be understood that the foregoing descriptions of RU distribution with reference to FIG. 1 to FIG. 3 are merely examples. For a subcarrier range corresponding to each RU, refer to related records and tables in the 802.11. Details are not described herein again.

Figure 4:
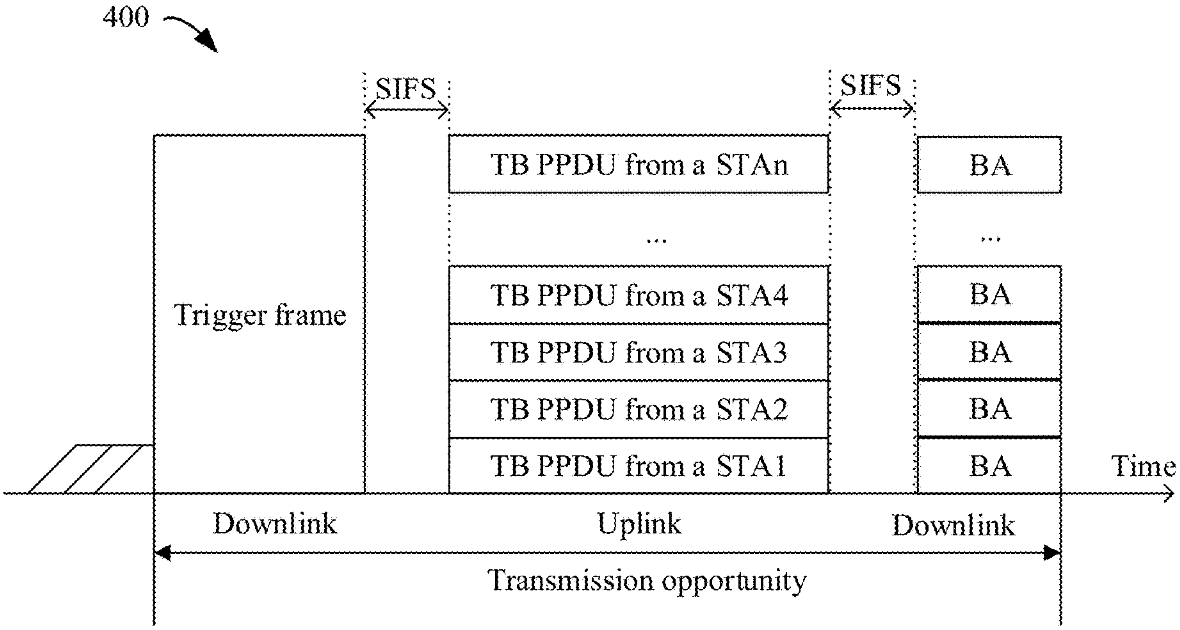
FIG. 4 is a schematic diagram of multi-user transmission between an AP and a STA.

In the 802.11ax and the 802.11be, uplink multi-user transmission is supported. Transmission between one AP and a plurality of STAs is used as an example. FIG. 4 is a schematic diagram of multi-user transmission 400. The AP sends a trigger frame, to trigger transmission of the plurality of STAs. A frame format of the trigger frame may be shown in FIG. 5.

As shown in FIG. 4, after receiving the trigger frame, each STA may obtain resource allocation information corresponding to an identifier of the STA. The resource allocation information may indicate an RU that can be used by the corresponding STA. In this way, each STA may send, after a short interframe space (SIFS), an uplink data frame on an allocated RU by using a trigger-based physical layer protocol data unit (TB PPDU). In addition, after the SIFS, each STA may receive a block acknowledgment (BA) frame sent by the AP.

Figure 5:
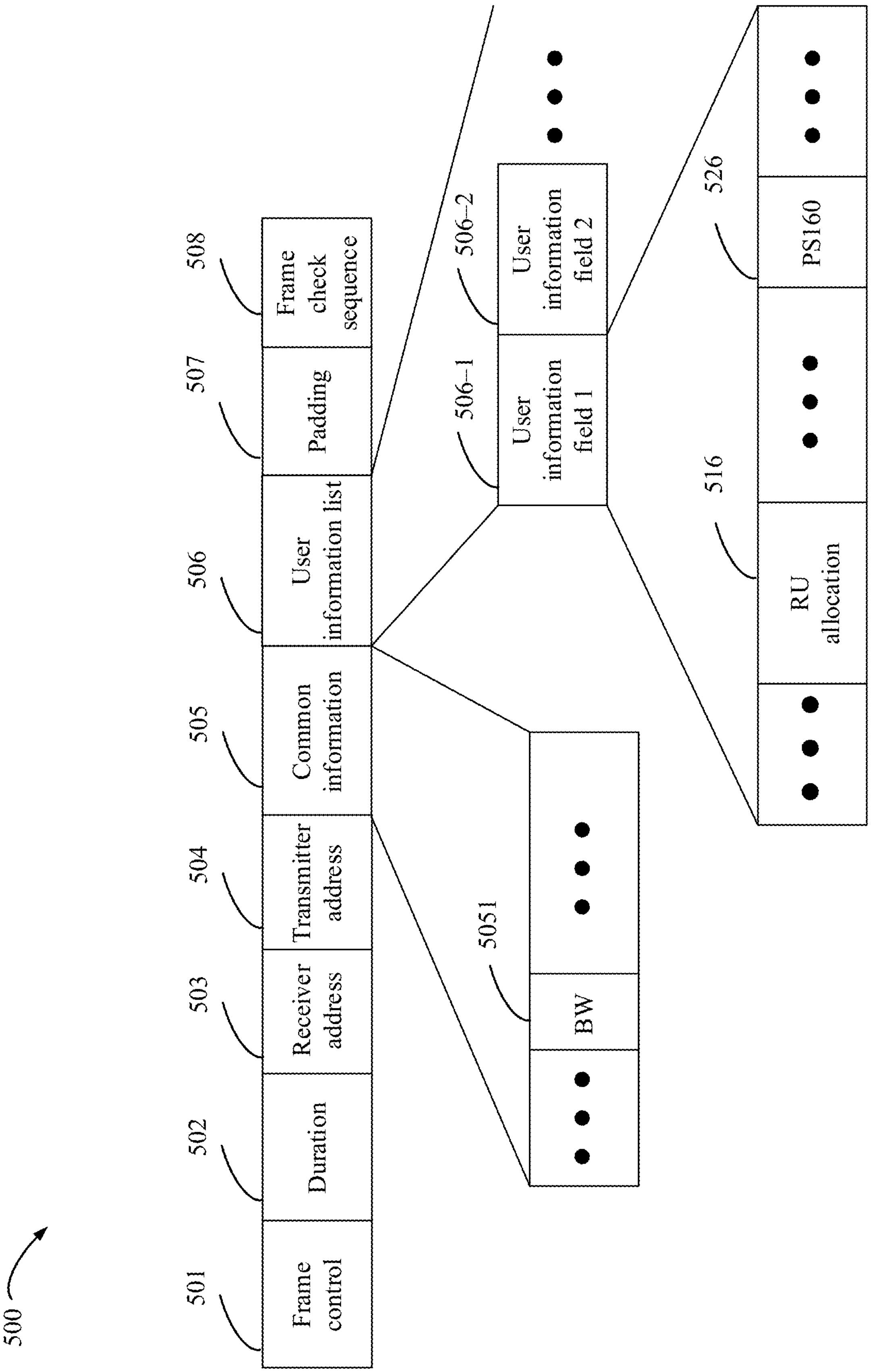
FIG. 5 is a schematic diagram of a frame format of a trigger frame.

FIG. 5 is a schematic diagram of the frame format 500 of the trigger frame sent by the AP. FIG. 5 shows the frame format 500 of the trigger frame defined in the 802.11be. The trigger frame includes the following fields: a frame control field 501, a duration field 502, a receiver address (RA) field 503, a transmitter address (TA) field 504, a common information field 505, a user information list field 506, a padding field 507, and a frame check sequence (FCS) field 508.

The common information field 505 includes common information that needs to be read by all STAs (the STAs herein include at least one of an HE STA and an EHT STA), where the EHT STA refers to a station that supports the EHT protocol, and is also compatible with and supports the HE protocol and previous protocols. The common information field 505 includes at least an uplink bandwidth (UL BW) subfield 5051 that is used together with an uplink bandwidth extension subfield (UL BW Extension subfield) in a special user information field to indicate a total bandwidth of uplink transmission.

The user information list field 506 includes information for each user. As shown in FIG. 5, the user information list field 506 includes a user information field 1 506-1 and a user information field 2 506-2. Each user information field 506 may include an RU allocation subfield 516 and a primary-secondary 160 (PS160) subfield 526. The RU allocation subfield 516 indicates a location of a specific resource unit allocated to a corresponding STA. A mapping relationship between B0 in the RU allocation subfield 516, B7-B1 in the RU allocation subfield 516, and the PS160 subfield 526 is shown in the following Table 1.

The bandwidth (Bandwidth) in Table 1 is determined by both the UL BW subfield and the UL BW extension subfield, and N may be obtained according to an equation $N=2\times X1+X0$. For values of X1 and X0, refer to the following Table 2. Table 2 shows conversion from logical parameters PS160 and B0 to physical parameters X1 and X0.

TABLE 1

| PS160 subfield (PS160 subfield) | B0 of the RU allocation subfield (B0 of the resource unit allocation subfield) | B7-B1 of the RU allocation subfield (B7-B1 of the resource unit allocation subfield) | Bandwidth (MHz) (Bandwidth) | RU/MRU size (RU/MRU size) | RU/MRU index (RU/MRU index) | PHY RU/MRU index (physical RU/MRU index) |
|---|---|---|---|---|---|---|
| 0-3: (indicating 80 MHz where an RU is located) | | 0-8 | 20, 40, 80, 160, or 320 | 26 | RU1 to RU9, respectively (separately/sequentially/in sequence) | 37 × N + RU index |
| | | 9-17 | 40, 80, 160, or 320 | | RU10 to RU18, respectively | |
| | | 18 | 80, 160, or 320 | | Reserved (reserved) | |
| | | 19-36 | 80, 160, or 320 | | RU20 to RU37 respectively | |
| | | 37-40 | 20, 40, 80, 160, or 320 | 52 | RU1 to RU4, respectively | 16 × N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8 × N + RU index |
| | | 55, 56 | 40, 80, 160, or 320 | | RU3 and RU4, respectively | |
| | | 57-60 | 80, 160, or 320 | | RU5 to RU8, respectively | |
| | | 61 | 20, 40, 80, 160, or 320 | 242 | RU1 | 4 × N + RU index |
| | | 62 | 40, 80, 160, or 320 | | RU2 | |
| | | 63, 64 | 80, 160, or 320 | | RU3 and RU4, respectively | |
| | | 65 | 40, 80, 160, or 320 | 484 | RU1 | 2 × N + RU index |
| | | 66 | 80, 160, or 320 | | RU2 | |
| | | 67 | 80, 160, or 320 | 996 | RU1 | N + RU index |
| 0-1: (indicating 160 MHz where an RU is located) | 0 | 68 | | Reserved (reserved) | | Reserved (reserved) |
| | 1 | | 160 or 320 | 2 × 996 | RU1 | X1 + RU index |
| 0 | 0 | 69 | | Reserved (reserved) | | Reserved (reserved) |
| 0 | 1 | | | | | |
| 1 | 0 | | | | | |
| 1 | 1 | | 320 | 4 × 996 | RU1 | RU1 |
| 0-3: indicating 80 MHz where an MRU is located | | 70-72 | 20, 40, 80, 160, or 320 | 52 + 26 | MRU1 to MRU3, respectively | 12 × N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRU1 and MRU2, respectively | 8 × N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4 × N + MRU index |
| 0-1: 160 MHz where an MRU is located | 0 | 94, 95 | 160 or 320 | 996 + 484 | MRU1 and MRU2, respectively | 4 × X1 + MRU index |
| | 1 | | | | MRU3 and MRU4, respectively | |
| 0-1: 160 MHz where an MRU is located | 0 | 96-99 | 160 or 320 | 996 + 484 + 242 | MRU1 to MRU4, respectively | 8 × X1 + MRU index |
| | 1 | | | | MRU5 to MRU8, respectively | |
| 0 | 0 | 100-103 | 320 | 2 × 996 + 484 | MRU1 to MRU4, respectively | MRU index |
| 0 | 1 | | | | MRU5 and MRU6, respectively | |
| 1 | 0 | | | | MRU7 and MRU8, respectively | |
| 1 | 1 | | | | MRU9 to MRU12, respectively | |

TABLE 1-continued

| PS160 subfield (PS160 subfield) | B0 of the RU allocation subfield (B0 of the resource unit allocation subfield) | B7-B1 of the RU allocation subfield (B7-B1 of the resource unit allocation subfield) | Bandwidth (MHz) (Bandwidth) | RU/MRU size (RU/MRU size) | RU/MRU index (RU/MRU index) | PHY RU/MRU index (physical RU/MRU index) |
|---|---|---|---|---|---|---|
| 0 | 0 | 104 | 320 | 3 × 996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3 × 996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | Any (any) | Reserved | Reserved | Reserved |

Note:
In a primary 160 MHz, if B0 of the RU allocation subfield is set to 0, it indicates that the RU/MRU allocation is applied to a primary 80 MHz, and if B0 of the RU allocation subfield is set to 1, it indicates that the RU/MRU allocation is applied to a secondary 80 MHz. In a secondary 160 MHz, if B0 of the RU allocation subfield is set to 0, it indicates that the RU/MRU allocation is applied to low-frequency 80 MHz, and if B0 of the RU/MRU allocation is set to 1, it indicates that the RU/MRU allocation is applied to high frequency 80 MHz.

TABLE 2

| Bandwidth (MHz) | Logical input: Frequency band configuration | Logical input: PS160 | Logical input: B0 | Physical output: X0 | Physical output: X1 | Physical output: N |
|---|---|---|---|---|---|---|
| 20/40/80 | [P80] | 0 | 0 | 0 | 0 | 0 |
| 160 | [P80 S80] | 0 | 0 | 0 | 0 | 0 |
| | | 0 | 1 | 1 | 0 | 1 |
| | [S80 P80] | 0 | 0 | 1 | 0 | 1 |
| | | 0 | 1 | 0 | 0 | 0 |
| 320 | [P80 S80 S160] | 0 | 0 | 0 | 0 | 0 |
| | | 0 | 1 | 1 | 0 | 1 |
| | | 1 | 0 | 0 | 1 | 2 |
| | | 1 | 1 | 1 | 1 | 3 |
| | [S80 P80 S160] | 0 | 0 | 1 | 0 | 1 |
| | | 0 | 1 | 0 | 0 | 0 |
| | | 1 | 0 | 0 | 1 | 2 |
| | | 1 | 1 | 1 | 1 | 3 |
| | [S160 P80 S80] | 0 | 0 | 0 | 1 | 2 |
| | | 0 | 1 | 1 | 1 | 3 |
| | | 1 | 0 | 0 | 0 | 0 |
| | | 1 | 1 | 1 | 0 | 1 |
| | [S160 S80 P80] | 0 | 0 | 1 | 1 | 3 |
| | | 0 | 1 | 0 | 1 | 2 |
| | | 1 | 0 | 0 | 0 | 0 |
| | | 1 | 1 | 1 | 0 | 1 |

It should be understood that in Table 2, P80 represents a primary 80 MHz channel, S80 represents a secondary 80 MHz channel, and S160 represents a secondary 160 MHz channel. The "frequency band configuration" column indicates a sequence of P80, S80, and S160 in absolute frequencies. A sequence from left to right indicates a sequence from a low frequency to a high frequency. For example, [P80 S80] indicates that the primary 80 MHz channel is a first 80 MHz channel in ascending order of frequencies, and the secondary 80 MHz channel is a second 80 MHz channel in ascending order of frequencies; or in other words, [P80 S80] indicates that the primary 80 MHz channel is a low 80 MHz channel, and the secondary 80 MHz channel is a high 80 MHz channel. For another example, [S80 P80 S160] indicates that the secondary 80 MHz channel is a low 80 MHz channel of a low 160 MHz channel, the primary 80 MHz channel is a high 80 MHz channel of the low 160 MHz channel, and the secondary 160 MHz channel is a high 160 MHz channel.

In this way, in a multi-user transmission scenario shown in FIG. 4, each STA may determine, based on a corresponding field in a received trigger frame, an RU allocated to each STA to transmit a data frame.

However, in a low power indoor (LPI) communication scenario, both a maximum transmit power and a maximum power spectral density of a STA are strictly limited. The maximum power spectral density refers to a maximum transmit power of 1 MHz, or the maximum power spectral density is limited in a form in which a transmit power of 1 MHz does not exceed x dBm (dBm=10 lg (mW), lg represents a logarithm to base 10, and mW represents milliwatt). A minimum granularity of the maximum power spectral density is 1 MHz. As described above, the 20 MHz bandwidth includes 256 subcarriers. In other words, 1 MHz includes 12.8 (approximately 13) subcarriers. In a sending process, an average power of each subcarrier is the same. For any 13 continuous subcarriers, assuming that a maximum value of a quantity of subcarriers carrying a signal is n, the average power of each subcarrier is approximately (10^(x/10))/n mW, that is, 10 lg((10^(x/10))/n) dBm.

For example, due to a limitation of a regulation on a 6 GHz spectrum released by the Federal Communications Commission of the United States, the maximum transmit power of each STA is 24 dBm, and the maximum power spectral density is −1 dBm/MHz. In this way, the transmit power of the STA can reach 24 dBm only when the bandwidth reaches 320 MHz. However, when the bandwidth is less than 320 MHz, although the transmit power of the STA does not exceed 24 dBm, the STA can only use a power less than the transmit power corresponding to the bandwidth due to a limitation of the maximum power spectral density. For example, due to a limitation of a regulation on a 6 GHz spectrum released by Europe, the maximum transmit power of each STA is 23 dBm, and the maximum power spectral density is 10 dBm/MHz. In this case, when the bandwidth is 20 MHz, the transmit power is mainly limited by the maximum power spectral density, and when the bandwidth exceeds 20 MHz, the transmit power is mainly limited by the maximum transmit power.

It should be noted that all the RUs mentioned above are continuous RUs. It should be understood that the continuous RU is an RU including a plurality of continuous subcarriers; or the continuous RU is an RU including two continuous subcarrier groups, where a plurality of subcarriers included in each continuous subcarrier group are continuous, and the two continuous subcarrier groups are spaced by only a guard subcarrier, a null subcarrier, or a direct current subcarrier; or all subcarriers on a bandwidth between a lowest-frequency subcarrier of the continuous RU and a highest-frequency subcarrier of the continuous RU belong to the continuous RU. Certainly, the continuous RU may also have another name, and the name of the continuous RU is not limited herein. In the LPI communication scenario, the maximum transmit power and the maximum power spectral density are limited. Compared with the maximum power, the maximum power spectral density is more strictly limited, and the allowed maximum transmit power is generally more limited by the power spectral density. Due to a limitation of the maximum power spectral density, the transmit power of a single continuous RU is limited, and consequently transmission efficiency is low.

In view of this, this disclosure provides a design solution of a distributed resource unit, so that transmission can be performed at a large transmit power, thereby improving transmission efficiency. In other words, if the transmit power of 1 MHz is not changed, that is, the power spectral density is not changed, a distributed resource unit, or referred to as a distributed RU technology, is proposed to increase the transmit power.

In this embodiment of this disclosure, the distributed resource unit (DRU) is also referred to as a discrete RU, and is relative to the foregoing continuous RU.

The DRU in an embodiment of this disclosure includes a plurality of subcarriers discrete in frequency domain. Some or all of the plurality of discrete subcarriers may be discrete. In other words, the plurality of discrete subcarriers may include some subcarriers continuous in frequency, and some subcarriers discontinuous in frequency. Alternatively, none of the plurality of discrete subcarriers is continuous in frequency. It should be understood that the "discrete RU", the "distributed RU", and the "DRU" in this specification may be used interchangeably. It should be further understood that the discrete RU/distributed RU/DRU mentioned in this specification is an RU with subcarriers discrete in frequency domain. In other words, an RU with this characteristic is referred to as a discrete RU/distributed RU/DRU in this specification. However, in practice, an RU with this characteristic may have another name. This is not limited in this disclosure.

The following describes in detail technical solutions provided in this disclosure with reference to more accompanying drawings.

Figure 6:
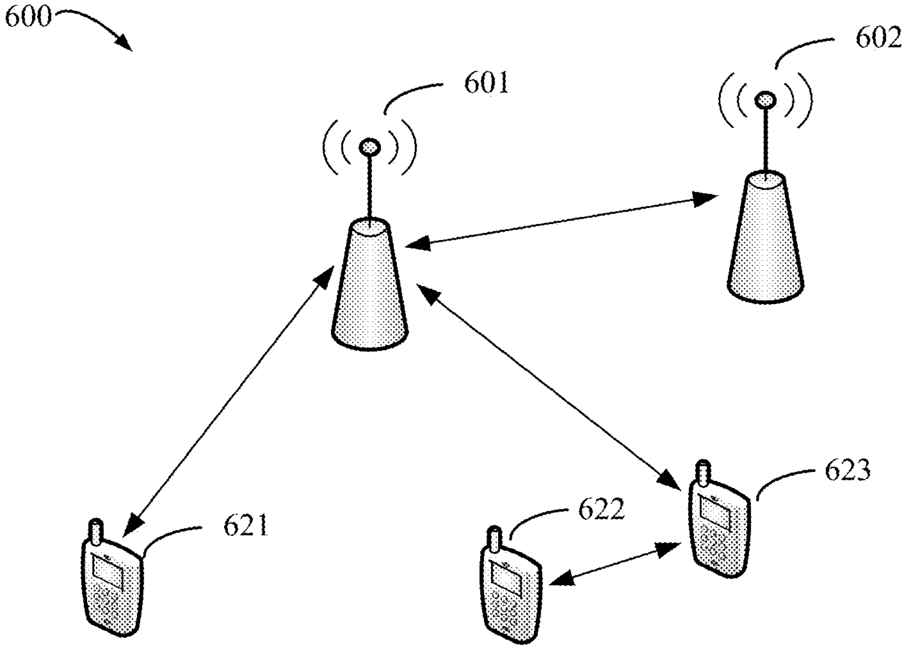
FIG. 6 is a schematic diagram of a communication system in which embodiments of this disclosure may be implemented.

FIG. 6 is a schematic diagram of a communication system 600 in which an embodiment of this disclosure may be implemented. FIG. 6 shows two APs: an AP 601 and an AP 602. FIG. 6 further shows three user stations: a STA 621, a STA 622, and a STA 623. Wireless communication may be performed between the APs, between the AP and the STA, and between the STAs according to various standards. This embodiment of this disclosure may be applied to the communication between the APs, the communication between the STAs, and the communication between the AP and the STA, for example, as shown in FIG. 6, communication between the AP 601 and the AP 602, communication between the STA 622 and the STA 623, communication between the AP 601 and the STA 621, or communication between the AP 601 and the STA 623. It should be noted that FIG. 6 is merely an example. For example, in some embodiments, the AP 602 may also communicate with at least one of the STA 621, the STA 622, and the STA 623. For example, in some embodiments, the STA 621 may also communicate with the STA 622 and/or the STA 623.

For ease of description, the AP 601 and the AP 602 are collectively referred to as an AP 60 below, and the STA 621, the STA 622, and the STA 623 are collectively referred to as a STA 62 below.

It may be understood that both the AP 60 and the STA 62 shown in FIG. 6 support the 802.11be protocol, may also support another WLAN communication protocol (such as 802.11ax and 802.11ac protocols), and may further support a newly-developed protocol (such as a next-generation protocol) after the 802.11be. Correspondingly, the method provided in this embodiment of this disclosure is applicable to the 802.11be protocol, and may also be applicable to a next-generation protocol of the 802.11be.

It should be further understood that FIG. 6 is only a schematic diagram. The system 600 may further include another network device or terminal device, for example, may further include a wireless relay device and a wireless backhaul device. In addition, quantities of APs 60 and STAs 62 included in the system 600 are not limited in this embodiment of this disclosure.

Figure 7:
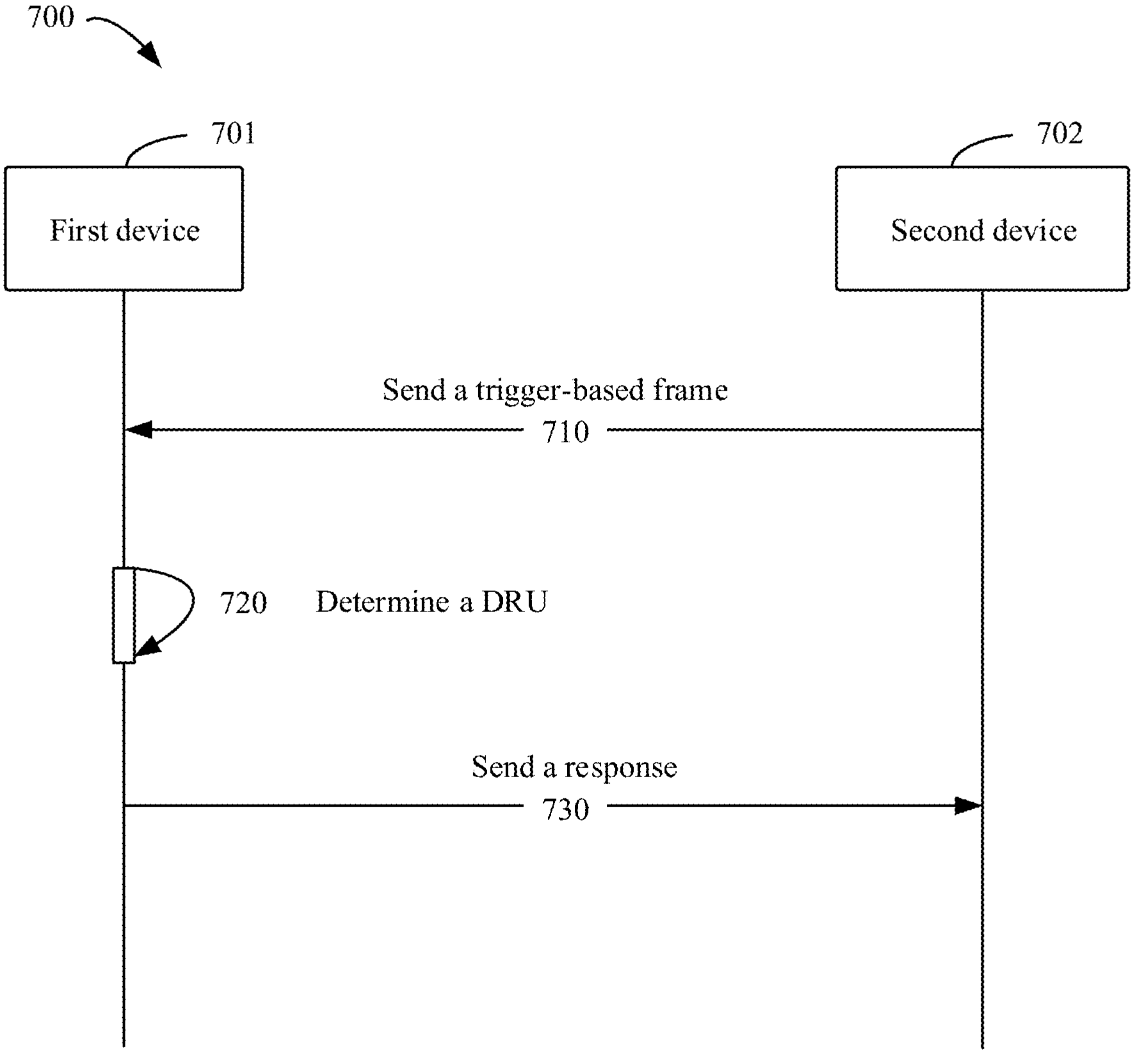
FIG. 7 is a diagram of signaling interaction of an information transmission process according to an embodiment of this disclosure.

FIG. 7 is a diagram of signaling interaction of an information transmission process 700 according to an embodiment of this disclosure. A first device 701 and a second device 702 are designed in the process 700.

It may be understood that in some embodiments, the first device 701 may be the STA 62 in FIG. 6, and the second device 702 may be the AP 60 in FIG. 6. In some other embodiments, the first device 701 may be the AP 60 in FIG. 6, and the second device 702 may be the STA 62 in FIG. 6. In some other embodiments, the first device 701 may be one STA 62 in FIG. 6, and the second device 702 may be another STA 62 in FIG. 6. In some other embodiments, the first device 701 may be one AP 60 (for example, the AP 601) in FIG. 6, and the second device 702 may be the other AP 60 (for example, the AP 602) in FIG. 6. It may be understood that the communication process shown in FIG. 7 is only an example rather than a limitation. In this embodiment of this disclosure, interaction signaling that is not shown in FIG. 7 may be included, or some signaling shown in FIG. 7 is omitted.

In the process 700, the second device 702 sends 710 a trigger-based frame.

Further or optionally, the second device 702 may generate the trigger-based frame and then send the frame.

In some embodiments, the trigger-based frame may be a trigger frame. Correspondingly, the second device 702 may generate the trigger frame. The trigger frame may have a frame format shown in FIG. 5. Further, the second device 702 may send the trigger frame to one or more first devices that are collectively referred to as the first device 701 in FIG. 7. Correspondingly, it may be understood that the first device 701 may receive the trigger-based frame from the second device 702.

The trigger frame may include an RU allocation field that carries DRU indication information. Further or optionally, the trigger frame may further include a bandwidth field that carries bandwidth indication information.

As shown in FIG. 5, if a user information list field 506 of the trigger frame includes subfields corresponding to the plurality of first devices 701, the trigger frame may be sent to the plurality of corresponding first devices 701. Correspondingly, the first device 701 may receive the trigger frame, and parse the subfield that is in the user information list field 506 and that corresponds to the first device 701.

It may be understood that the trigger-based frame may include a type of control frame, referred to as a trigger frame, for example, a trigger frame in the 802.11be, in a MAC frame specified in a standard, or may be another MAC frame with a trigger function. The another MAC frame with a trigger function may also be referred to as a MAC frame with a TRS function, and the function is generally implemented by using a TRS control subfield included in the MAC frame. In some embodiments, the DRU indication information may be carried in an RU allocation field in a user information field in the trigger frame, or may be carried in an RU allocation field in a TRS control subfield in another MAC frame.

Specifically, the DRU indication information may indicate a size and a location of the DRU allocated to the first device. The size of the DRU may be a quantity of subcarriers in the DRU, and the location of the DRU may be a location of a subcarrier in the DRU in frequency domain. For example, the DRU indication information may be carried in at least one of an RU allocation subfield, an uplink bandwidth subfield, an uplink bandwidth extension subfield, and a primary-secondary 160 subfield. Generally, a subcarrier index range indicates a location of a subcarrier in the DRU in frequency domain. The size and the location of the DRU conform to a size and a location predefined in the standard. The DRU indication information may be carried in the RU allocation subfield. For example, the DRU indication information may be designed with reference to the foregoing Table 1. In some embodiments, "RU" in Table 1 may be replaced with "DRU" as an example of the DRU indication information in this embodiment of this disclosure. In this way, the DRU can be indicated without changing a format in an existing protocol, thereby reducing complexity.

For example, as shown in Table 1, the PS160 subfield may indicate a location of a DRU (locations of continuous RUs are indicated in Table 1). The "RU/MRU index" in Table 1 may be redefined as a predefined logical index of the DRU. For a set of the logical index of the DRU and indices of subcarriers included in the DRU, refer to any one of the following Table 5 to Table 50. For brevity, a table form of the DRU indication information obtained based on Table 1 is not described again.

In an embodiment, the trigger frame includes indication information for indicating whether the first device (for example, the STA) uses a DRU or a continuous RU. Based on the indication information, after receiving the trigger frame, the first device may learn of a type of a scheduled RU, that is, whether the RU is a DRU or a continuous RU, so that compatible use of the DRU and the continuous RU can be implemented without increasing signaling overheads. In an embodiment, the indication information may be carried in a subfield in a common information field of the trigger frame. The subfield in the Common info Field may be a reserved field (a reserved field in the 802.11be) in the common information field of the trigger frame, or may be another field. This is not specifically limited herein. If the reserved field in the common information field of the trigger frame is used to carry the indication information, the reserved field is used, and is no longer considered as a reserved field. It should be understood that the trigger frame herein may also be replaced with the MAC frame with the TRS function, and the indication information for indicating whether the station uses a distributed RU or a continuous RU may be located in a reserved bit or a newly added subfield of the TRS subfield. Similarly, when the reserved bit is used, the reserved bit is no longer considered as a reserved bit.

In the process 700, the first device 701 determines 720 one or more distributed resource blocks based on the DRU indication information.

In an embodiment, the one or more distributed resource blocks may be determined from a predetermined quantity of distributed resource blocks, where the predetermined quantity of distributed resource blocks is predefined or preconfigured. A specific value of the predetermined quantity is related to a bandwidth and a size of the distributed resource block. The predetermined quantity of distributed resource blocks may also be referred to as predefined or preconfigured distributed resource blocks.

Specifically, the predetermined quantity of distributed resource blocks may be shown in the following embodiments with reference to Table 5 to Table 50. In other words, the predetermined quantity of distributed resource blocks may be considered as a pre-designed DRU tone plan (tone plan) in different bandwidths (for example, 40 MHz, 80 MHz, 160 MHz, or 320 MHz).

In an embodiment of this disclosure, the one or more distributed resource blocks may also be referred to as transmission resource blocks. In some embodiments, the first device 701 may determine the transmission resource block based on the bandwidth indication information and the DRU indication information. The transmission resource block may be a DRU. In the detailed descriptions of the following embodiments, as shown in Table 1, the first device 701 may determine a size of the DRU and an identifier of the DRU. Further, based on the following embodiments with reference to Table 3 to Table 50, the first device 701 may determine an index of each subcarrier included in the transmission resource block.

As described above, the transmission resource block may include N subcarriers, including N1 data subcarriers and N2 pilot subcarriers, where N=N1+N2. In addition, an absolute value of an index difference between any two data subcarriers of N3 data subcarriers is greater than or equal to 4, and N3<N1. An absolute value of an index difference between any two pilot subcarriers of the N2 pilot subcarriers included in the transmission resource block is greater than 1.

For example, for a distribution characteristic satisfied by the subcarriers included in the transmission resource block, refer to the following specific embodiments described with reference to Table 5 to Table 50. For brevity, details are not described herein again.

In the process 700, the first device 701 sends a response to the trigger-based frame to the second device 702 on the one or more distributed resource blocks.

Correspondingly, it may be understood that the second device 702 may receive the response from the first device 701.

In some embodiments, the response may be in a format of a trigger-based physical layer protocol data unit (TB PPDU). It may be understood that the response may be in another format. Details are not described herein again.

In this way, a transmission resource block used by the first device 701 occupies a minimum quantity of subcarriers in each 1 MHz bandwidth (approximately 13 continuous subcarriers), so that the first device 701 can use a larger transmit power, thereby improving transmission efficiency.

It may be understood that if the trigger frame is sent to the plurality of first devices 701, each first device 701 may similarly perform 720 and 730, thereby implementing multi-user uplink transmission.

In an embodiment of this disclosure, the DRU is used for information transmission. Compared with a continuous RU including a same quantity of subcarriers, the DRU strides across a bandwidth that is from a low-frequency subcarrier start location to a high-frequency subcarrier end location in frequency domain and that is greater than a frequency domain bandwidth occupied by the continuous RU. In this way, at a same maximum power spectral density, a total transmit power of the DRU is greater than a total transmit power of the continuous RU. In other words, at a limited power spectral density, finite subcarriers (for example, 26 subcarriers included in a continuous 26-tone RU) are discrete on a larger bandwidth, and a transmit power can be increased. Therefore, compared with a continuous RU, the DRU can increase a transmit power of a single RU during data transmission, thereby increasing a transmit power on a single subcarrier, and increasing a signal-to-noise ratio (SNR).

It may be understood that, for a first device (such as a STA), in one information transmission process, a transmit power of each subcarrier in a DRU allocated to the first device is the same. A carrier spacing of 78.125 kHz is used as an example. 1 MHz includes 12.8 (approximately 13) subcarriers. It is assumed that a transmit power of 1 MHz does not exceed p mW (namely, the maximum power spectral density). A maximum value of a quantity of subcarriers carrying a signal in any 13 continuous subcarriers determines an average power of each subcarrier, and further determines a transmit power of the signal. The transmit power of the signal is equal to a product of the average power of each subcarrier and the quantity of subcarriers. For example, assuming that a maximum of five subcarriers in any 13 continuous subcarriers (1 MHz) carry a signal, an average power of each subcarrier in the 1 MHz bandwidth is (p/5) mW. Assuming that a maximum of two subcarriers in any 13 continuous subcarriers (1 MHz) carry a signal, an average power of each subcarrier in the 1 MHz bandwidth is (p/2) mW. In other words, at a specific maximum power spectral density, a larger quantity of subcarriers carrying a signal in any 13 continuous subcarriers indicates a smaller average power on each subcarrier and a smaller total transmit power. It may be learned that, it is assumed that a resource unit allocated to the first device is a discrete 26-tone RU, that is, a quantity of subcarriers carrying a signal is 26. If there are a maximum of two subcarriers carrying a signal in any 13 continuous subcarriers, a bandwidth occupied by the discrete 26-tone RU is 26/2=13 MHz, and an average power of each subcarrier in the 1 MHz bandwidth is (p/2) mW. In this case, a total transmit power of the discrete 26-tone RU may be calculated based on a total transmit power of subcarriers, specifically, (p/2)×26 mW, or may be calculated based on a bandwidth occupied by subcarriers, specifically, 13×p mW. If a resource unit allocated to the first device is a continuous 26-tone RU, because the continuous 26-tone RU includes 26 continuous subcarriers (two groups of 13 continuous subcarriers), that is, a bandwidth occupied by the continuous 26-tone RU is 2 MHz, an average power of each subcarrier in the 1 MHz bandwidth is (p/13) mW. In this case, a total transmit power of the continuous 26-tone RU may be calculated based on a total transmit power of subcarriers, specifically, (p/13)×26 mW, or may be calculated based on a bandwidth occupied by subcarriers, specifically, 2×p mW. Through comparison, at a same maximum power spectrum density, the total transmit power of the discrete 26-tone RU is 6.5 times the total transmit power of the continuous 26-tone RU.

According to this embodiment of this disclosure, the design solution of the DRU tone plan (tone plan) is provided, and may be applied to uplink or downlink transmission. For example, the DRU is applied to uplink multi-user transmission. Different first devices (for example, STAs) may alternately send the DRU. At a specific bandwidth and a required power spectral density, a transmit power of each first device may be increased compared with a transmission manner in which a continuous RU is used. Further, a continuous RU signaling indication method may be reused, to reduce complexity.

In an embodiment of this disclosure, the DRU may have various sizes. The size of the DRU may indicate a quantity of subcarriers included in the DRU. The size of the DRU may be N, that is, the DRU includes N subcarriers, and may be specifically represented as an N-tone DRU. The DRU may include data subcarriers and pilot subcarriers. For example, the N-tone DRU may include N1 data subcarriers and N2 pilot subcarriers, and N1+N2=N. In some embodiments, N, N1, and N2 may satisfy a correspondence shown in Table 3. For example, N=26, N1=24, and N2=2. It indicates a 26-tone DRU that may include 24 data subcarriers and two pilot subcarriers. Meanings of other rows in Table 3 are similar to this, and details are not described again.

TABLE 3

| N | N1 | N2 |
|---|---|---|
| 26 | 24 | 2 |
| 52 | 48 | 4 |
| 106 | 102 | 4 |
| 242 | 234 | 8 |
| 484 | 468 | 16 |
| 996 | 980 | 16 |

Specifically, in some embodiments, an absolute value of an index difference between every two data subcarriers of the N3 data subcarriers in the N1 data subcarriers of the DRU of any size is greater than or equal to 4. Specifically, if the N3 data subcarriers are sorted from a low frequency to a high frequency of indices, an absolute value of an index difference between any two adjacent subcarriers of the N3 data subcarriers is greater than or equal to 4, and N3 is less than or equal to N1. In an embodiment, a ratio of N3 to N1 may be greater than a preset ratio, for example, 78%. In some embodiments, a correspondence between N1 and N3 may be shown in the following Table 4.

TABLE 4

| N1 | N3 | N4 |
|---|---|---|
| 24 | 24 | |
| 48 | 48 | |
| 102 | 96 | |
| 234 | 192 | 24 |
| 468 | 384 | 48 |
| 980 | 768 | 96 |

In some embodiments, when a bandwidth is 40 MHz, 80 MHz, 160 MHz, or 320 MHz, N1=24, N2=2, and N3=24, or when a bandwidth is 80 MHz, 160 MHz, or 320 MHz, N1=48, N2=4, and N3=48, or when a bandwidth is 160 MHz or 320 MHz, N1=102, N2=4, and N3=96, or when a bandwidth is 320 MHz, N1=234, N2=8, and N3=192, the N3 data subcarriers satisfy: If the N3 data subcarriers are divided into N3/6 groups from a low frequency to a high frequency of indices, every six data subcarriers form one group, and an absolute value of an index difference between two adjacent data subcarriers in a same group is 18. In other words, for the N3 data subcarriers, if indices of the subcarriers are sorted in ascending order, every six data subcarriers may be considered as or regarded as one group, so that the N3 data subcarriers may be considered as or regarded as the N3/6 groups, and each group includes six data subcarriers. For six data subcarriers in a same group, an absolute value of an index difference between every two adjacent data subcarriers is 18. In other words, a quantity of subcarriers between every two adjacent data subcarriers is 17.

In addition, for the N3/6 groups from a low frequency to a high frequency, absolute values of index differences between two most adjacent data subcarriers in two adjacent groups in the four groups at the lowest frequency may be sequentially 33, 43, and 33, and absolute values of index differences between two most adjacent data subcarriers in two adjacent groups in the four groups at the highest frequency may be sequentially 33, 43, and 33. In other words, in the N3/6 groups, an absolute value of a subcarrier index difference between a first subcarrier in a second group and a last subcarrier in a first group is 33, an absolute value of a subcarrier index difference between a first subcarrier in a third group and a last subcarrier in the second group is 43, and an absolute value of a subcarrier index difference between a first subcarrier in a fourth group and a last subcarrier in the third group is 33. In the N3/6 groups, an absolute value of a subcarrier index difference between a first subcarrier in an $(N3/6-2)^{th}$ group and a last subcarrier in an $(N3/6-3)^{th}$ group is 33, an absolute value of a subcarrier index difference between a first subcarrier in an $(N3/6-1)^{th}$ group and a last subcarrier in the $(N3/6-2)^{th}$ group is 43, and an absolute value of a subcarrier index difference between a first subcarrier in an $(N3/6)^{th}$ group and a last subcarrier in the $(N3/6-1)^{th}$ group is 33.

In an embodiment of this disclosure, an absolute value of a subcarrier index difference between two groups (for example, two adjacent groups) may be understood as a minimum absolute value of a difference between any subcarrier index in a second group and any subcarrier index in a first group in all subcarriers included in the two groups, or may be understood as a difference between a lowest index of all subcarriers in a second group and a highest index of all subcarriers in a first group. An index of each subcarrier in the first group is less than an index of any subcarrier in the second group. The first group in the two groups may be referred to as a lower-frequency group, and the second group in the two groups may be referred to as a higher-frequency group. In other words, an index of each subcarrier in the lower-frequency group is less than an index of any subcarrier in the higher-frequency group. However, it should be understood that whether a specific group is a lower-frequency group or a higher-frequency group depends on the two considered groups. For example, it is assumed that a group 1, a group 2, a group 3, and the like are included from a low frequency to a high frequency. In this case, when the two groups, namely, the group 1 and the group 2, are considered, the group 1 is a first group, and the group 2 is a second group. In other words, the group 1 is a lower-frequency group, and the group 2 is a higher-frequency group. When the two groups, namely, the group 2 and the group 3, are considered, the group 2 is a first group, and the group 3 is a second group. In other words, the group 2 is a lower-frequency group, and the group 3 is a higher-frequency group. In the description of the following embodiments of this disclosure, a lower-frequency group and a higher-frequency group are relative. A term such as the lower-frequency group and the higher-frequency group is merely for ease of description, and should not be construed as a limitation on embodiments of this disclosure.

Further, absolute values of index differences between two most adjacent data subcarriers in two adjacent groups of the N3/6 groups are alternately 33 and 43 in any one of the following cases (1) to (4): (1) a bandwidth is 40 MHz, 80 MHz, 160 MHz, or 320 MHz, N1=24, N2=2, and N3=24; (2) a bandwidth is 80 MHz, N1=48, N2=4, and N3=48; (3) a bandwidth is 160 MHz, N1=102, N2=4, and N3=96; or (4) a bandwidth is 320 MHz, N1=234, N2=8, and N3=192. In other words, for two adjacent groups, an absolute value of an index difference between a smallest subcarrier index in a higher-frequency group and a largest subcarrier index in a lower-frequency group is 33 or 43. Specifically, in ascending order of frequencies, an absolute value of an index difference between a first subcarrier in a second group and a last subcarrier in a first group is 33, an absolute value of an index difference between a first subcarrier in a third group and a last subcarrier in the second group is 43, an absolute value of an index difference between a first subcarrier in a fourth group and a last subcarrier in the third group is 33, and the rest may be deduced by analogy. In other words, a quantity of subcarriers between an odd-numbered group and a subsequent adjacent even-numbered group is 32, and a quantity of subcarriers between an even-numbered group and a subsequent adjacent odd-numbered group is 42.

Alternatively further, if a bandwidth is 160 MHz, N1=48, and N3=48, absolute values of index differences between two most adjacent data subcarriers in two adjacent groups of the N3/6 groups are sequentially 33, 43, 33, 555, 33, 43, and 33.

Alternatively further, if a bandwidth is 320 MHz, N1=48, and N3=48, absolute values of index differences between two most adjacent data subcarriers in two adjacent groups of the N3/6 groups are sequentially 33, 43, 33, 1579, 33, 43, and 33.

Alternatively further, if a bandwidth is 320 MHz, N1=102, and N3=96, absolute values of index differences between two most adjacent data subcarriers in two adjacent groups of the N3/6 groups are sequentially 33, 43, 33, 555, 33, 43, 33, 555, 33, 43, 33, 555, 33, 43, and 33.

In some embodiments, the N3 data subcarriers satisfy: If the N3 data subcarriers are divided into N3/12 groups from a low frequency to a high frequency of indices, every 12 data subcarriers form one group, an absolute value of an index difference between two adjacent data subcarriers in a same group is 9, and absolute values of index differences between two most adjacent data subcarriers in two adjacent groups are alternately 24 and 34 in any one of the following cases (1) to (4): (1) a bandwidth is 40 MHz, N1=48, N2=4, and N3=48; (2) a bandwidth is 80 MHz, N1=102, N2=4, and N3=96; (3) a bandwidth is 160 MHz, N1=234, N2=8, and N3=192; or (4) a bandwidth is 320 MHz, N1=468, N2=16, and N3=384.

In other words, for the N3 data subcarriers, indices of the subcarriers may be sorted in ascending order, and then every 12 data subcarriers may be considered as one group, so that the N3 data subcarriers may be considered as the N3/12 groups, and each group includes 12 data subcarriers. For 12 data subcarriers in a same group, an absolute value of an index difference between every two adjacent data subcarriers is 9. In other words, a quantity of subcarriers between every two adjacent data subcarriers is 8. For two adjacent groups, an absolute value of an index difference between a smallest index in a higher-frequency group and a largest index in a lower-frequency group is 24 or 34. Specifically, in ascending order of frequencies, an absolute value of an index difference between a first subcarrier in a second group and a last subcarrier in a first group is 24, an absolute value of an index difference between a first subcarrier in a third group and a last subcarrier in the second group is 34, an absolute value of an index difference between a first subcarrier in a fourth group and a last subcarrier in the third group is 24, and the rest may be deduced by analogy. In other words, a quantity of subcarriers between an odd-numbered group and a subsequent adjacent even-numbered group is 23, and a quantity of subcarriers between an even-numbered group and a subsequent adjacent odd-numbered group is 33.

In some embodiments, the N3 data subcarriers satisfy: If the N3 data subcarriers are divided into N3/24 groups from a low frequency to a high frequency of indices, every 24 data subcarriers form one group, absolute values of index differences between two adjacent data subcarriers in a same group are alternately 5 and 4, and absolute values of index differences between two most adjacent data subcarriers in two adjacent groups are alternately 19 and 29 in any one of the following cases (1) to (4): (1) a bandwidth is 40 MHz, N1=102, N2=4, and N3=96; (2) a bandwidth is 80 MHz, N1=234, N2=8, and N3=192; (3) a bandwidth is 160 MHz, N1=468, N2=16, and N3=384; or (4) a bandwidth is 320 MHz, N1=980, N2=16, and N3=768. In other words, for the N3 data subcarriers, indices of the subcarriers may be sorted in ascending order, and then every 24 data subcarriers may be considered as one group, so that the N3 data subcarriers may be considered as the N3/24 groups, and each group includes 24 data subcarriers. For 24 data subcarriers in a same group, an absolute value of an index difference between every two adjacent data subcarriers is 5 or 4. In other words, a quantity of subcarriers between every two adjacent data subcarriers is 4 or 3. In other words, in the 24 data subcarriers in the same group, an absolute value of an index difference between a data subcarrier in an even-numbered location and a data subcarrier in a previous adjacent odd-numbered location is 5, and an absolute value of an index difference between a data subcarrier in an odd-numbered location and a data subcarrier in a previous adjacent even-numbered location is 4.

For two adjacent groups, an absolute value of an index difference between a smallest index in a higher-frequency group and a largest index in a lower-frequency group is 19 or 29. Specifically, in ascending order of frequencies, an absolute value of an index difference between a first subcarrier in a second group and a last subcarrier in a first group is 19, an absolute value of an index difference between a first subcarrier in a third group and a last subcarrier in the second group is 29, an absolute value of an index difference between a first subcarrier in a fourth group and a last subcarrier in the third group is 19, and the rest may be deduced by analogy. In other words, a quantity of subcarriers between an odd-numbered group and a subsequent adjacent even-numbered group is 18, and a quantity of subcarriers between an even-numbered group and a subsequent adjacent odd-numbered group is 28.

For a DRU whose size is N, that is, an N-tone DRU, indices of N3 data subcarriers included in the DRU are all negative values, or indices of N3 data subcarriers are all positive values, or half (N3/2) of indices of N3 data subcarriers are positive values and half (N3/2) of indices of the N3 data subcarriers are negative values.

Specifically, M1 26-tone DRUs may be distributed on a bandwidth of 80 MHz, 160 MHz, or 320 MHz, where indices of N3 (N3=24) data subcarriers included in each of M1/2 26-tone DRUs are all negative values, and indices of N3 (N3=24) data subcarriers included in each of the other M1/2 26-tone DRUs are all positive values. It may be understood that when the bandwidth is 80 MHz, M1=36. When the bandwidth is 160 MHz, M1=72. When the bandwidth is 320 MHz, M1=144.

N3 data subcarriers in each N-tone DRU include N3/2 data subcarriers whose indices are negative and the other N3/2 data subcarriers whose indices are positive in any one of the following cases (1) to (6): (1) a 26-tone DRU on a 40 MHz bandwidth; (2) a 52-tone DRU on a bandwidth of 40 MHz, 80 MHz, 160 MHz, or 320 MHz; (3) a 106-tone DRU on a bandwidth of 40 MHz, 80 MHz, 160 MHz, or 320 MHz; (4) a 242-tone DRU on a bandwidth of 80 MHz, 160 MHz, or 320 MHz; (5) a 484-tone DRU on a bandwidth of 160 MHz or 320 MHz; and (6) a 996-tone DRU on a bandwidth of 320 MHz.

In addition, when the size of the DRU is greater than or equal to 242, that is, N≥242, remaining subcarriers other than the N3 data subcarriers in the N1 data subcarriers further include N4 data subcarriers, and an absolute value of an index difference between every two data subcarriers of the N4 data subcarriers is greater than or equal to 18. Specifically, if the N4 data subcarriers are sorted from a low frequency to a high frequency of indices, an absolute value of an index difference between any two adjacent subcarriers of the N4 data subcarriers is greater than or equal to 18. N4 is less than N3, and N3+N4<N1. In some embodiments, correspondences between N4 and N1 and between N4 and N3 may also be shown in the foregoing Table 4.

Further, if N1=234, N3=192, and N4=24, absolute values of index differences between two most adjacent data subcarriers in two adjacent groups of N4/6 groups are sequentially and alternately 33 and 43.

For a DRU whose size is 242, that is, a 242-tone DRU, indices of N4 data subcarriers included in the DRU are all negative values, or indices of N4 data subcarriers are all positive values.

Specifically, M2 242-tone DRUs may be distributed on a bandwidth of 80 MHz, 160 MHz, or 320 MHz, where indices of N4 (N4=24) data subcarriers included in each of M2/2 242-tone DRUs are all negative values, and indices of N4 (N4=24) data subcarriers included in each of the other M2/2 242-tone DRUs are all positive values. It may be understood that when the bandwidth is 80 MHz, M2=4. When the bandwidth is 160 MHz, M2=8. When the bandwidth is 320 MHz, M2=16.

For a DRU whose size is 484 or 996, that is, a 484-tone DRU or a 996-tone DRU, half (N4/2) of indices of N4 data subcarriers included in the DRU are positive values and half (N4/2) are negative values.

Specifically, in a case of a 484-tone DRU on a bandwidth of 160 MHz or 320 MHz, or a 996-tone DRU on a bandwidth of 320 MHz, N4 data subcarriers in each N-tone DRU include N4/2 data subcarriers whose indices are negative and the other N4/2 data subcarriers whose indices are positive.

In some embodiments, a lowest-frequency index of a data subcarrier at a lowest frequency in the N3 data subcarriers satisfies: (1) When the bandwidth is 40 MHz, the lowest-frequency index is −a−128; (2) when the bandwidth is 80 MHz, the lowest-frequency index is −a−128−256 (namely, −a−384); (3) when the bandwidth is 160 MHz, the lowest-frequency index is −a−128−256−512 (namely, −a−896); or (4) when the bandwidth is 320 MHz, the lowest-frequency index is −a−128−256−512−1024 (namely, −a−1920); and a is any positive integer from 110 to 122. For example, a may be 110, 113, 115, 117, or 122.

In this embodiment of this disclosure, an absolute value of an index difference between every two pilot subcarriers of N2 pilot subcarriers in a same DRU is greater than 1. Specifically, for a DRU of a specific size, N2 pilot subcarriers included in each of the DRU of the specific size are determined from remaining subcarriers of all subcarriers in the entire bandwidth other than guard subcarriers, direct current subcarriers, N3 data subcarriers in each DRU, N4 data subcarriers (if any) in each DRU. In addition, in this determining manner, N2 pilot subcarriers in a same DRU are fully discrete, thereby implementing maximum frequency domain diversity. In addition, it may be understood that, for a case in which N3+N4<N1, N1-N3-N4 data subcarriers are determined from remaining subcarriers other than the determined pilot subcarriers, so that the N1-N3-N4 data subcarriers included in each of the DRU of the specific size are fully discrete.

The following separately describes DRUs of different sizes in the 40 MHz bandwidth, the 80 MHz bandwidth, the 160 MHz bandwidth, and the 320 MHz bandwidth with reference to specific embodiments.

In an embodiment of this disclosure, a subcarrier may have a corresponding index. It should be noted that, in this embodiment of this disclosure, square brackets [s01, s02] may indicate a subcarrier index range, s01 indicates a subcarrier index with a smallest sequence number in the range, and s02 indicates a subcarrier index with a largest sequence number in the range. For example, [−a, −a+107] indicates 108 subcarriers whose subcarrier indices range from −a to −a+107. In another manner, in this embodiment of this disclosure, [s1: Δ: s2] may indicate a subcarrier index range, where s1 is a start subcarrier index, Δ is used as a step (which may also be understood as an absolute value of an index difference between two adjacent subcarriers), and s2 is a last subcarrier index in the subcarrier range, that is, [s1: Δ: s2] indicates that subcarrier indices are s1, s1+Δ, s1+2×Δ, . . . , and s2. For example, [−a, −a+107] may indicate [−a: 1: −a+107], that is, −a is a start subcarrier index, 1 is a step, and −a+107 is a last subcarrier index. In the following descriptions, the manner [s01, s02] or [s1: Δ: s2] still indicates a subcarrier index range. Details are not described again each time the manner appears.

In addition, for brevity of description, in the following descriptions, a subcarrier whose subcarrier index is a positive value is referred to as a "high-frequency subcarrier", and a subcarrier whose subcarrier index is a negative value is referred to as a "low-frequency subcarrier". However, a person skilled in the art may understand that the name is merely for ease of description, and should not be construed as a limitation on embodiments of this disclosure.

It should be noted that, in embodiments of this disclosure, an "index" represents a "subcarrier index", and a value range of the "index" depends on a bandwidth. For example, when the bandwidth is 40 MHz, the subcarrier index range is [−256, 255]. When the bandwidth is 80 MHz, the subcarrier index range is [−512, 511]. When the bandwidth is 160 MHz, the subcarrier index range is [−1024, 1023]. When the bandwidth is 320 MHz, the subcarrier index range is [−2048, 2047]. In this embodiment of this disclosure, an index difference between two subcarriers indicates a difference obtained by subtracting an index with a smaller value from an index with a larger value, so that the difference is a positive number. It may be understood that, as another expression, the index difference may alternatively be a negative number obtained by subtracting an index with a larger value from an index with a smaller value. For example, correspondingly "the index difference is greater than or equal to 4" should be understood as "an absolute value of the index difference is greater than or equal to 4". For brevity, the following embodiments of this specification are described by using an example in which "the index difference" indicates that "the absolute value of the index difference" is a positive number.

The following separately describes design solutions of DRUs of different sizes in a 40 MHz bandwidth, an 80 MHz bandwidth, a 160 MHz bandwidth, and a 320 MHz bandwidth with reference to specific embodiments.

It may be understood that, after receiving the trigger-based frame sent by the second device 702 (for example, the AP), the first device 701 (for example, the STA) may determine, based on the DRU indication information in the trigger-based frame, the DRU allocated to the first device 701. Specific subcarriers included in the DRU allocated to the first device 701 may be determined according to a tone plan of the distributed RU in the corresponding bandwidth. The tone plan of the distributed RU in the corresponding bandwidth herein is also a predefined distributed resource block. A plurality of embodiments of this disclosure provide tone plans of distributed RUs in different bandwidths. For details, refer to the following embodiments with reference to Table 5 to Table 50.

For a 40 MHz Bandwidth:

The 40 MHz bandwidth includes 512 subcarriers in total, and the subcarrier index range is [−256, 255]. As shown in FIG. 2, the 40 MHz bandwidth may include 18 26-tone RUs.

In a tone plan solution of a DRU, the 40 MHz bandwidth includes 18 26-tone DRUs, and each 26-tone DRU includes 24 data subcarriers and two pilot subcarriers. For example, Table 5 shows 18 26-tone DRUs corresponding to the 40 MHz bandwidth, and shows indices of 24 data subcarriers and indices of two pilot subcarriers included in each 26-tone DRU, and a lowest-frequency index of a data subcarrier in a 26-tone DRU whose identifier is 1 is −243.

TABLE 5

| Identifier of a 26-tone DRU | Index of a data subcarrier | Index of a pilot subcarrier |
|---|---|---|
| 1 | −243, −225, −207, −189, −171, −153, −120, −102, −84, −66, −48, −30, 13, 31, 49, 67, 85, 103, 136, 154, 172, 190, 208, 226 | −12, 121 |
| 2 | −242, −224, −206, −188, −170, −152, −119, −101, −83, −65, −47, −29, 14, 32, 50, 68, 86, 104, 137, 155, 173, 191, 209, 227 | −11, 122 |
| 3 | −241, −223, −205, −187, −169, −151, −118, −100, −82, −64, −46, −28, 15, 33, 51, 69, 87, 105, 138, 156, 174, 192, 210, 228 | −10, 123 |
| 4 | −240, −222, −204, −186, −168, −150, −117, −99, −81, −63, −45, −27, 16, 34, 52, 70, 88, 106, 139, 157, 175, 193, 211, 229 | −9, 124 |

TABLE 5-continued

| Identifier of a 26-tone DRU | Index of a data subcarrier | Index of a pilot subcarrier |
|---|---|---|
| 5 | −239, −221, −203, −185, −167, −149, −116, −98, −80, −62, −44, −26, 17, 35, 53, 71, 89, 107, 140, 158, 176, 194, 212, 230 | −8, 125 |
| 6 | −238, −220, −202, −184, −166, −148, −115, −97, −79, −61, −43, −25, 18, 36, 54, 72, 90, 108, 141, 159, 177, 195, 213, 231 | −7, 126 |
| 7 | −237, −219, −201, −183, −165, −147, −114, −96, −78, −60, −42, −24, 19, 37, 55, 73, 91, 109, 142, 160, 178, 196, 214, 232 | −6, 127 |
| 8 | −236, −218, −200, −182, −164, −146, −113, −95, −77, −59, −41, −23, 20, 38, 56, 74, 92, 110, 143, 161, 179, 197, 215, 233 | −5, 128 |
| 9 | −235, −217, −199, −181, −163, −145, −112, −94, −76, −58, −40, −22, 21, 39, 57, 75, 93, 111, 144, 162, 180, 198, 216, 234 | −4, 129 |
| 10 | −234, −216, −198, −180, −162, −144, −111, −93, −75, −57, −39, −21, 22, 40, 58, 76, 94, 112, 145, 163, 181, 199, 217, 235 | −3, 130 |
| 11 | −233, −215, −197, −179, −161, −143, −110, −92, −74, −56, −38, −20, 23, 41, 59, 77, 95, 113, 146, 164, 182, 200, 218, 236 | −128, 3 |
| 12 | −232, −214, −196, −178, −160, −142, −109, −91, −73, −55, −37, −19, 24, 42, 60, 78, 96, 114, 147, 165, 183, 201, 219, 237 | −127, 4 |
| 13 | −231, −213, −195, −177, −159, −141, −108, −90, −72, −54, −36, −18, 25, 43, 61, 79, 97, 115, 148, 166, 184, 202, 220, 238 | −126, 5 |
| 14 | −230, −212, −194, −176, −158, −140, −107, −89, −71, −53, −35, −17, 26, 44, 62, 80, 98, 116, 149, 167, 185, 203, 221, 239 | −125, 6 |
| 15 | −229, −211, −193, −175, −157, −139, −106, −88, −70, −52, −34, −16, 27, 45, 63, 81, 99, 117, 150, 168, 186, 204, 222, 240 | −124, 7 |
| 16 | −228, −210, −192, −174, −156, −138, −105, −87, −69, −51, −33, −15, 28, 46, 64, 82, 100, 118, 151, 169, 187, 205, 223, 241 | −123, 8 |
| 17 | −227, −209, −191, −173, −155, −137, −104, −86, −68, −50, −32, −14, 29, 47, 65, 83, 101, 119, 152, 170, 188, 206, 224, 242 | −122, 9 |
| 18 | −226, −208, −190, −172, −154, −136, −103, −85, −67, −49, −31, −13, 30, 48, 66, 84, 102, 120, 153, 171, 189, 207, 225, 243 | −121, 10 |

Specifically, as shown in Table 5, each 26-tone DRU includes 24 data subcarriers, including 12 high-frequency subcarriers (whose subcarrier indices are positive values) and 12 low-frequency subcarriers (whose subcarrier indices are negative values). If every six data subcarriers of the 24 data subcarriers are considered as one group in a frequency direction (for example, from low to high) (or understood as an ascending order of indices), absolute values of index differences between adjacent data subcarriers in a same group are all 18 (or a quantity of subcarriers in the middle is 17), and absolute values of index differences between data subcarriers in two adjacent groups are sequentially 33, 43, and 33. In other words, if 24 data subcarriers included in each 26-tone DRU are viewed in ascending order of subcarrier indices, quantities of subcarriers between two adjacent data subcarriers in every six data subcarriers in ascending order of frequencies are the same. Specifically, a quantity of subcarriers in the middle is 17.

In other words, it is assumed that indices of 24 data subcarriers included in each 26-tone DRU are sequentially arranged in a frequency direction and then divided into four groups, and each group includes six data subcarriers. Six data subcarriers in a same group are equally spaced. Specifically, a quantity of subcarriers between every two adjacent data subcarriers in a same group is 17.

It should be noted that, in this embodiment of this disclosure, an absolute value Δ of an index difference between two subcarriers may be equivalently described as a quantity of subcarriers between two subcarriers, that is, Δ−1. For brevity, the following mainly describes this embodiment by using the absolute value of the index difference. A person skilled in the art may obtain a description manner of the quantity of subcarriers between on this basis.

In addition, if 24 data subcarriers included in each 26-tone DRU are viewed in ascending order of subcarrier indices, every six data subcarriers of the 24 data subcarriers may be considered as one group, and therefore the 24 data subcarriers may be considered as four groups.

Using the 26-tone DRU whose identifier is 1 in Table 5 as an example, 24 data subcarriers included in the 26-tone DRU may be considered as the following four groups: (1) −243, −225, −207, −189, −171, −153; (2) −120, −102, −84, −66, −48, −30; (3) 13, 31, 49, 67, 85, 103; and (4) 136, 154, 172, 190, 208, 226. (1) and (2) are low-frequency groups, and (3) and (4) are high-frequency groups. An absolute value of an index difference between subcarriers of the two low-frequency groups (1) and (2) is a difference between −120 and −153, that is, 33. An absolute value of an index difference between subcarriers of the two high-frequency groups (3) and (4) is a difference between 136 and 103, that is, 33. An absolute value of a subcarrier index difference between the high-frequency group and the low-frequency group, namely, an absolute value of a subcarrier index difference between the high-frequency group (3) and the low-frequency group (2), is a difference between 13 and −30, that is, 43.

In addition, there is a fixed offset between indices of data subcarriers included in two 26-tone DRUs having adjacent identifiers, and the fixed offset is 1. For example, indices of 24 data subcarriers in a 26-tone DRU whose identifier is i (i=1, 2, . . . , or 17) all plus 1, to obtain indices of 24 data subcarriers in a 26-tone DRU whose identifier is i+1.

In Table 5, the identifier of the 26-tone DRU may be based on an index of a lowest-frequency subcarrier included in the 26-tone DRU. In other words, an identifier of a 26-tone DRU having a data subcarrier with a minimum value index is 1. As shown in Table 5, in all data subcarriers in the "index of a data subcarrier" column, a minimum value index is −243. Therefore, an identifier of a 26-tone DRU in which the subcarrier is located is 1. In addition, a minimum value index other than that of the 26-tone DRU whose identifier is 1 is −242. Therefore, the identifier of the 26-tone DRU in which the subcarrier is located is 2.

It may be understood that although the lowest-frequency index shown in Table 5 is −243, the value is merely an example. For example, the value may be any integer from −250 to −238, for example, −250, −245, or −238.

As shown in Table 5, each 26-tone DRU further includes two pilot subcarriers, where one pilot subcarrier is a high-frequency subcarrier, and the other pilot subcarrier is a low-frequency subcarrier. In addition, for 26-tone DRUs whose identifiers are 1 to 10, an absolute value of an index difference between two pilot subcarriers in a same 26-tone DRU is 133. For 26-tone DRUs whose identifiers are 11 to 18, an absolute value of an index difference between two pilot subcarriers in a same 26-tone DRU is 131. In this way, pilot subcarriers can be fully discrete, thereby implementing frequency domain diversity.

In an embodiment, pilot subcarriers included in each 26-tone DRU are determined from remaining subcarriers other than all data subcarriers in the "index of a data subcarrier" column in Table 5 and DC subcarriers [−2, 2] and guard subcarriers [−256, −245] and [245, 255] in [−256, 255].

As shown in Table 5, for identifiers 1 to 10, there is a fixed offset between indices of pilot subcarriers included in two 26-tone DRUs having adjacent identifiers, and the fixed offset is 1. For identifiers 11 to 18, there is a fixed offset between indices of pilot subcarriers included in two 26-tone DRUs having adjacent identifiers, and the fixed offset is 1. For example, indices of two pilot subcarriers in a 26-tone DRU whose identifier is i (i=1, 2, . . . , or 9) all plus 1, to obtain indices of two pilot subcarriers in a 26-tone DRU whose identifier is i+1. For example, indices of two pilot subcarriers in a 26-tone DRU whose identifier is i (i=11, 12, . . . , or 17) all plus 1, to obtain indices of two pilot subcarriers in a 26-tone DRU whose identifier is i+1.

In this way, for a 40 MHz bandwidth, by using a design of a 26-tone DRU shown in Table 5, a spacing between pilot subcarriers is not less than 25% of a total quantity of subcarriers, thereby implementing frequency domain diversity. Compared with the continuous 26-tone RUs shown in FIG. 2, at a same power spectral density, this embodiment of this disclosure can implement a maximum power amplification multiple, specifically, 13.

It may be understood that the pilot subcarriers shown in Table 5 are merely examples, and other pilot subcarriers may alternatively be used. For example, two pilot subcarriers in a 26-tone DRU are both high-frequency subcarriers, and two pilot subcarriers in another 26-tone DRU are both low-frequency subcarriers. In different 26-tone DRUs, quantities of subcarriers between two pilot subcarriers may be different.

The foregoing describes a tone plan solution of the 26-tone DRU in the 40 MHz bandwidth with reference to Table 5. The solution is merely an example. A person skilled in the art may obtain another solution on this basis. For example, the lowest-frequency index is no longer −243 but another value. For example, an index of a pilot subcarrier is determined by using another solution. In addition, the tone plan of other DRUs described below in this disclosure may also be similarly varied, and these variations are not described below for each DRU.

In a tone plan of a DRU, the 40 MHz bandwidth includes eight 52-tone DRUs, and each 52-tone DRU includes 48 data subcarriers and four pilot subcarriers. For example, Table 6 shows an example of eight 52-tone DRUs corresponding to the 40 MHz bandwidth, and shows indices of 48 data subcarriers and indices of four pilot subcarriers included in each 52-tone DRU, and a lowest-frequency index of a data subcarrier in a 52-tone DRU whose identifier is 1 is −243.

TABLE 6

| Identifier of a 52-tone DRU | Index of a data subcarrier | Index of a pilot subcarrier |
|---|---|---|
| 1 | −243, −234, −225, −216, −207, −198, −189, −180, −171, −162, −153, −144, −120, −111, −102, −93, −84, −75, −66, −57, −48, −39, −30, −21, 13, 22, 31, 40, 49, 58, 67, 76, 85, 94, 103, 112, 136, 145, 154, 163, 172, 181, 190, 199, 208, 217, 226, 235 | −12, −3, 121, 130 |
| 2 | −242, −233, −224, −215, −206, −197, −188, −179, −170, −161, −152, −143, −119, −110, −101, −92, −83, −74, −65, −56, −47, −38, −29, −20, 14, 23, 32, 41, 50, 59, 68, 77, 86, 95, 104, 113, 137, 146, 155, 164, 173, 182, 191, 200, 209, 218, 227, 236 | −128, −11, 3, 122 |
| 3 | −241, −232, −223, −214, −205, −196, −187, −178, −169, −160, −151, −142, −118, −109, −100, −91, −82, −73, −64, −55, −46, −37, −28, −19, 15, 24, 33, 42, 51, 60, 69, 78, 87, 96, 105, 114, 138, 147, 156, 165, 174, 183, 192, 201, 210, 219, 228, 237 | −127, −10, 4, 123 |
| 4 | −240, −231, −222, −213, −204, −195, −186, −177, −168, −159, −150, −141, −117, −108, −99, −90, −81, −72, −63, −54, −45, −36, −27, −18, 16, 25, 34, 43, 52, 61, 70, 79, 88, 97, 106, 115, 139, 148, 157, 166, 175, 184, 193, 202, 211, 220, 229, 238 | −126, −9, 5, 124 |
| 5 | −238, −229, −220, −211, −202, −193, −184, −175, −166, −157, −148, −139, −115, −106, −97, −88, −79, −70, −61, −52, −43, −34, −25, −16, 18, 27, 36, 45, 54, 63, 72, 81, 90, 99, 108, 117, 141, 150, 159, 168, 177, 186, 195, 204, 213, 222, 231, 240 | −124, −7, 7, 126 |
| 6 | −237, −228, −219, −210, −201, −192, −183, −174, −165, −156, −147, −138, −114, −105, −96, −87, −78, −69, −60, −51, −42, −33, −24, −15, 19, 28, 37, 46, 55, 64, 73, 82, 91, 100, 109, 118, 142, 151, 160, 169, 178, 187, 196, 205, 214, 223, 232, 241 | −123, −6, 8, 127 |
| 7 | −236, −227, −218, −209, −200, −191, −182, −173, −164, −155, −146, −137, −113, −104, −95, −86, −77, −68, −59, −50, −41, −32, −23, −14, 20, 29, 38, 47, 56, 65, 74, 83, 92, 101, 110, 119, 143, 152, 161, 170, 179, 188, 197, 206, 215, 224, 233, 242 | −122, −5, 9, 128 |

TABLE 6-continued

| Identifier of a 52-tone DRU | Index of a data subcarrier | Index of a pilot subcarrier |
|---|---|---|
| 8 | −235, −226, −217, −208, −199, −190, −181, −172, −163, −154, −145, −136, −112, −103, −94, −85, −76, −67, −58, −49, −40, −31, −22, −13, 21, 30, 39, 48, 57, 66, 75, 84, 93, 102, 111, 120, 144, 153, 162, 171, 180, 189, 198, 207, 216, 225, 234, 243 | −121, −4, 10, 129 |

Specifically, as shown in Table 6, each 52-tone DRU includes 48 data subcarriers, including 24 high-frequency subcarriers (whose subcarrier indices are positive values) and 24 low-frequency subcarriers (whose subcarrier indices are negative values). If every 12 of the 48 data subcarriers are considered as one group in a frequency direction (for example, from low to high) (or understood as an ascending order of indices), absolute values of index differences between adjacent data subcarriers in a same group are all 9. In addition, absolute values of index differences between data subcarriers of two adjacent groups are alternately 24 and 34.

In other words, it is assumed that indices of 48 data subcarriers included in each 52-tone DRU are sequentially arranged in a frequency direction and then divided into four groups, and each group includes 12 data subcarriers. 12 data subcarriers in a same group are equally spaced. Specifically, a quantity of subcarriers between every two adjacent data subcarriers in a same group is 8.

In an embodiment of this disclosure, for ease of description, [s1: Δ: s2] indicates that s1 is used as a start subcarrier index, Δ is used as a step, and s2 is used as a last subcarrier index in the subcarrier range, for example, [−243: 9: −144] indicates the following subcarrier indices: −243, −243+9, −243+18, −243+27, . . . , and −144, that is, −243, −234, −225, −216, −207, −198, −189, −180, −171, −162, −153, and −144.

Using a 52-tone DRU whose identifier is 1 in Table 6 as an example, 48 data subcarriers included in the 52-tone DRU may be considered as the following four groups: (1) [−243: 9: −144]; (2) [−120: 9: −21]; (3) [13: 9: 112]; and (4) [136: 9: 235]. (1) and (2) are low-frequency groups, and (3) and (4) are high-frequency groups. An absolute value of an index difference between subcarriers of the two low-frequency groups (1) and (2) is a difference between −120 and −144, that is, 24. An absolute value of an index difference between subcarriers of the two high-frequency groups (3) and (4) is a difference between 136 and 112, that is, 24. An absolute value of a subcarrier index difference between the high-frequency group and the low-frequency group, namely, an absolute value of a subcarrier index difference between the high-frequency group (3) and the low-frequency group (2), is a difference between 13 and −21, that is, 34.

As shown in Table 6, for identifiers 1 to 4, and 5 to 8, there is a fixed offset between indices of data subcarriers included in two 52-tone DRUs having adjacent identifiers, and the fixed offset is 1. For example, indices of 48 data subcarriers in a 52-tone DRU whose identifier is i (i=1, 2, 3, 5, 6, or 7) all plus 1, to obtain indices of 48 data subcarriers in a 52-tone DRU whose identifier is i+1. An offset between an index of a data subcarrier included in a 52-tone DRU whose identifier is 4 and an index of a data subcarrier included in a 52-tone DRU whose identifier is 5 is 2. For example, indices of 48 data subcarriers in a 52-tone DRU whose identifier is 4 all plus 2, to obtain indices of 48 data subcarriers in a 52-tone DRU whose identifier is 5.

In another description, eight 52-tone DRUs may include four 52-tone DRUs with large identifiers (identifiers 5 to 8) and four 52-tone DRUs with low identifiers (identifiers 1 to 4). In the four 52-tone DRUs with large identifiers, there is a fixed offset between two adjacent DRUs, and the fixed offset is 1. In the four 52-tone DRUs with small identifiers, there is a fixed offset between two adjacent DRUs, and the fixed offset is 1. An offset between a 52-tone DRU with a large identifier and a 52-tone DRU with a low identifier, specifically between a 52-tone DRU whose identifier is 4 and a 52-tone DRU whose identifier is 5, is 2.

As shown in Table 6, each 52-tone DRU includes four pilot subcarriers, including two high-frequency subcarriers and two low-frequency subcarriers. In this way, pilot subcarriers included in a same DRU can be fully discrete, thereby implementing frequency domain diversity.

In addition, as shown in Table 5, the 52-tone DRU whose identifier is i (i=1 to 4) may be considered as a combination of a 26-tone DRU whose identifier is i and a 26-tone DRU whose identifier is i+9, and the 52-tone DRU whose identifier is i (i=5 to 8) may be considered as a combination of a 26-tone DRU whose identifier is i+1 and a 26-tone DRU whose identifier is i+10. In this way, subcarriers in the 52-tone DRU can be fully discrete. For example, 48 data subcarriers in a 52-tone DRU whose identifier is 1 are a combination of 24 data subcarriers in a 26-tone DRU whose identifier is 1 and 24 data subcarriers in a 26-tone DRU whose identifier is 10 in Table 5. Four pilot subcarriers in the 52-tone DRU whose identifier is 1 are a combination of two pilot subcarriers in the 26-tone DRU whose identifier is 1 and two pilot subcarriers in the 26-tone DRU whose identifier is 10 in Table 5. Correspondingly, Table 6 may also be simplified and represented as the following Table 7 based on Table 5.

TABLE 7

| Identifier of a 52-tone DRU | Identifier of a 26-tone DRU |
|---|---|
| 1 | 1, 10 |
| 2 | 2, 11 |
| 3 | 3, 12 |
| 4 | 4, 13 |
| 5 | 6, 15 |
| 6 | 7, 16 |
| 7 | 8, 17 |
| 8 | 9, 18 |

In addition, in an embodiment of this disclosure, the identifier of the 52-tone DRU may be based on a lowest-frequency index of a data subcarrier included in each 52-tone DRU. For example, an identifier of a 52-tone DRU having a lowest-frequency index −243 is 1, and an identifier of a 52-tone DRU with a second lowest-frequency index −242 is 2.

According to the design of the 52-tone DRU shown in Table 6 or Table 7 in this embodiment of this disclosure, compared with the continuous 52-tone RU in FIG. 2, at a same power spectral density, this embodiment of this disclosure can implement a maximum power amplification multiple, specifically, 6.5.

In an embodiment of this disclosure, an association between a 52-tone DRU and a 26-tone DRU in 40 MHz is described by using Table 7. It may be understood that the foregoing described manner of determining a 52-tone DRU based on a 26-tone DRU is merely an example, and subcarriers in the 52-tone DRU can be fully discrete. In another embodiment, a 52-tone DRU may alternatively be determined in another manner based on a 26-tone DRU. For example, a combination of two 26-tone DRUs whose identifiers are 1 and 2 is determined as the 52-tone DRU whose identifier is 1. This is not limited in this disclosure. Details are not described again. In addition, it may be understood that, considering the association between the 52-tone DRU and the 26-tone DRU, if the lowest-frequency index of the data subcarrier included in the 26-tone DRU is another value other than −243, correspondingly the lowest-frequency index of the data subcarrier included in the 52-tone DRU also adaptively changes to another value.

In a tone plan solution of a DRU, the 40 MHz bandwidth includes four 106-tone DRUs, and each 106-tone DRU includes 102 data subcarriers and four pilot subcarriers. For example, Table 8 shows an example of four 106-tone DRUs corresponding to the 40 MHz bandwidth, and shows indices of 102 data subcarriers and indices of four pilot subcarriers included in each 106-tone DRU. As shown in Table 8, the 102 data subcarriers may be considered as two parts. A first part of data subcarriers includes 96 data subcarriers, a second part of data subcarriers includes six data subcarriers, and a lowest-frequency index of a data subcarrier in a 106-tone DRU whose identifier is 1 is −243. It should be understood that, although the data subcarriers are divided into the first part and the second part in Table 8 and are separately listed, in this embodiment of this disclosure, the data subcarriers are presented as a plurality of parts only for ease of description, and are not actually used as division of data subcarriers included in each 106-tone DRU. During actual application, the data subcarriers include a combination of data subcarriers in two parts, and do not need to be distinguished. In other words, the first part and the second part do not need to be distinguished, but are considered as a whole, namely, a data subcarrier index included in each 106-tone DRU.

TABLE 8

| Identifier of a 106-tone DRU | Index of a data subcarrier: First part | Index of a data subcarrier: Second part | Index of a pilot subcarrier |
|---|---|---|---|
| 1 | −243, −238, −234, −229, −225, −220, −216, −211, −207, −202, −198, −193, −189, −184, −180, −175, −171, −166, −162, −157, −153, −148, −144, −139, −120, −115, −111, −106, −102, −97, −93, −88, −84, −79, −75, −70, −66, −61, −57, −52, −48, −43, −39, −34, −30, −25, −21, −16, 13, 18, 22, 27, 31, 36, 40, 45, 49, 54, 58, 63, 67, 72, 76, 81, 85, 90, 94, 99, 103, 108, 112, 117, 136, 141, 145, 150, 154, 159, 163, 168, 172, 177, 181, 186, 190, 195, 199, 204, 208, 213, 217, 222, 226, 231, 235, 240 | −135, 244, −7, −3, 126, 121 | −124, −2, 7, 1130 |
| 2 | −242, −237, −233, −228, −224, −219, −215, −210, −206, −201, −197, −192, −188, −183, −179, −174, −170, −165, −161, −156, −152, −147, −143, −138, −119, −114, −110, −105, −101, −96, −92, −87, −83, −78, −74, −69, −65, −60, −56, −51, −47, −42, −38, −33, −29, −24, −20, −15, 14, 19, 23, 28, 32, 37, 41, 46, 50, 55, 59, 64, 68, 73, 77, 82, 86, 91, 95, 100, 104, 109, 113, 118, 137, 142, 146, 151, 155, 160, 164, 169, 173, 178, 182, 187, 191, 196, 200, 205, 209, 214, 218, 223, 227, 232, 236, 241 | −134, 131, −123, −6, 3, 122 | −128, −11, 8, 127 |
| 3 | −241, −236, −232, −227, −223, −218, −214, −209, −205, −200, −196, −191, −187, −182, −178, −173, −169, −164, −160, −155, −151, −146, −142, −137, −118, −113, −109, −104, −100, −95, −91, −86, −82, −77, −73, −68, −64, −59, −55, −50, −46, −41, −37, −32, −28, −23, −19, −14, 15, 20, 24, 29, 33, 38, 42, 47, 51, 56, 60, 65, 69, 74, 78, 83, 87, 92, 96, 101, 105, 110, 114, 119, 138, 143, 147, 152, 156, 161, 165, 170, 174, 179, 183, 188, 192, 197, 201, 206, 210, 215, 219, 224, 228, 233, 237, 242 | −133, 132, −122, −5, 4, 123 | −127, −10, 9, 128 |
| 4 | −240, −235, −231, −226, −222, −217, −213, −208, −204, −199, −195, −190, −186, −181, −177, −172, −168, −163, −159, −154, −150, −145, −141, −136, −117, −112, −108, −103, −99, −94, −90, −85, −81, −76, −72, −67, −63, −58, −54, −49, −45, −40, −36, −31, −27, −22, −18, −13, 16, 21, 25, 30, 34, 39, 43, 48, 52, 57, 61, 66, 70, 75, 79, 84, 88, 93, 97, 102, 106, 111, 115, 120, 139, 144, 148, 153, 157, 162, 166, 171, 175, 180, 184, 189, 193, 198, 202, 207, 211, 216, 220, 225, 229, 234, 238, 243 | −132, 133, −126, −4, 5, 124 | −121, −9, 10, 129 |

Specifically, as shown in Table 8, each 106-tone DRU includes 102 data subcarriers, and some (namely, the first part in Table 8: 96 data subcarriers) of the 102 data subcarriers include 48 high-frequency subcarriers (whose subcarrier indices are positive values) and 48 low-frequency subcarriers (whose subcarrier indices are negative values). If every 24 of the 96 data subcarriers are considered as one group in a frequency direction (for example, from low to high) (or understood as an ascending order of indices), absolute values of index differences between adjacent data subcarriers in a same group are alternately 5 and 4, and absolute values of index differences between data subcarriers in two adjacent groups are alternately 19 and 29.

In other words, for the 24 data subcarriers in the same group, an absolute value of an index difference between adjacent subcarriers of 12 data subcarriers in odd-numbered locations is 9, and an absolute value of an index difference between adjacent subcarriers of 12 data subcarriers in even-numbered locations is 9. An absolute value of an index difference between a data subcarrier in an even-numbered location and a previous adjacent data subcarrier is 5. Correspondingly, an absolute value of an index difference between a data subcarrier in an odd-numbered location and a previous adjacent data subcarrier is 4. In some embodiments, the 24 data subcarriers in the same group may be considered to include two sequences, for example, an odd-numbered location sequence and an even-numbered location sequence. An absolute value of an index difference between adjacent data subcarriers in each sequence is 9. For example, indices of the first 24 data subcarriers of the first part of data subcarriers of the 242-tone DRU whose identifier is 1 include −243, −238, −234, −229, −225, −220, −216, −211, −207, −202, −198, −193, −189, −184, −180, −175, −171, −166, −162, −157, −153, −148, −144, and −139, and may be represented as a combination of two sequences [−243: 9: −144] and [−238: 9: −139].

In other words, it is assumed that indices of 96 data subcarriers of 102 data subcarriers included in each 106-tone DRU are sequentially arranged in a frequency direction and then divided into four groups, and each group includes 24 data subcarriers. Absolute values of index differences between 24 data subcarriers in a same group are alternately 5 and 4.

Using a 106-tone DRU whose identifier is 1 in Table 8 as an example, 96 data subcarriers included in the 106-tone DRU may be considered as the following four groups: (1) −243, −238, −234, −229, −225, −220, −216, −211, −207, −202, −198, −193, −189, −184, −180, −175, −171, −166, −162, −157, −153, −148, −144, −139; (2) −120, −115, −111, −106, −102, −97, −93, −88, −84, −79, −75, −70, −66, −61, −57, −52, −48, −43, −39, −34, −30, −25, −21, −16; (3) 13, 18, 22, 27, 31, 36, 40, 45, 49, 54, 58, 63, 67, 72, 76, 81, 85, 90, 94, 99, 103, 108, 112, 117; and (4) 136, 141, 145, 150, 154, 159, 163, 168, 172, 177, 181, 186, 190, 195, 199, 204, 208, 213, 217, 222, 226, 231, 235, 240. (1) and (2) are low-frequency groups, and (3) and (4) are high-frequency groups. An absolute value of an index difference between subcarriers of the two low-frequency groups (1) and (2) is a difference between −120 and −139, that is, 19. An absolute value of an index difference between subcarriers of the two high-frequency groups (3) and (4) is a difference between 136 and 117, that is, 19. An absolute value of a subcarrier index difference between the high-frequency group and the low-frequency group, namely, an absolute value of a subcarrier index difference between the high-frequency group (3) and the low-frequency group (2), is a difference between 13 and −16, that is, 29.

As shown in Table 8, there is a fixed offset between indices of 96 data subcarriers (the first part) included in two 106-tone DRUs having adjacent identifiers, and the fixed offset is 1. For example, indices of 96 data subcarriers in a 106-tone DRU whose identifier is i (i=1, 2, or 3) all plus 1, to obtain indices of 96 data subcarriers in a 106-tone DRU whose identifier is i+1.

In addition to the 96 data subcarriers in the first part column of the foregoing table, each 106-tone DRU further includes six data subcarriers and four pilot subcarriers. In some embodiments, six data subcarriers and four pilot subcarriers may be separately selected from remaining subcarriers of all subcarriers of the entire bandwidth other than guard subcarriers, DC subcarriers, and data subcarriers in the first part column. A specific selection manner is not limited in this embodiment of this disclosure. For example, Table 8 shows an example, so that subcarriers included in the 106-tone DRU can be fully discrete.

With reference to the foregoing Table 5 or Table 6, it may be considered that a 106-tone DRU is obtained based on a 26-tone DRU or a 52-tone DRU. For example, the four pilot subcarriers included in the 106-tone DRU may be a part of a set of eight pilot subcarriers included in the corresponding four 26-tone DRUs. In addition, the other six data subcarriers included in the 106-tone DRU may be selected from remaining subcarriers of all the subcarriers of the entire bandwidth other than the guard subcarriers, the DC subcarriers, the data subcarriers in the first part column, and the pilot subcarriers, and the data subcarriers may be fully discrete, as shown in the “second part” column of Table 8.

As shown in Table 8, each 106-tone DRU includes four pilot subcarriers, including two high-frequency subcarriers and two low-frequency subcarriers, and an absolute value of an index difference between a low-frequency pilot subcarrier and a high-frequency pilot subcarrier is 19. In this way, pilot subcarriers included in a same DRU can be fully discrete, thereby implementing frequency domain diversity.

For example, Table 8 may be simplified and represented as the following Table 9. The “first part” column in Table 9 means that the first part of (96) data subcarriers in the 106-tone DRU include a combination of data subcarriers in corresponding 26-tone DRUs shown in Table 5. For example, a 106-tone DRU whose identifier is 1 is used as an example. 96 data subcarriers (the first part) of 102 data subcarriers included in the 106-tone DRU include all data subcarriers of four 26-tone DRUs whose identifiers are 1, 6, 10, and 15 shown in Table 5. In another understanding, a 106-tone DRU whose identifier is 1 is used as an example. 96 data subcarriers (the first part) of 102 data subcarriers included in the 106-tone DRU include all data subcarriers of two 52-tone DRUs whose identifiers are 1 and 5 shown in Table 6.

TABLE 9

| | Index of a data subcarrier | | |
|---|---|---|---|
| Identifier of a 106-tone DRU | First part (identifier of a 26-tone DRU) | Second part | Index of a pilot subcarrier |
| 1 | 1, 6, 10, 15 | −135, −7, −3, 121, 126, 244 | −124, −12, 7, 130 |
| 2 | 2, 7, 11, 16 | −134, −123, −6, 3, 122, 131 | −128, −11, 8, 127 |
| 3 | 3, 8, 12, 17 | −133, −122, −5, 4, 123, 132 | −127, −10, 9, 128 |
| 4 | 4, 9, 13, 18 | −132, −126, −4, 5, 124, 133 | −121, −9, 10, 129 |

In addition, in an embodiment of this disclosure, the identifier of the 106-tone DRU may be based on a lowest-frequency index of a data subcarrier included in each 106-tone DRU. For example, an identifier of a 106-tone DRU having a lowest-frequency index −243 is 1.

According to the design of the 106-tone DRU shown in Table 8 or Table 9 in this embodiment of this disclosure, compared with the continuous 106-tone RU in FIG. 2, at a same power spectral density, this embodiment of this disclosure can implement a maximum power amplification multiple, specifically, 4.33.

In an embodiment of this disclosure, an association between a 26-tone DRU (indirectly a 52-tone DRU) and a 106-tone DRU in 40 MHz is described by using Table 9. It may be understood that a manner of determining a 106-tone DRU based on a 26-tone DRU in Table 9 is merely an example, and subcarriers in the 106-tone DRU can be fully discrete. In another embodiment, a 106-tone DRU may alternatively be determined in another manner based on a 26-tone DRU. For example, a combination of four 26-tone DRUs whose identifiers are 1 to 4 is determined as the first part of data subcarriers of the 106-tone DRU whose identifier is 1. This is not limited in this disclosure. Details are not described again. In addition, it may be understood that if the lowest-frequency index of the data subcarrier included in the 26-tone DRU is another value other than −243, correspondingly the lowest-frequency index of the data subcarrier included in the 106-tone DRU also adaptively changes to another value.

Tone plans of 26-tone DRUs, 52-tone DRUs, and 106-tone DRUs in 40 MHz are separately described above with reference to Table 5 to Table 9. An index −243 is used as a lowest-frequency index of a data subcarrier.

The foregoing content describes in detail subcarriers (data subcarriers and pilot subcarriers) separately included in different DRUs in the 40 MHz bandwidth. To make characteristics of the subcarriers clearer, the following describes characteristics followed by a tone plan of the DRUs in the 40 MHz bandwidth.

The tone plan of the DRUs in the 40 MHz bandwidth may include a predetermined quantity of DRUs, and the predetermined quantity of DRUs satisfies one or more of the following characteristics.

Characteristic a: The characteristic includes a data subcarrier set and a pilot subcarrier set.

Characteristic b: A data subcarrier set includes M subcarrier sets (tone sets), where M is greater than or equal to 18, and M is a positive integer. For example, M is 18 or 36. Quantities of subcarriers included in the subcarrier sets are the same, and indices of the subcarriers are distributed as evenly as possible. For example, a subcarriers set includes six subcarriers (for example, M=36) or 12 subcarriers (for example, M=18).

Characteristic c: Data subcarriers in a single DRU of the predetermined quantity of DRUs include a plurality of evenly discrete subcarrier sets in the M subcarrier sets. For example, when M=36, data subcarriers in a single DRU include at least four subcarrier sets in the M sets. For example, when M=18, data subcarriers in a single DRU include at least two subcarrier sets in the M sets.

Specifically, index sets of the data subcarriers may be [−a, −a+107] and [b−107, b], where a and b may be any integer in a closed interval [110, 122], and a and b may be equal or unequal. Certainly, a data subcarrier set may alternatively be another subcarrier index range, and is not listed herein again.

In some embodiments, as shown in Table 10, the index sets of the data subcarriers are [−a, −a+107] and [b−107, b], and may include 36 groups, where each group includes six subcarriers. Six subcarriers in a same group include three high-frequency subcarriers (whose subcarrier indices are positive values) and three low-frequency subcarriers (whose subcarrier indices are negative values). In addition, the three high-frequency subcarriers are equally spaced, and the three low-frequency subcarriers are equally spaced. Specifically, an absolute value of an index difference between two adjacent high-frequency subcarriers is 36, and an absolute value of an index difference between two adjacent low-frequency subcarriers is also 36. An absolute value of an index difference between a high-frequency subcarrier with a minimum index and a low-frequency subcarrier with a minimum absolute value index in a same group is a+b−179. In other words, an absolute value of an index difference between a high-frequency subcarrier and a low-frequency subcarrier in a same group is a+b−179. In addition, there is a fixed offset between two adjacent groups, and the fixed offset is 1. For example, an index of each subcarrier whose group number is i (i=1, 2, . . . , or 35) plus 1, to obtain an index of each subcarrier whose group number is i+1.

TABLE 10

| Group number | Subcarrier index |
|---|---|
| 1 | −a, −a + 36, −a + 72, b − 107, b − 71, b − 35 |
| 2 | −a + 1, −a + 37, −a + 73, b − 106, b − 70, b − 34 |
| 3 | −a + 2, −a + 38, −a + 74, b − 105, b − 69, b − 33 |
| 4 | −a + 3, −a + 39, −a + 75, b − 104, b − 68, b − 32 |
| 5 | −a + 4, −a + 40, −a + 76, b − 103, b − 67, b − 31 |
| 6 | −a + 5, −a + 41, −a + 77, b − 102, b − 66, b − 30 |
| 7 | −a + 6, −a + 42, −a + 78, b − 101, b − 65, b − 29 |
| 8 | −a + 7, −a + 43, −a + 79, b − 100, b − 64, b − 28 |
| 9 | −a + 8, −a + 44, −a + 80, b − 99, b − 63, b − 27 |
| 10 | −a + 9, −a + 45, −a + 81, b − 98, b − 62, b − 26 |
| 11 | −a + 10, −a + 46, −a + 82, b − 97, b − 61, b − 25 |
| 12 | −a + 11, −a + 47, −a + 83, b − 96, b − 60, b − 24 |
| 13 | −a + 12, −a + 48, −a + 84, b − 95, b − 59, b − 23 |
| 14 | −a + 13, −a + 49, −a + 85, b − 94, b − 58, b − 22 |
| 15 | −a + 14, −a + 50, −a + 86, b − 93, b − 57, b − 21 |
| 16 | −a + 15, −a + 51, −a + 87, b − 92, b − 56, b − 20 |
| 17 | −a + 16, −a + 52, −a + 88, b − 91, b − 55, b − 19 |
| 18 | −a + 17, −a + 53, −a + 89, b − 90, b − 54, b − 18 |
| 19 | −a + 18, −a + 54, −a + 90, b − 89, b − 53, b − 17 |
| 20 | −a + 19, −a + 55, −a + 91, b − 88, b − 52, b − 16 |
| 21 | −a + 20, −a + 56, −a + 92, b − 87, b − 51, b − 15 |
| 22 | −a + 21, −a + 57, −a + 93, b − 86, b − 50, b − 14 |
| 23 | −a + 22, −a + 58, −a + 94, b − 85, b − 49, b − 13 |
| 24 | −a + 23, −a + 59, −a + 95, b − 84, b − 48, b − 12 |
| 25 | −a + 24, −a + 60, −a + 96, b − 83, b − 47, b − 11 |
| 26 | −a + 25, −a + 61, −a + 97, b − 82, b − 46, b − 10 |
| 27 | −a + 26, −a + 62, −a + 98, b − 81, b − 45, b − 9 |
| 28 | −a + 27, −a + 63, −a + 99, b − 80, b − 44, b − 8 |
| 29 | −a + 28, −a + 64, −a + 100, b − 79, b − 43, b − 7 |
| 30 | −a + 29, −a + 65, −a + 101, b − 78, b − 42, b − 6 |
| 31 | −a + 30, −a + 66, −a + 102, b − 77, b − 41, b − 5 |
| 32 | −a + 31, −a + 67, −a + 103, b − 76, b − 40, b − 4 |
| 33 | −a + 32, −a + 68, −a + 104, b − 75, b − 39, b − 3 |
| 34 | −a + 33, −a + 69, −a + 105, b − 74, b − 38, b − 2 |
| 35 | −a + 34, −a + 70, −a + 106, b − 73, b − 37, b − 1 |
| 36 | −a + 35, −a + 71, −a + 107, b − 72, b − 36, b |

In some embodiments, as shown in Table 11, the sets of the data subcarriers are [−a, −a+107] and [b−107, b], and may include 18 groups, where each group includes 12 subcarriers. 12 subcarriers in a same group include six high-frequency subcarriers (whose subcarrier indices are positive values) and six low-frequency subcarriers (whose subcarrier indices are negative values). In addition, the six high-frequency subcarriers are equally spaced, and the six low-frequency subcarriers are equally spaced. Specifically, an absolute value of an index difference between two adjacent high-frequency subcarriers is 18, and an absolute value of an index difference between two adjacent low-frequency subcarriers is also 18. An absolute value of an index difference between a high-frequency subcarrier with a minimum index and a low-frequency subcarrier with a minimum absolute value index in a same group is a+b−197. In other words, an absolute value of an index difference between a high-frequency subcarrier and a low-frequency subcarrier in a same group is a+b−197. In addition, there is a fixed offset between two adjacent groups, and the fixed offset is 1. For example, an index of each subcarrier whose group number is i (i=1, 2, . . . , or 17) plus 1, to obtain an index of each subcarrier whose group number is i+1.

TABLE 11

| Group number | Subcarrier index |
|---|---|
| 1 | −a, −a + 18, −a + 36, −a + 54, −a + 72, −a + 90, b − 107, b − 89, b − 71, b − 53, b − 35, b −17 |
| 2 | −a + 1, −a + 19, −a + 37, −a + 55, −a + 73, −a + 91, b − 106, b − 88, b − 70, b − 52, b − 34, b − 16 |
| 3 | −a + 2, −a + 20, −a + 38, −a + 56, −a + 74, −a + 92, b − 105, b − 87, b − 69, b − 51, b − 33, b − 15 |
| 4 | −a + 3, −a + 21, −a + 39, −a + 57, −a + 75, −a + 93, b − 104, b − 86, b − 68, b − 50, b − 32, b − 14 |
| 5 | −a + 4, −a + 22, −a + 40, −a + 58, −a + 76, −a + 94, b − 103, b − 85, b − 67, b − 49, b − 31, b − 13 |
| 6 | −a + 5, −a + 23, −a + 41, −a + 59, −a + 77, −a + 95, b − 102, b − 84, b − 66, b − 48, b − 30, b − 12 |
| 7 | −a + 6, −a + 24, −a + 42, −a + 60, −a + 78, −a + 96, b − 101, b − 83, b − 65, b − 47, b − 29, b − 11 |
| 8 | −a + 7, −a + 25, −a + 43, −a + 61, −a + 79, −a + 97, b − 100, b − 82, b − 64, b − 46, b − 28, b − 10 |
| 9 | −a + 8, −a + 26, −a + 44, −a + 62, −a + 80, −a + 98, b − 99, b − 81, b − 63, b − 45, b − 27, b − 9 |
| 10 | −a + 9, −a + 27, −a + 45, −a + 63, −a + 81, −a + 99, b − 98, b − 80, b − 62, b − 44, b − 26, b − 8 |
| 11 | −a + 10, −a + 28, −a + 46, −a + 64, −a + 82, −a + 100, b − 97, b − 79, b − 61, b − 43, b − 25, b − 7 |
| 12 | −a + 11, −a + 29, −a + 47, −a + 65, −a + 83, −a + 101, b − 96, b − 78, b − 60, b − 42, b − 24, b − 6 |
| 13 | −a + 12, −a + 30, −a + 48, −a + 66, −a + 84, −a + 102, b − 95, b − 77, b − 59, b − 41, b − 23, b − 5 |
| 14 | −a + 13, −a + 31, −a + 49, −a + 67, −a + 85, −a + 103, b − 94, b − 76, b − 58, b − 40, b − 22, b − 4 |
| 15 | −a + 14, −a + 32, −a + 50, −a + 68, −a + 86, −a + 104, b − 93, b − 75, b − 57, b − 39, b − 21, b − 3 |
| 16 | −a + 15, −a + 33, −a + 51, −a + 69, −a + 87, −a + 105, b − 92, b − 74, b − 56, b − 38, b − 20, b − 2 |
| 17 | −a + 16, −a + 34, −a + 52, −a + 70, −a + 88, −a + 106, b − 91, b − 73, b − 55, b − 37, b − 19, b − 1 |
| 18 | −a + 17, −a + 35, −a + 53, −a + 71, −a + 89, −a + 107, b − 90, b − 72, b − 54, b − 36, b − 18, b |

In an example, it may be assumed that a=b=115, so that Table 11 may be changed to Table 12. Table 12 shows 18 groups included in a total of 216 subcarriers whose subcarrier indices are [−a, −a+107] and [b−107, b] (that is, [−115, −8] and [8, 115]). 12 subcarriers in a same group include six high-frequency subcarriers (whose subcarrier indices are positive values) and six low-frequency subcarriers (whose subcarrier indices are negative values). In addition, the six high-frequency subcarriers are equally spaced, and the six low-frequency subcarriers are equally spaced. Specifically, an absolute value of an index difference between two adjacent high-frequency subcarriers is 18, and an absolute value of an index difference between two adjacent low-frequency subcarriers is also 18. An absolute value of an index difference between a high-frequency subcarrier and a low-frequency subcarrier in a same group is 33. In addition, there is a fixed offset between two adjacent groups, and the fixed offset is 1. For example, an index of each subcarrier whose group number is i (i=1, 2, . . . , or 17) plus 1, to obtain an index of each subcarrier whose group number is i+1.

TABLE 12

| Group number | Subcarrier index |
|---|---|
| 1 | −115, −97, −79, −61, −43, −25, 8, 26, 44, 62, 80, 98 |
| 2 | −114, −96, −78, −60, −42, −24, 9, 27, 45, 63, 81, 99 |
| 3 | −113, −95, −77, −59, −41, −23, 10, 28, 46, 64, 82, 100 |
| 4 | −112, −94, −76, −58, −40, −22, 11, 29, 47, 65, 83, 101 |
| 5 | −111, −93, −75, −57, −39, −21, 12, 30, 48, 66, 84, 102 |
| 6 | −110, −92, −74, −56, −38, −20, 13, 31, 49, 67, 85, 103 |
| 7 | −109, −91, −73, −55, −37, −19, 14, 32, 50, 68, 86, 104 |
| 8 | −108, −90, −72, −54, −36, −18, 15, 33, 51, 69, 87, 105 |
| 9 | −107, −89, −71, −53, −35, −17, 16, 34, 52, 70, 88, 106 |
| 10 | −106, −88, −70, −52, −34, −16, 17, 35, 53, 71, 89, 107 |
| 11 | −105, −87, −69, −51, −33, −15, 18, 36, 54, 72, 90, 108 |
| 12 | −104, −86, −68, −50, −32, −14, 19, 37, 55, 73, 91, 109 |
| 13 | −103, −85, −67, −49, −31, −13, 20, 38, 56, 74, 92, 110 |
| 14 | −102, −84, −66, −48, −30, −12, 21, 39, 57, 75, 93, 111 |
| 15 | −101, −83, −65, −47, −29, −11, 22, 40, 58, 76, 94, 112 |
| 16 | −100, −82, −64, −46, −28, −10, 23, 41, 59, 77, 95, 113 |
| 17 | −99, −81, −63, −45, −27, −9, 24, 42, 60, 78, 96, 114 |
| 18 | −98, −80, −62, −44, −26, −8, 25, 43, 61, 79, 97, 115 |

In some embodiments, data subcarriers included in the 26-tone DRU in 40 MHz shown in Table 5 may be determined by using Table 12. In some examples, the subcarrier indices whose group number is i in Table 12 may be shifted leftward by n11 to obtain 12 low-frequency data subcarriers in the 26-tone DRU whose identifier is i, and the subcarrier indices whose group number is i in Table 12 may be shifted rightward by n12 to obtain 12 high-frequency data subcarriers in the 26-tone DRU whose identifier is i. In an example of Table 5, n11=n12=128. However, it may be understood that n11 and n12 may alternatively be other values, and are not listed herein again.

In other words, for the 26-tone DRU whose identifier is i shown in Table 5, it may be considered that indices of subcarriers whose group number is i in Table 12 are shifted leftward by 128 (that is, all minus 128) to obtain 12 low-frequency data subcarriers in the 26-tone DRU whose identifier is i, and indices of subcarriers whose group number is i in Table 12 are shifted rightward by 128 (that is, all plus 128) to obtain 12 high-frequency data subcarriers in the 26-tone DRU whose identifier is i. Correspondingly, Table 5 may also be simplified and represented as the following Table 13, where numbers in brackets { } are group numbers shown in Table 12, and include a combination of indices of subcarriers in the group numbers shown in Table 12.

TABLE 13

| Identifier of a 26-tone DRU | Index of a data subcarrier | Index of a pilot subcarrier |
|---|---|---|
| 1 | {1} ± 128 | −12, 121 |
| 2 | {2} ± 128 | −11, 122 |
| 3 | {3} ± 128 | −10, 123 |
| 4 | {4} ± 128 | −9, 124 |
| 5 | {5} ± 128 | −8, 125 |
| 6 | {6} ± 128 | −7, 126 |
| 7 | {7} ± 128 | −6, 127 |
| 8 | {8} ± 128 | −5, 128 |
| 9 | {9} ± 128 | −4, 129 |
| 10 | {10} ± 128 | −3, 130 |
| 11 | {11} ± 128 | −128, 3 |
| 12 | {12} ± 128 | −127, 4 |
| 13 | {13} ± 128 | −126, 5 |
| 14 | {14} ± 128 | −125, 6 |
| 15 | {15} ± 128 | −124, 7 |
| 16 | {16} ± 128 | −123, 8 |
| 17 | {17} ± 128 | −122, 9 |
| 18 | {18} ± 128 | −121, 10 |

Similarly, Table 6 may also be simplified and represented as the following Table 14, where numbers in brackets { } are group numbers shown in Table 12, and include a combination of indices of subcarriers in the group numbers shown in Table 12.

TABLE 14

| Identifier of a 52-tone DRU | Index of a data subcarrier | Index of a pilot subcarrier |
|---|---|---|
| 1 | {1, 10} ± 128 | −12, −3, 121, 130 |
| 2 | {2, 11} ± 128 | −128, −11, 3, 122 |
| 3 | {3, 12} ± 128 | −127, −10, 4, 123 |
| 4 | {4, 13} ± 128 | −126, −9, 5, 124 |
| 5 | {6, 15} ± 128 | −124, −7, 7, 126 |
| 6 | {7, 16} ± 128 | −123, −6, 8, 127 |
| 7 | {8, 17} ± 128 | −122, −5, 9, 128 |
| 8 | {9, 18} ± 128 | −121, −4, 10, 129 |

Similarly, Table 8 may also be simplified and represented as the following Table 15, where numbers in brackets { } are group numbers shown in Table 12, and include a combination of indices of subcarriers in the group numbers shown in Table 12.

TABLE 15

| Identifier of a | Index of a data subcarrier | | Index of a |
|---|---|---|---|
| 106-tone DRU | First part | Second part | pilot subcarrier |
| 1 | {1, 6, 10, 15} ± 128 | −135, −7, −3, 121, 126, 244 | −124, −12, 7, 130 |
| 2 | {2, 7, 11, 16} ± 128 | −134, −123, −6, 3, 122, 131 | −128, −11, 8, 127 |
| 3 | {3, 8, 12, 17} ± 128 | −133, −122, −5, 4, 123, 132 | −127, −10, 9, 128 |
| 4 | {4, 9, 13, 18} ± 128 | −132, −126, −4, 5, 124, 133 | −121, −9, 10, 129 |

It may be understood that, although an embodiment of obtaining DRUs of various sizes in 40 MHz based on Table 12 is described with reference to Table 13 to Table 15, this disclosure is not limited thereto. For example, an index of a subcarrier included in each DRU may be determined without considering the grouping in Table 12. For example, an index of a subcarrier included in each DRU may be determined based on another grouping form. This is not limited in this disclosure.

For an 80 MHz Bandwidth:

The 80 MHz bandwidth includes 1024 subcarriers in total, and the subcarrier index range is [−512, 511].

In a tone plan solution of a DRU, the 80 MHz bandwidth includes 36 26-tone DRUs, and each 26-tone DRU includes 24 data subcarriers and two pilot subcarriers. For example, Table 16 shows an example of 36 26-tone DRUs corresponding to the 80 MHz bandwidth, and shows indices of 24 data subcarriers and indices of two pilot subcarriers included in each 26-tone DRU, and a lowest-frequency index of a data subcarrier in a 26-tone DRU whose identifier is 1 is −499.

TABLE 16

| Identifier of a 26-tone DRU | Index of a data subcarrier | Index of a pilot subcarrier |
|---|---|---|
| 1 | −499, −481, −463, −445, −427, −409, −376, −358, −340, −322, −304, −286, −243, −225, −207, −189, −171, −153, −120, −102, −84, −66, −48, −30 | −268, −135 |
| 2 | −498, −480, −462, −444, −426, −408, −375, −357, −339, −321, −303, −285, −242, −224, −206, −188, −170, −152, −119, −101, −83, −65, −47, −29 | −267, −134 |
| 3 | −497, −479, −461, −443, −425, −407, −374, −356, −338, −320, −302, −284, −241, −223, −205, −187, −169, −151, −118, −100, −82, −64, −46, −28 | −266, −133 |
| 4 | −496, −478, −460, −442, −424, −406, −373, −355, −337, −319, −301, −283, −240, −222, −204, −186, −168, −150, −117, −99, −81, −63, −45, −27 | −265, −132 |
| 5 | −495, −477, −459, −441, −423, −405, −372, −354, −336, −318, −300, −282, −239, −221, −203, −185, −167, −149, −116, −98, −80, −62, −44, −26 | −264, −131 |
| 6 | −494, −476, −458, −440, −422, −404, −371, −353, −335, −317, −299, −281, −238, −220, −202, −184, −166, −148, −115, −97, −79, −61, −43, −25 | −263, −130 |
| 7 | −493, −475, −457, −439, −421, −403, −370, −352, −334, −316, −298, −280, −237, −219, −201, −183, −165, −147, −114, −96, −78, −60, −42, −24 | −262, −129 |

TABLE 16-continued

| Identifier of a 26-tone DRU | Index of a data subcarrier | Index of a pilot subcarrier |
|---|---|---|
| 8 | −492, −474, −456, −438, −420, −402, −369, −351, −333, −315, −297, −279, −236, −218, −200, −182, −164, −146, −113, −95, −77, −59, −41, −23 | −261, −128 |
| 9 | −491, −473, −455, −437, −419, −401, −368, −350, −332, −314, −296, −278, −235, −217, −199, −181, −163, −145, −112, −94, −76, −58, −40, −22 | −260, −127 |
| 10 | −490, −472, −454, −436, −418, −400, −367, −349, −331, −313, −295, −277, −234, −216, −198, −180, −162, −144, −111, −93, −75, −57, −39, −21 | −259, −126 |
| 11 | −489, −471, −453, −435, −417, −399, −366, −348, −330, −312, −294, −276, −233, −215, −197, −179, −161, −143, −110, −92, −74, −56, −38,−20 | −384, −253 |
| 12 | −488, −470, −452, −434, −416, −398, −365, −347, −329, −311, −293, −275, −232, −214, −196, −178, −160, −142, −109, −91, −73, −55, −37, −19 | −383, −252 |
| 13 | −487, −469, −451, −433, −415, −397, −364, −346, −328, −310, −292, −274, −231, −213, −195, −177, −159, −141, −108, −90, −72, −54, −36, −18 | −382, −251 |
| 14 | −486, −468, −450, −432, −414, −396, −363, −345, −327, −309, −291, −273, −230, −212, −194, −176, −158, −140, −107, −89, −71, −53, −35, −17 | −381, −250 |
| 15 | −485, −467, −449, −431, −413, −395, −362, −344, −326, −308, −290, −272, −229, −211, −193, −175, −157, −139, −106, −88, −70, −52, −34, −16 | −380, −249 |
| 16 | −484, −466, −448, −430, −412, −394, −361, −343, −325, −307, −289, −271, −228, −210, −192, −174, −156, −138, −105, −87, −69, −51,−33,−15 | −379, −248 |
| 17 | −483, −465, −447, −429, −411, −393, −360, −342, −324, −306, −288, −270, −227, −209, −191, −173, −155, −137, −104, −86, −68, −50, −32, −14 | −378, −247 |
| 18 | −482, −464, −446, −428, −410, −392, −359, −341, −323, −305, −287, −269, −226, −208, −190, −172, −154, −136, −103, −85, −67, −49,−31,−13 | −377, −246 |
| 19 | 13, 31, 49, 67, 85, 103, 136, 154, 172, 190, 208, 226, 269, 287, 305, 323, 341, 359, 392, 410, 428, 446, 464, 482 | 244, 377 |
| 20 | 14, 32, 50, 68, 86, 104, 137, 155, 173, 191, 209, 227, 270, 288, 306, 324, 342, 360, 393, 411, 429, 447, 465, 483 | 245, 378 |
| 21 | 15, 33, 51, 69, 87, 105, 138, 156, 174, 192, 210, 228, 271, 289, 307, 325, 343, 361, 394, 412, 430, 448, 466, 484 | 246, 379 |
| 22 | 16, 34, 52, 70, 88, 106, 139, 157, 175, 193, 211, 229, 272, 290, 308, 326, 344, 362, 395, 413, 431, 449, 467, 485 | 247, 380 |
| 23 | 17, 35, 53, 71, 89, 107, 140, 158, 176, 194, 212, 230, 273, 291, 309, 327, 345, 363, 396, 414, 432, 450, 468, 486 | 248, 381 |
| 24 | 18, 36, 54, 72, 90, 108, 141, 159, 177, 195, 213, 231, 274, 292, 310, 328, 346, 364, 397, 415, 433, 451, 469, 487 | 249, 382 |
| 25 | 19, 37, 55, 73, 91, 109, 142, 160, 178, 196, 214, 232, 275, 293, 311, 329, 347, 365, 398, 416, 434, 452, 470, 488 | 250, 383 |
| 26 | 20, 38, 56, 74, 92, 110, 143, 161, 179, 197, 215, 233, 276, 294, 312, 330, 348, 366, 399, 417, 435, 453, 471, 489 | 251, 384 |
| 27 | 21, 39, 57, 75, 93, 111, 144, 162, 180, 198, 216, 234, 277, 295, 313, 331, 349, 367, 400, 418, 436, 454, 472, 490 | 252, 385 |
| 28 | 22, 40, 58, 76, 94, 112, 145, 163, 181, 199, 217, 235, 278, 296, 314, 332, 350, 368, 401, 419, 437, 455, 473, 491 | 253, 386 |
| 29 | 23, 41, 59, 77, 95, 113, 146, 164, 182, 200, 218, 236, 279, 297, 315, 333, 351, 369, 402, 420, 438, 456, 474, 492 | 128, 259 |
| 30 | 24, 42, 60, 78, 96, 114, 147, 165, 183, 201, 219, 237, 280, 298, 316, 334, 352, 370, 403, 421, 439, 457, 475, 493 | 129, 260 |
| 31 | 25, 43, 61, 79, 97, 115, 148, 166, 184, 202, 220, 238, 281, 299, 317, 335, 353, 371, 404, 422, 440, 458, 476, 494 | 130, 261 |
| 32 | 26, 44, 62, 80, 98, 116, 149, 167, 185, 203, 221, 239, 282, 300, 318, 336, 354, 372, 405, 423, 441, 459, 477, 495 | 131, 262 |
| 33 | 27, 45, 63, 81, 99, 117, 150, 168, 186, 204, 222, 240, 283, 301, 319, 337, 355, 373, 406, 424, 442, 460, 478, 496 | 132, 263 |
| 34 | 28, 46, 64, 82, 100, 118, 151, 169, 187, 205, 223, 241, 284, 302, 320, 338, 356, 374, 407, 425, 443, 461, 479, 497 | 133, 264 |
| 35 | 29, 47, 65, 83, 101, 119, 152, 170, 188, 206, 224, 242, 285, 303, 321, 339, 357, 375, 408, 426, 444, 462, 480, 498 | 134, 265 |
| 36 | 30, 48, 66, 84, 102, 120, 153, 171, 189, 207, 225, 243, 286, 304, 322, 340, 358, 376, 409, 427, 445, 463, 481, 499 | 135, 266 |

Specifically, as shown in Table 16, the 36 26-tone DRUs corresponding to the 80 MHz bandwidth include 18 high-frequency 26-tone DRUs and 18 low-frequency 26-tone DRUs, where subcarrier indices of 26 subcarriers in a high-frequency 26-tone DRU are all positive values, and subcarrier indices of 26 subcarriers in a low-frequency 26-tone DRU are all negative values.

Each 26-tone DRU includes 24 data subcarriers. If every six data subcarriers of the 24 data subcarriers are considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33.

In other words, it is assumed that indices of 24 data subcarriers included in each 26-tone DRU are sequentially arranged in a frequency direction and then divided into four groups, and each group includes six data subcarriers. Six data subcarriers in a same group are equally spaced. Specifically, a quantity of subcarriers between every two adjacent data subcarriers in a same group is 17.

Using the 26-tone DRU whose identifier is 1 in Table 16 as an example, 24 data subcarriers included in the 26-tone DRU may be considered as the following four groups: (1) −499, −481, −463, −445, −427, −409; (2) −376, −358, −340, −322, −304, −286; (3) −243, −225, −207, −189, −171, −153; and (4) −120, −102, −84, −66, −48, −30. An absolute value of an index difference between subcarriers of (1) and (2) is a difference between −376 and −409, that is, 33. An absolute value of an index difference between subcarriers of (2) and (3) is a difference between −243 and −286, that is, 43. An absolute value of an index difference between subcarriers of (3) and (4) is a difference between −120 and −150, that is, 33.

In addition, in the 18 low-frequency 26-tone DRUs, there is a fixed offset between indices of data subcarriers included in two 26-tone DRUs having adjacent identifiers, and the fixed offset is 1. Specifically, indices of 24 data subcarriers in a 26-tone DRU whose identifier is i (i=1, 2, . . . , or 17) all plus 1, to obtain indices of 24 data subcarriers in a 26-tone DRU whose identifier is i+1. Similarly, in the 18 high-frequency 26-tone DRUs, there is a fixed offset between indices of data subcarriers included in two 26-tone DRUs having adjacent identifiers, and the fixed offset is 1. Specifically, indices of 24 data subcarriers in a 26-tone DRU whose identifier is i (i=19, 20, . . . , or 35) all plus 1, to obtain indices of 24 data subcarriers in a 26-tone DRU whose identifier is i+1. In addition, there is an offset 495 between a low-frequency 26-tone DRU and a high-frequency 26-tone DRU, that is, between a 26-tone DRU whose identifier is 18 and a 26-tone DRU whose identifier is 19.

In Table 16, the identifier of the 26-tone DRU may be based on an index of a lowest-frequency subcarrier included in the 26-tone DRU. In other words, an identifier of a 26-tone DRU having a data subcarrier with a minimum value index is 1. As shown in Table 16, in all data subcarriers in the “index of a data subcarrier” column, a minimum value index is −499. Therefore, an identifier of a 26-tone DRU in which the subcarrier is located is 1. In addition, a minimum value index other than that of the 26-tone DRU whose identifier is 1 is −498. Therefore, the identifier of the 26-tone DRU in which the subcarrier is located is 2.

It may be understood that although the lowest-frequency index shown in Table 16 is −499, the value is merely an example. For example, the value may be any integer from −506 to −494.

As shown in Table 16, each 26-tone DRU further includes two pilot subcarriers. For 26-tone DRUs whose identifiers are 1 to 10 or 19 to 28, an absolute value of an index difference between two pilot subcarriers in a same 26-tone DRU is 133. For 26-tone DRUs whose identifiers are 11 to 18 or 29 to 36, an absolute value of an index difference between two pilot subcarriers in a same 26-tone DRU is 131.

As shown in Table 16, for identifiers 1 to 10, there is a fixed offset between indices of pilot subcarriers included in two 26-tone DRUs having adjacent identifiers, and the fixed offset is 1. For identifiers 11 to 18, there is a fixed offset between indices of pilot subcarriers included in two 26-tone DRUs having adjacent identifiers, and the fixed offset is 1. For identifiers 19 to 28, there is a fixed offset between indices of pilot subcarriers included in two 26-tone DRUs having adjacent identifiers, and the fixed offset is 1. For identifiers 29 to 36, there is a fixed offset between indices of pilot subcarriers included in two 26-tone DRUs having adjacent identifiers, and the fixed offset is 1. For example, indices of two pilot subcarriers in a 26-tone DRU whose identifier is i (i=1-9, 11-17, 19-27, or 29-35) all plus 1, to obtain indices of two pilot subcarriers in a 26-tone DRU whose identifier is i+1.

In an embodiment of this disclosure, for the 80 MHz bandwidth, a manner of determining two pilot subcarriers in a 26-tone DRU is similar to the foregoing manner of determining the two pilot subcarriers in the 26-tone DRU for the 40 MHz bandwidth, so that pilot subcarriers in a same DRU are fully discrete, thereby implementing frequency domain diversity. Details are not described herein again.

It may be understood that the pilot subcarriers shown in Table 16 are merely examples, and other pilot subcarriers may alternatively be used. For example, spacings between two pilot subcarriers in different 26-tone DRUs may be unequal to each other.

In this way, for the 80 MHz bandwidth, through the design of the 26-tone DRU shown in Table 16, compared with the continuous 26-tone RU shown in FIG. 3, at a same power spectral density, this embodiment of this disclosure can implement a maximum power amplification multiple, specifically, 13.

The foregoing describes a tone plan solution of the 26-tone DRU in the 80 MHz bandwidth with reference to Table 16. The solution is merely an example. A person skilled in the art may obtain another solution on this basis. For example, the lowest-frequency index is no longer −499 but another value. For example, an index of a pilot subcarrier is determined by using another solution. In addition, the tone plan of other DRUs described below in this disclosure may also be similarly varied, and these variations are not described below for each DRU.

In a tone plan solution of a DRU, the 80 MHz bandwidth includes 16 52-tone DRUs, and each 52-tone DRU includes 48 data subcarriers and four pilot subcarriers. For example, Table 17 shows an example of 16 52-tone DRUs corresponding to the 80 MHz bandwidth, and shows indices of 48 data subcarriers and indices of four pilot subcarriers included in each 52-tone DRU, and a lowest-frequency index of a data subcarrier in a 52-tone DRU whose identifier is 1 is −499.

TABLE 17

| Identifier of a 52-tone DRU | Index of a data subcarrier | Index of a pilot subcarrier |
|---|---|---|
| 1 | −499, −481, −463, −445, −427, −409, −376, −358, −340, −322, −304, −286, −243, −225, −207, −189, −171, −153, −120, −102, −84, −66, −48, −30, 13, 31, 49, 67, 85, 103, 136, 154, 172, 190, 208, 226, 269, 287, 305, 323, 341, 359, 392, 410, 428, 446, 464, 482 | −268, −135, 244, 377 |
| 2 | −498, −480, −462, −444, −426, −408, −375, −357, −339, −321, −303, −285, −242, −224, −206, −188, −170, −152, −119, −101, −83, −65, −47, −29, 14, 32, 50, 68, 86, 104, 137, 155, 173, 191, 209, 227, 270, 288, 306, 324, 342, 360, 393, 411, 429, 447, 465, 483 | −267, −134, 245, 378 |
| 3 | −497, −479, −461, −443, −425, −407, −374, −356, −338, −320, −302, −284, −241, −223, −205, −187, −169, −151, −118, −100, −82, −64, −46, −28, 15, 33, 51, 69, 87, 105, 138, 156, 174, 192, 210, 228, 271, 289, 307, 325, 343, 361, 394, 412, 430, 448, 466, 484 | −266, −133, 246, 379 |
| 4 | −496, −478, −460, −442, −424, −406, −373, −355, −337, −319, −301, −283, −240, −222, −204, −186, −168, −150, −117, −99, −81, −63, −45, −27, 16, 34, 52, 70, 88, 106, 139, 157, 175, 193, 211, 229, 272, 290, 308, 326, 344, 362, 395, 413, 431, 449, 467, 485 | −265, −132, 247, 380 |
| 5 | −494, −476, −458, −440, −422, −404, −371, −353, −335, −317, −299, −281, −238, −220, −202, −184, −166, −148, −115, −97, −79, −61, −43, −25, 18, 36, 54, 72, 90, 108, 141, 159, 177, 195, 213, 231, 274, 292, 310, 328, 346, 364, 397, 415, 433, 451, 469, 487 | −263, −130, 249, 382 |
| 6 | −493, −475, −457, −439, −421, −403, −370, −352, −334, −316, −298, −280, −237, −219, −201, −183, −165, −147, −114, −96, −78, −60, −42, −24, 19, 37, 55, 73, 91, 109, 142, 160, 178, 196, 214, 232, 275, 293, 311, 329, 347, 365, 398, 416, 434, 452, 470, 488 | −262, −129, 250, 383 |
| 7 | −492, −474, −456, −438, −420, −402, −369, −351, −333, −315, −297, −279, −236, −218, −200, −182, −164, −146, −113, −95, −77, −59, −41, −23, 20, 38, 56, 74, 92, 110, 143, 161, 179, 197, 215, 233, 276, 294, 312, 330, 348, 366, 399, 417, 435, 453, 471, 489 | −261, −128, 251, 384 |
| 8 | −491, −473, −455, −437, −419, −401, −368, −350, −332, −314, −296, −278, −235, −217, −199, −181, −163, −145, −112, −94, −76, −58, −40, −22, 21, 39, 57, 75, 93, 111, 144, 162, 180, 198, 216, 234, 277, 295, 313, 331, 349, 367, 400, 418, 436, 454, 472, 490 | −260, −127, 252, 385 |
| 9 | −490, −472, −454, −436, −418, −400, −367, −349, −331, −313, −295, −277, −234, −216, −198, −180, −162, −144, −111, −93, −75, −57, −39, −21, 22, 40, 58, 76, 94, 112, 145, 163, 181, 199, 217, 235, 278, 296, 314, 332, 350, 368, 401, 419, 437, 455, 473, 491 | −259, −126, 253, 386 |
| 10 | −489, −471, −453, −435, −417, −399, −366, −348, −330, −312, −294, −276, −233, −215, −197, −179, −161, −143, −110, −92, −74, −56, −38, −20, 23, 41, 59, 77, 95, 113, 146, 164, 182, 200, 218, 236, 279, 297, 315, 333, 351, 369, 402, 420, 438, 456, 474, 492 | −384, −253, 128, 259 |
| 11 | −488, −470, −452, −434, −416, −398, −365, −347, −329, −311, −293, −275, −232, −214, −196, −178, −160, −142, −109, −91, −73, −55, −37, −19, 24, 42, 60, 78, 96, 114, 147, 165, 183, 201, 219, 237, 280, 298, 316, 334, 352, 370, 403, 421, 439, 457, 475, 493 | −383, −252, 129, 260 |
| 12 | −487, −469, −451, −433, −415, −397, −364, −346, −328, −310, −292, −274, −231, −213, −195, −177, −159, −141, −108, −90, −72, −54, −36, −18, 25, 43, 61, 79, 97, 115, 148, 166, 184, 202, 220, 238, 281, 299, 317, 335, 353, 371, 404, 422, 440, 458, 476, 494 | −382, −251, 130, 261 |
| 13 | −485, −467, −449, −431, −413, −395, −362, −344, −326, −308, −290, −272, −229, −211, −193, −175, −157, −139, −106, −88, −70, −52, −34, −16, 27, 45, 63, 81, 99, 117, 150, 168, 186, 204, 222, 240, 283, 301, 319, 337, 355, 373, 406, 424, 442, 460, 478, 496 | −380, −249, 132, 263 |
| 14 | −484, −466, −448, −430, −412, −394, −361, −343, −325, −307, −289, −271, −228, −210, −192, −174, −156, −138, −105, −87, −69, −51, −33, −15, 28, 46, 64, 82, 100, 118, 151, 169, 187, 205, 223, 241, 284, 302, 320, 338, 356, 374, 407, 425, 443, 461, 479, 497 | −379, −248, 133, 264 |
| 15 | −483, −465, −447, −429, −411, −393, −360, −342, −324, −306, −288, −270, −227, −209, −191, −173, −155, −137, −104, −86, −68, −50, −32, −14, 29, 47, 65, 83, 101, 119, 152, 170, 188, 206, 224, 242, 285, 303, 321, 339, 357, 375, 408, 426, 444, 462, 480, 498 | −378, −247, 134, 265 |
| 16 | −482, −464, −446, −428, −410, −392, −359, −341, −323, −305, −287, −269, −226, −208, −190, −172, −154, −136, −103, −85, −67, −49, −31, −13, 30, 48, 66, 84, 102, 120, 153, 171, 189, 207, 225, 243, 286, 304, 322, 340, 358, 376, 409, 427, 445, 463, 481, 499 | −377, −246, 135, 266 |

As shown in Table 17, each 52-tone DRU includes 48 data subcarriers, including 24 high-frequency subcarriers (whose subcarrier indices are positive values) and 24 low-frequency subcarriers (whose subcarrier indices are negative values). If every six data subcarriers of the 48 data subcarriers are considered as one group in a frequency direction (for example, from low to high) (or understood as an ascending order of indices), absolute values of index differences between adjacent data subcarriers in a same group are all 18, and absolute values of index differences between data subcarriers in two adjacent groups are alternately 33 and 43.

In other words, it is assumed that indices of 48 data subcarriers included in each 52-tone DRU are sequentially arranged in a frequency direction and then divided into eight groups, and each group includes six data subcarriers. Six data subcarriers in a same group are equally spaced. Specifically, a quantity of subcarriers between every two adjacent data subcarriers in a same group is 17.

Using a 52-tone DRU whose identifier is 1 in Table 17 as an example, 48 data subcarriers included in the 52-tone DRU are divided into the following eight groups: (1) [−499: 18: −409]; (2) [−376: 18: −286]; (3) [−243: 18: −153]; (4) [−120: 18: −30]; (5) [13: 18: 103]; (6) [136: 18: 226]; (7) [269: 18: 359]; and (8) [392: 18: 482]. (1) to (4) are low-frequency groups, and (5) to (8) are high-frequency groups. An absolute value of an index difference between subcarriers of (1) and (2) is a difference between −376 and −409, that is, 33. An absolute value of an index difference between subcarriers of (2) and (3) is a difference between −243 and −286, that is, 43. An absolute value of an index difference between subcarriers of (3) and (4) is a difference between −120 and −153, that is, 33. An absolute value of an index difference between subcarriers of (4) and (5) is a difference between 13 and −30, that is, 43. An absolute value of an index difference between subcarriers of (5) and (6) is a difference between 136 and 103, that is, 33. An absolute value of an index difference between subcarriers of (6) and (7) is a difference between 269 and 226, that is, 43. An absolute value of an index difference between subcarriers of (7) and (8) is a difference between 392 and 359, that is, 33. It may be learned that absolute values of index differences between adjacent groups are alternately 33 and 43.

As shown in Table 17, for identifiers 1 to 4, 5 to 12, or 13 to 16, there is a fixed offset between indices of data subcarriers included in two 52-tone DRUs having adjacent identifiers, and the fixed offset is 1. For example, indices of 48 data subcarriers in a 52-tone DRU whose identifier is i (i=1, 2, 3, 5, 6, 7, 8, 9, 10, 11, 13, 14, or 15) all plus 1, to obtain indices of 48 data subcarriers in a 52-tone DRU whose identifier is i+1. An offset between an index of a data subcarrier included in a 52-tone DRU whose identifier is 4 and an index of a data subcarrier included in a 52-tone DRU whose identifier is 5 is 2. An offset between an index of a data subcarrier included in a 52-tone DRU whose identifier is 12 and an index of a data subcarrier included in a 52-tone DRU whose identifier is 13 is 2. For example, indices of 48 data subcarriers in a 52-tone DRU whose identifier is 4 all plus 2, to obtain indices of 48 data subcarriers in a 52-tone DRU whose identifier is 5. For example, indices of 48 data subcarriers in a 52-tone DRU whose identifier is 12 all plus 2, to obtain indices of 48 data subcarriers in a 52-tone DRU whose identifier is 13.

As shown in Table 17, each 52-tone DRU includes four pilot subcarriers, including two high-frequency subcarriers and two low-frequency subcarriers. In this way, pilot subcarriers included in a same DRU can be fully discrete, thereby implementing frequency domain diversity.

As shown in Table 16, the 52-tone DRU whose identifier is i (i=1 to 4) may be considered as a combination of a 26-tone DRU whose identifier is i and a 26-tone DRU whose identifier is i+18, the 52-tone DRU whose identifier is i (i=5 to 12) may be considered as a combination of a 26-tone DRU whose identifier is i+1 and a 26-tone DRU whose identifier is i+19, and the 52-tone DRU whose identifier is i (i=13 to 16) may be considered as a combination of a 26-tone DRU whose identifier is i+2 and a 26-tone DRU whose identifier is i+20. In this way, subcarriers in the 52-tone DRU can be fully discrete. For example, 48 data subcarriers in a 52-tone DRU whose identifier is 1 are a combination of 24 data subcarriers in a 26-tone DRU whose identifier is 1 and 24 data subcarriers in a 26-tone DRU whose identifier is 19 in Table 16. Four pilot subcarriers in the 52-tone DRU whose identifier is 1 are a combination of two pilot subcarriers in the 26-tone DRU whose identifier is 1 and two pilot subcarriers in the 26-tone DRU whose identifier is 19 in Table 16. Correspondingly, Table 17 may also be simplified and represented as the following Table 18 based on Table 16.

TABLE 18

| Identifier of a 52-tone DRU | Identifier of a 26-tone DRU |
|---|---|
| 1 | 1, 19 |
| 2 | 2, 20 |
| 3 | 3, 21 |
| 4 | 4, 22 |
| 5 | 6, 24 |
| 6 | 7, 25 |
| 7 | 8, 26 |
| 8 | 9, 27 |
| 9 | 10, 28 |
| 10 | 11, 29 |
| 11 | 12, 30 |
| 12 | 13, 31 |
| 13 | 15, 33 |
| 14 | 16, 34 |
| 15 | 17, 35 |
| 16 | 18, 36 |

In addition, in an embodiment of this disclosure, the identifier of the 52-tone DRU may be based on a lowest-frequency index of a data subcarrier included in each 52-tone DRU. For example, an identifier of a 52-tone DRU having a lowest-frequency index −499 is 1.

According to the design of the 52-tone DRU shown in Table 17 or Table 18 in this embodiment of this disclosure, compared with the continuous 52-tone RU in FIG. 3, at a same power spectral density, this embodiment of this disclosure can implement a maximum power amplification multiple, specifically, 13.

In an embodiment of this disclosure, an association between a 52-tone DRU and a 26-tone DRU in 80 MHz is described by using Table 18. It may be understood that the foregoing described manner of determining a 52-tone DRU based on a 26-tone DRU is merely an example, and subcarriers in the 52-tone DRU can be fully discrete. In another embodiment, a 52-tone DRU may alternatively be determined in another manner based on a 26-tone DRU. For example, a combination of two 26-tone DRUs whose identifiers are 1 and 20 is determined as the 52-tone DRU whose identifier is 1. This is not limited in this disclosure. Details are not described again. In addition, it may be understood that, considering the association between the 52-tone DRU and the 26-tone DRU, if the lowest-frequency index of the data subcarrier included in the 26-tone DRU is another value other than −499, correspondingly the lowest-frequency index of the data subcarrier included in the 52-tone DRU also adaptively changes to another value.

In a tone plan solution of a DRU, the 80 MHz bandwidth includes eight 106-tone DRUs, and each 106-tone DRU includes 102 data subcarriers and four pilot subcarriers. For example, Table 19 shows an example of eight 106-tone DRUs corresponding to the 80 MHz bandwidth, and shows indices of 102 data subcarriers and indices of four pilot subcarriers included in each 106-tone DRU. As shown in Table 19, the 102 data subcarriers may be considered as two parts. A first part of data subcarriers includes 96 data subcarriers, a second part of data subcarriers includes six data subcarriers, and a lowest-frequency index of a data subcarrier in a 106-tone DRU whose identifier is 1 is −499.

It should be understood that, although the data subcarriers are divided into the first part and the second part in Table 19 and are separately listed, in an embodiment of this disclosure, the data subcarriers are presented as a plurality of parts only for ease of description, and are not actually used as division of data subcarriers included in each 106-tone DRU.

During actual application, the data subcarriers include a combination of data subcarriers in two parts, and do not need to be distinguished. In other words, the first part and the second part do not need to be distinguished, but are considered as a whole, namely, a data subcarrier index included in each 106-tone DRU.

TABLE 19

| Identifier of a 106-tone DRU | Index of a data subcarrier: First part | Index of a data subcarrier: Second part | Index of a pilot subcarrier |
| --- | --- | --- | --- |
| 1 | −499, −490, −481, −472, −463, −454, −445, −436, −427, −418, −409, −400, −376, −367, −358, −349, −340, −331, −322, −313, −304, −295, −286, −277, −243, −234, −225, −216, −207, −198, −189, −180, −171, −162, −153, −144, −120, −111, −102, −93, −84, −75, −66, −57, −48, −39, −30, −21, 13, 22, 31, 40, 49, 58, 67, 76, 85, 94, 103, 112, 136, 145, 154, 163, 172, 181, 190, 199, 208, 217, 226, 235, 269, 278, 287, 296, 305, 314, 323, 332, 341, 350, 359, 368, 392, 401, 410, 419, 428, 437, 446, 455, 464, 473, 482, 491 | −259, −135, −12, 5, 253, 377 | −268, −126, 244, 386 |
| 2 | −498, −489, −480, −471, −462, −453, −444, −435, −426, −417, −408, −399, −375, −366, −357, −348, −339, −330, −321, −312, −303, −294, −285, −276, −242, −233, −224, −215, −206, −197, −188, −179, −170, −161, −152, −143, −119, −110, −101, −92, −83, −74, −65, −56, −47, −38, −29, −20, 14, 23, 32, 41, 50, 59, 68, 77, 86, 95, 104, 113, 137, 146, 155, 164, 173, 182, 191, 200, 209, 218, 227, 236, 270, 279, 288, 297, 306, 315, 324, 333, 342, 351, 360, 369, 393, 402, 411, 420, 429, 438, 447, 456, 465, 474, 483, 492 | −267, −253, −11, 6, 245, 259 | −384, −134, 128, 378 |
| 3 | −497, −488, −479, −470, −461, −452, −443, −434, −425, −416, −407, −398, −374, −365, −356, −347, −338, −329, −320, −311, −302, −293, −284, −275, −241, −232, −223, −214, −205, −196, −187, −178, −169, −160, −151, −142, −118, −109, −100, −91, −82, −73, −64, −55, −46, −37, −28, −19, 15, 24, 33, 42, 51, 60, 69, 78, 87, 96, 105, 114, 138, 147, 156, 165, 174, 183, 192, 201, 210, 219, 228, 237, 271, 280, 289, 298, 307, 316, 325, 334, 343, 352, 361, 370, 394, 403, 412, 421, 430, 439, 448, 457, 466, 475, 484, 493 | −266, −252, −10, 7, 246, 260 | −383, −133, 129, 379 |
| 4 | −496, −487, −478, −469, −460, −451, −442, −433, −424, −415, −406, −397, −373, −364, −355, −346, −337, −328, −319, −310, −301, −292, −283, −274, −240, −231, −222, −213, −204, −195, −186, −177, −168, −159, −150, −141, −117, −108, −99, −90, −81, −72, −63, −54, −45, −36, −27, −18, 16, 25, 34, 43, 52, 61, 70, 79, 88, 97, 106, 115, 139, 148, 157, 166, 175, 184, 193, 202, 211, 220, 229, 238, 272, 281, 290, 299, 308, 317, 326, 335, 344, 353, 362, 371, 395, 404, 413, 422, 431, 440, 449, 458, 467, 476, 485, 494 | −265, −251, −9, 8, 247, 261 | −382, −132, 130, 380 |
| 5 | −494, −485, −476, −467, −458, −449, −440, −431, −422, −413, −404, −395, −371, −362, −353, −344, −335, −326, −317, −308, −299, −290, −281, −272, −238, −229, −220, −211, −202, −193, −184, −175, −166, −157, −148, −139, −115, −106, −97, −88, −79, −70, −61, −52, −43, −34, −25, −16, 18, 27, 36, 45, 54, 63, 72, 81, 90, 99, 108, 117, 141, 150, 159, 168, 177, 186, 195, 204, 213, 222, 231, 240, 274, 283, 292, 301, 310, 319, 328, 337, 346, 355, 364, 373, 397, 406, 415, 424, 433, 442, 451, 460, 469, 478, 487, 496 | −263, −249, −8, 9, 249, 263 | −380, −130, 132, 382 |
| 6 | −493, −484, −475, −466, −457, −448, −439, −430, −421, −412, −403, −394, −370, −361, −352, −343, −334, −325, −316, −307, −298, −289, −280, −271, −237, −228, −219, −210, −201, −192, −183, −174, −165, −156, −147, −138, −114, −105, −96, −87, −78, −69, −60, −51, −42, −33, −24, −15, 19, 28, 37, 46, 55, 64, 73, 82, 91, 100, 109, 118, 142, 151, 160, 169, 178, 187, 196, 205, 214, 223, 232, 241, 275, 284, 293, 302, 311, 320, 329, 338, 347, 356, 365, 374, 398, 407, 416, 425, 434, 443, 452, 461, 470, 479, 488, 497 | −262, −248, −7, 10, 250, 264 | −379, −129, 133, 383 |
| 7 | −492, −483, −474, −465, −456, −447, −438, −429, −420, −411, −402, −393, −369, −360, −351, −342, −333, −324, −315, −306, −297, −288, −279, −270, −236, −227, −218, −209, −200, −191, −182, −173, −164, −155, −146, −137, −113, −104, −95, −86, −77, −68, −59, −50, −41, −32, −23, −14, 20, 29, 38, 47, 56, 65, 74, 83, 92, 101, 110, 119, 143, 152, 161, 170, 179, | −261, −247, −6, 11, 251, 265 | −378, −128, 134, 384 |

TABLE 19-continued

| Identifier of a 106-tone DRU | Index of a data subcarrier First part | Second part | Index of a pilot subcarrier |
|---|---|---|---|
| | 188, 197, 206, 215, 224, 233, 242, 276, 285, 294, 303, 312, 321, 330, 339, 348, 357, 366, 375, 399, 408, 417, 426, 435, 444, 453, 462, 471, 480, 489, 498 | | |
| 8 | −491, −482, −473, −464, −455, −446, −437, −428, −419, −410, −401, −392, −368, −359, −350, −341, −332, −323, −314, −305, −296, −287, −278, −269, −235, −226, −217, −208, −199, −190, −181, −172, −163, −154, −145, −136, −112, −103, −94, −85, −76, −67, −58, −49, −40, −31, −22, −13, 21, 30, 39, 48, 57, 66, 75, 84, 93, 102, 111, 120, 144, 153, 162, 171, 180, 189, 198, 207, 216, 225, 234, 243, 277, 286, 295, 304, 313, 322, 331, 340, 349, 358, 367, 376, 400, 409, 418, 427, 436, 445, 454, 463, 472, 481, 490, 499 | −260, −246, −5, 12, 252, 266 | −377, −127, 135, 385 |

As shown in Table 19, each 106-tone DRU includes 102 data subcarriers, and some (namely, the first part in Table 19: 96 data subcarriers) of the 102 data subcarriers include 48 high-frequency subcarriers (whose subcarrier indices are positive values) and 48 low-frequency subcarriers (whose subcarrier indices are negative values). If every 12 of the 96 data subcarriers are considered as one group in a frequency direction (for example, from low to high) (or understood as an ascending order of indices), absolute values of index differences between adjacent data subcarriers in a same group are all 9, and absolute values of index differences between data subcarriers in two adjacent groups are alternately 24 and 34.

In other words, if indices of 96 data subcarriers of 102 data subcarriers included in each 106-tone DRU are sequentially arranged in a frequency direction and then divided into eight groups, and each group includes 12 data subcarriers. 12 data subcarriers in a same group are equally spaced. Specifically, a quantity of subcarriers between every two adjacent data subcarriers in a same group is 8.

Using a 106-tone DRU whose identifier is 1 in Table 19 as an example, 96 data subcarriers of 102 data subcarriers included in the 106-tone DRU are divided into the following eight groups: (1) [−499: 9: −400]; (2) [−376: 9: −277]; (3) [−243: 9: −144]; (4) [−120: 9: −21]; (5) [13: 9: 112]; (6) [136: 9: 235]; (7) [269: 9: 368]; and (8) [392: 9: 491]. (1) to (4) are low-frequency groups, and (5) to (8) are high-frequency groups. Absolute values of subcarrier index differences between (1) and (2), between (3) and (4), between (5) and (6), and between (7) and (8) are all 24. Absolute values of subcarrier index differences between (2) and (3), between (4) and (5), and between (6) and (7) are all 34. It may be learned that absolute values of index differences between adjacent groups are alternately 24 and 34.

As shown in Table 19, for identifiers 1 to 4, or 5 to 8, there is a fixed offset between indices of 96 data subcarriers (the first part) included in two 106-tone DRUs having adjacent identifiers, and the fixed offset is 1. For example, indices of 96 data subcarriers in a 106-tone DRU whose identifier is i (i=1, 2, 3, 5, 6, or 7) all plus 1, to obtain indices of 96 data subcarriers in a 106-tone DRU whose identifier is i+1. An offset between indices of 96 data subcarriers (the first part) in the 106-tone DRU whose identifier is 4 and indices of 96 data subcarriers in the 106-tone DRU whose identifier is 5 is 2. For example, indices of 96 data subcarriers in a 106-tone DRU whose identifier is 4 all plus 2, to obtain indices of 96 data subcarriers in a 106-tone DRU whose identifier is 5.

In addition to the 96 data subcarriers in the first part column of the foregoing table, each 106-tone DRU further includes six data subcarriers and four pilot subcarriers. In some embodiments, six data subcarriers and four pilot subcarriers may be separately selected from remaining subcarriers of all subcarriers of the entire bandwidth other than guard subcarriers, DC subcarriers, and data subcarriers in the first part column. A specific selection manner is not limited in this embodiment of this disclosure. For example, Table 19 shows an example, so that subcarriers included in the 106-tone DRU can be fully discrete.

With reference to the foregoing Table 16 or Table 17, it may be considered that a 106-tone DRU is obtained based on a 26-tone DRU or a 52-tone DRU. For example, the four pilot subcarriers included in the 106-tone DRU may be a part of a set of eight pilot subcarriers included in the corresponding four 26-tone DRUs. In addition, the other six data subcarriers included in the 106-tone DRU may be selected from remaining subcarriers of all the subcarriers of the entire bandwidth other than the guard subcarriers, the DC subcarriers, the data subcarriers in the first part column, and the pilot subcarriers, and the data subcarriers may be fully discrete, as shown in the “second part” column of Table 19.

As shown in Table 19, each 106-tone DRU includes four pilot subcarriers, including two high-frequency subcarriers and two low-frequency subcarriers, and any two pilot subcarriers in a same DRU are not adjacent. The pilot subcarriers shown in Table 19 implement full discretization of pilot subcarriers in a same DRU, thereby implementing frequency domain diversity.

For example, Table 19 may be simplified and represented as the following Table 20. The “first part” column in Table 20 means that the first part of (96) data subcarriers in the 106-tone DRU include a combination of data subcarriers in corresponding 26-tone DRUs shown in Table 16. For example, a 106-tone DRU whose identifier is 1 is used as an example. 96 data subcarriers (the first part) of 102 data subcarriers included in the 106-tone DRU include all data subcarriers of four 26-tone DRUs whose identifiers are 1, 10, 19, and 28 shown in Table 16. In another understanding, a 106-tone DRU whose identifier is 1 is used as an example. 96 data subcarriers (the first part) of 102 data subcarriers included in the 106-tone DRU include all data subcarriers of two 52-tone DRUs whose identifiers are 1 and 9 shown in Table 17.

TABLE 20

| Identifier of a 106-tone DRU | Index of a data subcarrier: First part (identifier of a 26-tone DRU) | Index of a data subcarrier: Second part | Index of a pilot subcarrier |
|---|---|---|---|
| 1 | 1, 10, 19, 28 | −259, −135, −12, 5, 253, 377 | −268, −126, 244, 386 |
| 2 | 2, 11, 20, 29 | −267, −253, −11, 6, 245, 259 | −384, −134, 128, 378 |
| 3 | 3, 12, 21, 30 | −266, −252, −10, 7, 246, 260 | −383, −133, 129, 379 |
| 4 | 4, 13, 22, 31 | −265, −251, −9, 8, 247, 261 | −382, −132, 130, 380 |
| 5 | 6, 15, 24, 33 | −263, −249, −8, 9, 249, 263 | −380, −130, 132, 382 |
| 6 | 7, 16, 25, 34 | −262, −248, −7, 10, 250, 264 | −379, −129, 133, 383 |
| 7 | 8, 17, 26, 35 | −261, −247, −6, 11, 251, 265 | −378, −128, 134, 384 |
| 8 | 9, 18, 27, 36 | −260, −246, −5, 12, 252, 266 | −377, −127, 135, 385 |

In addition, in an embodiment of this disclosure, the identifier of the 106-tone DRU may be based on a lowest-frequency index of a data subcarrier included in each 106-tone DRU. For example, an identifier of a 106-tone DRU having a lowest-frequency index −499 is 1.

According to the design of the 106-tone DRU shown in Table 19 or Table 20 in this embodiment of this disclosure, compared with the continuous 106-tone RU in FIG. 3, at a same power spectral density, this embodiment of this disclosure can implement a maximum power amplification multiple, specifically, 6.5.

In an embodiment of this disclosure, an association between a 26-tone DRU (indirectly a 52-tone DRU) and a 106-tone DRU in 80 MHz is described by using Table 20. It may be understood that the foregoing described manner of determining a 106-tone DRU based on a 26-tone DRU is merely an example, and subcarriers in the 106-tone DRU can be fully discrete. In another embodiment, a 106-tone DRU may alternatively be determined in another manner based on a 26-tone DRU. For example, a combination of four 26-tone DRUs whose identifiers are 1 to 4 is determined as the first part of data subcarriers of the 106-tone DRU whose identifier is 1. This is not limited in this disclosure. Details are not described again. In addition, it may be understood that if the lowest-frequency index of the data subcarrier included in the 26-tone DRU is another value other than −499, correspondingly the lowest-frequency index of the data subcarrier included in the 106-tone DRU also adaptively changes to another value.

In a tone plan solution of a DRU, the 80 MHz bandwidth includes four 242-tone DRUs, and each 242-tone DRU includes 234 data subcarriers and eight pilot subcarriers. For example, Table 21 shows an example of four 242-tone DRUs corresponding to the 80 MHz bandwidth, and shows indices of 234 data subcarriers and indices of eight pilot subcarriers included in each 242-tone DRU. As shown in Table 21, the 234 data subcarriers may be considered as three parts. A first part of data subcarriers includes 192 data subcarriers, a second part of data subcarriers includes 24 data subcarriers, a third part of data subcarriers includes 18 data subcarriers, and a lowest-frequency index of a data subcarrier in a 242-tone DRU whose identifier is 1 is −499. It should be understood that, although the data subcarriers are divided into the first part, the second part, and the third part in Table 21 and are separately listed, in an embodiment of this disclosure, the data subcarriers are presented as a plurality of parts only for ease of description, and are not actually used as division of data subcarriers included in each 242-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 242-tone DRU.

TABLE 21

| Identifier of a 242-tone DRU | Index of a data subcarrier: First part | Index of a data subcarrier: Second part | Index of a data subcarrier: Third part | Index of a pilot subcarrier |
|---|---|---|---|---|
| | −436, −431, −427, −422, −418, −413, −409, −404, −400, −395, −376, −371, −367, −362, −358, −353, −349, −344, −340, −335, −331, −326, −322, −317, −313, −308, −304, −299, −295, −290, −286, −281, −277, −272, −243, −238, −234, −229, −225, −220, −216, −211, −207, −202, −198, −193, −189, −184, −180, −175, −171, −166, −162, −157, −153, −148, −144, −139, −120, −115, −111, −106, −102, −97, −93, −88, −84, −79, −75, −70, −66, −61, −57, −52, −48, −43, −39, −34, −30, −25, −21, −16, 13, 18, 22, 27, 31, 36, 40, 45, 49, 54, 58, 63, 67, 72, 76, 81, 85, 90, 94, 99, 103, 108, 112, 117, 136, 141, 145, 150, 154, 159, 163, 168, 172, 177, 181, 186, 190, 195, 199, 204, 208, 213, 217, 222, 226, 231, 235, 240, 269, 274, 278, 283, 287, 292, 296, 301, 305, 310, 314, 319, 323, 328, 332, 337, 341, 346, 350, 355, 359, 364, 368, 373, 392, 397, 401, 406, 410, 415, 419, 424, 428, 433, 437, 442, 446, | −441, −423, −405, −372, −354, −336, −318, −300, −282, −239, −221, −203, −185, −167, −149, −116, −98, −80, −62, −44, −26 | −249, −135, −131, −12, −8, −4, 5, 9, 121, 249, 253, 254, 263, 377, 387 | −126, 132, 244, 382, 386 |

TABLE 21-continued

| Identifier of a 242-tone DRU | Index of a data subcarrier First part | Second part | Third part | Index of a pilot subcarrier |
|---|---|---|---|---|
| | 451, 455, 460, 464, 469, 473, 478, 482, 487, 491, 496 | | | |
| 2 | −498, −493, −489, −484, −480, −475, −471, −466, −462, −457, −453, −448, −444, −439, −435, −430, −426, −421, −417, −412, −408, −403, −399, −394, −375, −370, −366, −361, −357, −352, −348, −343, −339, −334, −330, −325, −321, −316, −312, −307, −303, −298, −294, −289, −285, −280, −276, −271, −242, −237, −233, −228, −224, −219, −215, −210, −206, −201, −197, −192, −188, −183, −179, −174, −170, −165, −161, −156, −152, −147, −143, −138, −119, −114, −110, −105, −101, −96, −92, −87, −83, −78, −74, −69, −65, −60, −56, −51, −47, −42, −38, −33, −29, −24, −20, −15, 14, 19, 23, 28, 32, 37, 41, 46, 50, 55, 59, 64, 68, 73, 77, 82, 86, 91, 95, 100, 104, 109, 113, 118, 137, 142, 146, 151, 155, 160, 164, 169, 173, 178, 182, 187, 191, 196, 200, 205, 209, 214, 218, 223, 227, 232, 236, 241, 270, 275, 279, 284, 288, 293, 297, 302, 306, 311, 315, 320, 324, 329, 333, 338, 342, 347, 351, 356, 360, 365, 369, 374, 393, 398, 402, 407, 411, 416, 420, 425, 429, 434, 438, 443, 447, 452, 456, 461, 465, 470, 474, 479, 483, 488, 492, 497 | −486, −468, −450, −432, −414, −396, −363, −345, −327, −309, −291, −273, −230, −212, −194, −176, −158, −140, −107, −89, −71, −53, −35, −17 | −381, −267, −262, −253, −250, −248, −11, −7, −3, 6, 10, 122, 245, 250, 255, 259, 264, 388 | −384, −379, −134, −129, 128, 133, 378, 383 |
| 3 | −497, −492, −488, −483, −479, −474, −470, −465, −461, −456, −452, −447, −443, −438, −434, −429, −425, −420, −416, −411, −407, −402, −398, −393, −374, −369, −365, −360, −356, −351, −347, −342, −338, −333, −329, −324, −320, −315, −311, −306, −302, −297, −293, −288, −284, −279, −275, −270, −241, −236, −232, −227, −223, −218, −214, −209, −205, −200, −196, −191, −187, −182, −178, −173, −169, −164, −160, −155, −151, −146, −142, −137, −118, −113, −109, −104, −100, −95, −91, −86, −82, −77, −73, −68, −64, −59, −55, −50, −46, −41, −37, −32, −28, −23, −19, −14, 15, 20, 24, 29, 33, 38, 42, 47, 51, 56, 60, 65, 69, 74, 78, 83, 87, 92, 96, 101, 105, 110, 114, 119, 138, 143, 147, 152, 156, 161, 165, 170, 174, 179, 183, 188, 192, 197, 201, 206, 210, 215, 219, 224, 228, 233, 237, 242, 271, 276, 280, 285, 289, 294, 298, 303, 307, 312, 316, 321, 325, 330, 334, 339, 343, 348, 352, 357, 361, 366, 370, 375, 394, 399, 403, 408, 412, 417, 421, 426, 430, 435, 439, 444, 448, 453, 457, 462, 466, 471, 475, 480, 484, 489, 493, 498 | 17, 35, 53, 71, 89, 107, 140, 158, 176, 194, 212, 230, 273, 291, 309, 327, 345, 363, 396, 414, 432, 450, 468, 486 | −266, −261, −252, −247, −10, −6, 3, 7, 11, 123, 246, 248, 251, 256, 260, 265, 381, 389 | −383, −378, −133, −128, 129, 134, 379, 384 |
| 4 | −496, −491, −487, −482, −478, −473, −469, −464, −460, −455, −451, −446, −442, −437, −433, −428, −424, −419, −415, −410, −406, −401, −397, −392, −373, −368, −364, −359, −355, −350, −346, −341, −337, −332, −328, −323, −319, −314, −310, −305, −301, −296, −292, −287, −283, −278, −274, −269, −240, −235, −231, −226, −222, −217, −213, −208, −204, −199, −195, −190, −186, −181, −177, −172, −168, −163, −159, −154, −150, −145, −141, −136, −117, −112, −108, −103, −99, −94, −90, −85, −81, −76, −72, −67, −63, −58, −54, −49, −45, −40, −36, −31, −27, −22, −18, −13, 16, 21, 25, 30, 34, 39, 43, 48, 52, 57, 61, 66, 70, 75, 79, 84, 88, 93, 97, 102, 106, 111, 115, 120, 139, 144, 148, 153, 157, 162, 166, 171, 175, 180, 184, 189, 193, 198, 202, 207, 211, 216, 220, 225, 229, 234, 238, 243, 272, 277, 281, 286, 290, 295, 299, 304, 308, 313, 317, 322, 326, 331, 335, 340, 344, 349, 353, 358, 362, 367, 371, 376, 395, 400, 404, 409, | 26, 44, 62, 80, 98, 116, 149, 167, 185, 203, 221, 239, 282, 300, 318, 336, 354, 372, 405, 423, 441, 459, 477, 495 | −265, −260, −251, −246, −9, −5, 4, 8, 12, 124, 131, 247, 252, 257, 261, 262, 266, 390 | −382, −377, −132, −127, 130, 135, 380, 385 |

TABLE 21-continued

| Identifier of a 242-tone DRU | Index of a data subcarrier First part | Second part | Third part | Index of a pilot subcarrier |
|---|---|---|---|---|
| | 413, 418, 422, 427, 431, 436, 440, 445, 449, 454, 458, 463, 467, 472, 476, 481, 485, 490, 494, 499 | | | |

As shown in Table 21, each 242-tone DRU includes 234 data subcarriers, and the first part (192 data subcarriers) of the 234 data subcarriers include 96 high-frequency subcarriers (whose subcarrier indices are positive values) and 96 low-frequency subcarriers (whose subcarrier indices are negative values). If every 24 of the 192 data subcarriers are considered as one group in a frequency direction (for example, from low to high) (or understood as an ascending order of indices), absolute values of index differences between adjacent data subcarriers in a same group are alternately 5 and 4. In addition, absolute values of index differences between data subcarriers of two adjacent groups are alternately 19 and 29.

In other words, for the 24 data subcarriers in the same group, an absolute value of an index difference between adjacent subcarriers of 12 data subcarriers in odd-numbered locations is 9, and an absolute value of an index difference between adjacent subcarriers of 12 data subcarriers in even-numbered locations is 9. An absolute value of an index difference between a data subcarrier in an even-numbered location and a previous adjacent data subcarrier is 5. Correspondingly, an absolute value of an index difference between a data subcarrier in an odd-numbered location and a previous adjacent data subcarrier is 4. In some embodiments, the 24 data subcarriers in the same group may be considered to include two sequences, for example, an odd-numbered location sequence and an even-numbered location sequence. An absolute value of an index difference between adjacent data subcarriers in each sequence is 9. For example, indices of the first 24 data subcarriers of the first part of data subcarriers of the 242-tone DRU whose identifier is 1 include −499, −494, −490, 485, −481, 476, −472, 467, −463, −458, −454, −449, −445, −440, −436, −431, −427, −422, −418, −413, −409, −404, −400, and −395, and may be represented as a combination of two sequences [−499: 9: −400] and [−494: 9: −395].

In other words, it is assumed that indices of 192 data subcarriers of 234 data subcarriers included in each 242-tone DRU are sequentially arranged in a frequency direction and then divided into eight groups, and each group includes 24 data subcarriers. Absolute values of index differences between 24 data subcarriers in a same group are alternately 5 and 4.

As shown in Table 21, there is a fixed offset between indices of 192 data subcarriers (the first part) included in two 242-tone DRUs having adjacent identifiers, and the fixed offset is 1. For example, indices of 192 data subcarriers in a 242-tone DRU whose identifier is i (i=1, 2, or 3) all plus 1, to obtain indices of 192 data subcarriers in a 242-tone DRU whose identifier is i+1.

As shown in Table 21, each 242-tone DRU includes 234 data subcarriers. If every six data subcarriers of the second part (24 data subcarriers) of the 234 data subcarriers may be considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33. In addition, indices of 24 data subcarriers in the second part of the 242-tone DRU whose identifier is i (i=1 or 3) all plus 9, to obtain indices of 24 data subcarriers in the second part of the 242-tone DRU whose identifier is i+1. Indices of 24 data subcarriers in the second part of the 242-tone DRU whose identifier is 2 all plus 503, to obtain indices of 24 data subcarriers in the second part of the 242-tone DRU whose identifier is 3.

In addition to the 192 data subcarriers in the first part column and the 24 data subcarriers in the second part column of the foregoing table, each 242-tone DRU further includes 18 data subcarriers (the third part) and eight pilot subcarriers. In some embodiments, 18 data subcarriers and eight pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 21 shows an example, so that subcarriers included in the 242-tone DRU can be fully discrete.

With reference to the foregoing Table 16, it may be considered that a 242-tone DRU is obtained based on a 26-tone DRU. For example, Table 21 may be simplified and represented as the following Table 22. The "first part" column in Table 22 means that the first part of (192) data subcarriers in the 242-tone DRU include a combination of data subcarriers in corresponding 26-tone DRUs shown in Table 16. The "second part" column in Table 22 means that the second part of (24) data subcarriers in the 242-tone DRU include a combination of data subcarriers in corresponding 26-tone DRUs shown in Table 16. For example, a 242-tone DRU whose identifier is 1 is used as an example. 192 data subcarriers (the first part) included in the 242-tone DRU include all data subcarriers in eight 26-tone DRUs whose identifiers are 1, 6, 10, 15, 19, 24, 28, and 33 shown in Table 16, and 24 data subcarriers (the second part) included in the 242-tone DRU include all data subcarriers in a 26-tone DRU whose identifier is 5 shown in Table 16.

TABLE 22

| Identifier of a 242-tone DRU | Index of a data subcarrier: First part (identifier of a 26-tone DRU) | Second part (identifier of a 26–tone DRU) | Third part | Index of a pilot subcarrier |
|---|---|---|---|---|
| 1 | 1, 6, 10, 15, 19, 24, 28, 33 | 5 | −264, −263, −259, −249, −135, −131, −12, −8, −4, 5, 9, 121, 249, 253, 254, 263, 377, 387 | −380, −268, −130, −126, 132, 244, 382, 386 |
| 2 | 2, 7, 11, 16, 20, 25, 29, 34 | 14 | −381, −267,−262,−253,−250, −248, −11, −7, −3, 6, 10, 122, 245, 250, 255, 259, 264, 388 | −384, −379, −134, −129, 128, 133, 378, 383 |
| 3 | 3, 8, 12, 17, 21, 26, 30, 35 | 23 | −266, −261, −252,−247,−10, −6, 3, 7, 11, 123, 246, 248, 251, 256, 260, 265, 381, 389 | −383, −378, −133, −128, 129, 134, 379, 384 |
| 4 | 4, 9, 13, 18, 22, 27, 31, 36 | 32 | −265, −260, −251, −246, −9, −5, 4, 8, 12, 124, 131, 247, 252, 257, 261, 262, 266, 390 | −382, −377, −132, −127, 130, 135, 380, 385 |

For example, the eight pilot subcarriers included in the 242-tone DRU may be a part of a set of 18 pilot subcarriers included in the corresponding nine 26-tone DRUs. Alternatively, in some embodiments, the eight pilot subcarriers included in the 242-tone DRU may be a part of a set of 16 pilot subcarriers included in the eight 26-tone DRUs in the corresponding first part. In addition, the other 18 data subcarriers included in the 242-tone DRU may be selected from remaining subcarriers of all the subcarriers of the entire bandwidth other than the guard subcarriers, the DC subcarriers, the data subcarriers in the first part column, the data subcarriers in the second part column, and the pilot subcarriers, and the data subcarriers may be fully discrete.

As shown in Table 21, each 242-tone DRU includes eight pilot subcarriers, and any two pilot subcarriers in a same DRU are not adjacent. The pilot subcarriers shown in Table 21 implement full discretization of pilot subcarriers in a same DRU, thereby implementing frequency domain diversity.

In addition, in an embodiment of this disclosure, the identifier of the 242-tone DRU may be based on a lowest-frequency index of a data subcarrier included in each 242-tone DRU. For example, an identifier of a 242-tone DRU having a lowest-frequency index −499 is 1.

According to the design of the 242-tone DRU shown in Table 21 or Table 22 in an embodiment of this disclosure, compared with the continuous 242-tone RU in FIG. 3, at a same power spectral density, this embodiment of this disclosure can implement a maximum power amplification multiple, for example, 3.25.

In an embodiment of this disclosure, an association between a 26-tone DRU (indirectly a 52-tone DRU) and a 106-tone DRU in 80 MHz is described by using Table 22. It may be understood that the foregoing described manner of determining a 242-tone DRU based on a 26-tone DRU is merely an example, and subcarriers in the 242-tone DRU can be fully discrete. In another embodiment, a 242-tone DRU may alternatively be determined in another manner based on a 26-tone DRU. For example, a combination of data subcarriers of nine 26-tone DRUs whose identifiers are 1 to 9 is determined as the first part and the second part of the 242-tone DRU whose identifier is 1. This is not limited in this disclosure. Details are not described again.

In addition, it should be noted that the 242-tone DRU in 80 MHz described with reference to Table 21 and Table 22 is merely an example. For example, 234 data subcarriers in the 242-tone DRU may alternatively be divided into three parts in another manner, for example, a first part, a second part, and a third part shown in Table 23 below. In Table 23, the “first part” column means that a first part of data subcarriers (204) in the 242-tone DRU include a combination of data subcarriers in corresponding 106-tone DRUs. For example, a 242-tone DRU whose identifier is 1 is used as an example. The first part of (204) data subcarriers included in the 242-tone DRU include all data subcarriers of 106-tone DRUs whose identifiers are 1 and 5 shown in Table 19. In Table 23, the “second part” column means that the second part of (24) data subcarriers in the 242-tone DRU include a combination of data subcarriers in corresponding 26-tone DRUs. For example, a 242-tone DRU whose identifier is 1 is used as an example. The second part of (24) data subcarriers included in the 242-tone DRU include data subcarriers in a 26-tone DRU whose identifier is 5 shown in Table 16.

TABLE 23

| Identifier of a 242-tone DRU | Index of a data subcarrier: First part (identifier of a 106-tone DRU) | Second part (identifier of a 26-tone DRU) | Third part | Index of a pilot subcarrier |
|---|---|---|---|---|
| 1 | 1, 5 | 5 | −264, −131, −4, 121, 254, 387 | −380, −268, −130, −126, 132, 244, 382, 386 |
| 2 | 2, 6 | 14 | −381, −250, −3, 122, 255, 388 | −384, −379, −134, −129, 128, 133, 378, 383 |

TABLE 23-continued

| Identifier of a 242-tone DRU | Index of a data subcarrier: First part (identifier of a 106-tone DRU) | Index of a data subcarrier: Second part (identifier of a 26-tone DRU) | Index of a data subcarrier: Third part | Index of a pilot subcarrier |
|---|---|---|---|---|
| 3 | 3, 7 | 23 | 3, 123, 248, 256, 381, 389 | −383, −378, −133, −128, 129, 134, 379, 384 |
| 4 | 4, 8 | 32 | 4, 124, 131, 257, 262, 390 | −382, −377,−132,−127, 130, 135, 380, 385 |

It may be understood that the manner of determining the 242-tone DRU based on the 106-tone DRU and the 26-tone DRU described in the foregoing Table 23 is merely an example, and subcarriers in the 242-tone DRU can be fully discrete. In another embodiment, the 242-tone DRU may alternatively be determined in another manner. This is not limited in this disclosure. Details are not described again.

In addition, it may be understood that if the lowest-frequency index of the data subcarrier included in the 26-tone DRU is another value other than −499, correspondingly the lowest-frequency index of the data subcarrier included in the 242-tone DRU also adaptively changes to another value.

Tone plans of 26-tone DRUs, 52-tone DRUs, 106-tone DRUs, and 242-tone DRUs in 80 MHz are separately described above with reference to Table 16 to Table 23. An index −499 is used as a lowest-frequency index of a data subcarrier.

The foregoing content describes in detail subcarriers (data subcarriers and pilot subcarriers) separately included in different DRUs in the 80 MHz bandwidth. Further, for a characteristic followed by a tone plan of the DRUs in the 80 MHz bandwidth and related description, refer to descriptions of the 40 MHz bandwidth. Details are not described again.

In some embodiments, data subcarriers included in the 26-tone DRU in 80 MHz may be obtained by shifting leftward by n11, shifting rightward by n12, shifting leftward by n21, and shifting rightward by n22 based on Table 12. Alternatively, if n11=n12=128, data subcarriers included in the 26-tone DRU in 80 MHz may be obtained by shifting leftward by n21 and/or shifting rightward by n22 based on the 26-tone DRU in 40 MHz (Table 5). In an example of Table 16, n21=n22=256. However, n21 and n22 may alternatively be other values, and are not listed herein again.

Correspondingly, Table 16 may also be simplified and represented as the following Table 24, where numbers in brackets { } are group numbers shown in Table 12, and include a combination of indices of subcarriers in the group numbers shown in Table 12, and may be understood as being obtained by shifting leftward/rightward by 256 based on Table 5.

TABLE 24

| Identifier of a 26-tone DRU | Index of a data subcarrier | Index of a pilot subcarrier |
|---|---|---|
| 1 | {1} − 128, {1} − 384 | −268, −135 |
| 2 | {2} − 128, {2} − 384 | −267, −134 |
| 3 | {3} − 128, {3} − 384 | −266, −133 |
| 4 | {4} − 128, {4} − 384 | −265, −132 |
| 5 | {5} − 128, {5} − 384 | −264, −131 |
| 6 | {6} − 128, {6} − 384 | −263, −130 |
| 7 | {7} − 128, {7} − 384 | −262, −129 |
| 8 | {8} − 128, {8} − 384 | −261, −128 |

TABLE 24-continued

| Identifier of a 26-tone DRU | Index of a data subcarrier | Index of a pilot subcarrier |
|---|---|---|
| 9 | {9} − 128, {9} − 384 | −260, −127 |
| 10 | {10} − 128, {10} − 384 | −259, −126 |
| 11 | {11} − 128, {11} − 384 | −384, −253 |
| 12 | {12} − 128, {12} − 384 | −383, −252 |
| 13 | {13} − 128, {13} − 384 | −382, −251 |
| 14 | {14} − 128, {14} − 384 | −381, −250 |
| 15 | {15} − 128, {15} −384 | −380, −249 |
| 16 | {16} − 128, {16} − 384 | −379, −248 |
| 17 | {17} − 128, {17} − 384 | −378, −247 |
| 18 | {18} − 128, {18} − 384 | −377, −246 |
| 19 | {1} + 128, {1} + 384 | 244, 377 |
| 20 | {2} + 128, {2} + 384 | 245, 378 |
| 21 | {3} + 128, {3} + 384 | 246, 379 |
| 22 | {4} + 128, {4} + 384 | 247, 380 |
| 23 | {5} + 128, {5} + 384 | 248, 381 |
| 24 | {6} + 128, {6} + 384 | 249, 382 |
| 25 | {7} + 128, {7} + 384 | 250, 383 |
| 26 | {8} + 128, {8} + 384 | 251, 384 |
| 27 | {9} + 128, {9} + 384 | 252, 385 |
| 28 | {10} + 128, {10} + 384 | 253, 386 |
| 29 | {11} + 128, {11} + 384 | 128, 259 |
| 30 | {12} + 128, {12} + 384 | 129, 260 |
| 31 | {13} + 128, {13} + 384 | 130, 261 |
| 32 | {14} + 128, {14} + 384 | 131, 262 |
| 33 | {15} + 128, {15} + 384 | 132, 263 |
| 34 | {16} + 128, {16} + 384 | 133, 264 |
| 35 | {17} + 128, {17} + 384 | 134, 265 |
| 36 | {18} + 128, {18} + 384 | 135, 266 |

Similarly, Table 17 may also be simplified and represented as the following Table 25, where numbers in brackets { } are group numbers shown in Table 12, and include a combination of indices of subcarriers in the group numbers shown in Table 12.

TABLE 25

| Identifier of a 52-tone DRU | Index of a data subcarrier | Index of a pilot subcarrier |
|---|---|---|
| 1 | {1} ± 128, {1} ± 384 | −268, −135, 244, 377 |
| 2 | {2} ± 128, {2} ± 384 | −267, −134, 245, 378 |
| 3 | {3} ± 128, {3} ± 384 | −266, −133, 246, 379 |
| 4 | {4} ± 128, {4} ± 384 | −265, −132, 247, 380 |
| 5 | {6} ± 128, {6} ± 384 | −263, −130, 249, 382 |
| 6 | {7} ± 128, {7} ± 384 | −262, −129, 250, 383 |
| 7 | {8} ± 128, {8} ± 384 | −261, −128, 251, 384 |
| 8 | {9} ± 128, {9} ± 384 | −260, −127, 252, 385 |
| 9 | {10} ± 128, {10} ± 384 | −259, −126, 253, 386 |
| 10 | {11} ± 128, {11} ± 384 | −384, −253, 128, 259 |
| 11 | {12} ± 128, {12} ± 384 | −383, −252, 129, 260 |
| 12 | {13} ± 128, {13} ± 384 | −382, −251, 130, 261 |
| 13 | {15} ± 128, {15} ± 384 | −380, −249, 132, 263 |
| 14 | {16} ± 128, {16} ± 384 | −379, −248, 133, 264 |
| 15 | {17} ± 128, {17} ± 384 | −378, −247, 134, 265 |
| 16 | {18} ± 128, {18} ± 384 | −377, −246, 135, 266 |

It may be understood that, for the 106-tone DRU in 80 MHz, with reference to the foregoing Table 20 and Table 24, indices of data subcarriers included in the 106-tone DRU may also be represented as variations based on Table 12. For the 242-tone DRU in 80 MHz, with reference to the foregoing Table 22 and Table 24, indices of data subcarriers included in the 242-tone DRU may also be represented as variations based on Table 12. For brevity, the examples are not elaborated herein.

In addition, it may be understood that, although an embodiment of obtaining DRUs of various sizes in 80 MHz based on Table 12 is described, this disclosure is not limited thereto. For example, an index of a subcarrier included in each DRU may be determined without considering the grouping in Table 12. For example, an index of a subcarrier included in each DRU may be determined based on another grouping form. This is not limited in this disclosure.

For a 160 MHz Bandwidth:

The 160 MHz bandwidth includes 2048 subcarriers in total, and the subcarrier index range is [−1024, 1023]. The 160 MHz bandwidth may include 72 26-tone RUs.

In a tone plan solution of a DRU, the 160 MHz bandwidth includes 72 26-tone DRUs, and each 26-tone DRU includes 24 data subcarriers and two pilot subcarriers. For example, Table 26 shows an example of 72 26-tone DRUs corresponding to the 160 MHz bandwidth, and shows indices of 24 data subcarriers and indices of two pilot subcarriers included in each 26-tone DRU, and a lowest-frequency index of a data subcarrier in a 26-tone DRU whose identifier is 1 is −1011.

TABLE 26

| Identifier of a 26-tone DRU | Index of a data subcarrier | Index of a pilot subcarrier |
|---|---|---|
| 1 | −1011, −993, −975, −957, −939, −921, −888, −870, −852, −834, −816, −798, −755, −737, −719, −701, −683, −665, −632, −614, −596, −578, −560, −542 | −780, −647 |
| 2 | −1010, −992, −974, −956, −938, −920, −887, −869, −851, −833, −815, −797, −754, −736, −718, −700, −682, −664, −631, −613, −595, −577, −559, −541 | −779, −646 |
| 3 | −1009, −991, −973, −955, −937, −919, −886, −868, −850, −832, −814, −796, −753, −735, −717, −699, −681, −663, −630, −612, −594, −576, −558, −540 | −778, −645 |
| 4 | −1008, −990, −972, −954, −936, −918, −885, −867, −849, −831, −813, −795, −752, −734, −716, −698, −680, −662, −629, −611, −593, −575, −557, −539 | −777, −644 |
| 5 | −1007, −989, −971, −953, −935, −917, −884, −866, −848, −830, −812, −794, −751, −733, −715, −697, −679, −661, −628, −610, −592, −574, −556, −538 | −776, −643 |
| 6 | −1006, −988, −970, −952, −934, −916, −883, −865, −847, −829, −811, −793, −750, −732, −714, −696, −678, −660, −627, −609, −591, −573, −555, −537 | −775, −642 |
| 7 | −1005, −987, −969, −951, −933, −915, −882, −864, −846, −828, −810, −792, −749, −731, −713, −695, −677, −659, −626, −608, −590, −572, −554, −536 | −774, −641 |
| 8 | −1004, −986, −968, −950, −932, −914, −881, −863, −845, −827, −809, −791, −748, −730, −712, −694, −676, −658, −625, −607, −589, −571, −553, −535 | −773, −640 |
| 9 | −1003, −985, −967, −949, −931, −913, −880, −862, −844, −826, −808, −790, −747, −729, −711, −693, −675, −657, −624, −606, −588, −570, −552, −534 | −772, −639 |
| 10 | −1002, −984, −966, −948, −930, −912, −879, −861, −843, −825, −807, −789, −746, −728, −710, −692, −674, −656, −623, −605, −587, −569, −551, −533 | −771, −638 |
| 11 | −1001, −983, −965, −947, −929, −911, −878, −860, −842, −824, −806, −788, −745, −727, −709, −691, −673, −655, −622, −604, −586, −568, −550, −532 | −896, −765 |
| 12 | −1000, −982, −964, −946, −928, −910, −877, −859, −841, −823, −805, −787, −744, −726, −708, −690, −672, −654, −621, −603, −585, −567, −549, −531 | −895, −764 |
| 13 | −999, −981, −963, −945, −927, −909, −876, −858, −840, −822, −804, −786, −743, −725, −707, −689, −671, −653, −620, −602, −584, −566, −548, −530 | −894, −763 |
| 14 | −998, −980, −962, −944, −926, −908, −875, −857, −839, −821, −803, −785, −742, −724, −706, −688, −670, −652, −619, −601, −583, −565, −547, −529 | −893, −762 |
| 15 | −997, −979, −961, −943, −925, −907, −874, −856, −838, −820, −802, −784, −741, −723, −705, −687, −669, −651, −618, −600, −582, −564, −546, −528 | −892, −761 |
| 16 | −996, −978, −960, −942, −924, −906, −873, −855, −837, −819, −801, −783, −740, −722, −704, −686, −668, −650, −617, −599, −581, −563, −545, −527 | −891, −760 |
| 17 | −995, −977, −959, −941, −923, −905, −872, −854, −836, −818, −800, −782, −739, −721, −703, −685, −667, −649, −616, −598, −580, −562, −544, −526 | −890, −759 |
| 18 | −994, −976, −958, −940, −922, −904, −871, −853, −835, −817, −799, −781, −738, −720, −702, −684, −666, −648, −615, −597, −579, −561, −543, −525 | −889, −758 |

TABLE 26-continued

| Identifier of a 26-tone DRU | Index of a data subcarrier | Index of a pilot subcarrier |
|---|---|---|
| 19 | −499, −481, −463, −445, −427, −409, −376, −358, −340, −322, −304, −286, −243, −225, −207, −189, −171, −153, −120, −102, −84, −66, −48, −30 | −268, −135 |
| 20 | −498, −480, −462, −444, −426, −408, −375, −357, −339, −321, −303, −285, −242, −224, −206, −188, −170, −152, −119, −101, −83, −65, −47, −29 | −267, −134 |
| 21 | −497, −479, −461, −443, −425, −407, −374, −356, −338, −320, −302, −284, −241, −223, −205, −187, −169, −151, −118, −100, −82, −64, −46, −28 | −266, −133 |
| 22 | 496, −478, −460, −442, −424, −406, −373, −355, −337, −319, −301, −283, −240, −222, −204, −186, −168, −150, −117, −99, −81, −63, −45, −27 | −265, −132 |
| 23 | −495, −477, −459, −441, −423, −405, −372, −354, −336, −318, −300, −282, −239, −221, −203, −185, −167, −149, −116, −98, −80, −62, −44, −26 | −264, −131 |
| 24 | −494, −476, −458, −440, −422, −404, −371, −353, −335, −317, −299, −281, −238, −220, −202, −184, −166, −148, −115, −97, −79, −61, −43, −25 | −263, −130 |
| 25 | −493, −475, −457, −439, −421, −403, −370, −352, −334, −316, −298, −280, −237, −219, −201, −183, −165, −147, −114, −96, −78, −60, −42, −24 | −262, −129 |
| 26 | −492, −474, −456, −438, −420, −402, −369, −351, −333, −315, −297, −279, −236, −218, −200, −182, −164, −146, −113, −95, −77, −59, −41, −23 | −261, −128 |
| 27 | −491, −473, −455, −437, −419, −401, −368, −350, −332, −314, −296, −278, −235, −217, −199, −181, −163, −145, −112, −94, −76, −58, −40, −22 | −260, −127 |
| 28 | −490, −472, −454, −436, −418, −400, −367, −349, −331, −313, −295, −277, −234, −216, −198, −180, −162, −144, −111, −93, −75, −57, −39, −21 | −259, −126 |
| 29 | −489, −471, −453, −435, −417, −399, −366, −348, −330, −312, −294, −276, −233, −215, −197, −179, −161, −143, −110, −92, −74, −56, −38, −20 | −384, −253 |
| 30 | −488, −470, −452, −434, −416, −398, −365, −347, −329, −311, −293, −275, −232, −214, −196, −178, −160, −142, −109, −91, −73, −55, −37, −19 | −383, −252 |
| 31 | −487, −469, −451, −433, −415, −397, −364, −346, −328, −310, −292, −274, −231, −213, −195, −177, −159, −141, −108, −90, −72, −54, −36, −18 | −382, −251 |
| 32 | −486, −468, −450, −432, −414, −396, −363, −345, −327, −309, −291, −273, −230, −212, −194, −176, −158, −140, −107, −89, −71, −53, −35, −17 | −381, −250 |
| 33 | −485, −467, −449, −431, −413, −395, −362, −344, −326, −308, −290, −272, −229, −211, −193, −175, −157, −139, −106, −88, −70, −52, −34, −16 | −380, −249 |
| 34 | −484, −466, −448, −430, −412, −394, −361, −343, −325, −307, −289, −271, −228, −210, −192, −174, −156, −138, −105, −87, −69, −51, −33, −15 | −379, −248 |
| 35 | −483, −465, −447, −429, −411, −393, −360, −342, −324, −306, −288, −270, −227, −209, −191, −173, −155, −137, −104, −86, −68, −50, −32, −14 | −378, −247 |
| 36 | −482, −464, −446, −428, −410, −392, −359, −341, −323, −305, −287, −269, −226, −208, −190, −172, −154, −136, −103, −85, −67, −49, −31, −13 | −377, −246 |
| 37 | 13, 31, 49, 67, 85, 103, 136, 154, 172, 190, 208, 226, 269, 287, 305, 323, 341, 359, 392, 410, 428, 446, 464, 482 | 244, 377 |
| 38 | 14, 32, 50, 68, 86, 104, 137, 155, 173, 191, 209, 227, 270, 288, 306, 324, 342, 360, 393, 411, 429, 447, 465, 483 | 245, 378 |
| 39 | 15, 33, 51, 69, 87, 105, 138, 156, 174, 192, 210, 228, 271, 289, 307, 325, 343, 361, 394, 412, 430, 448, 466, 484 | 246, 379 |
| 40 | 16, 34, 52, 70, 88, 106, 139, 157, 175, 193, 211, 229, 272, 290, 308, 326, 344, 362, 395, 413, 431, 449, 467, 485 | 247, 380 |
| 41 | 17, 35, 53, 71, 89, 107, 140, 158, 176, 194, 212, 230, 273, 291, 309, 327, 345, 363, 396, 414, 432, 450, 468, 486 | 248, 381 |
| 42 | 18, 36, 54, 72, 90, 108, 141, 159, 177, 195, 213, 231, 274, 292, 310, 328, 346, 364, 397, 415, 433, 451, 469, 487 | 249, 382 |
| 43 | 19, 37, 55, 73, 91, 109, 142, 160, 178, 196, 214, 232, 275, 293, 311, 329, 347, 365, 398, 416, 434, 452, 470, 488 | 250, 383 |
| 44 | 20, 38, 56, 74, 92, 110, 143, 161, 179, 197, 215, 233, 276, 294, 312, 330, 348, 366, 399, 417, 435, 453, 471, 489 | 251, 384 |
| 45 | 21, 39, 57, 75, 93, 111, 144, 162, 180, 198, 216, 234, 277, 295, 313, 331, 349, 367, 400, 418, 436, 454, 472, 490 | 252, 385 |
| 46 | 22, 40, 58, 76, 94, 112, 145, 163, 181, 199, 217, 235, 278, 296, 314, 332, 350, 368, 401, 419, 437, 455, 473, 491 | 253, 386 |

TABLE 26-continued

| Identifier of a 26-tone DRU | Index of a data subcarrier | Index of a pilot subcarrier |
|---|---|---|
| 47 | 23, 41, 59, 77, 95, 113, 146, 164, 182, 200, 218, 236, 279, 297, 315, 333, 351, 369, 402, 420, 438, 456, 474, 492 | 128, 259 |
| 48 | 24, 42, 60, 78, 96, 114, 147, 165, 183, 201, 219, 237, 280, 298, 316, 334, 352, 370, 403, 421, 439, 457, 475, 493 | 129, 260 |
| 49 | 25, 43, 61, 79, 97, 115, 148, 166, 184, 202, 220, 238, 281, 299, 317, 335, 353, 371, 404, 422, 440, 458, 476, 494 | 130, 261 |
| 50 | 26, 44, 62, 80, 98, 116, 149, 167, 185, 203, 221, 239, 282, 300, 318, 336, 354, 372, 405, 423, 441, 459, 477, 495 | 131, 262 |
| 51 | 27, 45, 63, 81, 99, 117, 150, 168, 186, 204, 222, 240, 283, 301, 319, 337, 355, 373, 406, 424, 442, 460, 478, 496 | 132, 263 |
| 52 | 28, 46, 64, 82, 100, 118, 151, 169, 187, 205, 223, 241, 284, 302, 320, 338, 356, 374, 407, 425, 443, 461, 479, 497 | 133, 264 |
| 53 | 29, 47, 65, 83, 101, 119, 152, 170, 188, 206, 224, 242, 285, 303, 321, 339, 357, 375, 408, 426, 444, 462, 480, 498 | 134, 265 |
| 54 | 30, 48, 66, 84, 102, 120, 153, 171, 189, 207, 225, 243, 286, 304, 322, 340, 358, 376, 409, 427, 445, 463, 481, 499 | 135, 266 |
| 55 | 525, 543, 561, 579, 597, 615, 648, 666, 684, 702, 720, 738, 781, 799, 817, 835, 853, 871, 904, 922, 940, 958, 976, 994 | 756, 889 |
| 56 | 526, 544, 562, 580, 598, 616, 649, 667, 685, 703, 721, 739, 782, 800, 818, 836, 854, 872, 905, 923, 941, 959, 977, 995 | 757, 890 |
| 57 | 527, 545, 563, 581, 599, 617, 650, 668, 686, 704, 722, 740, 783, 801, 819, 837, 855, 873, 906, 924, 942, 960, 978, 996 | 758, 891 |
| 58 | 528, 546, 564, 582, 600, 618, 651, 669, 687, 705, 723, 741, 784, 802, 820, 838, 856, 874, 907, 925, 943, 961, 979, 997 | 759, 892 |
| 59 | 529, 547, 565, 583, 601, 619, 652, 670, 688, 706, 724, 742, 785, 803, 821, 839, 857, 875, 908, 926, 944, 962, 980, 998 | 760, 893 |
| 60 | 530, 548, 566, 584, 602, 620, 653, 671, 689, 707, 725, 743, 786, 804, 822, 840, 858, 876, 909, 927, 945, 963, 981, 999 | 761, 894 |
| 61 | 531, 549, 567, 585, 603, 621, 654, 672, 690, 708, 726, 744, 787, 805, 823, 841, 859, 877, 910, 928, 946, 964, 982, 1000 | 762, 895 |
| 62 | 532, 550, 568, 586, 604, 622, 655, 673, 691, 709, 727, 745, 788, 806, 824, 842, 860, 878, 911, 929, 947, 965, 983, 1001 | 763, 896 |
| 63 | 533, 551, 569, 587, 605, 623, 656, 674, 692, 710, 728, 746, 789, 807, 825, 843, 861, 879, 912, 930, 948, 966, 984, 1002 | 764, 897 |
| 64 | 534, 552, 570, 588, 606, 624, 657, 675, 693, 711, 729, 747, 790, 808, 826, 844, 862, 880, 913, 931, 949, 967, 985, 1003 | 765, 898 |
| 65 | 535, 553, 571, 589, 607, 625, 658, 676, 694, 712, 730, 748, 791, 809, 827, 845, 863, 881, 914, 932, 950, 968, 986, 1004 | 640, 771 |
| 66 | 536, 554, 572, 590, 608, 626, 659, 677, 695, 713, 731, 749, 792, 810, 828, 846, 864, 882, 915, 933, 951, 969, 987, 1005 | 641, 772 |
| 67 | 537, 555, 573, 591, 609, 627, 660, 678, 696, 714, 732, 750, 793, 811, 829, 847, 865, 883, 916, 934, 952, 970, 988, 1006 | 642, 773 |
| 68 | 538, 556, 574, 592, 610, 628, 661, 679, 697, 715, 733, 751, 794, 812, 830, 848, 866, 884, 917, 935, 953, 971, 989, 1007 | 643, 774 |
| 69 | 539, 557, 575, 593, 611, 629, 662, 680, 698, 716, 734, 752, 795, 813, 831, 849, 867, 885, 918, 936, 954, 972, 990, 1008 | 644, 775 |
| 70 | 540, 558, 576, 594, 612, 630, 663, 681, 699, 717, 735, 753, 796, 814, 832, 850, 868, 886, 919, 937, 955, 973, 991, 1009 | 645, 776 |
| 71 | 541, 559, 577, 595, 613, 631, 664, 682, 700, 718, 736, 754, 797, 815, 833, 851, 869, 887, 920, 938, 956, 974, 992, 1010 | 646, 777 |
| 72 | 542, 560, 578, 596, 614, 632, 665, 683, 701, 719, 737, 755, 798, 816, 834, 852, 870, 888, 921, 939, 957, 975, 993, 1011 | 647, 778 |

As shown in Table 26, the 72 26-tone DRUs corresponding to the 160 MHz bandwidth include 36 high-frequency 26-tone DRUs and 36 low-frequency 26-tone DRUs, where subcarrier indices of 26 subcarriers in a high-frequency 26-tone DRU are all positive values, and subcarrier indices of 26 subcarriers in a low-frequency 26-tone DRU are all negative values.

Each 26-tone DRU includes 24 data subcarriers. If every six data subcarriers of the 24 data subcarriers are considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33.

In other words, it is assumed that indices of 24 data subcarriers included in each 26-tone DRU are sequentially arranged in a frequency direction and then divided into four groups, and each group includes six data subcarriers. Six data subcarriers in a same group are equally spaced. Specifically, a quantity of subcarriers between every two adjacent data subcarriers in a same group is 17.

In addition, in every 18 26-tone DRUs, there is a fixed offset between indices of data subcarriers included in two 26-tone DRUs having adjacent identifiers, and the fixed offset is 1. For example, indices of 24 data subcarriers in a 26-tone DRU whose identifier is i (i=1, 2, . . . , or 17; or 19, 20, . . . , or 35; or 37, 38, . . . , or 53; or 55, 56, . . . , or 71) all plus 1, to obtain indices of 24 data subcarriers in a 26-tone DRU whose identifier is i+1. In addition, there is an offset 495 between 18 different 26-tone DRUs, that is, between a 26-tone DRU whose identifier is 18 and a 26-tone DRU whose identifier is 19, between a 26-tone DRU whose identifier is 36 and a 26-tone DRU whose identifier is 37, and between a 26-tone DRU whose identifier is 54 and a 26-tone DRU whose identifier is 55.

In Table 26, the identifier of the 26-tone DRU may be based on an index of a lowest-frequency subcarrier included in the 26-tone DRU. In other words, an identifier of a 26-tone DRU having a data subcarrier with a minimum value index is 1. As shown in Table 26, in all data subcarriers in the "index of a data subcarrier" column, a minimum value index is −1011. Therefore, an identifier of a 26-tone DRU in which the subcarrier is located is 1. In addition, a minimum value index other than that of the 26-tone DRU whose identifier is 1 is −1010. Therefore, the identifier of the 26-tone DRU in which the subcarrier is located is 2.

It may be understood that although the lowest-frequency index shown in Table 26 is −1011, the value is merely an example. For example, the value may be any integer from −1018 to −1006.

As shown in Table 26, each 26-tone DRU further includes two pilot subcarriers. For 26-tone DRUs whose identifiers are 1 to 10, 19 to 28, 37 to 46, or 55 to 64, an absolute value of an index difference between two pilot subcarriers in a same 26-tone DRU is 133. For 26-tone DRUs whose identifiers are 11 to 18, 29 to 36, 47 to 54, or 65 to 72, an absolute value of an index difference between two pilot subcarriers in a same 26-tone DRU is 131.

As shown in Table 26, for identifiers 1 to 10, there is a fixed offset between indices of pilot subcarriers included in two 26-tone DRUs having adjacent identifiers, and the fixed offset is 1. For identifiers 11 to 18, there is a fixed offset between indices of pilot subcarriers included in two 26-tone DRUs having adjacent identifiers, and the fixed offset is 1. For identifiers 19 to 28, there is a fixed offset between indices of pilot subcarriers included in two 26-tone DRUs having adjacent identifiers, and the fixed offset is 1. For identifiers 29 to 36, there is a fixed offset between indices of pilot subcarriers included in two 26-tone DRUs having adjacent identifiers, and the fixed offset is 1. For identifiers 37 to 46, there is a fixed offset between indices of pilot subcarriers included in two 26-tone DRUs having adjacent identifiers, and the fixed offset is 1. For identifiers 47 to 54, there is a fixed offset between indices of pilot subcarriers included in two 26-tone DRUs having adjacent identifiers, and the fixed offset is 1. For identifiers 55 to 64, there is a fixed offset between indices of pilot subcarriers included in two 26-tone DRUs having adjacent identifiers, and the fixed offset is 1. For identifiers 65 to 72, there is a fixed offset between indices of pilot subcarriers included in two 26-tone DRUs having adjacent identifiers, and the fixed offset is 1. For example, indices of two pilot subcarriers in a 26-tone DRU whose identifier is i (i=1 to 9, 11 to 17, 19 to 27, 29 to 35, 37 to 45, 47 to 53, 55 to 63, or 65 to 71) all plus 1, to obtain indices of two pilot subcarriers in a 26-tone DRU whose identifier is i+1.

In an embodiment of this disclosure, for the 160 MHz bandwidth, a manner of determining two pilot subcarriers in a 26-tone DRU is similar to the foregoing manner of determining the two pilot subcarriers in the 26-tone DRU for the 40 MHz bandwidth. The pilot subcarriers shown in Table 26 implement full discretization of pilot subcarriers in a same DRU, thereby implementing frequency domain diversity. Details are not described herein again.

It may be understood that the pilot subcarriers shown in Table 26 are merely examples, and other pilot subcarriers may alternatively be used. For example, spacings between two pilot subcarriers in different 26-tone DRUs may be unequal to each other.

In this way, for the 160 MHz bandwidth, through the design of the 26-tone DRU shown in Table 26, compared with the continuous 26-tone RU in the 160 MHz obtained based on the 80 MHz in FIG. 3, at a same power spectral density, this embodiment of this disclosure can implement a maximum power amplification multiple, specifically, 13.

The foregoing describes a tone plan solution of the 26-tone DRU in the 160 MHz bandwidth with reference to Table 26. The solution is merely an example. A person skilled in the art may obtain another solution on this basis. For example, the lowest-frequency index is no longer −1011 but another value. For example, an index of a pilot subcarrier is determined by using another solution. In addition, the tone plan of other DRUs described below in this disclosure may also be similarly varied, and these variations are not described below for each DRU.

In a tone plan solution of a DRU, the 160 MHz bandwidth includes 32 52-tone DRUs, and each 52-tone DRU includes 48 data subcarriers and four pilot subcarriers. For example, Table 27 shows an example of 32 52-tone DRUs corresponding to the 160 MHz bandwidth, and shows indices of 48 data subcarriers and indices of four pilot subcarriers included in each 52-tone DRU, and a lowest-frequency index of a data subcarrier in a 52-tone DRU whose identifier is 1 is −1011.

TABLE 27

| Identifier of a 52-tone DRU | Index of a data subcarrier | Index of a pilot subcarrier |
|---|---|---|
| 1 | −1011, −993, −975, −957, −939, −921, −888, −870, −852, −834, −816, −798, −755, −737, −719, −701, −683, −665, −632, −614, −596, −578, −560, −542, 13, 31, 49, 67, 85, 103, 136, 154, 172, 190, 208, 226, 269, 287, 305, 323, 341, 359, 392, 410, 428, 446, 464, 482 | −780, −647, 244, 377 |
| 2 | −1010, −992, −974, −956, −938, −920, −887, −869, −851, −833, −815, −797, −754, −736, −718, −700, −682, −664, −631, −613, −595, −577, −559, −541, 14, 32, 50, 68, 86, 104, 137, 155, 173, 191, 209, 227, 270, 288, 306, 324, 342, 360, 393, 411, 429, 447, 465, 483 | −779, −646, 245, 378 |
| 3 | −1009, −991, −973, −955, −937, −919, −886, −868, −850, −832, −814, −796, −753, −735, −717, −699, −681, −663, −630, −612, −594, −576, −558, −540, 15, 33, 51, 69, 87, 105, 138, 156, 174, 192, 210, 228, 271, 289, 307, 325, 343, 361, 394, 412, 430, 448, 466, 484 | −778, −645, 246, 379 |
| 4 | −1008, −990, −972, −954, −936, −918, −885, −867, −849, −831, −813, −795, −752, −734, −716, −698, −680, −662, −629, −611, −593, −575, −557, −539, 16, 34, 52, 70, 88, 106, 139, 157, 175, 193, 211, 229, 272, 290, 308, 326, 344, 362, 395, 413, 431, 449, 467, 485 | −777, −644, 247, 380 |
| 5 | −1006, −988, −970, −952, −934, −916, −883, −865, −847, −829, −811, −793, −750, −732, −714, −696, −678, −660, −627, −609, −591, −573, −555, −537, 18, 36, 54, 72, 90, 108, 141, 159, 177, 195, 213, 231, 274, 292, 310, 328, 346, 364, 397, 415, 433, 451, 469, 487 | −775, −642, 249, 382 |

TABLE 27-continued

| Identifier of a 52-tone DRU | Index of a data subcarrier | Index of a pilot subcarrier |
|---|---|---|
| 6 | −1005, −987, −969, −951, −933, −915, −882, −864, −846, −828, −810, −792, −749, −731, −713, −695, −677, −659, −626, −608, −590, −572, −554, −536, 19, 37, 55, 73, 91, 109, 142, 160, 178, 196, 214, 232, 275, 293, 311, 329, 347, 365, 398, 416, 434, 452, 470, 488 | −774, −641, 250, 383 |
| 7 | −1004, −986, −968, −950, −932, −914, −881, −863, −845, −827, −809, −791, −748, −730, −712, −694, −676, −658, −625, −607, −589, −571, −553, −535, 20, 38, 56, 74, 92, 110, 143, 161, 179, 197, 215, 233, 276, 294, 312, 330, 348, 366, 399, 417, 435, 453, 471, 489 | −773, −640, 251, 384 |
| 8 | −1003, −985, −967, −949, −931, −913, −880, −862, −844, −826, −808, −790, −747, −729, −711, −693, −675, −657, −624, −606, −588, −570, −552, −534, 21, 39, 57, 75, 93, 111, 144, 162, 180, 198, 216, 234, 277, 295, 313, 331, 349, 367, 400, 418, 436, 454, 472, 490 | −772, −639, 252, 385 |
| 9 | −1002, −984, −966, −948, −930, −912, −879, −861, −843, −825, −807, −789, −746, −728, −710, −692, −674, −656, −623, −605, −587, −569, −551, −533, 22, 40, 58, 76, 94, 112, 145, 163, 181, 199, 217, 235, 278, 296, 314, 332, 350, 368, 401, 419, 437, 455, 473, 491 | −771, −638, 253, 386 |
| 10 | −1001, −983, −965, −947, −929, −911, −878, −860, −842, −824, −806, −788, −745, −727, −709, −691, −673, −655, −622, −604, −586, −568, −550, −532, 23, 41, 59, 77, 95, 113, 146, 164, 182, 200, 218, 236, 279, 297, 315, 333, 351, 369, 402, 420, 438, 456, 474, 492 | −896, −765, 128, 259 |
| 11 | −1000, −982, −964, −946, −928, −910, −877, −859, −841, −823, −805, −787, −744, −726, −708, −690, −672, −654, −621, −603, −585, −567, −549, −531, 24, 42, 60, 78, 96, 114, 147, 165, 183, 201, 219, 237, 280, 298, 316, 334, 352, 370, 403, 421, 439, 457, 475, 493 | −895, −764, 129, 260 |
| 12 | −999, −981, −963, −945, −927, −909, −876, −858, −840, −822, −804, −786, −743, −725, −707, −689, −671, −653, −620, −602, −584, −566, −548, −530, 25, 43, 61, 79, 97, 115, 148, 166, 184, 202, 220, 238, 281, 299, 317, 335, 353, 371, 404, 422, 440, 458, 476, 494 | −894, −763, 130, 261 |
| 13 | −997, −979, −961, −943, −925, −907, −874, −856, −838, −820, −802, −784, −741, −723, −705, −687, −669, −651, −618, −600, −582, −564, −546, −528, 27, 45, 63, 81, 99, 117, 150, 168, 186, 204, 222, 240, 283, 301, 319, 337, 355, 373, 406, 424, 442, 460, 478, 496 | −892, −761, 132, 263 |
| 14 | −996, −978, −960, −942, −924, −906, −873, −855, −837, −819, −801, −783, −740, −722, −704, −686, −668, −650, −617, −599, −581, −563, −545, −527, 28, 46, 64, 82, 100, 118, 151, 169, 187, 205, 223, 241, 284, 302, 320, 338, 356, 374, 407, 425, 443, 461, 479, 497 | −891, −760, 133, 264 |
| 15 | −995, −977, −959, −941, −923, −905, −872, −854, −836, −818, −800, −782, −739, −721, −703, −685, −667, −649, −616, −598, −580, −562, −544, −526, 29, 47, 65, 83, 101, 119, 152, 170, 188, 206, 224, 242, 285, 303, 321, 339, 357, 375, 408, 426, 444, 462, 480, 498 | −890, −759, 134, 265 |
| 16 | −994, −976, −958, −940, −922, −904, −871, −853, −835, −817, −799, −781, −738, −720, −702, −684, −666, −648, −615, −597, −579, −561, −543, −525, 30, 48, 66, 84, 102, 120, 153, 171, 189, 207, 225, 243, 286, 304, 322, 340, 358, 376, 409, 427, 445, 463, 481, 499 | −889, −758, 135, 266 |
| 17 | −499, −481, −463, −445, −427, −409, −376, −358, −340, −322, −304, −286, −243, −225, −207, −189, −171, −153, −120, −102, −84, −66, −48, −30, 525, 543, 561, 579, 597, 615, 648, 666, 684, 702, 720, 738, 781, 799, 817, 835, 853, 871, 904, 922, 940, 958, 976, 994 | −268, −135, 756, 889 |
| 18 | −498, −480, −462, −444, −426, −408, −375, −357, −339, −321, −303, −285, −242, −224, −206, −188, −170, −152, −119, −101, −83, −65, −47, −29, 526, 544, 562, 580, 598, 616, 649, 667, 685, 703, 721, 739, 782, 800, 818, 836, 854, 872, 905, 923, 941, 959, 977, 995 | −267, −134, 757, 890 |
| 19 | −497, −479, −461, −443, −425, −407, −374, −356, −338, −320, −302, −284, −241, −223, −205, −187, −169, −151, −118, −100, −82, −64, −46, −28, 527, 545, 563, 581, 599, 617, 650, 668, 686, 704, 722, 740, 783, 801, 819, 837, 855, 873, 906, 924, 942, 960, 978, 996 | −266, −133, 758, 891 |
| 20 | −496, −478, −460, −442, −424, −406, −373, −355, −337, −319, −301, −283, −240, −222, −204, −186, −168, −150, −117, −99, −81, −63, −45, −27, 528, 546, 564, 582, 600, 618, 651, 669, 687, 705, 723, 741, 784, 802, 820, 838, 856, 874, 907, 925, 943, 961, 979, 997 | −265, −132, 759, 892 |
| 21 | −494, −476, −458, −440, −422, −404, −371, −353, −335, −317, −299, −281, −238, −220, −202, −184, −166, −148, −115, −97, −79, −61, −43, −25, 530, 548, 566, 584, 602, 620, 653, 671, 689, 707, 725, 743, 786, 804, 822, 840, 858, 876, 909, 927, 945, 963, 981, 999 | −263, −130, 761, 894 |
| 22 | −493, −475, −457, −439, −421, −403, −370, −352, −334, −316, −298, −280, −237, −219, −201, −183, −165, −147, −114, −96, −78, −60, −42, −24, 531, 549, 567, 585, 603, 621, 654, 672, 690, 708, 726, 744, 787, 805, 823, 841, 859, 877, 910, 928, 946, 964, 982, 1000 | −262, −129, 762, 895 |
| 23 | −492, −474, −456, −438, −420, −402, −369, −351, −333, −315, −297, −279, −236, −218, −200, −182, −164, −146, −113, −95, −77, −59, −41, −23, 532, 550, 568, 586, 604, 622, 655, 673, 691, 709, 727, 745, 788, 806, 824, 842, 860, 878, 911, 929, 947, 965, 983, 1001 | −261, −128, 763, 896 |

TABLE 27-continued

| Identifier of a 52-tone DRU | Index of a data subcarrier | Index of a pilot subcarrier |
|---|---|---|
| 24 | −491, −473, −455, −437, −419, −401, −368, −350, −332, −314, −296, −278, −235, −217, −199, −181, −163, −145, −112, −94, −76, −58, −40, −22, 533, 551, 569, 587, 605, 623, 656, 674, 692, 710, 728, 746, 789, 807, 825, 843, 861, 879, 912, 930, 948, 966, 984, 1002 | −260, −127, 764, 897 |
| 25 | −490, −472, −454, −436, −418, −400, −367, −349, −331, −313, −295, −277, −234, −216, −198, −180, −162, −144, −111, −93, −75, −57, −39, −21, 534, 552, 570, 588, 606, 624, 657, 675, 693, 711, 729, 747, 790, 808, 826, 844, 862, 880, 913, 931, 949, 967, 985, 1003 | −259, −126, 765, 898 |
| 26 | −489, −471, −453, −435, −417, −399, −366, −348, −330, −312, −294, −276, −233, −215, −197, −179, −161, −143, −110, −92, −74, −56, −38, −20, 535, 553, 571, 589, 607, 625, 658, 676, 694, 712, 730, 748, 791, 809, 827, 845, 863, 881, 914, 932, 950, 968, 986, 1004 | −384, −253, 640, 771 |
| 27 | −488, −470, −452, −434, −416, −398, −365, −347, −329, −311, −293, −275, −232, −214, −196, −178, −160, −142, −109, −91, −73, −55, −37, −19, 536, 554, 572, 590, 608, 626, 659, 677, 695, 713, 731, 749, 792, 810, 828, 846, 864, 882, 915, 933, 951, 969, 987, 1005 | −383, −252, 641, 772 |
| 28 | −487, −469, −451, −433, −415, −397, −364, −346, −328, −310, −292, −274, −231, −213, −195, −177, −159, −141, −108, −90, −72, −54, −36, −18, 537, 555, 573, 591, 609, 627, 660, 678, 696, 714, 732, 750, 793, 811, 829, 847, 865, 883, 916, 934, 952, 970, 988, 1006 | −382, −251, 642, 773 |
| 29 | −485, −467, −449, −431, −413, −395, −362, −344, −326, −308, −290, −272, −229, −211, −193, −175, −157, −139, −106, −88, −70, −52, −34, −16, 539, 557, 575, 593, 611, 629, 662, 680, 698, 716, 734, 752, 795, 813, 831, 849, 867, 885, 918, 936, 954, 972, 990, 1008 | −380, −249, 644, 775 |
| 30 | −484, −466, −448, −430, −412, −394, −361, −343, −325, −307, −289, −271, −228, −210, −192, −174, −156, −138, −105, −87, −69, −51, −33, −15, 540, 558, 576, 594, 612, 630, 663, 681, 699, 717, 735, 753, 796, 814, 832, 850, 868, 886, 919, 937, 955, 973, 991, 1009 | −379, −248, 645, 776 |
| 31 | −483, −465, −447, −429, −411, −393, −360, −342, −324, −306, −288, −270, −227, −209, −191, −173, −155, −137, −104, −86, −68, −50, −32, −14, 541, 559, 577, 595, 613, 631, 664, 682, 700, 718, 736, 754, 797, 815, 833, 851, 869, 887, 920, 938, 956, 974, 992, 1010 | −378, −247, 646, 777 |
| 32 | −482, −464, −446, −428, −410, −392, −359, −341, −323, −305, −287, −269, −226, −208, −190, −172, −154, −136, −103, −85, −67, −49, −31, −13, 542, 560, 578, 596, 614, 632, 665, 683, 701, 719, 737, 755, 798, 816, 834, 852, 870, 888, 921, 939, 957, 975, 993, 1011 | −377, −246, 647, 778 |

As shown in Table 27, each 52-tone DRU includes 48 data subcarriers, including 24 high-frequency subcarriers (whose subcarrier indices are positive values) and 24 low-frequency subcarriers (whose subcarrier indices are negative values). If every six data subcarriers of the 48 data subcarriers are considered as one group in a frequency direction (for example, from low to high) (or understood as an ascending order of indices), the 48 data subcarriers may be considered as eight groups, including four low-frequency groups and four high-frequency groups. An index of each data subcarrier in a low-frequency group is a negative value, and an index of each data subcarrier in a high-frequency group is a positive value. Absolute values of index differences between adjacent data subcarriers in a same group are all 18, absolute values of index differences between data subcarriers in two adjacent low-frequency groups or two adjacent high-frequency groups are sequentially 33, 43, and 33, and absolute values of index differences between data subcarriers in a high-frequency group and a low-frequency group (an absolute value of a difference between a minimum index of all data subcarriers in a high-frequency group and a maximum index of all data subcarriers in a low-frequency group) are 555.

In other words, it is assumed that indices of 48 data subcarriers included in each 52-tone DRU are sequentially arranged in a frequency direction and then divided into eight groups, and each group includes six data subcarriers. Six data subcarriers in a same group are equally spaced. Specifically, a quantity of subcarriers between every two adjacent data subcarriers in a same group is 17.

As shown in Table 27, for identifiers 1 to 4, 5 to 12, 13 to 16, 17 to 20, 21 to 28, or 29 to 32, there is a fixed offset between indices of data subcarriers included in two 52-tone DRUs having adjacent identifiers, and the fixed offset is 1. For example, indices of 48 data subcarriers in a 52-tone DRU whose identifier is i (i=1 to 3, 5 to 11, 13 to 15, 17 to 19, 21 to 27, or 29 to 31) all plus 1, to obtain indices of 48 data subcarriers in a 52-tone DRU whose identifier is i+1. An offset between an index of a data subcarrier included in a 52-tone DRU whose identifier is 4 and an index of a data subcarrier included in a 52-tone DRU whose identifier is 5 is 2. For example, indices of 48 data subcarriers in a 52-tone DRU whose identifier is 4 all plus 2, to obtain indices of 48 data subcarriers in a 52-tone DRU whose identifier is 5. Similarly, an offset between an index of a data subcarrier included in a 52-tone DRU whose identifier is 12 and an index of a data subcarrier included in a 52-tone DRU whose identifier is 13 is 2. An offset between an index of a data subcarrier included in a 52-tone DRU whose identifier is 16 and an index of a data subcarrier included in a 52-tone DRU whose identifier is 17 is 2. An offset between an index of a data subcarrier included in a 52-tone DRU whose identifier is 20 and an index of a data subcarrier included in a 52-tone DRU whose identifier is 21 is 2. An offset between an index of a data subcarrier included in a 52-tone DRU whose identifier is 28 and an index of a data subcarrier included in a 52-tone DRU whose identifier is 29 is 2.

As shown in Table 27, each 52-tone DRU includes four pilot subcarriers, including two high-frequency subcarriers and two low-frequency subcarriers. In this way, pilot subcarriers included in a same DRU can be fully discrete.

As shown in Table 26, the 52-tone DRU whose identifier is i (i=1 to 4) may be considered as a combination of a 26-tone DRU whose identifier is i and a 26-tone DRU whose identifier is i+36, the 52-tone DRU whose identifier is i (i=5 to 12) may be considered as a combination of a 26-tone DRU whose identifier is i+1 and a 26-tone DRU whose identifier is i+37, the 52-tone DRU whose identifier is i (i=13 to 20) may be considered as a combination of a 26-tone DRU whose identifier is i+2 and a 26-tone DRU whose identifier is i+38, the 52-tone DRU whose identifier is i (i=21 to 28) may be considered as a combination of a 26-tone DRU whose identifier is i+3 and a 26-tone DRU whose identifier is i+39, and the 52-tone DRU whose identifier is i (i=29 to 32) may be considered as a combination of a 26-tone DRU whose identifier is i+4 and a 26-tone DRU whose identifier is i+40. In this way, subcarriers in the 52-tone DRU can be fully discrete. For example, 48 data subcarriers in a 52-tone DRU whose identifier is 1 are a combination of 24 data subcarriers in a 26-tone DRU whose identifier is 1 and 24 data subcarriers in a 26-tone DRU whose identifier is 37 in Table 26. Four pilot subcarriers in the 52-tone DRU whose identifier is 1 are a combination of two pilot subcarriers in the 26-tone DRU whose identifier is 1 and two pilot subcarriers in the 26-tone DRU whose identifier is 37 in Table 26. Correspondingly, Table 27 may also be simplified and represented as the following Table 28 based on Table 26.

TABLE 28

| Identifier of a 52-tone DRU | Identifier of a 26-tone DRU |
|---|---|
| 1 | 1, 37 |
| 2 | 2, 38 |
| 3 | 3, 39 |
| 4 | 4, 40 |
| 5 | 6, 42 |
| 6 | 7, 43 |
| 7 | 8, 44 |
| 8 | 9, 45 |
| 9 | 10, 46 |
| 10 | 11, 47 |
| 11 | 12, 48 |
| 12 | 13, 49 |
| 13 | 15, 51 |
| 14 | 16, 52 |
| 15 | 17, 53 |
| 16 | 18, 54 |
| 17 | 19, 55 |
| 18 | 20, 56 |
| 19 | 21, 57 |
| 20 | 22, 58 |
| 21 | 24, 60 |
| 22 | 25, 61 |
| 23 | 26, 62 |
| 24 | 27, 63 |
| 25 | 28, 64 |
| 26 | 29, 65 |
| 27 | 30, 66 |
| 28 | 31, 67 |
| 29 | 33, 69 |
| 30 | 34, 70 |

TABLE 28-continued

| Identifier of a 52-tone DRU | Identifier of a 26-tone DRU |
|---|---|
| 31 | 35, 71 |
| 32 | 36, 72 |

In addition, in an embodiment of this disclosure, the identifier of the 52-tone DRU may be based on a lowest-frequency index of a data subcarrier included in each 52-tone DRU. For example, an identifier of a 52-tone DRU having a lowest-frequency index −1011 is 1.

According to the design of the 52-tone DRU shown in Table 27 or Table 28 in an embodiment of this disclosure, compared with the continuous 52-tone RU in the 160 MHz obtained based on the 80 MHz in FIG. 3, at a same power spectral density, this embodiment of this disclosure can implement a maximum power amplification multiple, specifically, 13.

In an embodiment of this disclosure, an association between a 52-tone DRU and a 26-tone DRU in 160 MHz is described by using Table 28. It may be understood that the foregoing described manner of determining a 52-tone DRU based on a 26-tone DRU is merely an example, and subcarriers in the 52-tone DRU can be fully discrete. In another embodiment, a 52-tone DRU may alternatively be determined in another manner based on a 26-tone DRU. For example, a combination of two 26-tone DRUs whose identifiers are 1 and 39 is determined as the 52-tone DRU whose identifier is 1. This is not limited in this disclosure. Details are not described again. In addition, it may be understood that, considering the association between the 52-tone DRU and the 26-tone DRU, if the lowest-frequency index of the data subcarrier included in the 26-tone DRU is another value other than −1011, correspondingly the lowest-frequency index of the data subcarrier included in the 52-tone DRU also adaptively changes to another value.

In a tone plan solution of a DRU, the 160 MHz bandwidth includes 16 106-tone DRUs, and each 106-tone DRU includes 102 data subcarriers and four pilot subcarriers. For example, Table 29 shows an example of 16 106-tone DRUs corresponding to the 160 MHz bandwidth, and shows 102 data subcarriers and four pilot subcarriers included in each 106-tone DRU. The 102 data subcarriers may be considered as two parts. A first part of data subcarriers includes 96 data subcarriers, a second part of data subcarriers includes six data subcarriers, and a lowest-frequency index of a data subcarrier in a 106-tone DRU whose identifier is 1 is −1011. It should be understood that, although the data subcarriers are divided into the first part and the second part in Table 29 and are separately listed, in this embodiment of this disclosure, the data subcarriers are presented as a plurality of parts only for ease of description, and are not actually used as division of data subcarriers included in each 106-tone DRU. During actual application, the data subcarriers include a combination of data subcarriers in two parts, and do not need to be distinguished. In other words, the first part and the second part do not need to be distinguished, but are considered as a whole, namely, a data subcarrier index included in each 106-tone DRU.

TABLE 29

| Identifier of a | Index of a data subcarrier | | Index of a pilot |
|---|---|---|---|
| 106-tone DRU | First part | Second part | subcarrier |
| 1 | −1011, −993, −975, −957, −939, −921, −888, −870, −852, −834, −816, −798, −755, −737, −719, −701, −683, −665, −632, −614, −596, −578, −560, −542, −499, −481, −463, −445, −427, −409, −376, −358, −340, −322, −304, −286, −243, −225, −207, −189, −171, −153, −120, −102, −84, | −647, −524, −135, 244, 500, 756 | −780, −268, 377, 889 |

TABLE 29-continued

| Identifier of a 106-tone DRU | Index of a data subcarrier — First part | Index of a data subcarrier — Second part | Index of a pilot subcarrier |
|---|---|---|---|
| | −66, −48, −30, 13, 31, 49, 67, 85, 103, 136, 154, 172, 190, 208, 226, 269, 287, 305, 323, 341, 359, 392, 410, 428, 446, 464, 482, 525, 543, 561, 579, 597, 615, 648, 666, 684, 702, 720, 738, 781, 799, 817, 835, 853, 871, 904, 922, 940, 958, 976, 994 | | |
| 2 | −1010, −992, −974, −956, −938, −920, −887, −869, −851, −833, −815, −797, −754, −736, −718, −700, −682, −664, −631, −613, −595, −577, −559, −541, −498, −480, −462, −444, −426, −408, −375, −357, −339, −321, −303, −285, −242, −224, −206, −188, −170, −152, −119, −101, −83, −65, −47, −29, 14, 32, 50, 68, 86, 104, 137, 155, 173, 191, 209, 227, 270, 288, 306, 324, 342, 360, 393, 411, 429, 447, 465, 483, 526, 544, 562, 580, 598, 616, 649, 667, 685, 703, 721, 739, 782, 800, 818, 836, 854, 872, 905, 923, 941, 959, 977, 995 | −646, −523, −134, 245, 501, 757 | −779, −267, 378, 890 |
| 3 | −1009, −991, −973, −955, −937, −919, −886, −868, −850, −832, −814, −796, −753, −735, −717, −699, −681, −663, −630, −612, −594, −576, −558, −540, −497, −479, −461, −443, −425, −407, −374, −356, −338, −320, −302, −284, −241, −223, −205, −187, −169, −151, −118, −100, −82, −64, −46, −28, 15, 33, 51, 69, 87, 105, 138, 156, 174, 192, 210, 228, 271, 289, 307, 325, 343, 361, 394, 412, 430, 448, 466, 484, 527, 545, 563, 581, 599, 617, 650, 668, 686, 704, 722, 740, 783, 801, 819, 837, 855, 873, 906, 924, 942, 960, 978, 996 | −645, −522, −133, 246, 502, 758 | −778, −266, 379, 891 |
| 4 | −1008, −990, −972, −954, −936, −918, −885, −867, −849, −831, −813, −795, −752, −734, −716, −698, −680, −662, −629, −611, −593, −575, −557, −539, −496, −478, −460, −442, −424, −406, −373, −355, −337, −319, −301, −283, −240, −222, −204, −186, −168, −150, −117, −99, −81, −63, −45, −27, 16, 34, 52, 70, 88, 106, 139, 157, 175, 193, 211, 229, 272, 290, 308, 326, 344, 362, 395, 413, 431, 449, 467, 485, 528, 546, 564, 582, 600, 618, 651, 669, 687, 705, 723, 741, 784, 802, 820, 838, 856, 874, 907, 925, 943, 961, 979, 997 | −644, −521, −132, 247, 503, 759 | −777, −265, 380, 892 |
| 5 | −1006, −988, −970, −952, −934, −916, −883, −865, −847, −829, −811, −793, −750, −732, −714, −696, −678, −660, −627, −609, −591, −573, −555, −537, −494, −476, −458, −440, −422, −404, −371, −353, −335, −317, −299, −281, −238, −220, −202, −184, −166, −148, −115, −97, −79, −61, −43, −25, 18, 36, 54, 72, 90, 108, 141, 159, 177, 195, 213, 231, 274, 292, 310, 328, 346, 364, 397, 415, 433, 451, 469, 487, 530, 548, 566, 584, 602, 620, 653, 671, 689, 707, 725, 743, 786, 804, 822, 840, 858, 876, 909, 927, 945, 963, 981, 999 | −642, −520, −130, 249, 504, 761 | −775, −263, 382, 894 |
| 6 | −1005, −987, −969, −951, −933, −915, −882, −864, −846, −828, −810, −792, −749, −731, −713, −695, −677, −659, −626, −608, −590, −572, −554, −536, −493, −475, −457, −439, −421, −403, −370, −352, −334, −316, −298, −280, −237, −219, −201, −183, −165, −147, −114, −96, −78, −60, −42, −24, 19, 37, 55, 73, 91, 109, 142, 160, 178, 196, 214, 232, 275, 293, 311, 329, 347, 365, 398, 416, 434, 452, 470, 488, 531, 549, 567, 585, 603, 621, 654, 672, 690, 708, 726, 744, 787, 805, 823, 841, 859, 877, 910, 928, 946, 964, 982, 1000 | −641, −519, −129, 250, 505, 762 | −774, −262, 383, 895 |
| 7 | −1004, −986, −968, −950, −932, −914, −881, −863, −845, −827, −809, −791, −748, −730, −712, −694, −676, −658, −625, −607, −589, −571, −553, −535, −492, −474, −456, −438, −420, −402, −369, −351, −333, −315, −297, −279, −236, −218, −200, −182, −164, −146, −113, −95, −77, −59, −41, −23, 20, 38, 56, 74, 92, 110, 143, 161, 179, 197, 215, 233, 276, 294, 312, 330, 348, 366, 399, 417, 435, 453, 471, 489, 532, 550, | −640, −518, −128, 251, 506, 763 | −773, −261, 384, 896 |

TABLE 29-continued

| Identifier of a 106-tone DRU | Index of a data subcarrier: First part | Index of a data subcarrier: Second part | Index of a pilot subcarrier |
|---|---|---|---|
| | 568, 586, 604, 622, 655, 673, 691, 709, 727, 745, 788, 806, 824, 842, 860, 878, 911, 929, 947, 965, 983, 1001 | | |
| 8 | −1003, −985, −967, −949, −931, −913, −880, −862, −844, −826, −808, −790, −747, −729, −711, −693, −675, −657, −624, −606, −588, −570, −552, −534, −491, −473, −455, −437, −419, −401, −368, −350, −332, −314, −296, −278, −235, −217, −199, −181, −163, −145, −112, −94, −76, −58, −40, −22, 21, 39, 57, 75, 93, 111, 144, 162, 180, 198, 216, 234, 277, 295, 313, 331, 349, 367, 400, 418, 436, 454, 472, 490, 533, 551, 569, 587, 605, 623, 656, 674, 692, 710, 728, 746, 789, 807, 825, 843, 861, 879, 912, 930, 948, 966, 984, 1002 | −639, −517, −127, 252, 507, 764 | −772, −260, 385, 897 |
| 9 | −1002, −984, −966, −948, −930, −912, −879, −861, −843, −825, −807, −789, −746, −728, −710, −692, −674, −656, −623, −605, −587, −569, −551, −533, −490, −472, −454, −436, −418, −400, −367, −349, −331, −313, −295, −277, −234, −216, −198, −180, −162, −144, −111, −93, −75, −57, −39, −21, 22, 40, 58, 76, 94, 112, 145, 163, 181, 199, 217, 235, 278, 296, 314, 332, 350, 368, 401, 419, 437, 455, 473, 491, 534, 552, 570, 588, 606, 624, 657, 675, 693, 711, 729, 747, 790, 808, 826, 844, 862, 880, 913, 931, 949, 967, 985, 1003 | −638, −516, −126, 253, 508, 765 | −771, −259, 386, 898 |
| 10 | −1001, −983, −965, −947, −929, −911, −878, −860, −842, −824, −806, −788, −745, −727, −709, −691, −673, −655, −622, −604, −586, −568, −550, −532, −489, −471, −453, −435, −417, −399, −366, −348, −330, −312, −294, −276, −233, −215, −197, −179, −161, −143, −110, −92, −74, −56, −38, −20, 23, 41, 59, 77, 95, 113, 146, 164, 182, 200, 218, 236, 279, 297, 315, 333, 351, 369, 402, 420, 438, 456, 474, 492, 535, 553, 571, 589, 607, 625, 658, 676, 694, 712, 730, 748, 791, 809, 827, 845, 863, 881, 914, 932, 950, 968, 986, 1004 | −765, −515, −253, 128, 509, 640 | −896, −384, 259, 771 |
| 11 | −1000, −982, −964, −946, −928, −910, −877, −859, −841, −823, −805, −787, −744, −726, −708, −690, −672, −654, −621, −603, −585, −567, −549, −531, −488, −470, −452, −434, −416, −398, −365, −347, −329, −311, −293, −275, −232, −214, −196, −178, −160, −142, −109, −91, −73, −55, −37, −19, 24, 42, 60, 78, 96, 114, 147, 165, 183, 201, 219, 237, 280, 298, 316, 334, 352, 370, 403, 421, 439, 457, 475, 493, 536, 554, 572, 590, 608, 626, 659, 677, 695, 713, 731, 749, 792, 810, 828, 846, 864, 882, 915, 933, 951, 969, 987, 1005 | −764, −509, −252, 129, 515, 641 | −895, −383, 260, 772 |
| 12 | −999, −981, −963, −945, −927, −909, −876, −858, −840, −822, −804, −786, −743, −725, −707, −689, −671, −653, −620, −602, −584, −566, −548, −530, −487, −469, −451, −433, −415, −397, −364, −346, −328, −310, −292, −274, −231, −213, −195, −177, −159, −141, −108, −90, −72, −54, −36, −18, 25, 43, 61, 79, 97, 115, 148, 166, 184, 202, 220, 238, 281, 299, 317, 335, 353, 371, 404, 422, 440, 458, 476, 494, 537, 555, 573, 591, 609, 627, 660, 678, 696, 714, 732, 750, 793, 811, 829, 847, 865, 883, 916, 934, 952, 970, 988, 1006 | −763, −508, −251, 130, 516, 642 | −894, −382, 261, 773 |
| 13 | −997, −979, −961, −943, −925, −907, −874, −856, −838, −820, −802, −784, −741, −723, −705, −687, −669, −651, −618, −600, −582, −564, −546, −528, −485, −467, −449, −431, −413, −395, −362, −344, −326, −308, −290, −272, −229, −211, −193, −175, −157, −139, −106, −88, −70, −52, −34, −16, 27, 45, 63, 81, 99, 117, 150, 168, 186, 204, 222, 240, 283, 301, 319, 337, 355, 373, 406, 424, 442, 460, 478, 496, 539, 557, 575, 593, 611, 629, 662, 680, 698, 716, 734, 752, 795, 813, 831, 849, 867, 885, 918, 936, 954, 972, 990, 1008 | −761, −507, −249, 132, 517, 644 | −892, −380, 263, 775 |

TABLE 29-continued

| Identifier of a 106-tone DRU | Index of a data subcarrier First part | Second part | Index of a pilot subcarrier |
|---|---|---|---|
| 14 | −996, −978, −960, −942, −924, −906, −873, −855, −837, −819, −801, −783, −740, −722, −704, −686, −668, −650, −617, −599, −581, −563, −545, −527, −484, −466, −448, −430, −412, −394, −361, −343, −325, −307, −289, −271, −228, −210, −192, −174, −156, −138, −105, −87, −69, −51, −33, −15, 28, 46, 64, 82, 100, 118, 151, 169, 187, 205, 223, 241, 284, 302, 320, 338, 356, 374, 407, 425, 443, 461, 479, 497, 540, 558, 576, 594, 612, 630, 663, 681, 699, 717, 735, 753, 796, 814, 832, 850, 868, 886, 919, 937, 955, 973, 991, 1009 | −760, −506, −248, 133, 518, 645 | −891, −379, 264, 776 |
| 15 | −995, −977, −959, −941, −923, −905, −872, −854, −836, −818, −800, −782, −739, −721, −703, −685, −667, −649, −616, −598, −580, −562, −544, −526, −483, −465, −447, −429, −411, −393, −360, −342, −324, −306, −288, −270, −227, −209, −191, −173, −155, −137, −104, −86, −68, −50, −32, −14, 29, 47, 65, 83, 101, 119, 152, 170, 188, 206, 224, 242, 285, 303, 321, 339, 357, 375, 408, 426, 444, 462, 480, 498, 541, 559, 577, 595, 613, 631, 664, 682, 700, 718, 736, 754, 797, 815, 833, 851, 869, 887, 920, 938, 956, 974, 992, 1010 | −759, −505, −247, 134, 519, 646 | −890, −378, 265, 777 |
| 16 | −994, −976, −958, −940, −922, −904, −871, −853, −835, −817, −799, −781, −738, −720, −702, −684, −666, −648, −615, −597, −579, −561, −543, −525, −482, −464, −446, −428, −410, −392, −359, −341, −323, −305, −287, −269, −226, −208, −190, −172, −154, −136, −103, −85, −67, −49, −31, −13, 30, 48, 66, 84, 102, 120, 153, 171, 189, 207, 225, 243, 286, 304, 322, 340, 358, 376, 409, 427, 445, 463, 481, 499, 542, 560, 578, 596, 614, 632, 665, 683, 701, 719, 737, 755, 798, 816, 834, 852, 870, 888, 921, 939, 957, 975, 993, 1011 | −758, −504, −246, 135, 520, 647 | −889, −377, 266, 778 |

Similar to the 106-tone DRU in the 80 MHz bandwidth, the first part of data subcarriers may be considered as being obtained based on a 26-tone DRU or a 52-tone DRU. For brevity, as shown in Table 30, indices of the first part of data subcarriers included in the 106-tone DRU may be simplified and shown by using identifiers of 26-tone DRUs in Table 26.

In Table 30, the "first part" column means that the first part of (96) data subcarriers in the 106-tone DRU include a combination of data subcarriers in corresponding 26-tone DRUs shown in Table 26. For example, a 106-tone DRU whose identifier is 1 is used as an example. 96 data subcarriers in the 102 data subcarriers included in the 106-tone

TABLE 30

| Identifier of a 106-tone DRU | Index of a data subcarrier First part (identifier of a 26-tone DRU) | Second part | Index of a pilot subcarrier |
|---|---|---|---|
| 1 | 1, 19, 37, 55 | −647, −524, −135, 244, 500, 756 | −780, −268, 377, 889 |
| 2 | 2, 20, 38, 56 | −646, −523, −134, 245, 501, 757 | −779, −267, 378, 890 |
| 3 | 3, 21, 39, 57 | −645, −522, −133, 246, 502, 758 | −778, −266, 379, 891 |
| 4 | 4, 22, 40, 58 | −644, −521, −132, 247, 503, 759 | −777, −265, 380, 892 |
| 5 | 6, 24, 42, 60 | −642, −520, −130, 249, 504, 761 | −775, −263, 382, 894 |
| 6 | 7, 25, 43, 61 | −641, −519, −129, 250, 505, 762 | −774, −262, 383, 895 |
| 7 | 8, 26, 44, 62 | −640, −518, −128, 251, 506, 763 | −773, −261, 384, 896 |
| 8 | 9, 27, 45, 63 | −639, −517, −127, 252, 507, 764 | −772, −260, 385, 897 |
| 9 | 10, 28, 46, 64 | −638, −516, −126, 253, 508, 765 | −771, −259, 386, 898 |
| 10 | 11, 29, 47, 65 | −765, −515, −253, 128, 509, 640 | −896, −384, 259, 771 |
| 11 | 12, 30, 48, 66 | −764, −509, −252, 129, 515, 641 | −895, −383, 260, 772 |
| 12 | 13, 31, 49, 67 | −763, −508, −251, 130, 516, 642 | −894, −382, 261, 773 |
| 13 | 15, 33, 51, 69 | −761, −507, −249, 132, 517, 644 | −892, −380, 263, 775 |
| 14 | 16, 34, 52, 70 | −760, −506, −248, 133, 518, 645 | −891, −379, 264, 776 |
| 15 | 17, 35, 53, 71 | −759, −505, −247, 134, 519, 646 | −890, −378, 265, 777 |
| 16 | 18, 36, 54, 72 | −758, −504, −246, 135, 520, 647 | −889, −377, 266, 778 |

DRU include all data subcarriers in four 26-tone DRUs whose identifiers are 1, 19, 37, and 55 shown in Table 26.

Specifically, as shown in Table 29, each 106-tone DRU includes 102 data subcarriers, and some (namely, the first part in Table 29: 96 data subcarriers) of the 102 data subcarriers include 48 high-frequency subcarriers (whose subcarrier indices are positive values) and 48 low-frequency subcarriers (whose subcarrier indices are negative values). If every six data subcarriers of the 96 data subcarriers are considered as one group in a frequency direction (for example, from low to high) (or understood as an ascending order of indices), absolute values of index differences between adjacent data subcarriers in a same group are 18. In addition, absolute values of index differences between data subcarriers of two adjacent groups are alternately 33 and 43.

In other words, if indices of 96 data subcarriers of 102 data subcarriers included in each 106-tone DRU are sequentially arranged in a frequency direction and then divided into 16 groups, and each group includes six data subcarriers. Six data subcarriers in a same group are equally spaced. Specifically, a quantity of subcarriers between every two adjacent data subcarriers in a same group is 17.

In Table 29, for identifiers 1 to 4, 5 to 12, or 13 to 16, there is a fixed offset between indices of 96 data subcarriers (the first part) included in two 106-tone DRUs having adjacent identifiers, and the fixed offset is 1. For example, indices of 96 data subcarriers in a 106-tone DRU whose identifier is i (i=1 to 3, 5 to 11, or 13 to 15) all plus 1, to obtain indices of 96 data subcarriers in a 106-tone DRU whose identifier is i+1. An offset between indices of 96 data subcarriers (the first part) in the 106-tone DRU whose identifier is 4 and indices of 96 data subcarriers in the 106-tone DRU whose identifier is 5 is 2. For example, indices of 96 data subcarriers in a 106-tone DRU whose identifier is 4 all plus 2, to obtain indices of 96 data subcarriers in a 106-tone DRU whose identifier is 5. Similarly, an offset between indices of 96 data subcarriers (the first part) in the 106-tone DRU whose identifier is 12 and indices of 96 data subcarriers in the 106-tone DRU whose identifier is 13 is 2.

In addition to the 96 data subcarriers in the first part column, each 106-tone DRU further includes six data subcarriers and four pilot subcarriers. In some embodiments, six data subcarriers and four pilot subcarriers may be separately selected from remaining subcarriers of all subcarriers of the entire bandwidth other than guard subcarriers, DC subcarriers, and data subcarriers in the first part column. A specific selection manner is not limited in this embodiment of this disclosure. For example, Table 29 or Table 30 shows an example, so that subcarriers included in the 106-tone DRU can be fully discrete.

For example, the four pilot subcarriers included in the 106-tone DRU may be a part of a set of eight pilot subcarriers included in the corresponding four 26-tone DRUs. In addition, the other six data subcarriers included in the 106-tone DRU may be selected from remaining subcarriers of all the subcarriers of the entire bandwidth other than the guard subcarriers, the DC subcarriers, the data subcarriers in the first part column, and the pilot subcarriers, and the data subcarriers may be fully discrete, as shown in the "second part" column of Table 29 or Table 30.

In addition, in an embodiment of this disclosure, the identifier of the 106-tone DRU may be based on a lowest-frequency index of a data subcarrier included in each 106-tone DRU. For example, an identifier of a 106-tone DRU having a lowest-frequency index −1011 is 1.

According to the design of the 106-tone DRU shown in Table 29 in an embodiment of this disclosure, compared with the continuous 106-tone RU in the 160 MHz obtained based on the 80 MHz in FIG. 3, at a same power spectral density, this embodiment of this disclosure can implement a maximum power amplification multiple, specifically, 13.

In an embodiment of this disclosure, an association between a 26-tone DRU (indirectly a 52-tone DRU) and a 106-tone DRU in 160 MHz is described by using Table 30. It may be understood that the foregoing described manner of determining a 106-tone DRU based on a 26-tone DRU is merely an example, and subcarriers in the 106-tone DRU can be fully discrete. In another embodiment, a 106-tone DRU may alternatively be determined in another manner based on a 26-tone DRU. For example, a combination of four 26-tone DRUs whose identifiers are 1 to 4 is determined as the first part of data subcarriers of the 106-tone DRU whose identifier is 1. This is not limited in this disclosure. Details are not described again. In addition, it may be understood that if the lowest-frequency index of the data subcarrier included in the 26-tone DRU is another value other than −1011, correspondingly the lowest-frequency index of the data subcarrier included in the 106-tone DRU also adaptively changes to another value.

In a tone plan solution of a DRU, the 160 MHz bandwidth includes eight 242-tone DRUs, and each 242-tone DRU includes 234 data subcarriers and eight pilot subcarriers.

For example, Table 31 shows an example of eight 242-tone DRUs corresponding to the 160 MHz bandwidth, and shows 234 data subcarriers and eight pilot subcarriers included in each 242-tone DRU. The 234 data subcarriers may be considered as three parts. A first part of data subcarriers includes 192 data subcarriers, a second part of data subcarriers includes 24 data subcarriers, a third part of data subcarriers includes 18 data subcarriers, and a lowest-frequency index of a data subcarrier in a 242-tone DRU whose identifier is 1 is −1011. It should be understood that, although the data subcarriers are divided into the first part, the second part, and the third part in Table 31 and are separately listed, in this embodiment of this disclosure, the data subcarriers are presented as a plurality of parts only for ease of description, and are not actually used as division of data subcarriers included in each 242-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 242-tone DRU.

TABLE 31

| Identifier of a 242-tone DRU | Index of a data subcarrier | | | Index of a pilot subcarrier |
|---|---|---|---|---|
| | First part | Second part | Third part | |
| 1 | −1011, −1002, −993, −984, −975, −966, −957, −948, −939, −930, −921, −912, −888, −879, −870, −861, −852, −843, −834, −825, −816, −807, −798, −789, −755, −746, −737, −728, −719, −710, | −1007, −989, −971, −953, −935, −917, −884, −866, −848, −830, −812, −794, −751, −733, −715, −697, −679, −661, | −776, −647, −643, −638, −524, −516, −389, −256, −135, −126, 121, 244, 253, 500, 508, 521, 756, 765 | −780, −268, 377, 889, −771, −259, 386, 898 |

TABLE 31-continued

| Identifier of a 242-tone DRU | Index of a data subcarrier First part | Second part | Third part | Index of a pilot subcarrier |
|---|---|---|---|---|
| | −701, −692, −683, −674, −665, −656, −632, −623, −614, −605, −596, −587, −578, −569, −560, −551, −542, −533, −499, −490, −481, −472, −463, −454, −445, −436, −427, −418, −409, −400, −376, −367, −358, −349, −340, −331, −322, −313, −304, −295, −286, −277, −243, −234, −225, −216, −207, −198, −189, −180, −171, −162, −153, −144, −120, −111, −102, −93, −84, −75, −66, −57, −48, −39, −30, −21, 13, 22, 31, 40, 49, 58, 67, 76, 85, 94, 103, 112, 136, 145, 154, 163, 172, 181, 190, 199, 208, 217, 226, 235, 269, 278, 287, 296, 305, 314, 323, 332, 341, 350, 359, 368, 392, 401, 410, 419, 428, 437, 446, 455, 464, 473, 482, 491, 525, 534, 543, 552, 561, 570, 579, 588, 597, 606, 615, 624, 648, 657, 666, 675, 684, 693, 702, 711, 720, 729, 738, 747, 781, 790, 799, 808, 817, 826, 835, 844, 853, 862, 871, 880, 904, 913, 922, 931, 940, 949, 958, 967, 976, 985, 994, 1003 | −628, −610, −592, −574, −556, −538 | | |
| 2 | −1010, −1001, −992, −983, −974, −965, −956, −947, −938, −929, −920, −911, −887, −878, −869, −860, −851, −842, −833, −824, −815, −806, −797, −788, −754, −745, −736, −727, −718, −709, −700, −691, −682, −673, −664, −655, −631, −622, −613, −604, −595, −586, −577, −568, −559, −550, −541, −532, −498, −489, −480, −471, −462, −453, −444, −435, −426, −417, −408, −399, −375, −366, −357, −348, −339, −330, −321, −312, −303, −294, −285, −276, −242, −233, −224, −215, −206, −197, −188, −179, −170, −161, −152, −143, −119, −110, −101, −92, −83, −74, −65, −56, −47, −38, −29, −20, 14, 23, 32, 41, 50, 59, 68, 77, 86, 95, 104, 113, 137, 146, 155, 164, 173, 182, 191, 200, 209, 218, 227, 236, 270, 279, 288, 297, 306, 315, 324, 333, 342, 351, 360, 369, 393, 402, 411, 420, 429, 438, 447, 456, 465, 474, 483, 492, 526, 535, 544, 553, 562, 571, 580, 589, 598, 607, 616, 625, 649, 658, 667, 676, 685, 694, 703, 712, 721, 730, 739, 748, 782, 791, 800, 809, 818, 827, 836, 845, 854, 863, 872, 881, 905, 914, 923, 932, 941, 950, 959, 968, 977, 986, 995, 1004 | −998, −980, −962, −944, −926, −908, −875, −857, −839, −821, −803, −785, −742, −724, −706, −688, −670, −652, −619, −601, −583, −565, −547, −529 | −893, −765, −762, −646, −523, −515, −388, −255, −253, −134, 122, 128, 245, 501, 509, 522, 640, 757 | −779, −267, 378, 890, −896, −384, 259, 771 |
| 3 | −1009, −1000, −991, −982, −973, −964, −955, −946, −937, −928, −919, −910, −886, −877, −868, −859, −850, −841, −832, −823, −814, −805, −796, −787, −753, −744, −735, −726, −717, −708, −699, −690, −681, −672, −663, −654, −630, −621, −612, −603, −594, −585, −576, −567, −558, −549, −540, −531, −497, −488, −479, −470, −461, −452, −443, −434, −425, −416, −407, −398, −374, −365, −356, −347, −338, −329, −320, −311, −302, −293, | −495, −477, −459, −441, −423, −405, −372, −354, −336, −318, −300, −282, −239, −221, −203, −185, −167, −149, −116, −98, −80, −62, −44, −26 | −899, −764, −757, −645, −522, −509, −391, −264, −258, −252, −133, −131, 129, 246, 502, 515, 641, 758 | −778, −266, 379, 891, −895, −383, 260, 772 |

TABLE 31-continued

| Identifier of a 242-tone DRU | Index of a data subcarrier | | | Index of a pilot subcarrier |
|---|---|---|---|---|
| | First part | Second part | Third part | |
| | −284, −275, −241, −232, −223, −214, −205, −196, −187, −178, −169, −160, −151, −142, −118, −109, −100, −91, −82, −73, −64, −55, −46, −37, −28, −19, 15, 24, 33, 42, 51, 60, 69, 78, 87, 96, 105, 114, 138, 147, 156, 165, 174, 183, 192, 201, 210, 219, 228, 237, 271, 280, 289, 298, 307, 316, 325, 334, 343, 352, 361, 370, 394, 403, 412, 421, 430, 439, 448, 457, 466, 475, 484, 493, 527, 536, 545, 554, 563, 572, 581, 590, 599, 608, 617, 626, 650, 659, 668, 677, 686, 695, 704, 713, 722, 731, 740, 749, 783, 792, 801, 810, 819, 828, 837, 846, 855, 864, 873, 882, 906, 915, 924, 933, 942, 951, 960, 969, 978, 987, 996, 1005 | | | |
| 4 | −1008, −999, −990, −981, −972, −963, −954, −945, −936, −927, −918, −909, −885, −876, −867, −858, −849, −840, −831, −822, −813, −804, −795, −786, −752, −743, −734, −725, −716, −707, −698, −689, −680, −671, −662, −653, −629, −620, −611, −602, −593, −584, −575, −566, −557, −548, −539, −530, −496, −487, −478, −469, −460, −451, −442, −433, −424, −415, −406, −397, −373, −364, −355, −346, −337, −328, −319, −310, −301, −292, −283, −274, −240, −231, −222, −213, −204, −195, −186, −177, −168, −159, −150, −141, −117, −108, −99, −90, −81, −72, −63, −54, −45, −36, −27, −18, 16, 25, 34, 43, 52, 61, 70, 79, 88, 97, 106, 115, 139, 148, 157, 166, 175, 184, 193, 202, 211, 220, 229, 238, 272, 281, 290, 299, 308, 317, 326, 335, 344, 353, 362, 371, 395, 404, 413, 422, 431, 440, 449, 458, 467, 476, 485, 494, 528, 537, 546, 555, 564, 573, 582, 591, 600, 609, 618, 627, 651, 660, 669, 678, 687, 696, 705, 714, 723, 732, 741, 750, 784, 793, 802, 811, 820, 829, 838, 847, 856, 865, 874, 883, 907, 916, 925, 934, 943, 952, 961, 970, 979, 988, 997, 1006 | −486, −468, −450, −432, −414, −396, −363, −345, −327, −309, −291, −273, −230, −212, −194, −176, −158, −140, −107, −89, −71, −53, −35, −17 | −898, −763, −756, −644, −521, −508, −390, −381, −257, −251, −250, −132, 130, 247, 503, 516, 642, 759 | −777, −265, 380, 892, −894, −382, 261, 773 |
| 5 | −1006, −997, −988, −979, −970, −961, −952, −943, −934, −925, −916, −907, −883, −874, −865, −856, −847, −838, −829, −820, −811, −802, −793, −784, −750, −741, −732, −723, −714, −705, −696, −687, −678, −669, −660, −651, −627, −618, −609, −600, −591, −582, −573, −564, −555, −546, −537, −528, −494, −485, −476, −467, −458, −449, −440, −431, −422, −413, −404, −395, −371, −362, −353, −344, −335, −326, −317, −308, −299, −290, −281, −272, −238, −229, −220, −211, −202, −193, −184, −175, −166, −157, −148, −139, −115, −106, −97, −88, −79, −70, −61, −52, −43, −34, −25, −16, 18, 27, 36, 45, 54, 63, 72, 81, 90, 99, 108, 117, 141, 150, 159, 168, 177, 186, 195, 204, 213, 222, 231, 240, 274, | 17, 35, 53, 71, 89, 107, 140, 158, 176, 194, 212, 230, 273, 291, 309, 327, 345, 363, 396, 414, 432, 450, 468, 486 | −903, −770, −761, −642, −637, −520, −507, −503, −249, −130, 132, 248, 249, 381, 504, 517, 644, 761 | −775, −263, 382, 894, −892, −380, 263, 775 |

TABLE 31-continued

| Identifier of a 242-tone DRU | Index of a data subcarrier First part | Second part | Third part | Index of a pilot subcarrier |
|---|---|---|---|---|
| | 283, 292, 301, 310, 319, 328, 337, 346, 355, 364, 373, 397, 406, 415, 424, 433, 442, 451, 460, 469, 478, 487, 496, 530, 539, 548, 557, 566, 575, 584, 593, 602, 611, 620, 629, 653, 662, 671, 680, 689, 698, 707, 716, 725, 734, 743, 752, 786, 795, 804, 813, 822, 831, 840, 849, 858, 867, 876, 885, 909, 918, 927, 936, 945, 954, 963, 972, 981, 990, 999, 1008 | | | |
| 6 | −1005, −996, −987, −978, −969, −960, −951, −942, −933, −924, −915, −906, −882, −873, −864, −855, −846, −837, −828, −819, −810, −801, −792, −783, −749, −740, −731, −722, −713, −704, −695, −686, −677, −668, −659, −650, −626, −617, −608, −599, −590, −581, −572, −563, −554, −545, −536, −527, −493, −484, −475, −466, −457, −448, −439, −430, −421, −412, −403, −394, −370, −361, −352, −343, −334, −325, −316, −307, −298, −289, −280, −271, −237, −228, −219, −210, −201, −192, −183, −174, −165, −156, −147, −138, −114, −105, −96, −87, −78, −69, −60, −51, −42, −33, −24, −15, 19, 28, 37, 46, 55, 64, 73, 82, 91, 100, 109, 118, 142, 151, 160, 169, 178, 187, 196, 205, 214, 223, 232, 241, 275, 284, 293, 302, 311, 320, 329, 338, 347, 356, 365, 374, 398, 407, 416, 425, 434, 443, 452, 461, 470, 479, 488, 497, 531, 540, 549, 558, 567, 576, 585, 594, 603, 612, 621, 630, 654, 663, 672, 681, 690, 699, 708, 717, 726, 735, 744, 753, 787, 796, 805, 814, 823, 832, 841, 850, 859, 868, 877, 886, 910, 919, 928, 937, 946, 955, 964, 973, 982, 991, 1000, 1009 | 26, 44, 62, 80, 98, 116, 149, 167, 185, 203, 221, 239, 282, 300, 318, 336, 354, 372, 405, 423, 441, 459, 477, 495 | −902, −769, −760, −641, −636, −519, −506, −502, −248, −129, 131, 133, 250, 262, 505, 518, 645, 762 | −774, −262, 383, 895, −891, −379, 264, 776 |
| 7 | −1004, −995, −986, −977, −968, −959, −950, −941, −932, −923, −914, −905, −881, −872, −863, −854, −845, −836, −827, −818, −809, −800, −791, −782, −748, −739, −730, −721, −712, −703, −694, −685, −676, −667, −658, −649, −625, −616, −607, −598, −589, −580, −571, −562, −553, −544, −535, −526, −492, −483, −474, −465, −456, −447, −438, −429, −420, −411, −402, −393, −369, −360, −351, −342, −333, −324, −315, −306, −297, −288, −279, −270, −236, −227, −218, −209, −200, −191, −182, −173, −164, −155, −146, −137, −113, −104, −95, −86, −77, −68, −59, −50, −41, −32, −23, −14, 20, 29, 38, 47, 56, 65, 74, 83, 92, 101, 110, 119, 143, 152, 161, 170, 179, 188, 197, 206, 215, 224, 233, 242, 276, 285, 294, 303, 312, 321, 330, 339, 348, 357, 366, 375, 399, 408, 417, 426, 435, 444, 453, 462, 471, 480, 489, 498, 532, 541, 550, 559, 568, 577, 586, 595, 604, 613, 622, 631, 655, 664, 673, 682, 691, 700, 709, 718, 727, 736, 745, 754, 788, 797, 806, 815, 824, 833, 842, 851, 860, | 529, 547, 565, 583, 601, 619, 652, 670, 688, 706, 724, 742, 785, 803, 821, 839, 857, 875, 908, 926, 944, 962, 980, 998 | −901, −768, −759, −640, −635, −518, −505, −501, −247, −128, 134, 251, 506, 519, 646, 760, 763, 893 | −773, −261, 384, 896, −890, −378, 265, 777 |

TABLE 31-continued

| Identifier of a 242-tone DRU | Index of a data subcarrier First part | Second part | Third part | Index of a pilot subcarrier |
|---|---|---|---|---|
| | 869, 878, 887, 911, 920, 929, 938, 947, 956, 965, 974, 983, 992, 1001, 1010 | | | |
| 8 | −1003, −994, −985, −976, −967, −958, −949, −940, −931, −922, −913, −904, −880, −871, −862, −853, −844, −835, −826, −817, −808, −799, −790, −781, −747, −738, −729, −720, −711, −702, −693, −684, −675, −666, −657, −648, −624, −615, −606, −597, −588, −579, −570, −561, −552, −543, −534, −525, −491, −482, −473, −464, −455, −446, −437, −428, −419, −410, −401, −392, −368, −359, −350, −341, −332, −323, −314, −305, −296, −287, −278, −269, −235, −226, −217, −208, −199, −190, −181, −172, −163, −154, −145, −136, −112, −103, −94, −85, −76, −67, −58, −49, −40, −31, −22, −13, 21, 30, 39, 48, 57, 66, 75, 84, 93, 102, 111, 120, 144, 153, 162, 171, 180, 189, 198, 207, 216, 225, 234, 243, 277, 286, 295, 304, 313, 322, 331, 340, 349, 358, 367, 376, 400, 409, 418, 427, 436, 445, 454, 463, 472, 481, 490, 499, 533, 542, 551, 560, 569, 578, 587, 596, 605, 614, 623, 632, 656, 665, 674, 683, 692, 701, 710, 719, 728, 737, 746, 755, 789, 798, 807, 816, 825, 834, 843, 852, 861, 870, 879, 888, 912, 921, 930, 939, 948, 957, 966, 975, 984, 993, 1002, 1011 | 538, 556, 574, 592, 610, 628, 661, 679, 697, 715, 733, 751, 794, 812, 830, 848, 866, 884, 917, 935, 953, 971, 989, 1007 | −900, −767, −758, −639, −634, −517, −504, −500, −246, −127, 135, 252, 507, 520, 643, 647, 764, 774 | −772, −260, 385, 897, −889, −377, 266, 778 |

As shown in Table 31, a first part of (192) data subcarriers in each 242-tone DRU include 96 high-frequency subcarriers (whose subcarrier indices are positive values) and 96 low-frequency subcarriers (whose subcarrier indices are negative values). If every 12 of the 192 data subcarriers (the first part) are considered as one group in a frequency direction (for example, from low to high) (or understood as an ascending order of indices), absolute values of index differences between adjacent data subcarriers in a same group are 9. In addition, absolute values of index differences between data subcarriers of two adjacent groups are alternately 24 and 34.

In Table 31, for identifiers 1 to 4, or 5 to 8, there is a fixed offset between indices of 192 data subcarriers (the first part) included in two 242-tone DRUs having adjacent identifiers, and the fixed offset is 1. For example, indices of 192 data subcarriers in a 242-tone DRU whose identifier is i (i=1 to 3, or 5 to 7) all plus 1, to obtain indices of 192 data subcarriers in a 242-tone DRU whose identifier is i+1. An offset between indices of 192 data subcarriers (the first part) in a 242-tone DRU whose identifier is 4 and indices of 192 data subcarriers in a 242-tone DRU whose identifier is 5 is 2. For example, indices of 192 data subcarriers in a 242-tone DRU whose identifier is 4 all plus 2, to obtain indices of 192 data subcarriers in a 242-tone DRU whose identifier is 5.

As shown in Table 31, 234 data subcarriers of each 242-tone DRU further include a second part of data subcarriers (24 data subcarriers). If every six data subcarriers may be considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33. In addition, indices of 24 data subcarriers in a second part of a 242-tone DRU whose identifier is i (i=1, 3, 5, or 7) all plus 9, to obtain indices of 24 data subcarriers in a second part of a 242-tone DRU whose identifier is i+1. Indices of 24 data subcarriers in a second part of a 242-tone DRU whose identifier is i (i=2, 4, or 6) all plus 503, to obtain indices of 24 data subcarriers in a second part of a 242-tone DRU whose identifier is i+1.

In addition to the 192 data subcarriers in the first part column and the 24 data subcarriers in the second part column, each 242-tone DRU further includes 18 data subcarriers (the third part) and eight pilot subcarriers. In some embodiments, 18 data subcarriers and eight pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 31 shows an example, so that subcarriers included in the 242-tone DRU can be fully discrete.

Similar to the 242-tone DRU in the 80 MHz bandwidth, the first part of data subcarriers may be considered as being obtained based on a 26-tone DRU or a 52-tone DRU, and the second part of data subcarriers may be considered as being obtained based on a 26-tone DRU. For brevity, as shown in Table 32, indices of the first part of data subcarriers included in the 242-tone DRU may be simplified and shown by using identifiers of 26-tone DRUs in Table 26, and indices of the second part of data subcarriers included in the 242-tone DRU may be simplified and shown by using identifiers of 26-tone DRUs in Table 26.

TABLE 32

| Identifier of a 242-tone DRU | Index of a data subcarrier: First part (identifier of a 26-tone DRU) | Second part (identifier of a 26-tone DRU) | Third part | Index of a pilot subcarrier |
|---|---|---|---|---|
| 1 | 1, 10, 19, 28, 37, 46, 55, 64 | 5 | −776, −647, −643, −638, −524, −516, −389, −256, −135, −126, 121, 244, 253, 500, 508, 521, 756, 765 | −780, −268, 377, 889, −771, −259, 386, 898 |
| 2 | 2, 11, 20, 29, 38, 47, 56, 65 | 14 | −893, −765, −762, −646, −523, −515, −388, −255, −253, −134, 122, 128, 245, 501, 509, 522, 640, 757 | −779, −267, 378, 890, −896, −384, 259, 771 |
| 3 | 3, 12, 21, 30, 39, 48, 57, 66 | 23 | −899, −764, −757, −645, −522, −509, −391, −264, −258, −252, −133, −131, 129, 246, 502, 515, 641, 758 | −778, −266, 379, 891, −895, −383, 260, 772 |
| 4 | 4, 13, 22, 31, 40, 49, 58, 67 | 32 | −898, −763, −756, −644, −521, −508, −390, −381, −257, −251, −250, −132, 130, 247, 503, 516, 642, 759 | −777, −265, 380, 892, −894, −382, 261, 773 |
| 5 | 6, 15, 24, 33, 42, 51, 60, 69 | 41 | −903, −770, −761, −642, −637, −520, −507, −503, −249, −130, 132, 248, 249, 381, 504, 517, 644, 761 | −775, −263, 382, 894, −892, −380, 263, 775 |
| 6 | 7, 16, 25, 34, 43, 52, 61, 70 | 50 | −902, −769, −760, −641, −636, −519, −506, −502, −248, −129, 131, 133, 250, 262, 505, 518, 645, 762 | −774, −262, 383, 895, −891, −379, 264, 776 |
| 7 | 8, 17, 26, 35, 44, 53, 62, 71 | 59 | −901, −768, −759, −640, −635, −518, −505, −501, −247, −128, 134, 251, 506, 519, 646, 760, 763, 893 | −773, −261, 384, 896, −890, −378, 265, 777 |
| 8 | 9, 18, 27, 36, 45, 54, 63, 72 | 68 | −900, −767, −758, −639, −634, −517, −504, −500, −246, −127, 135, 252, 507, 520, 643, 647, 764, 774 | −772, −260, 385, 897, −889, −377, 266, 778 |

In Table 32, the “first part” column means that the first part of (192) data subcarriers in the 242-tone DRU include a combination of data subcarriers in corresponding 26-tone DRUs. For example, a 242-tone DRU whose identifier is 1 is used as an example. The first part of 192 data subcarriers included in the 242-tone DRU include all data subcarriers in eight 26-tone DRUs whose identifiers are 1, 10, 19, 28, 37, 46, 55, and 64 shown in Table 26. Similarly, the “second part” column means that the second part of (24) data subcarriers in the 242-tone DRU include a combination of data subcarriers in corresponding 26-tone DRUs. For example, a 242-tone DRU whose identifier is 1 is used as an example. The second part of 24 data subcarriers included in the 242-tone DRU includes data subcarriers in a 26-tone DRU whose identifier is 5 shown in Table 26.

For example, the eight pilot subcarriers included in the 242-tone DRU may be a part of a set of 18 pilot subcarriers included in the corresponding nine 26-tone DRUs. Alternatively, in some embodiments, the eight pilot subcarriers included in the 242-tone DRU may be a part of a set of 16 pilot subcarriers included in the eight 26-tone DRUs in the corresponding first part. In addition, the other 18 data subcarriers included in the 242-tone DRU may be selected from remaining subcarriers of all the subcarriers of the entire bandwidth other than the guard subcarriers, the DC subcarriers, the data subcarriers in the first part column, the data subcarriers in the second part column, and the pilot subcarriers, and the data subcarriers may be fully discrete.

As shown in Table 31 or Table 32, each 242-tone DRU includes eight pilot subcarriers, and any two pilot subcarriers in a same DRU are not adjacent. The pilot subcarriers shown in Table 31 or Table 32 implement full discretization of pilot subcarriers in a same DRU, thereby implementing frequency domain diversity.

In addition, in this embodiment of this disclosure, the identifier of the 242-tone DRU may be based on a lowest-frequency index of a data subcarrier included in each 242-tone DRU. For example, an identifier of a 242-tone DRU having a lowest-frequency index −1011 is 1.

In addition, it should be noted that the 242-tone DRU in 160 MHz described with reference to Table 31 or Table 32 is merely an example. For example, 234 data subcarriers in the 242-tone DRU may alternatively be divided into three parts in another manner, for example, a first part, a second part, and a third part shown in Table 33 below. In Table 33, the “first part” column means that a first part of data subcarriers (204) in the 242-tone DRU include a combination of data subcarriers in corresponding 106-tone DRUs. For example, a 242-tone DRU whose identifier is 1 is used as an example. The first part of (204) data subcarriers included in the 242-tone DRU include all data subcarriers of 106-tone DRUs whose identifiers are 1 and 9 shown in Table 29. In Table 33, the “second part” column means that the second part of (24) data subcarriers in the 242-tone DRU include a combination of data subcarriers in corresponding 26-tone DRUs. For example, a 242-tone DRU whose identifier is 1 is used as an example. The second part of (24) data subcarriers included in the 242-tone DRU include data subcarriers in a 26-tone DRU whose identifier is 5 shown in Table 26.

TABLE 33

| Identifier of a 242-tone DRU | Index of a data subcarrier: First part (identifier of a 106-tone DRU) | Index of a data subcarrier: Second part (identifier of a 26-tone DRU) | Index of a data subcarrier: Third part | Index of a pilot subcarrier |
|---|---|---|---|---|
| 1 | 1, 9 | 5 | −776, −643, −389, −256, 121, 521 | −780, −268, 377, 889, −771, −259, 386, 898 |
| 2 | 2, 10 | 14 | −893, −762, −388, −255, 122, 522 | −779, −267, 378, 890, −896, −384, 259, 771 |
| 3 | 3, 11 | 23 | −899, −757, −391, −264, −258, −131 | −778, −266, 379, 891, −895, −383, 260, 772 |
| 4 | 4, 12 | 32 | −898, −756, −390, −381, −257, −250 | −777, −265, 380, 892, −894, −382, 261, 773 |
| 5 | 5, 13 | 41 | −903, −770, −637, −503, 248, 381 | −775, −263, 382, 894, −892, −380, 263, 775 |
| 6 | 6, 14 | 50 | −902, −769, −636, −502, 131, 262 | −774, −262, 383, 895, −891, −379, 264, 776 |
| 7 | 7, 15 | 59 | −901, −768, −635, −501, 760, 893 | −773, −261, 384, 896, −890, −378, 265, 777 |
| 8 | 8, 16 | 68 | −900, −767, −634, −500, 643, 774 | −772, −260, 385, 897, −889, −377, 266, 778 |

In this way, for the 160 MHz bandwidth, through the design of the 242-tone DRU shown in Table 31 to Table 33, compared with the continuous 242-tone RU in the 160 MHz obtained based on the 80 MHz in FIG. 3, at a same power spectral density, this embodiment of this disclosure can implement a maximum power amplification multiple, for example, 4.33.

In an embodiment of this disclosure, an association between a 26-tone DRU (indirectly a 52-tone DRU) and a 242-tone DRU in 160 MHz is described by using Table 32. It may be understood that the foregoing described manner of determining a 242-tone DRU based on a 26-tone DRU is merely an example, and subcarriers in the 242-tone DRU can be fully discrete. In another embodiment, a 242-tone DRU may alternatively be determined in another manner based on a 26-tone DRU. For example, a combination of data subcarriers of nine 26-tone DRUs whose identifiers are 1 to 9 is determined as the first part and the second part of the 242-tone DRU whose identifier is 1. This is not limited in this disclosure. Details are not described again.

In an embodiment of this disclosure, an association between a 106-tone DRU and a 26-tone DRU in 160 MHz is described by using Table 33. It may be understood that the foregoing described manner of determining a 242-tone DRU based on a 106-tone DRU and a 26-tone DRU is merely an example, and subcarriers in the 242-tone DRU can be fully discrete. In another embodiment, a 242-tone DRU may alternatively be determined in another manner. For example, a combination of data subcarriers of two 106-tone DRUs whose identifiers are 1 and 2 is determined as the first part of the 242-tone DRU whose identifier is 1. This is not limited in this disclosure. Details are not described again.

In addition, it may be understood that if the lowest-frequency index of the data subcarrier included in the 26-tone DRU is another value other than −1011, correspondingly the lowest-frequency index of the data subcarrier included in the 242-tone DRU also adaptively changes to another value.

In a tone plan solution of a DRU, the 160 MHz bandwidth includes four 484-tone DRUs, and each 484-tone DRU includes 468 data subcarriers and 16 pilot subcarriers.

For example, Table 34 shows an example of four 484-tone DRUs corresponding to the 160 MHz bandwidth, and shows 468 data subcarriers and 16 pilot subcarriers included in each 484-tone DRU. The 468 data subcarriers may be divided into three parts. A first part includes 384 data subcarriers, a second part includes 48 data subcarriers, a third part includes 36 data subcarriers, and a lowest-frequency index of a data subcarrier in a 484-tone DRU whose identifier is 1 is −1011. It should be understood that, although the data subcarriers are divided into the first part, the second part, and the third part in Table 34 and are separately listed, in this embodiment of this disclosure, the data subcarriers are presented as a plurality of parts only for ease of description, and are not actually used as division of data subcarriers included in each 284-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 484-tone DRU.

TABLE 34

| Identifier of a 484-tone DRU | Index of a data subcarrier: First part | Index of a data subcarrier: Second part | Index of a data subcarrier: Third part | Index of a pilot subcarrier |
|---|---|---|---|---|
| 1 | −1011, −1006, −1002, −997, −993, −988, −984, −979, −975, −970, −966, −961, −957, −952, −948, −943, −939, −934, −930, −925, −921, −916, −912, −907, −888, −883, −879, −874, −870, −865, −861, −856, −852, −847, −843, −838, −834, −829, −825, −820, −816, −811, | −1007, −989, −971, −953, −935, −917, −884, −866, −848, −830, −812, −794, −751, −733, −715, −697, −679, −661, −628, −610, −592, | −903, −776, −770, −761, −647, −643, −642, −638, −637, −524, −520, −516, −507, −503, | −780, −268, 377, 889, −771, −259, 386, 898, −775, −263, 382, 894, −892, −380, |

TABLE 34-continued

| Identifier of a 484-tone DRU | Index of a data subcarrier First part | Second part | Third part | Index of a pilot subcarrier |
|---|---|---|---|---|
| | −807, −802, −798, −793, −789, −784, −755, −750, −746, −741, −737, −732, −728, −723, −719, −714, −710, −705, −701, −696, −692, −687, −683, −678, −674, −669, −665, −660, −656, −651, −632, −627, −623, −618, −614, −609, −605, −600, −596, −591, −587, −582, −578, −573, −569, −564, −560, −555, −551, −546, −542, −537, −533, −528, −499, −494, −490, −485, −481, −476, −472, −467, −463, −458, −454, −449, −445, −440, −436, −431, −427, −422, −418, −413, −409, −404, −400, −395, −376, −371, −367, −362, −358, −353, −349, −344, −340, −335, −331, −326, −322, −317, −313, −308, −304, −299, −295, −290, −286, −281, −277, −272, −243, −238, −234, −229, −225, −220, −216, −211, −207, −202, −198, −193, −189, −184, −180, −175, −171, −166, −162, −157, −153, −148, −144, −139, −120, −115, −111, −106, −102, −97, −93, −88, −84, −79, −75, −70, −66, −61, −57, −52, −48, −43, −39, −34, −30, −25, −21, −16, 13, 18, 22, 27, 31, 36, 40, 45, 49, 54, 58, 63, 67, 72, 76, 81, 85, 90, 94, 99, 103, 108, 112, 117, 136, 141, 145, 150, 154, 159, 163, 168, 172, 177, 181, 186, 190, 195, 199, 204, 208, 213, 217, 222, 226, 231, 235, 240, 269, 274, 278, 283, 287, 292, 296, 301, 305, 310, 314, 319, 323, 328, 332, 337, 341, 346, 350, 355, 359, 364, 368, 373, 392, 397, 401, 406, 410, 415, 419, 424, 428, 433, 437, 442, 446, 451, 455, 460, 464, 469, 473, 478, 482, 487, 491, 496, 525, 530, 534, 539, 543, 548, 552, 557, 561, 566, 570, 575, 579, 584, 588, 593, 597, 602, 606, 611, 615, 620, 624, 629, 648, 653, 657, 662, 666, 671, 675, 680, 684, 689, 693, 698, 702, 707, 711, 716, 720, 725, 729, 734, 738, 743, 747, 752, 781, 786, 790, 795, 799, 804, 808, 813, 817, 822, 826, 831, 835, 840, 844, 849, 853, 858, 862, 867, 871, 876, 880, 885, 904, 909, 913, 918, 922, 927, 931, 936, 940, 945, 949, 954, 958, 963, 967, 972, 976, 981, 985, 990, 994, 999, 1003, 1008 | −574, −556, −538, 17, 35, 53, 71, 89, 107, 140, 158, 176, 194, 212, 230, 273, 291, 309, 327, 345, 363, 396, 414, 432, 450, 468, 486 | −389, −256, −249, −135, −130, −126, 121, 132, 244, 248, 249, 253, 381, 500, 504, 508, 517, 521, 644, 756, 761, 765 | 263, 775 |
| 2 | −1010, −1005, −1001, −996, −992, −987, −983, −978, −974, −969, −965, −960, −956, −951, −947, −942, −938, −933, −929, −924, −920, −915, −911, −906, −887, −882, −878, −873, −869, −864, −860, −855, −851, −846, −842, −837, −833, −828, −824, −819, −815, −810, −806, −801, −797, −792, −788, −783, −754, −749, −745, −740, −736, −731, −727, −722, −718, −713, −709, −704, −700, −695, −691, −686, −682, −677, −673, −668, −664, −659, −655, −650, −631, −626, −622, −617, −613, −608, −604, −599, −595, −590, −586, −581, −577, −572, −568, −563, −559, −554, −550, −545, −541, −536, −532, −527, −498, −493, −489, −484, −480, −475, −471, −466, −462, −457, −453, −448, −444, −439, −435, −430, −426, −421, −417, −412, −408, −403, −399, −394, −375, −370, −366, −361, −357, −352, −348, −343, −339, −334, −330, −325, −321, −316, −312, −307, −303, −298, −294, −289, −285, −280, −276, −271, −242, −237, −233, −228, −224, −219, −215, −210, −206, −201, −197, −192, | −998, −980, −962, −944, −926, −908, −875, −857, −839, −821, −803, −785, −742, −724, −706, −688, −670, −652, −619, −601, −583, −565, −547, −529, 26, 44, 62, 80, 98, 116, 149, 167, 185, 203, 221, 239, 282, 300, 318, 336, 354, 372, 405, 423, 441, 459, 477, 495 | −902, −893, −769, −765, −762, −760, −646, −641, −636, −523, −519, −515, −506, −502, −388, −255, −253, −248, −134, −129, 122, 128, 131, 133, 245, 250, 262, 501, 505, 509, 518, 522, 640, 645, 757, 762 | −779, −267, 378, 890, −896, −384, 259, 771, −774, −262, 383, 895, −891, −379, 264, 776 |

TABLE 34-continued

| Identifier of a 484-tone DRU | Index of a data subcarrier First part | Second part | Third part | Index of a pilot subcarrier |
|---|---|---|---|---|
| | −188, −183, −179, −174, −170, −165, −161, −156, −152, −147, −143, −138, −119, −114, −110, −105, −101, −96, −92, −87, −83, −78, −74, −69, −65, −60, −56, −51, −47, −42, −38, −33, −29, −24, −20, −15, 14, 19, 23, 28, 32, 37, 41, 46, 50, 55, 59, 64, 68, 73, 77, 82, 86, 91, 95, 100, 104, 109, 113, 118, 137, 142, 146, 151, 155, 160, 164, 169, 173, 178, 182, 187, 191, 196, 200, 205, 209, 214, 218, 223, 227, 232, 236, 241, 270, 275, 279, 284, 288, 293, 297, 302, 306, 311, 315, 320, 324, 329, 333, 338, 342, 347, 351, 356, 360, 365, 369, 374, 393, 398, 402, 407, 411, 416, 420, 425, 429, 434, 438, 443, 447, 452, 456, 461, 465, 470, 474, 479, 483, 488, 492, 497, 526, 531, 535, 540, 544, 549, 553, 558, 562, 567, 571, 576, 580, 585, 589, 594, 598, 603, 607, 612, 616, 621, 625, 630, 649, 654, 658, 663, 667, 672, 676, 681, 685, 690, 694, 699, 703, 708, 712, 717, 721, 726, 730, 735, 739, 744, 748, 753, 782, 787, 791, 796, 800, 805, 809, 814, 818, 823, 827, 832, 836, 841, 845, 850, 854, 859, 863, 868, 872, 877, 881, 886, 905, 910, 914, 919, 923, 928, 932, 937, 941, 946, 950, 955, 959, 964, 968, 973, 977, 982, 986, 991, 995, 1000, 1004, 1009 | | | |
| 3 | −1009, −1004, −1000, −995, −991, −986, −982, −977, −973, −968, −964, −959, −955, −950, −946, −941, −937, −932, −928, −923, −919, −914, −910, −905, −886, −881, −877, −872, −868, −863, −859, −854, −850, −845, −841, −836, −832, −827, −823, −818, −814, −809, −805, −800, −796, −791, −787, −782, −753, −748, −744, −739, −735, −730, −726, −721, −717, −712, −708, −703, −699, −694, −690, −685, −681, −676, −672, −667, −663, −658, −654, −649, −630, −625, −621, −616, −612, −607, −603, −598, −594, −589, −585, −580, −576, −571, −567, −562, −558, −553, −549, −544, −540, −535, −531, −526, −497, −492, −488, −483, −479, −474, −470, −465, −461, −456, −452, −447, −443, −438, −434, −429, −425, −420, −416, −411, −407, −402, −398, −393, −374, −369, −365, −360, −356, −351, −347, −342, −338, −333, −329, −324, −320, −315, −311, −306, −302, −297, −293, −288, −284, −279, −275, −270, −241, −236, −232, −227, −223, −218, −214, −209, −205, −200, −196, −191, −187, −182, −178, −173, −169, −164, −160, −155, −151, −146, −142, −137, −118, −113, −109, −104, −100, −95, −91, −86, −82, −77, −73, −68, −64, −59, −55, −50, −46, −41, −37, −32, −28, −23, −19, −14, 15, 20, 24, 29, 33, 38, 42, 47, 51, 56, 60, 65, 69, 74, 78, 83, 87, 92, 96, 101, 105, 110, 114, 119, 138, 143, 147, 152, 156, 161, 165, 170, 174, 179, 183, 188, 192, 197, 201, 206, 210, 215, 219, 224, 228, 233, 237, 242, 271, 276, 280, 285, 289, 294, 298, 303, 307, 312, 316, 321, 325, 330, 334, 339, 343, 348, 352, 357, 361, 366, 370, 375, 394, 399, 403, 408, 412, 417, 421, 426, 430, 435, 439, 444, 448, 453, 457, 462, 466, 471, 475, 480, 484, 489, 493, 498, 527, 532, 536, 541, 545, 550, 554, 559, 563, 568, 572, 577, 581, 586, 590, 595, 599, 604, 608, 613, | −495, −477, −459, −441, −423, −405, −372, −354, −336, −318, −300, −282, −239, −221, −203, −185, −167, −149, −116, −98, −80, −62, −44, −26, 529, 547, 565, 583, 601, 619, 652, 670, 688, 706, 724, 742, 785, 803, 821, 839, 857, 875, 908, 926, 944, 962, 980, 998 | −901, −899, −768, −764, −759, −757, −645, −640, −635, −522, −518, −509, −505, −501, −391, −264, −258, −252, −247, −133, −131, −128, 129, 134, 246, 251, 502, 506, 515, 519, 641, 646, 758, 760, 763, 893 | −778, −266, 379, 891, −895, −383, 260, 772, −773, −261, 384, 896, −890, −378, 265, 777 |

TABLE 34-continued

| Identifier of a 484-tone | Index of a data subcarrier | | | Index of a pilot |
|---|---|---|---|---|
| DRU | First part | Second part | Third part | subcarrier |
| | 617, 622, 626, 631, 650, 655, 659, 664, 668, 673, 677, 682, 686, 691, 695, 700, 704, 709, 713, 718, 722, 727, 731, 736, 740, 745, 749, 754, 783, 788, 792, 797, 801, 806, 810, 815, 819, 824, 828, 833, 837, 842, 846, 851, 855, 860, 864, 869, 873, 878, 882, 887, 906, 911, 915, 920, 924, 929, 933, 938, 942, 947, 951, 956, 960, 965, 969, 974, 978, 983, 987, 992, 996, 1001, 1005, 1010 | | | |
| 4 | −1008, −1003, −999, −994, −990, −985, −981, −976, −972, −967, −963, −958, −954, −949, −945, −940, −936, −931, −927, −922, −918, −913, −909, −904, −885, −880, −876, −871, −867, −862, −858, −853, −849, −844, −840, −835, −831, −826, −822, −817, −813, −808, −804, −799, −795, −790, −786, −781, −752, −747, −743, −738, −734, −729, −725, −720, −716, −711, −707, −702, −698, −693, −689, −684, −680, −675, −671, −666, −662, −657, −653, −648, −629, −624, −620, −615, −611, −606, −602, −597, −593, −588, −584, −579, −575, −570, −566, −561, −557, −552, −548, −543, −539, −534, −530, −525, −496, −491, −487, −482, −478, −473, −469, −464, −460, −455, −451, −446, −442, −437, −433, −428, −424, −419, −415, −410, −406, −401, −397, −392, −373, −368, −364, −359, −355, −350, −346, −341, −337, −332, −328, −323, −319, −314, −310, −305, −301, −296, −292, −287, −283, −278, −274, −269, −240, −235, −231, −226, −222, −217, −213, −208, −204, −199, −195, −190, −186, −181, −177, −172, −168, −163, −159, −154, −150, −145, −141, −136, −117, −112, −108, −103, −99, −94, −90, −85, −81, −76, −72, −67, −63, −58, −54, −49, −45, −40, −36, −31, −27, −22, −18, −13, 16, 21, 25, 30, 34, 39, 43, 48, 52, 57, 61, 66, 70, 75, 79, 84, 88, 93, 97, 102, 106, 111, 115, 120, 139, 144, 148, 153, 157, 162, 166, 171, 175, 180, 184, 189, 193, 198, 202, 207, 211, 216, 220, 225, 229, 234, 238, 243, 272, 277, 281, 286, 290, 295, 299, 304, 308, 313, 317, 322, 326, 331, 335, 340, 344, 349, 353, 358, 362, 367, 371, 376, 395, 400, 404, 409, 413, 418, 422, 427, 431, 436, 440, 445, 449, 454, 458, 463, 467, 472, 476, 481, 485, 490, 494, 499, 528, 533, 537, 542, 546, 551, 555, 560, 564, 569, 573, 578, 582, 587, 591, 596, 600, 605, 609, 614, 618, 623, 627, 632, 651, 656, 660, 665, 669, 674, 678, 683, 687, 692, 696, 701, 705, 710, 714, 719, 723, 728, 732, 737, 741, 746, 750, 755, 784, 789, 793, 798, 802, 807, 811, 816, 820, 825, 829, 834, 838, 843, 847, 852, 856, 861, 865, 870, 874, 879, 883, 888, 907, 912, 916, 921, 925, 930, 934, 939, 943, 948, 952, 957, 961, 966, 970, 975, 979, 984, 988, 993, 997, 1002, 1006, 1011 | −486, −468, −450, −432, −414, −396, −363, −345, −327, −309, −291, −273, −230, −212, −194, −176, −158, −140, −107, −89, −71, −53, −35, −17, 538, 556, 574, 592, 610, 628, 661, 679, 697, 715, 733, 751, 794, 812, 830, 848, 866, 884, 917, 935, 953, 971, 989, 1007 | −900, −898, −767, −763, −758, −756, −644, −639, −634, −521, −517, −508, −504, −500, −390, −381, −257, −251, −250, −246, −132, −127, 130, 135, 247, 252, 503, 507, 516, 520, 642, 643, 647, 759, 764, 774 | −777, −265, 380, 892, −894, −382, 261, 773, −772, −260, 385, 897, −889, −377, 266, 778 |

For the first part of data subcarriers (384 data subcarriers) in the 484-tone DRU, as shown in Table 34, the 384 data subcarriers include 192 high-frequency subcarriers (whose subcarrier indices are positive values) and 192 low-frequency subcarriers (whose subcarrier indices are negative values). If every 24 of the 384 data subcarriers are considered as one group in a frequency direction (for example, from low to high) (or understood as an ascending order of indices), absolute values of index differences between adjacent data subcarriers in a same group are alternately 5 and 4, and absolute values of index differences between data subcarriers in two adjacent groups are alternately 19 and 29.

In other words, for the 24 data subcarriers in the same group, an absolute value of an index difference between adjacent subcarriers of 12 data subcarriers in odd-numbered locations is 9, and an absolute value of an index difference between adjacent subcarriers of 12 data subcarriers in even-numbered locations is 9. An absolute value of an index difference between a data subcarrier in an even-numbered location and a previous adjacent data subcarrier is 5. Correspondingly, an absolute value of an index difference between a data subcarrier in an odd-numbered location and a previous adjacent data subcarrier is 4. In some embodiments, the 24 data subcarriers in the same group may be considered to include two sequences, for example, an odd-numbered location sequence and an even-numbered location sequence. An absolute value of an index difference between adjacent data subcarriers in each sequence is 9. For example, indices of the first 24 data subcarriers of the first part of data subcarriers of the 484-tone DRU whose identifier is 1 include −1011, −1006, −1002, −997, −993, −988, −984, −979, −975, −970, −966, −961, −957, −952, −948, −943, −939, −934, −930, −925, −921, −916, −912, and −907, and may be represented as a combination of two sequences [−1011: 9: −912] and [−1006: 9: −907].

In other words, it is assumed that indices of 384 data subcarriers (the first part) included in each 484-tone DRU are sequentially arranged in a frequency direction and then divided into 16 groups, and each group includes 24 data subcarriers. Absolute values of index differences between 24 data subcarriers in a same group are alternately 5 and 4.

As shown in Table 34, there is a fixed offset between indices of 384 data subcarriers (the first part) included in two 484-tone DRUs having adjacent identifiers, and the fixed offset is 1. For example, indices of 384 data subcarriers in a 484-tone DRU whose identifier is i (i=1, 2, or 3) all plus 1, to obtain indices of 384 data subcarriers in a 484-tone DRU whose identifier is i+1.

The second part of data subcarriers (48 data subcarriers) in the 484-tone DRU includes 24 high-frequency subcarriers (whose subcarrier indices are positive values) and 24 low-frequency subcarriers (whose subcarrier indices are negative values). If every six data subcarriers of the second part (48 data subcarriers) are considered as one group in a frequency direction (for example, from low to high) (or understood as an ascending order of indices), the 48 data subcarriers may be considered as eight groups, including four low-frequency groups and four high-frequency groups. An index of each data subcarrier in a low-frequency group is a negative value, and an index of each data subcarrier in a high-frequency group is a positive value. Absolute values of index differences between adjacent data subcarriers in a same group are 18, absolute values of index differences between data subcarriers in two adjacent low-frequency groups or two adjacent high-frequency groups are sequentially 33, 43, and 33, and absolute values of index differences between data subcarriers in a high-frequency group and a low-frequency group (an absolute value of a difference between a minimum index of all data subcarriers in a high-frequency group and a maximum index of all data subcarriers in a low-frequency group) are 555.

In addition, indices of 48 data subcarriers in the second part of the 484-tone DRU whose identifier is i (i=1 or 3) all plus 9, to obtain indices of 48 data subcarriers in the second part of the 484-tone DRU whose identifier is i+1. Indices of 48 data subcarriers in the second part of the 484-tone DRU whose identifier is 2 all plus 503, to obtain indices of 48 data subcarriers in the second part of the 484-tone DRU whose identifier is 3.

In addition to the 384 data subcarriers in the first part column and the 48 data subcarriers in the second part column of the foregoing table, each 484-tone DRU further includes 36 data subcarriers (the third part) and 16 pilot subcarriers. In some embodiments, 36 data subcarriers and 16 pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 34 shows an example, so that subcarriers included in the 484-tone DRU can be fully discrete.

As shown in Table 34, each 484-tone DRU includes 16 pilot subcarriers, including eight high-frequency subcarriers and eight low-frequency subcarriers. In this way, pilot subcarriers included in a same DRU can be fully discrete, thereby implementing frequency domain diversity.

As shown in Table 31, a 484-tone DRU whose identifier is i (i=1 to 4) may be considered as a combination of a 242-tone DRU whose identifier is i and a 242-tone DRU whose identifier is i+4. In this way, subcarriers in the 484-tone DRU can be fully discrete. For example, data subcarriers in a 484-tone DRU whose identifier is 1 are a combination of data subcarriers in a 242-tone DRU whose identifier is 1 and data subcarriers in a 242-tone DRU whose identifier is 5 in Table 31. 16 pilot subcarriers in the 484-tone DRU whose identifier is 1 are a combination of eight pilot subcarriers in the 242-tone DRU whose identifier is 1 and eight pilot subcarriers in the 242-tone DRU whose identifier is 5 in Table 31. Correspondingly, Table 34 may also be simplified and represented as the following Table 35 based on Table 31.

TABLE 35

| Identifier of a 484-tone DRU | Identifier of a 242-tone DRU |
|---|---|
| 1 | 1, 5 |
| 2 | 2, 6 |
| 3 | 3, 7 |
| 4 | 4, 8 |

In addition, in this embodiment of this disclosure, the identifier of the 484-tone DRU may be based on a lowest-frequency index of a data subcarrier included in each 484-tone DRU. For example, an identifier of a 484-tone DRU having a lowest-frequency index −1011 is 1.

According to the design of the 484-tone DRU shown in Table 34 or Table 35 in an embodiment of this disclosure, compared with the continuous 484-tone RU in the 160 MHz obtained based on the 80 MHz in FIG. 3, at a same power spectral density, this embodiment of this disclosure can implement a maximum power amplification multiple, specifically, 2.6.

In an embodiment of this disclosure, an association between a 242-tone DRU and a 484-tone DRU in 160 MHz is described by using Table 35. It may be understood that the foregoing described manner of determining a 484-tone DRU based on a 242-tone DRU is merely an example, and subcarriers in the 484-tone DRU can be fully discrete. In another embodiment, the 484-tone DRU may alternatively be determined in another manner. This is not limited in this disclosure. Details are not described again.

In addition, with reference to the description of the 242-tone DRU in Table 32 or Table 33, the 484-tone DRU may alternatively be determined based on a 26-tone DRU or based on a 26-tone DRU and a 106-tone DRU (or a 52-tone DRU). For brevity, details are not described herein again. In addition, it may be understood that if the lowest-frequency index of the data subcarrier included in the 26-tone DRU is another value other than −1011, correspondingly the lowest-frequency index of the data subcarrier included in the 484-tone DRU also adaptively changes to another value.

Tone plans of 26-tone DRUs, 52-tone DRUs, 106-tone DRUs, 242-tone DRUs, and 484-tone DRUs in 160 MHz are separately described above with reference to Table 26 to Table 35. An index −1011 is used as a lowest-frequency index of a data subcarrier.

The foregoing content describes in detail subcarriers (data subcarriers and pilot subcarriers) separately included in different DRUs in the 160 MHz bandwidth. For a characteristic followed by a tone plan of the DRUs in the 160 MHz bandwidth and related description, refer to corresponding embodiments of the 40 MHz bandwidth. Details are not described herein again.

In some embodiments, data subcarriers included in the 26-tone DRU in 160 MHz may be obtained by shifting leftward by n11, shifting rightward by n12, shifting leftward by n21, shifting rightward by n22, shifting leftward by n31, and shifting rightward by n32 based on Table 12. Alternatively, if n11=n12=128, and n21=n22=256, data subcarriers included in the 26-tone DRU in 160 MHz may be obtained by shifting leftward by n31 and/or shifting rightward by n32 based on the 26-tone DRU in 80 MHz (Table 16). In an example of Table 26, n31=n32=512. However, n31 and n32 may alternatively be other values, and are not listed herein again.

Correspondingly, Table 26 may also be simplified and represented as the following Table 36, where numbers in brackets { } are group numbers shown in Table 12, and include a combination of indices of subcarriers in the group numbers shown in Table 12, and may be understood as being obtained by shifting leftward/rightward by 512 based on Table 16.

TABLE 36

| Identifier of a 26-tone DRU | Index of a data subcarrier | Index of a pilot subcarrier |
|---|---|---|
| 1 | {1} - 640, {1} - 896 | −780, −647 |
| 2 | {2} - 640, {2} - 896 | −779, −646 |
| 3 | {3} - 640, {3} - 896 | −778, −645 |
| 4 | {4} - 640, {4} - 896 | −777, −644 |
| 5 | {5} - 640, {5} - 896 | −776, −643 |
| 6 | {6} - 640, {6} - 896 | −775, −642 |
| 7 | {7} - 640, {7} - 896 | −774, −641 |
| 8 | {8} - 640, {8} - 896 | −773, −640 |
| 9 | {9} - 640, {9} - 896 | −772, −639 |
| 10 | {10} - 640, {10} - 896 | −771, −638 |
| 11 | {11} - 640, {11} - 896 | −896, −765 |
| 12 | {12} - 640, {12} - 896 | −895, −764 |
| 13 | {13} - 640, {13} - 896 | −894, −763 |
| 14 | {14} - 640, {14} - 896 | −893, −762 |
| 15 | {15} - 640, {15} - 896 | −892, −761 |
| 16 | {16} - 640, {16} - 896 | −891, −760 |
| 17 | {17} - 640, {17} - 896 | −890, −759 |
| 18 | {18} - 640, {18} - 896 | −889, −758 |
| 19 | {1} - 128, {1} - 384 | −268, −135 |
| 20 | {2} - 128, {2} - 384 | −267, −134 |
| 21 | {3} - 128, {3} - 384 | −266, −133 |
| 22 | {4} - 128, {4} - 384 | −265, −132 |
| 23 | {5} - 128, {5} - 384 | −264, −131 |
| 24 | {6} - 128, {6} - 384 | −263, −130 |
| 25 | {7} - 128, {7} - 384 | −262, −129 |
| 26 | {8} - 128, {8} - 384 | −261, −128 |
| 27 | {9} - 128, {9} - 384 | −260, −127 |
| 28 | {10} - 128, {10} - 384 | −259, −126 |

TABLE 36-continued

| Identifier of a 26-tone DRU | Index of a data subcarrier | Index of a pilot subcarrier |
|---|---|---|
| 29 | {11} - 128, {11} - 384 | −384, −253 |
| 30 | {12} - 128, {12} - 384 | −383, −252 |
| 31 | {13} - 128, {13} - 384 | −382, −251 |
| 32 | {14} - 128, {14} - 384 | −381, −250 |
| 33 | {15} - 128, {15} - 384 | −380, −249 |
| 34 | {16} - 128, {16} - 384 | −379, −248 |
| 35 | {17} - 128, {17} - 384 | −378, −247 |
| 36 | {18} - 128, {18} - 384 | −377, −246 |
| 37 | {1} + 128, {1} + 384 | 244, 377 |
| 38 | {2} + 128, {2} + 384 | 245, 378 |
| 39 | {3} + 128, {3} + 384 | 246, 379 |
| 40 | {4} + 128, {4} + 384 | 247, 380 |
| 41 | {5} + 128, {5} + 384 | 248, 381 |
| 42 | {6} + 128, {6} + 384 | 249, 382 |
| 43 | {7} + 128, {7} + 384 | 250, 383 |
| 44 | {8} + 128, {8} + 384 | 251, 384 |
| 45 | {9} + 128, {9} + 384 | 252, 385 |
| 46 | {10} + 128, {10} + 384 | 253, 386 |
| 47 | {11} + 128, {11} + 384 | 128, 259 |
| 48 | {12} + 128, {12} + 384 | 129, 260 |
| 49 | {13} + 128, {13} + 384 | 130, 261 |
| 50 | {14} + 128, {14} + 384 | 131, 262 |
| 51 | {15} + 128, {15} + 384 | 132, 263 |
| 52 | {16} + 128, {16} + 384 | 133, 264 |
| 53 | {17} + 128, {17} + 384 | 134, 265 |
| 54 | {18} + 128, {18} + 384 | 135, 266 |
| 55 | {1} + 640, {1} + 896 | 756, 889 |
| 56 | {2} + 640, {2} + 896 | 757, 890 |
| 57 | {3} + 640, {3} + 896 | 758, 891 |
| 58 | {4} + 640, {4} + 896 | 759, 892 |
| 59 | {5} + 640, {5} + 896 | 760, 893 |
| 60 | {6} + 640, {6} + 896 | 761, 894 |
| 61 | {7} + 640, {7} + 896 | 762, 895 |
| 62 | {8} + 640, {8} + 896 | 763, 896 |
| 63 | {9} + 640, {9} + 896 | 764, 897 |
| 64 | {10} + 640, {10} + 896 | 765, 898 |
| 65 | {11} + 640, {11} + 896 | 640, 771 |
| 66 | {12} + 640, {12} + 896 | 641, 772 |
| 67 | {13} + 640, {13} + 896 | 642, 773 |
| 68 | {14} + 640, {14} + 896 | 643, 774 |
| 69 | {15} + 640, {15} + 896 | 644, 775 |
| 70 | {16} + 640, {16} + 896 | 645, 776 |
| 71 | {17} + 640, {17} + 896 | 646, 777 |
| 72 | {18} + 640, {18} + 896 | 647, 778 |

It may be understood that, for the 52-tone DRU, the 106-tone DRU, the 242-tone DRU, and the 484-tone DRU in 160 MHz, with reference to the foregoing Table 28, Table 30, Table 32, and Table 35, indices of data subcarriers (or the first part) included in the 52-tone DRU, the 106-tone DRU, the 242-tone DRU, and the 484-tone DRU may also be represented as variations based on Table 12. For brevity, the examples are not elaborated herein.

In addition, it may be understood that, although an embodiment of obtaining DRUs of various sizes in 160 MHz based on Table 12 is described, this disclosure is not limited thereto. For example, an index of a subcarrier included in each DRU may be determined without considering the grouping in Table 12. For example, an index of a subcarrier included in each DRU may be determined based on another grouping form. This is not limited in this disclosure.

For a 320 MHz Bandwidth:

The 320 MHz bandwidth includes 4096 subcarriers in total, and the subcarrier index range is [−2048, 2047]. The 320 MHz bandwidth may include 144 26-tone RUs.

In a tone plan solution of a DRU, the 320 MHz bandwidth includes 144 26-tone DRUs, and each 26-tone DRU includes 24 data subcarriers and two pilot subcarriers. For example, Table 37 shows an example of 144 26-tone DRUs corresponding to the 320 MHz bandwidth, and shows indices of 24 data subcarriers and indices of two pilot subcarriers included in each DRU, and a lowest-frequency index of a data subcarrier in a 26-tone DRU whose identifier is 1 is −2035.

TABLE 37

| Identifier of a 26-tone DRU | Index of a data subcarrier | Index of a pilot subcarrier |
|---|---|---|
| 1 | −2035, −2017, −1999, −1981, −1963, −1945, −1912, −1894, −1876, −1858, −1840, −1822, −1779, −1761, −1743, −1725, −1707, −1689, −1656, −1638, −1620, −1602, −1584, −1566 | −1804, −1671 |
| 2 | −2034, −2016, −1998, −1980, −1962, −1944, −1911, −1893, −1875, −1857, −1839, −1821, −1778, −1760, −1742, −1724, −1706, −1688, −1655, −1637, −1619, −1601, −1583, −1565 | −1803, −1670 |
| 3 | −2033, −2015, −1997, −1979, −1961, −1943, −1910, −1892, −1874, −1856, −1838, −1820, −1777, −1759, −1741, −1723, −1705, −1687, −1654, −1636, −1618, −1600, −1582, −1564 | −1802, −1669 |
| 4 | −2032, −2014, −1996, −1978, −1960, −1942, −1909, −1891, −1873, −1855, −1837, −1819, −1776, −1758, −1740, −1722, −1704, −1686, −1653, −1635, −1617, −1599, −1581, −1563 | −1801, −1668 |
| 5 | −2031, −2013, −1995, −1977, −1959, −1941, −1908, −1890, −1872, −1854, −1836, −1818, −1775, −1757, −1739, −1721, −1703, −1685, −1652, −1634, −1616, −1598, −1580, −1562 | −1800, −1667 |
| 6 | −2030, −2012, −1994, −1976, −1958, −1940, −1907, −1889, −1871, −1853, −1835, −1817, −1774, −1756, −1738, −1720, −1702, −1684, −1651, −1633, −1615, −1597, −1579, −1561 | −1799, −1666 |
| 7 | −2029, −2011, −1993, −1975, −1957, −1939, −1906, −1888, −1870, −1852, −1834, −1816, −1773, −1755, −1737, −1719, −1701, −1683, −1650, −1632, −1614, −1596, −1578, −1560 | −1798, −1665 |
| 8 | −2028, −2010, −1992, −1974, −1956, −1938, −1905, −1887, −1869, −1851, −1833, −1815, −1772, −1754, −1736, −1718, −1700, −1682, −1649, −1631, −1613, −1595, −1577, −1559 | −1797, −1664 |
| 9 | −2027, −2009, −1991, −1973, −1955, −1937, −1904, −1886, −1868, −1850, −1832, −1814, −1771, −1753, −1735, −1717, −1699, −1681, −1648, −1630, −1612, −1594, −1576, −1558 | −1796, −1663 |
| 10 | −2026, −2008, −1990, −1972, −1954, −1936, −1903, −1885, −1867, −1849, −1831, −1813, −1770, −1752, −1734, −1716, −1698, −1680, −1647, −1629, −1611, −1593, −1575, −1557 | −1795, −1662 |
| 11 | −2025, −2007, −1989, −1971, −1953, −1935, −1902, −1884, −1866, −1848, −1830, −1812, −1769, −1751, −1733, −1715, −1697, −1679, −1646, −1628, −1610, −1592, −1574, −1556 | −1920, −1789 |
| 12 | −2024, −2006, −1988, −1970, −1952, −1934, −1901, −1883, −1865, −1847, −1829, −1811, −1768, −1750, −1732, −1714, −1696, −1678, −1645, −1627, −1609, −1591, −1573, −1555 | −1919, −1788 |
| 13 | −2023, −2005, −1987, −1969, −1951, −1933, −1900, −1882, −1864, −1846, −1828, −1810, −1767, −1749, −1731, −1713, −1695, −1677, −1644, −1626, −1608, −1590, −1572, −1554 | −1918, −1787 |
| 14 | −2022, −2004, −1986, −1968, −1950, −1932, −1899, −1881, −1863, −1845, −1827, −1809, −1766, −1748, −1730, −1712, −1694, −1676, −1643, −1625, −1607, −1589, −1571, −1553 | −1917, −1786 |

TABLE 37-continued

| Identifier of a 26-tone DRU | Index of a data subcarrier | Index of a pilot subcarrier |
|---|---|---|
| 15 | −2021, −2003, −1985, −1967, −1949, −1931, −1898, −1880, −1862, −1844, −1826, −1808, −1765, −1747, −1729, −1711, −1693, −1675, −1642, −1624, −1606, −1588, −1570, −1552 | −1916, −1785 |
| 16 | −2020, −2002, −1984, −1966, −1948, −1930, −1897, −1879, −1861, −1843, −1825, −1807, −1764, −1746, −1728, −1710, −1692, −1674, −1641, −1623, −1605, −1587, −1569, −1551 | −1915, −1784 |
| 17 | −2019, −2001, −1983, −1965, −1947, −1929, −1896, −1878, −1860, −1842, −1824, −1806, −1763, −1745, −1727, −1709, −1691, −1673, −1640, −1622, −1604, −1586, −1568, −1550 | −1914, −1783 |
| 18 | −2018, −2000, −1982, −1964, −1946, −1928, −1895, −1877, −1859, −1841, −1823, −1805, −1762, −1744, −1726, −1708, −1690, −1672, −1639, −1621, −1603, −1585, −1567, −1549 | −1913, −1782 |
| 19 | −1523, −1505, −1487, −1469, −1451, −1433, −1400, −1382, −1364, −1346, −1328, −1310, −1267, −1249, −1231, −1213, −1195, −1177, −1144, −1126, −1108, −1090, −1072, −1054 | −1292, −1159 |
| 20 | −1522, −1504, −1486, −1468, −1450, −1432, −1399, −1381, −1363, −1345, −1327, −1309, −1266, −1248, −1230, −1212, −1194, −1176, −1143, −1125, −1107, −1089, −1071, −1053 | −1291, −1158 |
| 21 | −1521, −1503, −1485, −1467, −1449, −1431, −1398, −1380, −1362, −1344, −1326, −1308, −1265, −1247, −1229, −1211, −1193, −1175, −1142, −1124, −1106, −1088, −1070, −1052 | −1290, −1157 |
| 22 | −1520, −1502, −1484, −1466, −1448, −1430, −1397, −1379, −1361, −1343, −1325, −1307, −1264, −1246, −1228, −1210, −1192, −1174, −1141, −1123, −1105, −1087, −1069, −1051 | −1289, −1156 |
| 23 | −1519, −1501, −1483, −1465, −1447, −1429, −1396, −1378, −1360, −1342, −1324, −1306, −1263, −1245, −1227, −1209, −1191, −1173, −1140, −1122, −1104, −1086, −1068, −1050 | −1288, −1155 |
| 24 | −1518, −1500, −1482, −1464, −1446, −1428, −1395, −1377, −1359, −1341, −1323, −1305, −1262, −1244, −1226, −1208, −1190, −1172, −1139, −1121, −1103, −1085, −1067, −1049 | −1287, −1154 |
| 25 | −1517, −1499, −1481, −1463, −1445, −1427, −1394, −1376, −1358, −1340, −1322, −1304, −1261, −1243, −1225, −1207, −1189, −1171, −1138, −1120, −1102, −1084, −1066, −1048 | −1286, −1153 |
| 26 | −1516, −1498, −1480, −1462, −1444, −1426, −1393, −1375, −1357, −1339, −1321, −1303, −1260, −1242, −1224, −1206, −1188, −1170, −1137, −1119, −1101, −1083, −1065, −1047 | −1285, −1152 |
| 27 | −1515, −1497, −1479, −1461, −1443, −1425, −1392, −1374, −1356, −1338, −1320, −1302, −1259, −1241, −1223, −1205, −1187, −1169, −1136, −1118, −1100, −1082, −1064, −1046 | −1284, −1151 |
| 28 | −1514, −1496, −1478, −1460, −1442, −1424, −1391, −1373, −1355, −1337, −1319, −1301, −1258, −1240, −1222, −1204, −1186, −1168, −1135, −1117, −1099, −1081, −1063, −1045 | −1283, −1150 |
| 29 | −1513, −1495, −1477, −1459, −1441, −1423, −1390, −1372, −1354, −1336, −1318, −1300, −1257, −1239, −1221, −1203, −1185, −1167, −1134, −1116, −1098, −1080, −1062, −1044 | −1408, −1277 |

TABLE 37-continued

| Identifier of a 26-tone DRU | Index of a data subcarrier | Index of a pilot subcarrier |
|---|---|---|
| 30 | −1512, −1494, −1476, −1458, −1440, −1422, −1389, −1371, −1353, −1335, −1317, −1299, −1256, −1238, −1220, −1202, −1184, −1166, −1133, −1115, −1097, −1079, −1061, −1043 | −1407, −1276 |
| 31 | −1511, −1493, −1475, −1457, −1439, −1421, −1388, −1370, −1352, −1334, −1316, −1298, −1255, −1237, −1219, −1201, −1183, −1165, −1132, −1114, −1096, −1078, −1060, −1042 | −1406, −1275 |
| 32 | −1510, −1492, −1474, −1456, −1438, −1420, −1387, −1369, −1351, −1333, −1315, −1297, −1254, −1236, −1218, −1200, −1182, −1164, −1131, −1113, −1095, −1077, −1059, −1041 | −1405, −1274 |
| 33 | −1509, −1491, −1473, −1455, −1437, −1419, −1386, −1368, −1350, −1332, −1314, −1296, −1253, −1235, −1217, −1199, −1181, −1163, −1130, −1112, −1094, −1076, −1058, −1040 | −1404, −1273 |
| 34 | −1508, −1490, −1472, −1454, −1436, −1418, −1385, −1367, −1349, −1331, −1313, −1295, −1252, −1234, −1216, −1198, −1180, −1162, −1129, −1111, −1093, −1075, −1057, −1039 | −1403, −1272 |
| 35 | −1507, −1489, −1471, −1453, −1435, −1417, −1384, −1366, −1348, −1330, −1312, −1294, −1251, −1233, −1215, −1197, −1179, −1161, −1128, −1110, −1092, −1074, −1056, −1038 | −1402, −1271 |
| 36 | −1506, −1488, −1470, −1452, −1434, −1416, −1383, −1365, −1347, −1329, −1311, −1293, −1250, −1232, −1214, −1196, −1178, −1160, −1127, −1109, −1091, −1073, −1055, −1037 | −1401, −1270 |
| 37 | −1011, −993, −975, −957, −939, −921, −888, −870, −852, −834, −816, −798, −755, −737, −719, −701, −683, −665, −632, −614, −596, −578, −560, −542 | −780, −647 |
| 38 | −1010, −992, −974, −956, −938, −920, −887, −869, −851, −833, −815, −797, −754, −736, −718, −700, −682, −664, −631, −613, −595, −577, −559, −541 | −779, −646 |
| 39 | −1009, −991, −973, −955, −937, −919, −886, −868, −850, −832, −814, −796, −753, −735, −717, −699, −681, −663, −630, −612, −594, −576, −558, −540 | −778, −645 |
| 40 | −1008, −990, −972, −954, −936, −918, −885, −867, −849, −831, −813, −795, −752, −734, −716, −698, −680, −662, −629, −611, −593, −575, −557, −539 | −777, −644 |
| 41 | −1007, −989, −971, −953, −935, −917, −884, −866, −848, −830, −812, −794, −751, −733, −715, −697, −679, −661, −628, −610, −592, −574, −556, −538 | −776, −643 |
| 42 | −1006, −988, −970, −952, −934, −916, −883, −865, −847, −829, −811, −793, −750, −732, −714, −696, −678, −660, −627, −609, −591, −573, −555, −537 | −775, −642 |
| 43 | −1005, −987, −969, −951, −933, −915, −882, −864, −846, −828, −810, −792, −749, −731, −713, −695, −677, −659, −626, −608, −590, −572, −554, −536 | −774, −641 |
| 44 | −1004, −986, −968, −950, −932, −914, −881, −863, −845, −827, −809, −791, −748, −730, −712, −694, −676, −658, −625, −607, −589, −571, −553, −535 | −773, −640 |
| 45 | −1003, −985, −967, −949, −931, −913, −880, −862, −844, −826, −808, −790, −747, −729, −711, −693, −675, −657, −624, −606, −588, −570, −552, −534 | −772, −639 |
| 46 | −1002, −984, −966, −948, −930, −912, −879, −861, −843, −825, −807, −789, −746, −728, −710, −692, −674, −656, −623, −605, −587, −569, −551, −533 | −771, −638 |

TABLE 37-continued

| Identifier of a 26-tone DRU | Index of a data subcarrier | Index of a pilot subcarrier |
|---|---|---|
| 47 | −1001, −983, −965, −947, −929, −911, −878, −860, −842, −824, −806, −788, −745, −727, −709, −691, −673, −655, −622, −604, −586, −568, −550, −532 | −896, −765 |
| 48 | −1000, −982, −964, −946, −928, −910, −877, −859, −841, −823, −805, −787, −744, −726, −708, −690, −672, −654, −621, −603, −585, −567, −549, −531 | −895, −764 |
| 49 | −999, −981, −963, −945, −927, −909, −876, −858, −840, −822, −804, −786, −743, −725, −707, −689, −671, −653, −620, −602, −584, −566, −548, −530 | −894, −763 |
| 50 | −998, −980, −962, −944, −926, −908, −875, −857, −839, −821, −803, −785, −742, −724, −706, −688, −670, −652, −619, −601, −583, −565, −547, −529 | −893, −762 |
| 51 | −997, −979, −961, −943, −925, −907, −874, −856, −838, −820, −802, −784, −741, −723, −705, −687, −669, −651, −618, −600, −582, −564, −546, −528 | −892, −761 |
| 52 | −996, −978, −960, −942, −924, −906, −873, −855, −837, −819, −801, −783, −740, −722, −704, −686, −668, −650, −617, −599, −581, −563, −545, −527 | −891, −760 |
| 53 | −995, −977, −959, −941, −923, −905, −872, −854, −836, −818, −800, −782, −739, −721, −703, −685, −667, −649, −616, −598, −580, −562, −544, −526 | −890, −759 |
| 54 | −994, −976, −958, −940, −922, −904, −871, −853, −835, −817, −799, −781, −738, −720, −702, −684, −666, −648, −615, −597, −579, −561, −543, −525 | −889, −758 |
| 55 | −499, −481, −463, −445, −427, −409, −376, −358, −340, −322, −304, −286, −243, −225, −207, −189, −171, −153, −120, −102, −84, −66, −48, −30 | −268, −135 |
| 56 | −498, −480, −462, −444, −426, −408, −375, −357, −339, −321, −303, −285, −242, −224, −206, −188, −170, −152, −119, −101, −83, −65, −47, −29 | −267, −134 |
| 57 | −497, −479, −461, −443, −425, −407, −374, −356, −338, −320, −302, −284, −241, −223, −205, −187, −169, −151, −118, −100, −82, −64, −46, −28 | −266, −133 |
| 58 | −496, −478, −460, −442, −424, −406, −373, −355, −337, −319, −301, −283, −240, −222, −204, −186, −168, −150, −117, −99, −81, −63, −45, −27 | −265, −132 |
| 59 | −495, −477, −459, −441, −423, −405, −372, −354, −336, −318, −300, −282, −239, −221, −203, −185, −167, −149, −116, −98, −80, −62, −44, −26 | −264, −131 |
| 60 | −494, −476, −458, −440, −422, −404, −371, −353, −335, −317, −299, −281, −238, −220, −202, −184, −166, −148, −115, −97, −79, −61, −43, −25 | −263, −130 |
| 61 | −493, −475, −457, −439, −421, −403, −370, −352, −334, −316, −298, −280, −237, −219, −201, −183, −165, −147, −114, −96, −78, −60, −42, −24 | −262, −129 |
| 62 | −492, −474, −456, −438, −420, −402, −369, −351, −333, −315, −297, −279, −236, −218, −200, −182, −164, −146, −113, −95, −77, −59, −41, −23 | −261, −128 |
| 63 | −491, −473, −455, −437, −419, −401, −368, −350, −332, −314, −296, −278, −235, −217, −199, −181, −163, −145, −112, −94, −76, −58, −40, −22 | −260, −127 |
| 64 | −490, −472, −454, −436, −418, −400, −367, −349, −331, −313, −295, −277, −234, −216, −198, −180, −162, −144, −111, −93, −75, −57, −39, −21 | −259, −126 |

TABLE 37-continued

| Identifier of a 26-tone DRU | Index of a data subcarrier | Index of a pilot subcarrier |
| --- | --- | --- |
| 65 | −489, −471, −453, −435, −417, −399, −366, −348, −330, −312, −294, −276, −233, −215, −197, −179, −161, −143, −110, −92, −74, −56, −38, −20 | −384, −253 |
| 66 | −488, −470, −452, −434, −416, −398, −365, −347, −329, −311, −293, −275, −232, −214, −196, −178, −160, −142, −109, −91, −73, −55, −37, −19 | −383, −252 |
| 67 | −487, −469, −451, −433, −415, −397, −364, −346, −328, −310, −292, −274, −231, −213, −195, −177, −159, −141, −108, −90, −72, −54, −36, −18 | −382, −251 |
| 68 | −486, −468, −450, −432, −414, −396, −363, −345, −327, −309, −291, −273, −230, −212, −194, −176, −158, −140, −107, −89, −71, −53, −35, −17 | −381, −250 |
| 69 | −485, −467, −449, −431, −413, −395, −362, −344, −326, −308, −290, −272, −229, −211, −193, −175, −157, −139, −106, −88, −70, −52, −34, −16 | −380, −249 |
| 70 | −484, −466, −448, −430, −412, −394, −361, −343, −325, −307, −289, −271, −228, −210, −192, −174, −156, −138, −105, −87, −69, −51, −33, −15 | −379, −248 |
| 71 | −483, −465, −447, −429, −411, −393, −360, −342, −324, −306, −288, −270, −227, −209, −191, −173, −155, −137, −104, −86, −68, −50, −32, −14 | −378, −247 |
| 72 | −482, −464, −446, −428, −410, −392, −359, −341, −323, −305, −287, −269, −226, −208, −190, −172, −154, −136, −103, −85, −67, −49, −31, −13 | −377, −246 |
| 73 | 13, 31, 49, 67, 85, 103, 136, 154, 172, 190, 208, 226, 269, 287, 305, 323, 341, 359, 392, 410, 428, 446, 464, 482 | 244, 377 |
| 74 | 14, 32, 50, 68, 86, 104, 137, 155, 173, 191, 209, 227, 270, 288, 306, 324, 342, 360, 393, 411, 429, 447, 465, 483 | 245, 378 |
| 75 | 15, 33, 51, 69, 87, 105, 138, 156, 174, 192, 210, 228, 271, 289, 307, 325, 343, 361, 394, 412, 430, 448, 466, 484 | 246, 379 |
| 76 | 16, 34, 52, 70, 88, 106, 139, 157, 175, 193, 211, 229, 272, 290, 308, 326, 344, 362, 395, 413, 431, 449, 467, 485 | 247, 380 |
| 77 | 17, 35, 53, 71, 89, 107, 140, 158, 176, 194, 212, 230, 273, 291, 309, 327, 345, 363, 396, 414, 432, 450, 468, 486 | 248, 381 |
| 78 | 18, 36, 54, 72, 90, 108, 141, 159, 177, 195, 213, 231, 274, 292, 310, 328, 346, 364, 397, 415, 433, 451, 469, 487 | 249, 382 |
| 79 | 19, 37, 55, 73, 91, 109, 142, 160, 178, 196, 214, 232, 275, 293, 311, 329, 347, 365, 398, 416, 434, 452, 470, 488 | 250, 383 |
| 80 | 20, 38, 56, 74, 92, 110, 143, 161, 179, 197, 215, 233, 276, 294, 312, 330, 348, 366, 399, 417, 435, 453, 471, 489 | 251, 384 |
| 81 | 21, 39, 57, 75, 93, 111, 144, 162, 180, 198, 216, 234, 277, 295, 313, 331, 349, 367, 400, 418, 436, 454, 472, 490 | 252, 385 |
| 82 | 22, 40, 58, 76, 94, 112, 145, 163, 181, 199, 217, 235, 278, 296, 314, 332, 350, 368, 401, 419, 437, 455, 473, 491 | 253, 386 |
| 83 | 23, 41, 59, 77, 95, 113, 146, 164, 182, 200, 218, 236, 279, 297, 315, 333, 351, 369, 402, 420, 438, 456, 474, 492 | 128, 259 |
| 84 | 24, 42, 60, 78, 96, 114, 147, 165, 183, 201, 219, 237, 280, 298, 316, 334, 352, 370, 403, 421, 439, 457, 475, 493 | 129, 260 |
| 85 | 25, 43, 61, 79, 97, 115, 148, 166, 184, 202, 220, 238, 281, 299, 317, 335, 353, 371, 404, 422, 440, 458, 476, 494 | 130, 261 |
| 86 | 26, 44, 62, 80, 98, 116, 149, 167, 185, 203, 221, 239, 282, 300, 318, 336, 354, 372, 405, 423, 441, 459, 477, 495 | 131, 262 |

TABLE 37-continued

| Identifier of a 26-tone DRU | Index of a data subcarrier | Index of a pilot subcarrier |
| --- | --- | --- |
| 87 | 27, 45, 63, 81, 99, 117, 150, 168, 186, 204, 222, 240, 283, 301, 319, 337, 355, 373, 406, 424, 442, 460, 478, 496 | 132, 263 |
| 88 | 28, 46, 64, 82, 100, 118, 151, 169, 187, 205, 223, 241, 284, 302, 320, 338, 356, 374, 407, 425, 443, 461, 479, 497 | 133, 264 |
| 89 | 29, 47, 65, 83, 101, 119, 152, 170, 188, 206, 224, 242, 285, 303, 321, 339, 357, 375, 408, 426, 444, 462, 480, 498 | 134, 265 |
| 90 | 30, 48, 66, 84, 102, 120, 153, 171, 189, 207, 225, 243, 286, 304, 322, 340, 358, 376, 409, 427, 445, 463, 481, 499 | 135, 266 |
| 91 | 525, 543, 561, 579, 597, 615, 648, 666, 684, 702, 720, 738, 781, 799, 817, 835, 853, 871, 904, 922, 940, 958, 976, 994 | 756, 889 |
| 92 | 526, 544, 562, 580, 598, 616, 649, 667, 685, 703, 721, 739, 782, 800, 818, 836, 854, 872, 905, 923, 941, 959, 977, 995 | 757, 890 |
| 93 | 527, 545, 563, 581, 599, 617, 650, 668, 686, 704, 722, 740, 783, 801, 819, 837, 855, 873, 906, 924, 942, 960, 978, 996 | 758, 891 |
| 94 | 528, 546, 564, 582, 600, 618, 651, 669, 687, 705, 723, 741, 784, 802, 820, 838, 856, 874, 907, 925, 943, 961, 979, 997 | 759, 892 |
| 95 | 529, 547, 565, 583, 601, 619, 652, 670, 688, 706, 724, 742, 785, 803, 821, 839, 857, 875, 908, 926, 944, 962, 980, 998 | 760, 893 |
| 96 | 530, 548, 566, 584, 602, 620, 653, 671, 689, 707, 725, 743, 786, 804, 822, 840, 858, 876, 909, 927, 945, 963, 981, 999 | 761, 894 |
| 97 | 531, 549, 567, 585, 603, 621, 654, 672, 690, 708, 726, 744, 787, 805, 823, 841, 859, 877, 910, 928, 946, 964, 982, 1000 | 762, 895 |
| 98 | 532, 550, 568, 586, 604, 622, 655, 673, 691, 709, 727, 745, 788, 806, 824, 842, 860, 878, 911, 929, 947, 965, 983, 1001 | 763, 896 |
| 99 | 533, 551, 569, 587, 605, 623, 656, 674, 692, 710, 728, 746, 789, 807, 825, 843, 861, 879, 912, 930, 948, 966, 984, 1002 | 764, 897 |
| 100 | 534, 552, 570, 588, 606, 624, 657, 675, 693, 711, 729, 747, 790, 808, 826, 844, 862, 880, 913, 931, 949, 967, 985, 1003 | 765, 898 |
| 101 | 535, 553, 571, 589, 607, 625, 658, 676, 694, 712, 730, 748, 791, 809, 827, 845, 863, 881, 914, 932, 950, 968, 986, 1004 | 640, 771 |
| 102 | 536, 554, 572, 590, 608, 626, 659, 677, 695, 713, 731, 749, 792, 810, 828, 846, 864, 882, 915, 933, 951, 969, 987, 1005 | 641, 772 |
| 103 | 537, 555, 573, 591, 609, 627, 660, 678, 696, 714, 732, 750, 793, 811, 829, 847, 865, 883, 916, 934, 952, 970, 988, 1006 | 642, 773 |
| 104 | 538, 556, 574, 592, 610, 628, 661, 679, 697, 715, 733, 751, 794, 812, 830, 848, 866, 884, 917, 935, 953, 971, 989, 1007 | 643, 774 |
| 105 | 539, 557, 575, 593, 611, 629, 662, 680, 698, 716, 734, 752, 795, 813, 831, 849, 867, 885, 918, 936, 954, 972, 990, 1008 | 644, 775 |
| 106 | 540, 558, 576, 594, 612, 630, 663, 681, 699, 717, 735, 753, 796, 814, 832, 850, 868, 886, 919, 937, 955, 973, 991, 1009 | 645, 776 |
| 107 | 541, 559, 577, 595, 613, 631, 664, 682, 700, 718, 736, 754, 797, 815, 833, 851, 869, 887, 920, 938, 956, 974, 992, 1010 | 646, 777 |
| 108 | 542, 560, 578, 596, 614, 632, 665, 683, 701, 719, 737, 755, 798, 816, 834, 852, 870, 888, 921, 939, 957, 975, 993, 1011 | 647, 778 |
| 109 | 1037, 1055, 1073, 1091, 1109, 1127, 1160, 1178, 1196, 1214, 1232, 1250, 1293, 1311, 1329, 1347, 1365, 1383, 1416, 1434, 1452, 1470, 1488, 1506 | 1268, 1401 |
| 110 | 1038, 1056, 1074, 1092, 1110, 1128, 1161, 1179, 1197, 1215, 1233, 1251, 1294, 1312, 1330, 1348, 1366, 1384, 1417, 1435, 1453, 1471, 1489, 1507 | 1269, 1402 |

TABLE 37-continued

| Identifier of a 26-tone DRU | Index of a data subcarrier | Index of a pilot subcarrier |
|---|---|---|
| 111 | 1039, 1057, 1075, 1093, 1111, 1129, 1162, 1180, 1198, 1216, 1234, 1252, 1295, 1313, 1331, 1349, 1367, 1385, 1418, 1436, 1454, 1472, 1490, 1508 | 1270, 1403 |
| 112 | 1040, 1058, 1076, 1094, 1112, 1130, 1163, 1181, 1199, 1217, 1235, 1253, 1296, 1314, 1332, 1350, 1368, 1386, 1419, 1437, 1455, 1473, 1491, 1509 | 1271, 1404 |
| 113 | 1041, 1059, 1077, 1095, 1113, 1131, 1164, 1182, 1200, 1218, 1236, 1254, 1297, 1315, 1333, 1351, 1369, 1387, 1420, 1438, 1456, 1474, 1492, 1510 | 1272, 1405 |
| 114 | 1042, 1060, 1078, 1096, 1114, 1132, 1165, 1183, 1201, 1219, 1237, 1255, 1298, 1316, 1334, 1352, 1370, 1388, 1421, 1439, 1457, 1475, 1493, 1511 | 1273, 1406 |
| 115 | 1043, 1061, 1079, 1097, 1115, 1133, 1166, 1184, 1202, 1220, 1238, 1256, 1299, 1317, 1335, 1353, 1371, 1389, 1422, 1440, 1458, 1476, 1494, 1512 | 1274, 1407 |
| 116 | 1044, 1062, 1080, 1098, 1116, 1134, 1167, 1185, 1203, 1221, 1239, 1257, 1300, 1318, 1336, 1354, 1372, 1390, 1423, 1441, 1459, 1477, 1495, 1513 | 1275, 1408 |
| 117 | 1045, 1063, 1081, 1099, 1117, 1135, 1168, 1186, 1204, 1222, 1240, 1258, 1301, 1319, 1337, 1355, 1373, 1391, 1424, 1442, 1460, 1478, 1496, 1514 | 1276, 1409 |
| 118 | 1046, 1064, 1082, 1100, 1118, 1136, 1169, 1187, 1205, 1223, 1241, 1259, 1302, 1320, 1338, 1356, 1374, 1392, 1425, 1443, 1461, 1479, 1497, 1515 | 1277, 1410 |
| 119 | 1047, 1065, 1083, 1101, 1119, 1137, 1170, 1188, 1206, 1224, 1242, 1260, 1303, 1321, 1339, 1357, 1375, 1393, 1426, 1444, 1462, 1480, 1498, 1516 | 1152, 1283 |
| 120 | 1048, 1066, 1084, 1102, 1120, 1138, 1171, 1189, 1207, 1225, 1243, 1261, 1304, 1322, 1340, 1358, 1376, 1394, 1427, 1445, 1463, 1481, 1499, 1517 | 1153, 1284 |
| 121 | 1049, 1067, 1085, 1103, 1121, 1139, 1172, 1190, 1208, 1226, 1244, 1262, 1305, 1323, 1341, 1359, 1377, 1395, 1428, 1446, 1464, 1482, 1500, 1518 | 1154, 1285 |
| 122 | 1050, 1068, 1086, 1104, 1122, 1140, 1173, 1191, 1209, 1227, 1245, 1263, 1306, 1324, 1342, 1360, 1378, 1396, 1429, 1447, 1465, 1483, 1501, 1519 | 1155, 1286 |
| 123 | 1051, 1069, 1087, 1105, 1123, 1141, 1174, 1192, 1210, 1228, 1246, 1264, 1307, 1325, 1343, 1361, 1379, 1397, 1430, 1448, 1466, 1484, 1502, 1520 | 1156, 1287 |
| 124 | 1052, 1070, 1088, 1106, 1124, 1142, 1175, 1193, 1211, 1229, 1247, 1265, 1308, 1326, 1344, 1362, 1380, 1398, 1431, 1449, 1467, 1485, 1503, 1521 | 1157, 1288 |
| 125 | 1053, 1071, 1089, 1107, 1125, 1143, 1176, 1194, 1212, 1230, 1248, 1266, 1309, 1327, 1345, 1363, 1381, 1399, 1432, 1450, 1468, 1486, 1504, 1522 | 1158, 1289 |
| 126 | 1054, 1072, 1090, 1108, 1126, 1144, 1177, 1195, 1213, 1231, 1249, 1267, 1310, 1328, 1346, 1364, 1382, 1400, 1433, 1451, 1469, 1487, 1505, 1523 | 1159, 1290 |
| 127 | 1549, 1567, 1585, 1603, 1621, 1639, 1672, 1690, 1708, 1726, 1744, 1762, 1805, 1823, 1841, 1859, 1877, 1895, 1928, 1946, 1964, 1982, 2000, 2018 | 1780, 1913 |
| 128 | 1550, 1568, 1586, 1604, 1622, 1640, 1673, 1691, 1709, 1727, 1745, 1763, 1806, 1824, 1842, 1860, 1878, 1896, 1929, 1947, 1965, 1983, 2001, 2019 | 1781, 1914 |
| 129 | 1551, 1569, 1587, 1605, 1623, 1641, 1674, 1692, 1710, 1728, 1746, 1764, 1807, 1825, 1843, 1861, 1879, 1897, 1930, 1948, 1966, 1984, 2002, 2020 | 1782, 1915 |
| 130 | 1552, 1570, 1588, 1606, 1624, 1642, 1675, 1693, 1711, 1729, 1747, 1765, 1808, 1826, 1844, 1862, 1880, 1898, 1931, 1949, 1967, 1985, 2003, 2021 | 1783, 1916 |
| 131 | 1553, 1571, 1589, 1607, 1625, 1643, 1676, 1694, 1712, 1730, 1748, 1766, 1809, 1827, 1845, 1863, 1881, 1899, 1932, 1950, 1968, 1986, 2004, 2022 | 1784, 1917 |
| 132 | 1554, 1572, 1590, 1608, 1626, 1644, 1677, 1695, 1713, 1731, 1749, 1767, 1810, 1828, 1846, 1864, 1882, 1900, 1933, 1951, 1969, 1987, 2005, 2023 | 1785, 1918 |
| 133 | 1555, 1573, 1591, 1609, 1627, 1645, 1678, 1696, 1714, 1732, 1750, 1768, 1811, 1829, 1847, 1865, 1883, 1901, 1934, 1952, 1970, 1988, 2006, 2024 | 1786, 1919 |
| 134 | 1556, 1574, 1592, 1610, 1628, 1646, 1679, 1697, 1715, 1733, 1751, 1769, 1812, 1830, 1848, 1866, 1884, 1902, 1935, 1953, 1971, 1989, 2007, 2025 | 1787, 1920 |
| 135 | 1557, 1575, 1593, 1611, 1629, 1647, 1680, 1698, 1716, 1734, 1752, 1770, 1813, 1831, 1849, 1867, 1885, 1903, 1936, 1954, 1972, 1990, 2008, 2026 | 1788, 1921 |
| 136 | 1558, 1576, 1594, 1612, 1630, 1648, 1681, 1699, 1717, 1735, 1753, 1771, 1814, 1832, 1850, 1868, 1886, 1904, 1937, 1955, 1973, 1991, 2009, 2027 | 1789, 1922 |
| 137 | 1559, 1577, 1595, 1613, 1631, 1649, 1682, 1700, 1718, 1736, 1754, 1772, 1815, 1833, 1851, 1869, 1887, 1905, 1938, 1956, 1974, 1992, 2010, 2028 | 1664, 1795 |
| 138 | 1560, 1578, 1596, 1614, 1632, 1650, 1683, 1701, 1719, 1737, 1755, 1773, 1816, 1834, 1852, 1870, 1888, 1906, 1939, 1957, 1975, 1993, 2011, 2029 | 1665, 1796 |
| 139 | 1561, 1579, 1597, 1615, 1633, 1651, 1684, 1702, 1720, 1738, 1756, 1774, 1817, 1835, 1853, 1871, 1889, 1907, 1940, 1958, 1976, 1994, 2012, 2030 | 1666, 1797 |
| 140 | 1562, 1580, 1598, 1616, 1634, 1652, 1685, 1703, 1721, 1739, 1757, 1775, 1818, 1836, 1854, 1872, 1890, 1908, 1941, 1959, 1977, 1995, 2013, 2031 | 1667, 1798 |
| 141 | 1563, 1581, 1599, 1617, 1635, 1653, 1686, 1704, 1722, 1740, 1758, 1776, 1819, 1837, 1855, 1873, 1891, 1909, 1942, 1960, 1978, 1996, 2014, 2032 | 1668, 1799 |
| 142 | 1564, 1582, 1600, 1618, 1636, 1654, 1687, 1705, 1723, 1741, 1759, 1777, 1820, 1838, 1856, 1874, 1892, 1910, 1943, 1961, 1979, 1997, 2015, 2033 | 1669, 1800 |
| 143 | 1565, 1583, 1601, 1619, 1637, 1655, 1688, 1706, 1724, 1742, 1760, 1778, 1821, 1839, 1857, 1875, 1893, 1911, 1944, 1962, 1980, 1998, 2016, 2034 | 1670, 1801 |
| 144 | 1566, 1584, 1602, 1620, 1638, 1656, 1689, 1707, 1725, 1743, 1761, 1779, 1822, 1840, 1858, 1876, 1894, 1912, 1945, 1963, 1981, 1999, 2017, 2035 | 1671, 1802 |

As shown in Table 37, the 144 26-tone DRUs corresponding to the 320 MHz bandwidth include 72 high-frequency 26-tone DRUs and 72 low-frequency 26-tone DRUs, where subcarrier indices of 26 subcarriers in a high-frequency 26-tone DRU are all positive values, and subcarrier indices of 26 subcarriers in a low-frequency 26-tone DRU are all negative values.

Each 26-tone DRU includes 24 data subcarriers. If every six data subcarriers of the 24 data subcarriers are considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33.

In other words, it is assumed that indices of 24 data subcarriers included in each 26-tone DRU are sequentially arranged in a frequency direction and then divided into four groups, and each group includes six data subcarriers. Six data subcarriers in a same group are equally spaced. Specifically, a quantity of subcarriers between every two adjacent data subcarriers in a same group is 17.

In addition, in every 18 26-tone DRUs, there is a fixed offset between indices of data subcarriers included in two 26-tone DRUs having adjacent identifiers, and the fixed offset is 1. Specifically, indices of 24 data subcarriers in a 26-tone DRU whose identifier is i (i=1 to 17, 19 to 35, 37 to 53, 55 to 71, 73 to 89, 91 to 107, 109 to 125, or 127 to 143) all plus 1, to obtain indices of 24 data subcarriers in a 26-tone DRU whose identifier is i+1. In addition, there is an offset 495 between 18 different 26-tone DRUs, that is, between a 26-tone DRU whose identifier is 18×n (n=1, 2, 3, 4, 5, 6, or 7) and a 26-tone DRU whose identifier is 18×n+1.

In Table 37, the identifier of the 26-tone DRU may be based on an index of a lowest-frequency subcarrier included in the 26-tone DRU. In other words, an identifier of a 26-tone DRU having a data subcarrier with a minimum value index is 1. As shown in Table 37, in all data subcarriers in the "index of a data subcarrier" column, a minimum value index is −2035. Therefore, an identifier of a 26-tone DRU in which the subcarrier is located is 1. In addition, a minimum value index other than that of the 26-tone DRU whose identifier is 1 is −2034. Therefore, the identifier of the 26-tone DRU in which the subcarrier is located is 2.

It may be understood that although the lowest-frequency index shown in Table 37 is −2035, the value is merely an example. For example, the value may be any integer from −2042 to −2030.

As shown in Table 37, each 26-tone DRU further includes two pilot subcarriers. For 26-tone DRUs whose identifiers are 1 to 10, 19 to 28, 37 to 46, 55 to 64, 73 to 82, 91 to 100, 109 to 118, or 127 to 136, an absolute value of an index difference between two pilot subcarriers in a same 26-tone DRU is 133. For 26-tone DRUs whose identifiers are 11 to 18, 29 to 36, 47 to 54, 65 to 72, 83 to 90, 101 to 108, 119 to 126, or 137 to 144, an absolute value of an index difference between two pilot subcarriers in a same 26-tone DRU is 131.

As shown in Table 37, indices of two pilot subcarriers in a 26-tone DRU whose identifier is i (i=1 to 9, 11 to 17, 19 to 27, 29 to 35, 37 to 45, 47 to 53, 55 to 63, 65 to 71, 73 to 81, 83 to 89, 91 to 99, 101 to 107, 109 to 117, 119 to 125, 127 to 135, or 137 to 143) all plus 1, to obtain indices of two pilot subcarriers in a 26-tone DRU whose identifier is i+1, that is, a fixed offset is 1.

In an embodiment of this disclosure, for the 320 MHz bandwidth, a manner of determining two pilot subcarriers in a 26-tone DRU is similar to the foregoing manner of determining the two pilot subcarriers in the 26-tone DRU for the 40 MHz bandwidth. The pilot subcarriers shown in Table 37 implement full discretization of pilot subcarriers in a same DRU, thereby implementing frequency domain diversity. Details are not described herein again.

It may be understood that the pilot subcarriers shown in Table 37 are merely examples, and other pilot subcarriers may alternatively be used. For example, spacings between two pilot subcarriers in different 26-tone DRUs may be unequal to each other.

In this way, for the 320 MHz bandwidth, through the design of the 26-tone DRU shown in Table 37, compared with the continuous 26-tone RU in the 320 MHz obtained based on the 80 MHz in FIG. 3, at a same power spectral density, this embodiment of this disclosure can implement a maximum power amplification multiple, specifically, 13.

The foregoing describes a tone plan solution of the 26-tone DRU in the 320 MHz bandwidth with reference to Table 37. The solution is merely an example. A person skilled in the art may obtain another solution on this basis. For example, the lowest-frequency index is no longer −2035 but another value. For example, an index of a pilot subcarrier is determined by using another solution. In addition, the tone plan of other DRUs described below in this disclosure may also be similarly varied, and these variations are not described below for each DRU.

In a tone plan solution of a DRU, the 320 MHz bandwidth includes 64 52-tone DRUs, and each 52-tone DRU includes 48 data subcarriers and four pilot subcarriers. For example, Table 38 shows an example of 64 52-tone DRUs corresponding to the 320 MHz bandwidth, and shows indices of 48 data subcarriers and indices of four pilot subcarriers included in each 52-tone DRU, and a lowest-frequency index of a data subcarrier in a 52-tone DRU whose identifier is 1 is −2035.

TABLE 38

| Identifier of a 52-tone DRU | Index of a data subcarrier | Index of a pilot subcarrier |
|---|---|---|
| 1 | −2035, −2017, −1999, −1981, −1963, −1945, −1912, −1894, −1876, −1858, −1840, −1822, −1779, −1761, −1743, −1725, −1707, −1689, −1656, −1638, −1620, −1602, −1584, −1566, 13, 31, 49, 67, 85, 103, 136, 154, 172, 190, 208, 226, 269, 287, 305, 323, 341, 359, 392, 410, 428, 446, 464, 482 | −1804, −1671, 244, 377 |
| 2 | −2034, −2016, −1998, −1980, −1962, −1944, −1911, −1893, −1875, −1857, −1839, −1821, −1778, −1760, −1742, −1724, −1706, −1688, −1655, −1637, −1619, −1601, −1583, −1565, 14, 32, 50, 68, 86, 104, 137, 155, 173, 191, 209, 227, 270, 288, 306, 324, 342, 360, 393, 411, 429, 447, 465, 483 | −1803, 1670, 245, 378 |

TABLE 38-continued

| Identifier of a 52-tone DRU | Index of a data subcarrier | Index of a pilot subcarrier |
|---|---|---|
| 3 | −2033, −2015, −1997, −1979, −1961, −1943, −1910, −1892, −1874, −1856, −1838, −1820, −1777, −1759, −1741, −1723, −1705, −1687, −1654, −1636, −1618, −1600, −1582, −1564, 15, 33, 51, 69, 87, 105, 138, 156, 174, 192, 210, 228, 271, 289, 307, 325, 343, 361, 394, 412, 430, 448, 466, 484 | −1802, −1669, 246, 379 |
| 4 | −2032, −2014, −1996, −1978, −1960, −1942, −1909, −1891, −1873, −1855, −1837, −1819, −1776, −1758, −1740, −1722, −1704, −1686, −1653, −1635, −1617, −1599, −1581, −1563, 16, 34, 52, 70, 88, 106, 139, 157, 175, 193, 211, 229, 272, 290, 308, 326, 344, 362, 395, 413, 431, 449, 467, 485 | −1801, −1668, 247, 380 |
| 5 | −2030, −2012, −1994, −1976, −1958, −1940, −1907, −1889, −1871, −1853, −1835, −1817, −1774, −1756, −1738, −1720, −1702, −1684, −1651, −1633, −1615, −1597, −1579, −1561, 18, 36, 54, 72, 90, 108, 141, 159, 177, 195, 213, 231, 274, 292, 310, 328, 346, 364, 397, 415, 433, 451, 469, 487 | −1799, −1666, 249, 382 |
| 6 | −2029, −2011, −1993, −1975, −1957, −1939, −1906, −1888, −1870, −1852, −1834, −1816, −1773, −1755, −1737, −1719, −1701, −1683, −1650, −1632, −1614, −1596, −1578, −1560, 19, 37, 55, 73, 91, 109, 142, 160, 178, 196, 214, 232, 275, 293, 311, 329, 347, 365, 398, 416, 434, 452, 470, 488 | −1798, −1665, 250, 383 |
| 7 | −2028, −2010, −1992, −1974, −1956, −1938, −1905, −1887, −1869, −1851, −1833, −1815, −1772, −1754, −1736, −1718, −1700, −1682, −1649, −1631, −1613, −1595, −1577, −1559, 20, 38, 56, 74, 92, 110, 143, 161, 179, 197, 215, 233, 276, 294, 312, 330, 348, 366, 399, 417, 435, 453, 471, 489 | −1797, −1664, 251, 384 |
| 8 | −2027, −2009, −1991, −1973, −1955, −1937, −1904, −1886, −1868, −1850, −1832, −1814, −1771, −1753, −1735, −1717, −1699, −1681, −1648, −1630, −1612, −1594, −1576, −1558, 21, 39, 57, 75, 93, 111, 144, 162, 180, 198, 216, 234, 277, 295, 313, 331, 349, 367, 400, 418, 436, 454, 472, 490 | −1796, −1663, 252, 385 |
| 9 | −2026, −2008, −1990, −1972, −1954, −1936, −1903, −1885, −1867, −1849, −1831, −1813, −1770, −1752, −1734, −1716, −1698, −1680, −1647, −1629, −1611, −1593, −1575, −1557, 22, 40, 58, 76, 94, 112, 145, 163, 181, 199, 217, 235, 278, 296, 314, 332, 350, 368, 401, 419, 437, 455, 473, 491 | −1795, −1662, 253, 386 |
| 10 | −2025, −2007, −1989, −1971, −1953, −1935, −1902, −1884, −1866, −1848, −1830, −1812, −1769, −1751, −1733, −1715, −1697, −1679, −1646, −1628, −1610, −1592, −1574, −1556, 23, 41, 59, 77, 95, 113, 146, 164, 182, 200, 218, 236, 279, 297, 315, 333, 351, 369, 402, 420, 438, 456, 474, 492 | −1920, −1789, 128, 259 |
| 11 | −2024, −2006, −1988, −1970, −1952, −1934, −1901, −1883, −1865, −1847, −1829, −1811, −1768, −1750, −1732, −1714, −1696, −1678, −1645, −1627, −1609, −1591, −1573, −1555, 24, 42, 60, 78, 96, 114, 147, 165, 183, 201, 219, 237, 280, 298, 316, 334, 352, 370, 403, 421, 439, 457, 475, 493 | −1919, −1788, 129, 260 |
| 12 | −2023, −2005, −1987, −1969, −1951, −1933, −1900, −1882, −1864, −1846, −1828, −1810, −1767, −1749, −1731, −1713, −1695, −1677, −1644, −1626, −1608, −1590, −1572, −1554, 25, 43, 61, 79, 97, 115, 148, 166, 184, 202, 220, 238, 281, 299, 317, 335, 353, 371, 404, 422, 440, 458, 476, 494 | −1918, −1787, 130, 261 |
| 13 | −2021, −2003, −1985, −1967, −1949, −1931, −1898, −1880, −1862, −1844, −1826, −1808, −1765, −1747, −1729, −1711, −1693, −1675, −1642, −1624, −1606, −1588, −1570, −1552, 27, 45, 63, 81, 99, 117, 150, 168, 186, 204, 222, 240, 283, 301, 319, 337, 355, 373, 406, 424, 442, 460, 478, 496 | −1916, −1785, 132, 263 |
| 14 | −2020, −2002, −1984, −1966, −1948, −1930, −1897, −1879, −1861, −1843, −1825, −1807, −1764, −1746, −1728, −1710, −1692, −1674, −1641, −1623, −1605, −1587, −1569, −1551, 28, 46, 64, 82, 100, 118, 151, 169, 187, 205, 223, 241, 284, 302, 320, 338, 356, 374, 407, 425, 443, 461, 479, 497 | −1915, −1784, 133, 264 |
| 15 | −2019, −2001, −1983, −1965, −1947, −1929, −1896, −1878, −1860, −1842, −1824, −1806, −1763, −1745, −1727, −1709, −1691, −1673, −1640, −1622, −1604, −1586, −1568, −1550, 29, 47, 65, 83, 101, 119, 152, 170, 188, 206, 224, 242, 285, 303, 321, 339, 357, 375, 408, 426, 444, 462, 480, 498 | −1914, −1783, 134, 265 |
| 16 | −2018, −2000, −1982, −1964, −1946, −1928, −1895, −1877, −1859, −1841, −1823, −1805, −1762, −1744, −1726, −1708, −1690, −1672, −1639, −1621, −1603, −1585, −1567, −1549, 30, 48, 66, 84, 102, 120, 153, 171, 189, 207, 225, 243, 286, 304, 322, 340, 358, 376, 409, 427, 445, 463, 481, 499 | −1913, −1782, 135, 266 |
| 17 | −1523, −1505, −1487, −1469, −1451, −1433, −1400, −1382, −1364, −1346, −1328, −1310, −1267, −1249, −1231, −1213, −1195, −1177, −1144, −1126, −1108, −1090, −1072, −1054, 525, 543, 561, 579, 597, 615, 648, 666, 684, 702, 720, 738, 781, 799, 817, 835, 853, 871, 904, 922, 940, 958, 976, 994 | −1292, −1159, 756, 889 |

TABLE 38-continued

| Identifier of a 52-tone DRU | Index of a data subcarrier | Index of a pilot subcarrier |
|---|---|---|
| 18 | −1522, −1504, −1486, −1468, −1450, −1432, −1399, −1381, −1363, −1345, −1327, −1309, −1266, −1248, −1230, −1212, −1194, −1176, −1143, −1125, −1107, −1089, −1071, −1053, 526, 544, 562, 580, 598, 616, 649, 667, 685, 703, 721, 739, 782, 800, 818, 836, 854, 872, 905, 923, 941, 959, 977, 995 | −1291, −1158, 757, 890 |
| 19 | −1521, −1503, −1485, −1467, −1449, −1431, −1398, −1380, −1362, −1344, −1326, −1308, −1265, −1247, −1229, −1211, −1193, −1175, −1142, −1124, −1106, −1088, −1070, −1052, 527, 545, 563, 581, 599, 617, 650, 668, 686, 704, 722, 740, 783, 801, 819, 837, 855, 873, 906, 924, 942, 960, 978, 996 | −1290, −1157, 758, 891 |
| 20 | −1520, −1502, −1484, −1466, −1448, −1430, −1397, −1379, −1361, −1343, −1325, −1307, −1264, −1246, −1228, −1210, −1192, −1174, −1141, −1123, −1105, −1087, −1069, −1051, 528, 546, 564, 582, 600, 618, 651, 669, 687, 705, 723, 741, 784, 802, 820, 838, 856, 874, 907, 925, 943, 961, 979, 997 | −1289, −1156, 759, 892 |
| 21 | −1518, −1500, −1482, −1464, −1446, −1428, −1395, −1377, −1359, −1341, −1323, −1305, −1262, −1244, −1226, −1208, −1190, −1172, −1139, −1121, −1103, −1085, −1067, −1049, 530, 548, 566, 584, 602, 620, 653, 671, 689, 707, 725, 743, 786, 804, 822, 840, 858, 876, 909, 927, 945, 963, 981, 999 | −1287, −1154, 761, 894 |
| 22 | −1517, −1499, −1481, −1463, −1445, −1427, −1394, −1376, −1358, −1340, −1322, −1304, −1261, −1243, −1225, −1207, −1189, −1171, −1138, −1120, −1102, −1084, −1066, −1048, 531, 549, 567, 585, 603, 621, 654, 672, 690, 708, 726, 744, 787, 805, 823, 841, 859, 877, 910, 928, 946, 964, 982, 1000 | −1286, −1153, 762, 895 |
| 23 | −1516, −1498, −1480, −1462, −1444, −1426, −1393, −1375, −1357, −1339, −1321, −1303, −1260, −1242, −1224, −1206, −1188, −1170, −1137, −1119, −1101, −1083, −1065, −1047, 532, 550, 568, 586, 604, 622, 655, 673, 691, 709, 727, 745, 788, 806, 824, 842, 860, 878, 911, 929, 947, 965, 983, 1001 | −1285, −1152, 763, 896 |
| 24 | −1515, −1497, −1479, −1461, −1443, −1425, −1392, −1374, −1356, −1338, −1320, −1302, −1259, −1241, −1223, −1205, −1187, −1169, −1136, −1118, −1100, −1082, −1064, −1046, 533, 551, 569, 587, 605, 623, 656, 674, 692, 710, 728, 746, 789, 807, 825, 843, 861, 879, 912, 930, 948, 966, 984, 1002 | −1284, −1151, 764, 897 |
| 25 | −1514, −1496, −1478, −1460, −1442, −1424, −1391, −1373, −1355, −1337, −1319, −1301, −1258, −1240, −1222, −1204, −1186, −1168, −1135, −1117, −1099, −1081, −1063, −1045, 534, 552, 570, 588, 606, 624, 657, 675, 693, 711, 729, 747, 790, 808, 826, 844, 862, 880, 913, 931, 949, 967, 985, 1003 | −1283, −1150, 765, 898 |
| 26 | −1513, −1495, −1477, −1459, −1441, −1423, −1390, −1372, −1354, −1336, −1318, −1300, −1257, −1239, −1221, −1203, −1185, −1167, −1134, −1116, −1098, −1080, −1062, −1044, 535, 553, 571, 589, 607, 625, 658, 676, 694, 712, 730, 748, 791, 809, 827, 845, 863, 881, 914, 932, 950, 968, 986, 1004 | −1408, −1277, 640, 771 |
| 27 | −1512, −1494, −1476, −1458, −1440, −1422, −1389, −1371, −1353, −1335, −1317, −1299, −1256, −1238, −1220, −1202, −1184, −1166, −1133, −1115, −1097, −1079, −1061, −1043, 536, 554, 572, 590, 608, 626, 659, 677, 695, 713, 731, 749, 792, 810, 828, 846, 864, 882, 915, 933, 951, 969, 987, 1005 | −1407, −1276, 641, 772 |
| 28 | −1511, −1493, −1475, −1457, −1439, −1421, −1388, −1370, −1352, −1334, −1316, −1298, −1255, −1237, −1219, −1201, −1183, −1165, −1132, −1114, −1096, −1078, −1060, −1042, 537, 555, 573, 591, 609, 627, 660, 678, 696, 714, 732, 750, 793, 811, 829, 847, 865, 883, 916, 934, 952, 970, 988, 1006 | −1406, −1275, 642, 773 |
| 29 | −1509, −1491, −1473, −1455, −1437, −1419, −1386, −1368, −1350, −1332, −1314, −1296, −1253, −1235, −1217, −1199, −1181, −1163, −1130, −1112, −1094, −1076, −1058, −1040, 539, 557, 575, 593, 611, 629, 662, 680, 698, 716, 734, 752, 795, 813, 831, 849, 867, 885, 918, 936, 954, 972, 990, 1008 | −1404, −1273, 644, 775 |
| 30 | −1508, −1490, −1472, −1454, −1436, −1418, −1385, −1367, −1349, −1331, −1313, −1295, −1252, −1234, −1216, −1198, −1180, −1162, −1129, −1111, −1093, −1075, −1057, −1039, 540, 558, 576, 594, 612, 630, 663, 681, 699, 717, 735, 753, 796, 814, 832, 850, 868, 886, 919, 937, 955, 973, 991, 1009 | −1403, −1272, 645, 776 |
| 31 | −1507, −1489, −1471, −1453, −1435, −1417, −1384, −1366, −1348, −1330, −1312, −1294, −1251, −1233, −1215, −1197, −1179, −1161, −1128, −1110, −1092, −1074, −1056, −1038, 541, 559, 577, 595, 613, 631, 664, 682, 700, 718, 736, 754, 797, 815, 833, 851, 869, 887, 920, 938, 956, 974, 992, 1010 | −1402, −1271, 646, 777 |
| 32 | −1506, −1488, −1470, −1452, −1434, −1416, −1383, −1365, −1347, −1329, −1311, −1293, −1250, −1232, −1214, −1196, −1178, −1160, −1127, −1109, −1091, −1073, −1055, −1037, 542, 560, 578, 596, 614, 632, 665, 683, 701, 719, 737, 755, 798, 816, 834, 852, 870, 888, 921, 939, 957, 975, 993, 1011 | −1401, −1270, 647, 778 |

TABLE 38-continued

| Identifier of a 52-tone DRU | Index of a data subcarrier | Index of a pilot subcarrier |
|---|---|---|
| 33 | −1011, −993, −975, −957, −939, −921, −888, −870, −852, −834, −816, −798, −755, −737, −719, −701, −683, −665, −632, −614, −596, −578, −560, −542, 1037, 1055, 1073, 1091, 1109, 1127, 1160, 1178, 1196, 1214, 1232, 1250, 1293, 1311, 1329, 1347, 1365, 1383, 1416, 1434, 1452, 1470, 1488, 1506 | −780, −647, 1268, 1401 |
| 34 | −1010, −992, −974, −956, −938, −920, −887, −869, −851, −833, −815, −797, −754, −736, −718, −700, −682, −664, −631, −613, −595, −577, −559, −541, 1038, 1056, 1074, 1092, 1110, 1128, 1161, 1179, 1197, 1215, 1233, 1251, 1294, 1312, 1330, 1348, 1366, 1384, 1417, 1435, 1453, 1471, 1489, 1507 | −779, −646, 1269, 1402 |
| 35 | −1009, −991, −973, −955, −937, −919, −886, −868, −850, −832, −814, −796, −753, −735, −717, −699, −681, −663, −630, −612, −594, −576, −558, −540, 1039, 1057, 1075, 1093, 1111, 1129, 1162, 1180, 1198, 1216, 1234, 1252, 1295, 1313, 1331, 1349, 1367, 1385, 1418, 1436, 1454, 1472, 1490, 1508 | −778, −645, 1270, 1403 |
| 36 | −1008, −990, −972, −954, −936, −918, −885, −867, −849, −831, −813, −795, −752, −734, −716, −698, −680, −662, −629, −611, −593, −575, −557, −539, 1040, 1058, 1076, 1094, 1112, 1130, 1163, 1181, 1199, 1217, 1235, 1253, 1296, 1314, 1332, 1350, 1368, 1386, 1419, 1437, 1455, 1473, 1491, 1509 | −777, −644, 1271, 1404 |
| 37 | −1006, −988, −970, −952, −934, −916, −883, −865, −847, −829, −811, −793, −750, −732, −714, −696, −678, −660, −627, −609, −591, −573, −555, −537, 1042, 1060, 1078, 1096, 1114, 1132, 1165, 1183, 1201, 1219, 1237, 1255, 1298, 1316, 1334, 1352, 1370, 1388, 1421, 1439, 1457, 1475, 1493, 1511 | −775, −642, 1273, 1406 |
| 38 | −1005, −987, −969, −951, −933, −915, −882, −864, −846, −828, −810, −792, −749, −731, −713, −695, −677, −659, −626, −608, −590, −572, −554, −536, 1043, 1061, 1079, 1097, 1115, 1133, 1166, 1184, 1202, 1220, 1238, 1256, 1299, 1317, 1335, 1353, 1371, 1389, 1422, 1440, 1458, 1476, 1494, 1512 | −774, −641, 1274, 1407 |
| 39 | −1004, −986, −968, −950, −932, −914, −881, −863, −845, −827, −809, −791, −748, −730, −712, −694, −676, −658, −625, −607, −589, −571, −553, −535, 1044, 1062, 1080, 1098, 1116, 1134, 1167, 1185, 1203, 1221, 1239, 1257, 1300, 1318, 1336, 1354, 1372, 1390, 1423, 1441, 1459, 1477, 1495, 1513 | −773, −640, 1275, 1408 |
| 40 | −1003, −985, −967, −949, −931, −913, −880, −862, −844, −826, −808, −790, −747, −729, −711, −693, −675, −657, −624, −606, −588, −570, −552, −534, 1045, 1063, 1081, 1099, 1117, 1135, 1168, 1186, 1204, 1222, 1240, 1258, 1301, 1319, 1337, 1355, 1373, 1391, 1424, 1442, 1460, 1478, 1496, 1514 | −772, −639, 1276, 1409 |
| 41 | −1002, −984, −966, −948, −930, −912, −879, −861, −843, −825, −807, −789, −746, −728, −710, −692, −674, −656, −623, −605, −587, −569, −551, −533, 1046, 1064, 1082, 1100, 1118, 1136, 1169, 1187, 1205, 1223, 1241, 1259, 1302, 1320, 1338, 1356, 1374, 1392, 1425, 1443, 1461, 1479, 1497, 1515 | −771, −638, 1277, 1410 |
| 42 | −1001, −983, −965, −947, −929, −911, −878, −860, −842, −824, −806, −788, −745, −727, −709, −691, −673, −655, −622, −604, −586, −568, −550, −532, 1047, 1065, 1083, 1101, 1119, 1137, 1170, 1188, 1206, 1224, 1242, 1260, 1303, 1321, 1339, 1357, 1375, 1393, 1426, 1444, 1462, 1480, 1498, 1516 | −896, −765, 1152, 1283 |
| 43 | −1000, −982, −964, −946, −928, −910, −877, −859, −841, −823, −805, −787, −744, −726, −708, −690, −672, −654, −621, −603, −585, −567, −549, −531, 1048, 1066, 1084, 1102, 1120, 1138, 1171, 1189, 1207, 1225, 1243, 1261, 1304, 1322, 1340, 1358, 1376, 1394, 1427, 1445, 1463, 1481, 1499, 1517 | −895, −764, 1153, 1284 |
| 44 | −999, −981, −963, −945, −927, −909, −876, −858, −840, −822, −804, −786, −743, −725, −707, −689, −671, −653, −620, −602, −584, −566, −548, −530, 1049, 1067, 1085, 1103, 1121, 1139, 1172, 1190, 1208, 1226, 1244, 1262, 1305, 1323, 1341, 1359, 1377, 1395, 1428, 1446, 1464, 1482, 1500, 1518 | −894, −763, 1154, 1285 |
| 45 | −997, −979, −961, −943, −925, −907, −874, −856, −838, −820, −802, −784, −741, −723, −705, −687, −669, −651, −618, −600, −582, −564, −546, −528, 1051, 1069, 1087, 1105, 1123, 1141, 1174, 1192, 1210, 1228, 1246, 1264, 1307, 1325, 1343, 1361, 1379, 1397, 1430, 1448, 1466, 1484, 1502, 1520 | −892, −761, 1156, 1287 |
| 46 | −996, −978, −960, −942, −924, −906, −873, −855, −837, −819, −801, −783, −740, −722, −704, −686, −668, −650, −617, −599, −581, −563, −545, −527, 1052, 1070, 1088, 1106, 1124, 1142, 1175, 1193, 1211, 1229, 1247, 1265, 1308, 1326, 1344, 1362, 1380, 1398, 1431, 1449, 1467, 1485, 1503, 1521 | −891, −760, 1157, 1288 |
| 47 | −995, −977, −959, −941, −923, −905, −872, −854, −836, −818, −800, −782, −739, −721, −703, −685, −667, −649, −616, −598, −580, −562, −544, −526, 1053, 1071, 1089, 1107, 1125, 1143, 1176, 1194, 1212, 1230, 1248, 1266, 1309, 1327, 1345, 1363, 1381, 1399, 1432, 1450, 1468, 1486, 1504, 1522 | −890, −759, 1158, 1289 |

TABLE 38-continued

| Identifier of a 52-tone DRU | Index of a data subcarrier | Index of a pilot subcarrier |
|---|---|---|
| 48 | −994, −976, −958, −940, −922, −904, −871, −853, −835, −817, −799, −781, −738, −720, −702, −684, −666, −648, −615, −597, −579, −561, −543, −525, 1054, 1072, 1090, 1108, 1126, 1144, 1177, 1195, 1213, 1231, 1249, 1267, 1310, 1328, 1346, 1364, 1382, 1400, 1433, 1451, 1469, 1487, 1505, 1523 | −889, −758, 1159, 1290 |
| 49 | −499, −481, −463, −445, −427, −409, −376, −358, −340, −322, −304, −286, −243, −225, −207, −189, −171, −153, −120, −102, −84, −66, −48, −30, 1549, 1567, 1585, 1603, 1621, 1639, 1672, 1690, 1708, 1726, 1744, 1762, 1805, 1823, 1841, 1859, 1877, 1895, 1928, 1946, 1964, 1982, 2000, 2018 | −268, −135, 1780, 1913 |
| 50 | −498, −480, −462, −444, −426, −408, −375, −357, −339, −321, −303, −285, −242, −224, −206, −188, −170, −152, −119, −101, −83, −65, −47, −29, 1550, 1568, 1586, 1604, 1622, 1640, 1673, 1691, 1709, 1727, 1745, 1763, 1806, 1824, 1842, 1860, 1878, 1896, 1929, 1947, 1965, 1983, 2001, 2019 | −267, −134, 1781, 1914 |
| 51 | −497, −479, −461, −443, −425, −407, −374, −356, −338, −320, −302, −284, −241, −223, −205, −187, −169, −151, −118, −100, −82, −64, −46, −28, 1551, 1569, 1587, 1605, 1623, 1641, 1674, 1692, 1710, 1728, 1746, 1764, 1807, 1825, 1843, 1861, 1879, 1897, 1930, 1948, 1966, 1984, 2002, 2020 | −266, −133, 1782, 1915 |
| 52 | −496, −478, −460, −442, −424, −406, −373, −355, −337, −319, −301, −283, −240, −222, −204, −186, −168, −150, −117, −99, −81, −63, −45, −27, 1552, 1570, 1588, 1606, 1624, 1642, 1675, 1693, 1711, 1729, 1747, 1765, 1808, 1826, 1844, 1862, 1880, 1898, 1931, 1949, 1967, 1985, 2003, 2021 | −265, −132, 1783, 1916 |
| 53 | −494, −476, −458, −440, −422, −404, −371, −353, −335, −317, −299, −281, −238, −220, −202, −184, −166, −148, −115, −97, −79, −61, −43, −25, 1554, 1572, 1590, 1608, 1626, 1644, 1677, 1695, 1713, 1731, 1749, 1767, 1810, 1828, 1846, 1864, 1882, 1900, 1933, 1951, 1969, 1987, 2005, 2023 | −263, −130, 1785, 1918 |
| 54 | −493, −475, −457, −439, −421, −403, −370, −352, −334, −316, −298, −280, −237, −219, −201, −183, −165, −147, −114, −96, −78, −60, −42, −24, 1555, 1573, 1591, 1609, 1627, 1645, 1678, 1696, 1714, 1732, 1750, 1768, 1811, 1829, 1847, 1865, 1883, 1901, 1934, 1952, 1970, 1988, 2006, 2024 | −262, −129, 1786, 1919 |
| 55 | −492, −474, −456, −438, −420, −402, −369, −351, −333, −315, −297, −279, −236, −218, −200, −182, −164, −146, −113, −95, −77, −59, −41, −23, 1556, 1574, 1592, 1610, 1628, 1646, 1679, 1697, 1715, 1733, 1751, 1769, 1812, 1830, 1848, 1866, 1884, 1902, 1935, 1953, 1971, 1989, 2007, 2025 | −261, −128, 1787, 1920 |
| 56 | −491, −473, −455, −437, −419, −401, −368, −350, −332, −314, −296, −278, −235, −217, −199, −181, −163, −145, −112, −94, −76, −58, −40, −22, 1557, 1575, 1593, 1611, 1629, 1647, 1680, 1698, 1716, 1734, 1752, 1770, 1813, 1831, 1849, 1867, 1885, 1903, 1936, 1954, 1972, 1990, 2008, 2026 | −260, −127, 1788, 1921 |
| 57 | −490, −472, −454, −436, −418, −400, −367, −349, −331, −313, −295, −277, −234, −216, −198, −180, −162, −144, −111, −93, −75, −57, −39, −21, 1558, 1576, 1594, 1612, 1630, 1648, 1681, 1699, 1717, 1735, 1753, 1771, 1814, 1832, 1850, 1868, 1886, 1904, 1937, 1955, 1973, 1991, 2009, 2027 | −259, −126, 1789, 1922 |
| 58 | −489, −471, −453, −435, −417, −399, −366, −348, −330, −312, −294, −276, −233, −215, −197, −179, −161, −143, −110, −92, −74, −56, −38, −20, 1559, 1577, 1595, 1613, 1631, 1649, 1682, 1700, 1718, 1736, 1754, 1772, 1815, 1833, 1851, 1869, 1887, 1905, 1938, 1956, 1974, 1992, 2010, 2028 | −384, −253, 1664, 1795 |
| 59 | −488, −470, −452, −434, −416, −398, −365, −347, −329, −311, −293, −275, −232, −214, −196, −178, −160, −142, −109, −91, −73, −55, −37, −19, 1560, 1578, 1596, 1614, 1632, 1650, 1683, 1701, 1719, 1737, 1755, 1773, 1816, 1834, 1852, 1870, 1888, 1906, 1939, 1957, 1975, 1993, 2011, 2029 | −383, −252, 1665, 1796 |
| 60 | −487, −469, −451, −433, −415, −397, −364, −346, −328, −310, −292, −274, −231, −213, −195, −177, −159, −141, −108, −90, −72, −54, −36, −18, 1561, 1579, 1597, 1615, 1633, 1651, 1684, 1702, 1720, 1738, 1756, 1774, 1817, 1835, 1853, 1871, 1889, 1907, 1940, 1958, 1976, 1994, 2012, 2030 | −382, −251, 1666, 1797 |
| 61 | −485, −467, −449, −431, −413, −395, −362, −344, −326, −308, −290, −272, −229, −211, −193, −175, −157, −139, −106, −88, −70, −52, −34, −16, 1563, 1581, 1599, 1617, 1635, 1653, 1686, 1704, 1722, 1740, 1758, 1776, 1819, 1837, 1855, 1873, 1891, 1909, 1942, 1960, 1978, 1996, 2014, 2032 | −380, −249, 1668, 1799 |
| 62 | −484, −466, −448, −430, −412, −394, −361, −343, −325, −307, −289, −271, −228, −210, −192, −174, −156, −138, −105, −87, −69, −51, −33, −15, 1564, 1582, 1600, 1618, 1636, 1654, 1687, 1705, 1723, 1741, 1759, 1777, 1820, 1838, 1856, 1874, 1892, 1910, 1943, 1961, 1979, 1997, 2015, 2033 | −379, −248, 1669, 1800 |

TABLE 38-continued

| Identifier of a 52-tone DRU | Index of a data subcarrier | Index of a pilot subcarrier |
|---|---|---|
| 63 | −483, −465, −447, −429, −411, −393, −360, −342, −324, −306, −288, −270, −227, −209, −191, −173, −155, −137, −104, −86, −68, −50, −32, −14, 1565, 1583, 1601, 1619, 1637, 1655, 1688, 1706, 1724, 1742, 1760, 1778, 1821, 1839, 1857, 1875, 1893, 1911, 1944, 1962, 1980, 1998, 2016, 2034 | −378, −247, 1670, 1801 |
| 64 | −482, −464, −446, −428, −410, −392, −359, −341, −323, −305, −287, −269, −226, −208, −190, −172, −154, −136, −103, −85, −67, −49, −31, −13, 1566, 1584, 1602, 1620, 1638, 1656, 1689, 1707, 1725, 1743, 1761, 1779, 1822, 1840, 1858, 1876, 1894, 1912, 1945, 1963, 1981, 1999, 2017, 2035 | −377, −246, 1671, 1802 |

As shown in Table 38, each 52-tone DRU includes 48 data subcarriers, including 24 high-frequency subcarriers (whose subcarrier indices are positive values) and 24 low-frequency subcarriers (whose subcarrier indices are negative values). If every six data subcarriers of the 48 data subcarriers are considered as one group in a frequency direction (for example, from low to high) (or understood as an ascending order of indices), the 48 data subcarriers may be considered as eight groups, including four low-frequency groups and four high-frequency groups. An index of each data subcarrier in a low-frequency group is a negative value, and an index of each data subcarrier in a high-frequency group is a positive value. Absolute values of index differences between adjacent data subcarriers in a same group are all 18, absolute values of index differences between data subcarriers in two adjacent low-frequency groups or two adjacent high-frequency groups are sequentially 33, 43, and 33, and absolute values of index differences between data subcarriers in a high-frequency group and a low-frequency group (an absolute value of a difference between a minimum index of all data subcarriers in a high-frequency group and a maximum index of all data subcarriers in a low-frequency group) are 1579.

In other words, it is assumed that indices of 48 data subcarriers included in each 52-tone DRU are sequentially arranged in a frequency direction and then divided into eight groups, and each group includes six data subcarriers. Six data subcarriers in a same group are equally spaced. Specifically, a quantity of subcarriers between every two adjacent data subcarriers in a same group is 17.

As shown in Table 38, for identifiers 1 to 4, 5 to 12, 13 to 16, 17 to 20, 21 to 28, 29 to 32, 33 to 36, 37 to 44, 45 to 48, 49 to 52, 53 to 60, or 61 to 64, there is a fixed offset between indices of data subcarriers included in two 52-tone DRUs having adjacent identifiers, and the fixed offset is 1. For example, indices of 48 data subcarriers in a 52-tone DRU whose identifier is i (i=1 to 3, 5 to 11, 13 to 15, 17 to 19, 21 to 27, 29 to 31, 33 to 35, 37 to 43, 45 to 47, 49 to 51, 53 to 59, or 61 to 63) all plus 1, to obtain indices of 48 data subcarriers in a 52-tone DRU whose identifier is i+1. An offset between an index of a data subcarrier included in a 52-tone DRU whose identifier is 4 and an index of a data subcarrier included in a 52-tone DRU whose identifier is 5 is 2. Similarly, an offset between an index of a data subcarrier included in a 52-tone DRU whose identifier is 12 (20, 28, 36, 44, 52, or 60) and an index of a data subcarrier included in a 52-tone DRU whose identifier is 13 (21, 29, 37, 45, 53, or 61) is 2. An offset between an index of a data subcarrier included in a 52-tone DRU whose identifier is 16 (32 or 48) and an index of a data subcarrier included in a 52-tone DRU whose identifier is 17 (33 or 49) is 495.

As shown in Table 38, each 52-tone DRU includes four pilot subcarriers, including two high-frequency subcarriers and two low-frequency subcarriers. In this way, pilot subcarriers included in a same DRU can be fully discrete, thereby implementing frequency domain diversity.

As shown in Table 37, the 52-tone DRU may be considered as being obtained based on a 26-tone DRU, as shown in Table 39. For example, 48 data subcarriers in a 52-tone DRU whose identifier is 1 are a combination of 24 data subcarriers in a 26-tone DRU whose identifier is 1 and 24 data subcarriers in a 26-tone DRU whose identifier is 73 in Table 37. Four pilot subcarriers in the 52-tone DRU whose identifier is 1 are a combination of two pilot subcarriers in the 26-tone DRU whose identifier is 1 and two pilot subcarriers in the 26-tone DRU whose identifier is 73 in Table 37.

TABLE 39

| Identifier of a 52-tone DRU | Identifier of a 26-tone DRU |
|---|---|
| 1 | 1, 73 |
| 2 | 2, 74 |
| 3 | 3, 75 |
| 4 | 4, 76 |
| 5 | 6, 78 |
| 6 | 7, 79 |
| 7 | 8, 80 |
| 8 | 9, 81 |
| 9 | 10, 82 |
| 10 | 11, 83 |
| 11 | 12, 84 |
| 12 | 13, 85 |
| 13 | 15, 87 |
| 14 | 16, 88 |
| 15 | 17, 89 |
| 16 | 18, 90 |
| 17 | 19, 91 |
| 18 | 20, 92 |
| 19 | 21, 93 |
| 20 | 22, 94 |
| 21 | 24, 96 |
| 22 | 25, 97 |
| 23 | 26, 98 |
| 24 | 27, 99 |
| 25 | 28, 100 |
| 26 | 29, 101 |
| 27 | 30, 102 |
| 28 | 31, 103 |
| 29 | 33, 105 |
| 30 | 34, 106 |
| 31 | 35, 107 |
| 32 | 36, 108 |
| 33 | 37, 109 |
| 34 | 38, 110 |

TABLE 39-continued

| Identifier of a 52-tone DRU | Identifier of a 26-tone DRU |
|---|---|
| 35 | 39, 111 |
| 36 | 40, 112 |
| 37 | 42, 114 |
| 38 | 43, 115 |
| 39 | 44, 116 |
| 40 | 45, 117 |
| 41 | 46, 118 |
| 42 | 47, 119 |
| 43 | 48, 120 |
| 44 | 49, 121 |
| 45 | 51, 123 |
| 46 | 52, 124 |
| 47 | 53, 125 |
| 48 | 54, 126 |
| 49 | 55, 127 |
| 50 | 56, 128 |
| 51 | 57, 129 |
| 52 | 58, 130 |
| 53 | 60, 132 |
| 54 | 61, 133 |
| 55 | 62, 134 |
| 56 | 63, 135 |
| 57 | 64, 136 |
| 58 | 65, 137 |
| 59 | 66, 138 |
| 60 | 67, 139 |
| 61 | 69, 141 |
| 62 | 70, 142 |
| 63 | 71, 143 |
| 64 | 72, 144 |

In addition, in this embodiment of this disclosure, the identifier of the 52-tone DRU may be based on a lowest-frequency index of a data subcarrier included in each 52-tone DRU. For example, an identifier of a 52-tone DRU having a lowest-frequency index −2035 is 1.

According to the design of the 52-tone DRU shown in Table 38 or Table 39 in an embodiment of this disclosure, compared with the continuous 52-tone RU in the 320 MHz obtained based on the 80 MHz in FIG. 3, at a same power spectral density, this embodiment of this disclosure can implement a maximum power amplification multiple, specifically, 13.

In an embodiment of this disclosure, an association between a 52-tone DRU and a 26-tone DRU in 320 MHz is described by using Table 39. It may be understood that the foregoing described manner of determining a 52-tone DRU based on a 26-tone DRU is merely an example, and subcarriers in the 52-tone DRU can be fully discrete. In another embodiment, a 52-tone DRU may alternatively be determined in another manner based on a 26-tone DRU. For example, a combination of two 26-tone DRUs whose identifiers are 1 and 2 is determined as the 52-tone DRU whose identifier is 1. This is not limited in this disclosure. Details are not described again. In addition, it may be understood that, considering the association between the 52-tone DRU and the 26-tone DRU, if the lowest-frequency index of the data subcarrier included in the 26-tone DRU is another value other than −2035, correspondingly the lowest-frequency index of the data subcarrier included in the 52-tone DRU also adaptively changes to another value.

In a tone plan solution of a DRU, the 320 MHz bandwidth includes 32 106-tone DRUs, and each 106-tone DRU includes 102 data subcarriers and four pilot subcarriers. For example, Table 40 shows an example of 32 106-tone DRUs corresponding to the 320 MHz bandwidth, and shows 102 data subcarriers and four pilot subcarriers included in each 106-tone DRU. The 102 data subcarriers may be considered as two parts. A first part of data subcarriers includes 96 data subcarriers, a second part of data subcarriers includes six data subcarriers, and a lowest-frequency index of a data subcarrier in a 106-tone DRU whose identifier is 1 is −2035. It should be understood that, although the data subcarriers are divided into the first part and the second part in Table 40 and are separately listed, in an embodiment of this disclosure, the data subcarriers are presented as a plurality of parts only for ease of description, and are not actually used as division of data subcarriers included in each 106-tone DRU. During actual application, the data subcarriers include a combination of data subcarriers in two parts, and do not need to be distinguished. In other words, the first part and the second part do not need to be distinguished, but are considered as a whole, namely, a data subcarrier index included in each 106-tone DRU.

TABLE 40

| Identifier of a 106-tone DRU | Index of a data subcarrier: First part | Index of a data subcarrier: Second part | Index of a pilot subcarrier |
|---|---|---|---|
| 1 | −2035, −2017, −1999, −1981, −1963, −1945, −1912, −1894, −1876, −1858, −1840, −1822, −1779, −1761, −1743, −1725, −1707, −1689, −1656, −1638, −1620, −1602, −1584, −1566, −1011, −993, −975, −957, −939, −921, −888, −870, −852, −834, −816, −798, −755, −737, −719, −701, −683, −665, −632, −614, −596, −578, −560, −542, 13, 31, 49, 67, 85, 103, 136, 154, 172, 190, 208, 226, 269, 287, 305, 323, 341, 359, 392, 410, 428, 446, 464, 482, 1037, 1055, 1073, 1091, 1109, 1127, 1160, 1178, 1196, 1214, 1232, 1250, 1293, 1311, 1329, 1347, 1365, 1383, 1416, 1434, 1452, 1470, 1488, 1506 | −1671, −1548, −647, 244, 500, 1268 | −1804, −780, 377, 1401 |
| 2 | −2034, −2016, −1998, −1980, −1962, −1944, −1911, −1893, −1875, −1857, −1839, −1821, −1778, −1760, −1742, −1724, −1706, −1688, −1655, −1637, −1619, −1601, −1583, −1565, −1010, −992, −974, −956, −938, −920, −887, −869, −851, −833, −815, −797, −754, −736, −718, −700, −682, −664, −631, −613, −595, −577, −559, −541, 14, 32, 50, 68, 86, 104, 137, 155, 173, 191, 209, 227, 270, | −1670, −1547, −646, 245, 501, 1269 | −1803, −779, 378, 1402 |

TABLE 40-continued

| Identifier of a 106-tone DRU | Index of a data subcarrier First part | Index of a data subcarrier Second part | Index of a pilot subcarrier |
|---|---|---|---|
| | 288, 306, 324, 342, 360, 393, 411, 429, 447, 465, 483, 1038, 1056, 1074, 1092, 1110, 1128, 1161, 1179, 1197, 1215, 1233, 1251, 1294, 1312, 1330, 1348, 1366, 1384, 1417, 1435, 1453, 1471, 1489, 1507 | | |
| 3 | −2033, −2015, −1997, −1979, −1961, −1943, −1910, −1892, −1874, −1856, −1838, −1820, −1777, −1759, −1741, −1723, −1705, −1687, −1654, −1636, −1618, −1600, −1582, −1564, −1009, −991, −973, −955, −937, −919, −886, −868, −850, −832, −814, −796, −753, −735, −717, −699, −681, −663, −630, −612, −594, −576, −558, −540, 15, 33, 51, 69, 87, 105, 138, 156, 174, 192, 210, 228, 271, 289, 307, 325, 343, 361, 394, 412, 430, 448, 466, 484, 1039, 1057, 1075, 1093, 1111, 1129, 1162, 1180, 1198, 1216, 1234, 1252, 1295, 1313, 1331, 1349, 1367, 1385, 1418, 1436, 1454, 1472, 1490, 1508 | −1669, −1546, −645, 246, 502, 1270 | −1802, −778, 379, 1403 |
| 4 | −2032, −2014, −1996, −1978, −1960, −1942, −1909, −1891, −1873, −1855, −1837, −1819, −1776, −1758, −1740, −1722, −1704, −1686, −1653, −1635, −1617, −1599, −1581, −1563, −1008, −990, −972, −954, −936, −918, −885, −867, −849, −831, −813, −795, −752, −734, −716, −698, −680, −662, −629, −611, −593, −575, −557, −539, 16, 34, 52, 70, 88, 106, 139, 157, 175, 193, 211, 229, 272, 290, 308, 326, 344, 362, 395, 413, 431, 449, 467, 485, 1040, 1058, 1076, 1094, 1112, 1130, 1163, 1181, 1199, 1217, 1235, 1253, 1296, 1314, 1332, 1350, 1368, 1386, 1419, 1437, 1455, 1473, 1491, 1509 | −1668, −1545, −644, 247, 503, 1271 | −1801, −777, 380, 1404 |
| 5 | −2030, −2012, −1994, −1976, −1958, −1940, −1907, −1889, −1871, −1853, −1835, −1817, −1774, −1756, −1738, −1720, −1702, −1684, −1651, −1633, −1615, −1597, −1579, −1561, −1006, −988, −970, −952, −934, −916, −883, −865, −847, −829, −811, −793, −750, −732, −714, −696, −678, −660, −627, −609, −591, −573, −555, −537, 18, 36, 54, 72, 90, 108, 141, 159, 177, 195, 213, 231, 274, 292, 310, 328, 346, 364, 397, 415, 433, 451, 469, 487, 1042, 1060, 1078, 1096, 1114, 1132, 1165, 1183, 1201, 1219, 1237, 1255, 1298, 1316, 1334, 1352, 1370, 1388, 1421, 1439, 1457, 1475, 1493, 1511 | −1666, −1544, −642, 249, 504, 1273 | −1799, −775, 382, 1406 |
| 6 | −2029, −2011, −1993, −1975, −1957, −1939, −1906, −1888, −1870, −1852, −1834, −1816, −1773, −1755, −1737, −1719, −1701, −1683, −1650, −1632, −1614, −1596, −1578, −1560, −1005, −987, −969, −951, −933, −915, −882, −864, −846, −828, −810, −792, −749, −731, −713, −695, −677, −659, −626, −608, −590, −572, −554, −536, 19, 37, 55, 73, 91, 109, 142, 160, 178, 196, 214, 232, 275, 293, 311, 329, 347, 365, 398, 416, 434, 452, 470, 488, 1043, 1061, 1079, 1097, 1115, 1133, 1166, 1184, 1202, 1220, 1238, 1256, 1299, 1317, 1335, 1353, 1371, 1389, 1422, 1440, 1458, 1476, 1494, 1512 | −1665, −1543, −641, 250, 505, 1274 | −1798, −774, 383, 1407 |
| 7 | −2028, −2010, −1992, −1974, −1956, −1938, −1905, −1887, −1869, −1851, −1833, −1815, −1772, −1754, −1736, −1718, −1700, −1682, −1649, −1631, −1613, −1595, −1577, −1559, −1004, −986, −968, −950, −932, −914, −881, −863, −845, −827, −809, −791, −748, −730, −712, −694, −676, −658, −625, −607, −589, −571, −553, −535, 20, 38, 56, 74, 92, 110, 143, 161, 179, 197, 215, 233, 276, 294, 312, 330, 348, 366, 399, 417, 435, 453, 471, 489, 1044, 1062, 1080, 1098, 1116, 1134, 1167, 1185, 1203, 1221, 1239, 1257, 1300, 1318, 1336, 1354, 1372, 1390, 1423, 1441, 1459, 1477, 1495, 1513 | −1664, −1542, −640, 251, 506, 1275 | −1797, −773, 384, 1408 |
| 8 | −2027, −2009, −1991, −1973, −1955, −1937, −1904, −1886, −1868, −1850, −1832, −1814, −1771, −1753, −1735, −1717, −1699, −1681, −1648, | −1663, −1541, −639, 252, 507, 1276 | −1796, −772, 385, 1409 |

TABLE 40-continued

| Identifier of a 106-tone DRU | Index of a data subcarrier First part | Second part | Index of a pilot subcarrier |
|---|---|---|---|
| | −1630, −1612, −1594, −1576, −1558, −1003, −985, −967, −949, −931, −913, −880, −862, −844, −826, −808, −790, −747, −729, −711, −693, −675, −657, −624, −606, −588, −570, −552, −534, 21, 39, 57, 75, 93, 111, 144, 162, 180, 198, 216, 234, 277, 295, 313, 331, 349, 367, 400, 418, 436, 454, 472, 490, 1045, 1063, 1081, 1099, 1117, 1135, 1168, 1186, 1204, 1222, 1240, 1258, 1301, 1319, 1337, 1355, 1373, 1391, 1424, 1442, 1460, 1478, 1496, 1514 | | |
| 9 | −2026, −2008, −1990, −1972, −1954, −1936, −1903, −1885, −1867, −1849, −1831, −1813, −1770, −1752, −1734, −1716, −1698, −1680, −1647, −1629, −1611, −1593, −1575, −1557, −1002, −984, −966, −948, −930, −912, −879, −861, −843, −825, −807, −789, −746, −728, −710, −692, −674, −656, −623, −605, −587, −569, −551, −533, 22, 40, 58, 76, 94, 112, 145, 163, 181, 199, 217, 235, 278, 296, 314, 332, 350, 368, 401, 419, 437, 455, 473, 491, 1046, 1064, 1082, 1100, 1118, 1136, 1169, 1187, 1205, 1223, 1241, 1259, 1302, 1320, 1338, 1356, 1374, 1392, 1425, 1443, 1461, 1479, 1497, 1515 | −1662, −1540, −638, 253, 508, 1277 | −1795, −771, 386, 1410 |
| 10 | −2025, −2007, −1989, −1971, −1953, −1935, −1902, −1884, −1866, −1848, −1830, −1812, −1769, −1751, −1733, −1715, −1697, −1679, −1646, −1628, −1610, −1592, −1574, −1556, −1001, −983, −965, −947, −929, −911, −878, −860, −842, −824, −806, −788, −745, −727, −709, −691, −673, −655, −622, −604, −586, −568, −550, −532, 23, 41, 59, 77, 95, 113, 146, 164, 182, 200, 218, 236, 279, 297, 315, 333, 351, 369, 402, 420, 438, 456, 474, 492, 1047, 1065, 1083, 1101, 1119, 1137, 1170, 1188, 1206, 1224, 1242, 1260, 1303, 1321, 1339, 1357, 1375, 1393, 1426, 1444, 1462, 1480, 1498, 1516 | −1789,−1539, −765, 128, 509, 1152 | −1920, −896, 259, 1283 |
| 11 | −2024, −2006, −1988, −1970, −1952, −1934, −1901, −1883, −1865, −1847, −1829, −1811, −1768, −1750, −1732, −1714, −1696, −1678, −1645, −1627, −1609, −1591, −1573, −1555, −1000, −982, −964, −946, −928, −910, −877, −859, −841, −823, −805, −787, −744, −726, −708, −690, −672, −654, −621, −603, −585, −567, −549, −531, 24, 42, 60, 78, 96, 114, 147, 165, 183, 201, 219, 237, 280, 298, 316, 334, 352, 370, 403, 421, 439, 457, 475, 493, 1048, 1066, 1084, 1102, 1120, 1138, 1171, 1189, 1207, 1225, 1243, 1261, 1304, 1322, 1340, 1358, 1376, 1394, 1427, 1445, 1463, 1481, 1499, 1517 | −1788, −1533, −764, 129, 515, 1153 | −1919, −895, 260, 1284 |
| 12 | −2023, −2005, −1987, −1969, −1951, −1933, −1900, −1882, −1864, −1846, −1828, −1810, −1767, −1749, −1731, −1713, −1695, −1677, −1644, −1626, −1608, −1590, −1572, −1554, −999, −981, −963, −945, −927, −909, −876, −858, −840, −822, −804, −786, −743, −725, −707, −689, −671, −653, −620, −602, −584, −566, −548, −530, 25, 43, 61, 79, 97, 115, 148, 166, 184, 202, 220, 238, 281, 299, 317, 335, 353, 371, 404, 422, 440, 458, 476, 494, 1049, 1067, 1085, 1103, 1121, 1139, 1172, 1190, 1208, 1226, 1244, 1262, 1305, 1323, 1341, 1359, 1377, 1395, 1428, 1446, 1464, 1482, 1500, 1518 | −1787, −1532, −763, 130, 516, 1154 | −1918, −894, 261, 1285 |
| 13 | −2021, −2003, −1985, −1967, −1949, −1931, −1898, −1880, −1862, −1844, −1826, −1808, −1765, −1747, −1729, −1711, −1693, −1675, −1642, −1624, −1606, −1588, −1570, −1552, −997, −979, −961, −943, −925, −907, −874, −856, −838, −820, −802, −784, −741, −723, −705, −687, −669, −651, −618, −600, −582, −564, −546, −528, 27, 45, 63, 81, 99, 117, 150, 168, 186, 204, 222, 240, 283, 301, 319, 337, 355, 373, 406, 424, 442, 460, 478, 496, 1051, 1069, 1087, 1105, 1123, 1141, 1174, 1192, 1210, 1228, 1246, 1264, 1307, 1325, 1343, 1361, 1379, 1397, 1430, 1448, 1466, 1484, 1502, 1520 | −1785, −1531, −761, 132, 517, 1156 | −1916, −892, 263, 1287 |

TABLE 40-continued

| Identifier of a 106-tone DRU | Index of a data subcarrier First part | Second part | Index of a pilot subcarrier |
|---|---|---|---|
| 14 | −2020, −2002, −1984, −1966, −1948, −1930, −1897, −1879, −1861, −1843, −1825, −1807, −1764, −1746, −1728, −1710, −1692, −1674, −1641, −1623, −1605, −1587, −1569, −1551, −996, −978, −960, −942, −924, −906, −873, −855, −837, −819, −801, −783, −740, −722, −704, −686, −668, −650, −617, −599, −581, −563, −545, −527, 28, 46, 64, 82, 100, 118, 151, 169, 187, 205, 223, 241, 284, 302, 320, 338, 356, 374, 407, 425, 443, 461, 479, 497, 1052, 1070, 1088, 1106, 1124, 1142, 1175, 1193, 1211, 1229, 1247, 1265, 1308, 1326, 1344, 1362, 1380, 1398, 1431, 1449, 1467, 1485, 1503, 1521 | −1784, −1530, −760, 133, 518, 1157 | −1915, −891, 264, 1288 |
| 15 | −2019, −2001, −1983, −1965, −1947, −1929, −1896, −1878, −1860, −1842, −1824, −1806, −1763, −1745, −1727, −1709, −1691, −1673, −1640, −1622, −1604, −1586, −1568, −1550, −995, −977, −959, −941, −923, −905, −872, −854, −836, −818, −800, −782, −739, −721, −703, −685, −667, −649, −616, −598, −580, −562, −544, −526, 29, 47, 65, 83, 101, 119, 152, 170, 188, 206, 224, 242, 285, 303, 321, 339, 357, 375, 408, 426, 444, 462, 480, 498, 1053, 1071, 1089, 1107, 1125, 1143, 1176, 1194, 1212, 1230, 1248, 1266, 1309, 1327, 1345, 1363, 1381, 1399, 1432, 1450, 1468, 1486, 1504, 1522 | −1783, −1529, −759, 134, 519, 1158 | −1914, −890, 265, 1289 |
| 16 | −2018, −2000, −1982, −1964, −1946, −1928, −1895, −1877, −1859, −1841, −1823, −1805, −1762, −1744, −1726, −1708, −1690, −1672, −1639, −1621, −1603, −1585, −1567, −1549, −994, −976, −958, −940, −922, −904, −871, −853, −835, −817, −799, −781, −738, −720, −702, −684, −666, −648, −615, −597, −579, −561, −543, −525, 30, 48, 66, 84, 102, 120, 153, 171, 189, 207, 225, 243, 286, 304, 322, 340, 358, 376, 409, 427, 445, 463, 481, 499, 1054, 1072, 1090, 1108, 1126, 1144, 1177, 1195, 1213, 1231, 1249, 1267, 1310, 1328, 1346, 1364, 1382, 1400, 1433, 1451, 1469, 1487, 1505, 1523 | −1782,−1528, −758, 135, 520, 1159 | −1913, −889, 266, 1290 |
| 17 | −1523, −1505, −1487, −1469, −1451, −1433, −1400, −1382, −1364, −1346, −1328, −1310, −1267, −1249, −1231, −1213, −1195, −1177, −1144, −1126, −1108, −1090, −1072, −1054, −499, −481, −463, −445, −427, −409, −376, −358, −340, −322, −304, −286, −243, −225, −207, −189, −171, −153, −120, −102, −84, −66, −48, −30, 525, 543, 561, 579, 597, 615, 648, 666, 684, 702, 720, 738, 781, 799, 817, 835, 853, 871, 904, 922, 940, 958, 976, 994, 1549, 1567, 1585, 1603, 1621, 1639, 1672, 1690, 1708, 1726, 1744, 1762, 1805, 1823, 1841, 1859, 1877, 1895, 1928, 1946, 1964, 1982, 2000, 2018 | −1159, −524, −135, 756, 1524, 1780 | −1292, −268, 889, 1913 |
| 18 | −1522, −1504, −1486, −1468, −1450, −1432, −1399, −1381, −1363, −1345, −1327, −1309, −1266, −1248, −1230, −1212, −1194, −1176, −1143, −1125, −1107, −1089, −1071, −1053, −498, −480, −462, −444, −426, −408, −375, −357, −339, −321, −303, −285, −242, −224, −206, −188, −170, −152, −119, −101, −83, −65, −47, −29, 526, 544, 562, 580, 598, 616, 649, 667, 685, 703, 721, 739, 782, 800, 818, 836, 854, 872, 905, 923, 941, 959, 977, 995, 1550, 1568, 1586, 1604, 1622, 1640, 1673, 1691, 1709, 1727, 1745, 1763, 1806, 1824, 1842, 1860, 1878, 1896, 1929, 1947, 1965, 1983, 2001, 2019 | −1158, −523, −134, 757, 1525, 1781 | −1291, −267, 890, 1914 |
| 19 | −1521, −1503, −1485, −1467, −1449, −1431, −1398, −1380, −1362, −1344, −1326, −1308, −1265, −1247, −1229, −1211, −1193, −1175, −1142, −1124, −1106, −1088, −1070, −1052, −497, −479, −461, −443, −425, −407, −374, −356, −338, −320, −302, −284, −241, −223, −205, −187, −169, −151, −118, −100, −82, −64, −46, −28, 527, 545, 563, 581, 599, 617, 650, 668, 686, 704, 722, 740, 783, 801, 819, 837, 855, 873, 906, 924, 942, 960, 978, 996, 1551, 1569, 1587, 1605, 1623, 1641, 1674, 1692, 1710, 1728, 1746, 1764, 1807, 1825, 1843, 1861, 1879, 1897, 1930, 1948, 1966, 1984, 2002, 2020 | −1157, −522, −133, 758, 1526, 1782 | −1290, −266, 891, 1915 |

TABLE 40-continued

| Identifier of a 106-tone DRU | Index of a data subcarrier First part | Index of a data subcarrier Second part | Index of a pilot subcarrier |
|---|---|---|---|
| 20 | −1520, −1502, −1484, −1466, −1448, −1430, −1397, −1379, −1361, −1343, −1325, −1307, −1264, −1246, −1228, −1210, −1192, −1174, −1141, −1123, −1105, −1087, −1069, −1051, −496, −478, −460, −442, −424, −406, −373, −355, −337, −319, −301, −283, −240, −222, −204, −186, −168, −150, −117, −99, −81, −63, −45, −27, 528, 546, 564, 582, 600, 618, 651, 669, 687, 705, 723, 741, 784, 802, 820, 838, 856, 874, 907, 925, 943, 961, 979, 997, 1552, 1570, 1588, 1606, 1624, 1642, 1675, 1693, 1711, 1729, 1747, 1765, 1808, 1826, 1844, 1862, 1880, 1898, 1931, 1949, 1967, 1985, 2003, 2021 | −1156, −521, −132, 759, 1527, 1783 | −1289, −265, 892, 1916 |
| 21 | −1518, −1500, −1482, −1464, −1446, −1428, −1395, −1377, −1359, −1341, −1323, −1305, −1262, −1244, −1226, −1208, −1190, −1172, −1139, −1121, −1103, −1085, −1067, −1049, −494, −476, −458, −440, −422, −404, −371, −353, −335, −317, −299, −281, −238, −220, −202, −184, −166, −148, −115, −97, −79, −61, −43, −25, 530, 548, 566, 584, 602, 620, 653, 671, 689, 707, 725, 743, 786, 804, 822, 840, 858, 876, 909, 927, 945, 963, 981, 999, 1554, 1572, 1590, 1608, 1626, 1644, 1677, 1695, 1713, 1731, 1749, 1767, 1810, 1828, 1846, 1864, 1882, 1900, 1933, 1951, 1969, 1987, 2005, 2023 | −1154, −520, −130, 761, 1528, 1785 | −1287, −263, 894, 1918 |
| 22 | −1517, −1499, −1481, −1463, −1445, −1427, −1394, −1376, −1358, −1340, −1322, −1304, −1261, −1243, −1225, −1207, −1189, −1171, −1138, −1120, −1102, −1084, −1066, −1048, −493, −475, −457, −439, −421, −403, −370, −352, −334, −316, −298, −280, −237, −219, −201, −183, −165, −147, −114, −96, −78, −60, −42, −24, 531, 549, 567, 585, 603, 621, 654, 672, 690, 708, 726, 744, 787, 805, 823, 841, 859, 877, 910, 928, 946, 964, 982, 1000, 1555, 1573, 1591, 1609, 1627, 1645, 1678, 1696, 1714, 1732, 1750, 1768, 1811, 1829, 1847, 1865, 1883, 1901, 1934, 1952, 1970, 1988, 2006, 2024 | −1153, −519, −129, 762, 1529, 1786 | −1286, −262, 895, 1919 |
| 23 | −1516, −1498, −1480, −1462, −1444, −1426, −1393, −1375, −1357, −1339, −1321, −1303, −1260, −1242, −1224, −1206, −1188, −1170, −1137, −1119, −1101, −1083, −1065, −1047, −492, −474, −456, −438, −420, −402, −369, −351, −333, −315, −297, −279, −236, −218, −200, −182, −164, −146, −113, −95, −77, −59, −41, −23, 532, 550, 568, 586, 604, 622, 655, 673, 691, 709, 727, 745, 788, 806, 824, 842, 860, 878, 911, 929, 947, 965, 983, 1001, 1556, 1574, 1592, 1610, 1628, 1646, 1679, 1697, 1715, 1733, 1751, 1769, 1812, 1830, 1848, 1866, 1884, 1902, 1935, 1953, 1971, 1989, 2007, 2025 | −1152, −518, −128, 763, 1530, 1787 | −1285, −261, 896, 1920 |
| 24 | −1515, −1497, −1479, −1461, −1443, −1425, −1392, −1374, −1356, −1338, −1320, −1302, −1259, −1241, −1223, −1205, −1187, −1169, −1136, −1118, −1100, −1082, −1064, −1046, −491, −473, −455, −437, −419, −401, −368, −350, −332, −314, −296, −278, −235, −217, −199, −181, −163, −145, −112, −94, −76, −58, −40, −22, 533, 551, 569, 587, 605, 623, 656, 674, 692, 710, 728, 746, 789, 807, 825, 843, 861, 879, 912, 930, 948, 966, 984, 1002, 1557, 1575, 1593, 1611, 1629, 1647, 1680, 1698, 1716, 1734, 1752, 1770, 1813, 1831, 1849, 1867, 1885, 1903, 1936, 1954, 1972, 1990, 2008, 2026 | −1151, −517, −127, 764, 1531, 1788 | −1284, −260, 897, 1921 |
| 25 | −1514, −1496, −1478, −1460, −1442, −1424, −1391, −1373, −1355, −1337, −1319, −1301, −1258, −1240, −1222, −1204, −1186, −1168, −1135, −1117, −1099, −1081, −1063, −1045, −490, −472, −454, −436, −418, −400, −367, −349, −331, −313, −295, −277, −234, −216, −198, −180, −162, −144, −111, −93, −75, −57, −39, −21, 534, 552, 570, 588, 606, 624, 657, 675, 693, 711, 729, 747, 790, 808, 826, 844, 862, 880, 913, 931, 949, 967, 985, 1003, 1558, 1576, 1594, 1612, 1630, 1648, 1681, 1699, 1717, 1735, 1753, 1771, 1814, 1832, 1850, 1868, 1886, 1904, 1937, 1955, 1973, 1991, 2009, 2027 | −1150, −516, −126, 765, 1532, 1789 | −1283, −259, 898, 1922 |

TABLE 40-continued

| Identifier of a 106-tone DRU | Index of a data subcarrier: First part | Index of a data subcarrier: Second part | Index of a pilot subcarrier |
|---|---|---|---|
| 26 | −1513, −1495, −1477, −1459, −1441, −1423, −1390, −1372, −1354, −1336, −1318, −1300, −1257, −1239, −1221, −1203, −1185, −1167, −1134, −1116, −1098, −1080, −1062, −1044, −489, −471, −453, −435, −417, −399, −366, −348, −330, −312, −294, −276, −233, −215, −197, −179, −161, −143, −110, −92, −74, −56, −38, −20, 535, 553, 571, 589, 607, 625, 658, 676, 694, 712, 730, 748, 791, 809, 827, 845, 863, 881, 914, 932, 950, 968, 986, 1004, 1559, 1577, 1595, 1613, 1631, 1649, 1682, 1700, 1718, 1736, 1754, 1772, 1815, 1833, 1851, 1869, 1887, 1905, 1938, 1956, 1974, 1992, 2010, 2028 | −1277, −515, −253, 640, 1533, 1664 | −1408, −384, 771, 1795 |
| 27 | −1512, −1494, −1476, −1458, −1440, −1422, −1389, −1371, −1353, −1335, −1317, −1299, −1256, −1238, −1220, −1202, −1184, −1166, −1133, −1115, −1097, −1079, −1061, −1043, −488, −470, −452, −434, −416, −398, −365, −347, −329, −311, −293, −275, −232, −214, −196, −178, −160, −142, −109, −91, −73, −55, −37, −19, 536, 554, 572, 590, 608, 626, 659, 677, 695, 713, 731, 749, 792, 810, 828, 846, 864, 882, 915, 933, 951, 969, 987, 1005, 1560, 1578, 1596, 1614, 1632, 1650, 1683, 1701, 1719, 1737, 1755, 1773, 1816, 1834, 1852, 1870, 1888, 1906, 1939, 1957, 1975, 1993, 2011, 2029 | −1276, −509, −252, 641, 1539, 1665 | −1407, −383, 772, 1796 |
| 28 | −1511, −1493, −1475, −1457, −1439, −1421, −1388, −1370, −1352, −1334, −1316, −1298, −1255, −1237, −1219, −1201, −1183, −1165, −1132, −1114, −1096, −1078, −1060, −1042, −487, −469, −451, −433, −415, −397, −364, −346, −328, −310, −292, −274, −231, −213, −195, −177, −159, −141, −108, −90, −72, −54, −36, −18, 537, 555, 573, 591, 609, 627, 660, 678, 696, 714, 732, 750, 793, 811, 829, 847, 865, 883, 916, 934, 952, 970, 988, 1006, 1561, 1579, 1597, 1615, 1633, 1651, 1684, 1702, 1720, 1738, 1756, 1774, 1817, 1835, 1853, 1871, 1889, 1907, 1940, 1958, 1976, 1994, 2012, 2030 | −1275, −508, −251, 642, 1540, 1666 | −1406, −382, 773, 1797 |
| 29 | −1509, −1491, −1473, −1455, −1437, −1419, −1386, −1368, −1350, −1332, −1314, −1296, −1253, −1235, −1217, −1199, −1181, −1163, −1130, −1112, −1094, −1076, −1058, −1040, −485, −467, −449, −431, −413, −395, −362, −344, −326, −308, −290, −272, −229, −211, −193, −175, −157, −139, −106, −88, −70, −52, −34, −16, 539, 557, 575, 593, 611, 629, 662, 680, 698, 716, 734, 752, 795, 813, 831, 849, 867, 885, 918, 936, 954, 972, 990, 1008, 1563, 1581, 1599, 1617, 1635, 1653, 1686, 1704, 1722, 1740, 1758, 1776, 1819, 1837, 1855, 1873, 1891, 1909, 1942, 1960, 1978, 1996, 2014, 2032 | −1273, −507, −249, 644, 1541, 1668 | −1404, −380, 775, 1799 |
| 30 | −1508, −1490, −1472, −1454, −1436, −1418, −1385, −1367, −1349, −1331, −1313, −1295, −1252, −1234, −1216, −1198, −1180, −1162, −1129, −1111, −1093, −1075, −1057, −1039, −484, −466, −448, −430, −412, −394, −361, −343, −325, −307, −289, −271, −228, −210, −192, −174, −156, −138, −105, −87, −69, −51, −33, −15, 540, 558, 576, 594, 612, 630, 663, 681, 699, 717, 735, 753, 796, 814, 832, 850, 868, 886, 919, 937, 955, 973, 991, 1009, 1564, 1582, 1600, 1618, 1636, 1654, 1687, 1705, 1723, 1741, 1759, 1777, 1820, 1838, 1856, 1874, 1892, 1910, 1943, 1961, 1979, 1997, 2015, 2033 | −1272, −506, −248, 645, 1542, 1669 | −1403, −379, 776, 1800 |
| 31 | −1507, −1489, −1471, −1453, −1435, −1417, −1384, −1366, −1348, −1330, −1312, −1294, −1251, −1233, −1215, −1197, −1179, −1161, −1128, −1110, −1092, −1074, −1056, −1038, −483, −465, −447, −429, −411, −393, −360, −342, −324, −306, −288, −270, −227, −209, −191, −173, −155, −137, −104, −86, −68, −50, −32, −14, 541, 559, 577, 595, 613, 631, 664, 682, 700, 718, 736, 754, 797, 815, 833, 851, 869, 887, 920, 938, 956, 974, 992, 1010, 1565, 1583, 1601, 1619, 1637, 1655, 1688, 1706, 1724, 1742, 1760, 1778, 1821, 1839, 1857, 1875, 1893, 1911, 1944, 1962, 1980, 1998, 2016, 2034 | −1271, −505, −247, 646, 1543, 1670 | −1402, −378, 777, 1801 |

TABLE 40-continued

| Identifier of a 106-tone DRU | Index of a data subcarrier First part | Second part | Index of a pilot subcarrier |
|---|---|---|---|
| 32 | −1506, −1488, −1470, −1452, −1434, −1416, −1383, −1365, −1347, −1329, −1311, −1293, −1250, −1232, −1214, −1196, −1178, −1160, −1127, −1109, −1091, −1073, −1055, −1037, −482, −464, −446, −428, −410, −392, −359, −341, −323, −305, −287, −269, −226, −208, −190, −172, −154, −136, −103, −85, −67, −49, −31, −13, 542, 560, 578, 596, 614, 632, 665, 683, 701, 719, 737, 755, 798, 816, 834, 852, 870, 888, 921, 939, 957, 975, 993, 1011, 1566, 1584, 1602, 1620, 1638, 1656, 1689, 1707, 1725, 1743, 1761, 1779, 1822, 1840, 1858, 1876, 1894, 1912, 1945, 1963, 1981, 1999, 2017, 2035 | −1270, −504, −246, 647, 1544, 1671 | −1401, −377, 778, 1802 |

As shown in Table 40, each 106-tone DRU includes 102 data subcarriers, and some of the 102 data subcarriers (namely, the first part in Table 40: 96 data subcarriers) include 48 high-frequency subcarriers (whose subcarrier indices are positive values) and 48 low-frequency subcarriers (whose subcarrier indices are negative values). If every six data subcarriers of the 96 data subcarriers are considered as one group in a frequency direction (for example, from low to high) (or understood as an ascending order of indices), the 96 data subcarriers may be considered as 16 groups. Absolute values of index differences between adjacent data subcarriers in a same group are 18. In addition, absolute values of index differences between data subcarriers of two adjacent groups are sequentially 33, 43, 33, 555, and the like. In other words, in an ascending order of frequencies, an absolute value of an index difference between data subcarriers in an even-numbered group and a previous adjacent odd-numbered group is equal to 33. An absolute value of an index difference between data subcarriers in a $(4i+1)^{th}$ group (I=1, 2, or 3) and a previous $(4i)^{th}$ group is equal to 555. An absolute value of an index difference between data subcarriers in a $(4i-1)^{th}$ group (i=1, 2, 3, or 4) and a previous $(4i-2)^{th}$ group is equal to 43.

In other words, if indices of 96 data subcarriers of 102 data subcarriers included in each 106-tone DRU are sequentially arranged in a frequency direction and then divided into 16 groups, and each group includes six data subcarriers. Six data subcarriers in a same group are equally spaced. Specifically, a quantity of subcarriers between every two adjacent data subcarriers in a same group is 17.

In Table 40, for identifiers 1 to 4, 5 to 12, 13 to 16, 17 to 20, 21 to 28, or 29 to 32, there is a fixed offset between indices of 96 data subcarriers (the first part) included in two 106-tone DRUs having adjacent identifiers, and the fixed offset is 1. For example, indices of 96 data subcarriers in a 106-tone DRU whose identifier is i (i=1 to 3, 5 to 11, 13 to 15, 17 to 19, 21 to 27, or 29 to 31) all plus 1, to obtain indices of 96 data subcarriers in a 106-tone DRU whose identifier is i+1. An offset between indices of 96 data subcarriers (the first part) in the 106-tone DRU whose identifier is 4 and indices of 96 data subcarriers in the 106-tone DRU whose identifier is 5 is 2. Similarly, an offset between indices of 96 data subcarriers (the first part) in a 106-tone DRU whose identifier is 12 (20 or 28) and indices of 96 data subcarriers in a 106-tone DRU whose identifier is 13 (21 or 29) is 2. In addition, an offset between indices of 96 data subcarriers (e.g., the first part) in the 106-tone DRU whose identifier is 16 and indices of 96 data subcarriers in the 106-tone DRU whose identifier is 17 is 495.

In addition to the 96 data subcarriers in the first part column, each 106-tone DRU further includes six data subcarriers and four pilot subcarriers. In some embodiments, six data subcarriers and four pilot subcarriers may be separately selected from remaining subcarriers of all subcarriers of the entire bandwidth other than guard subcarriers, DC subcarriers, and data subcarriers in the first part column. A specific selection manner is not limited in this embodiment of this disclosure. For example, Table 40 shows an example, so that subcarriers included in the 106-tone DRU can be fully discrete.

Similar to the 106-tone DRU in the 80 MHz bandwidth or the 160 MHz bandwidth, the first part of data subcarriers may be considered as being obtained based on a 26-tone DRU or a 52-tone DRU. For brevity, as shown in Table 41, indices of the first part of data subcarriers included in the 106-tone DRU may be simplified and shown by using identifiers of 26-tone DRUs in Table 37.

TABLE 41

| Identifier of a 106-tone DRU | Index of a data subcarrier First part (identifier of a 26-tone DRU) | Second part | Index of a pilot subcarrier |
|---|---|---|---|
| 1 | 1, 37, 73, 109 | −1671, −1548, −647, 244, 500, 1268 | −1804, −780, 377, 1401 |
| 2 | 2, 38, 74, 110 | −1670, −1547, −646, 245, 501, 1269 | −1803, −779, 378, 1402 |
| 3 | 3, 39, 75, 111 | −1669, −1546, −645, 246, 502, 1270 | −1802, −778, 379, 1403 |
| 4 | 4, 40, 76, 112 | −1668, −1545, −644, 247, 503, 1271 | −1801, −777, 380, 1404 |
| 5 | 6, 42, 78, 114 | −1666, −1544, −642, 249, 504, 1273 | −1799, −775, 382, 1406 |

TABLE 41-continued

| Identifier of a 106-tone DRU | Index of a data subcarrier: First part (identifier of a 26-tone DRU) | Index of a data subcarrier: Second part | Index of a pilot subcarrier |
|---|---|---|---|
| 6 | 7, 43, 79, 115 | −1665, −1543, −641, 250, 505, 1274 | −1798, −774, 383, 1407 |
| 7 | 8, 44, 80, 116 | −1664, −1542, −640, 251, 506, 1275 | −1797, −773, 384, 1408 |
| 8 | 9, 45, 81, 117 | −1663, −1541, −639, 252, 507, 1276 | −1796, −772, 385, 1409 |
| 9 | 10, 46, 82, 118 | −1662, −1540, −638, 253, 508, 1277 | −1795, −771, 386, 1410 |
| 10 | 11, 47, 83, 119 | −1789, −1539, −765, 128, 509, 1152 | −1920, −896, 259, 1283 |
| 11 | 12, 48, 84, 120 | −1788, −1533, −764, 129, 515, 1153 | −1919, −895, 260, 1284 |
| 12 | 13, 49, 85, 121 | −1787, −1532, −763, 130, 516, 1154 | −1918, −894, 261, 1285 |
| 13 | 15, 51, 87, 123 | −1785, −1531, −761, 132, 517, 1156 | −1916, −892, 263, 1287 |
| 14 | 16, 52, 88, 124 | −1784, −1530, −760, 133, 518, 1157 | −1915, −891, 264, 1288 |
| 15 | 17, 53, 89, 125 | −1783, −1529, −759, 134, 519, 1158 | −1914, −890, 265, 1289 |
| 16 | 18, 54, 90, 126 | −1782, −1528, −758, 135, 520, 1159 | −1913, −889, 266, 1290 |
| 17 | 19, 55, 91, 127 | −1159, −524, −135, 756, 1524, 1780 | −1292, −268, 889, 1913 |
| 18 | 20, 56, 92, 128 | −1158, −523, −134, 757, 1525, 1781 | −1291, −267, 890, 1914 |
| 19 | 21, 57, 93, 129 | −1157, −522, −133, 758, 1526, 1782 | −1290, −266, 891, 1915 |
| 20 | 22, 58, 94, 130 | −1156, −521, −132, 759, 1527, 1783 | −1289, −265, 892, 1916 |
| 21 | 24, 60, 96, 132 | −1154, −520, −130, 761, 1528, 1785 | −1287, −263, 894, 1918 |
| 22 | 25, 61, 97, 133 | −1153, −519, −129, 762, 1529, 1786 | −1286, −262, 895, 1919 |
| 23 | 26, 62, 98, 134 | −1152, −518, −128, 763, 1530, 1787 | −1285, −261, 896, 1920 |
| 24 | 27, 63, 99, 135 | −1151, −517, −127, 764, 1531, 1788 | −1284, −260, 897, 1921 |
| 25 | 28, 64, 100, 136 | −1150, −516, −126, 765, 1532, 1789 | −1283, −259, 898, 1922 |
| 26 | 29, 65, 101, 137 | −1277, −515, −253, 640, 1533, 1664 | −1408, −384, 771, 1795 |
| 27 | 30, 66, 102, 138 | −1276, −509, −252, 641, 1539, 1665 | −1407, −383, 772, 1796 |
| 28 | 31, 67, 103, 139 | −1275, −508, −251, 642, 1540, 1666 | −1406, −382, 773, 1797 |
| 29 | 33, 69, 105, 141 | −1273, −507, −249, 644, 1541, 1668 | −1404, −380, 775, 1799 |
| 30 | 34, 70, 106, 142 | −1272, −506, −248, 645, 1542, 1669 | −1403, −379, 776, 1800 |
| 31 | 35, 71, 107, 143 | −1271, −505, −247, 646, 1543, 1670 | −1402, −378, 777, 1801 |
| 32 | 36, 72, 108, 144 | −1270, −504, −246, 647, 1544, 1671 | −1401, −377, 778, 1802 |

In Table 41, the "first part" column means that the first part of (96) data subcarriers in the 106-tone DRU include a combination of data subcarriers in corresponding 26-tone DRUs shown in Table 37. For example, a 106-tone DRU whose identifier is 1 is used as an example. 96 data subcarriers in the 102 data subcarriers included in the 106-tone DRU include all data subcarriers in four 26-tone DRUs whose identifiers are 1, 37, 73, and 109 shown in Table 37.

For example, the four pilot subcarriers included in the 106-tone DRU may be a part of a set of eight pilot subcarriers included in the corresponding four 26-tone DRUs. In addition, the other six data subcarriers included in the 106-tone DRU may be selected from remaining subcarriers of all the subcarriers of the entire bandwidth other than the guard subcarriers, the DC subcarriers, the data subcarriers in the first part column, and the pilot subcarriers, and the data subcarriers may be fully discrete, as shown in the "second part" column of Table 40 or Table 41.

In addition, in an embodiment of this disclosure, the identifier of the 106-tone DRU may be based on a lowest-frequency index of a data subcarrier included in each 106-tone DRU. For example, an identifier of a 106-tone DRU having a lowest-frequency index −2035 is 1.

According to the design of the 106-tone DRU shown in Table 40 in an embodiment of this disclosure, compared with the continuous 106-tone RU in the 320 MHz obtained based on the 80 MHz in FIG. 3, at a same power spectral density, this embodiment of this disclosure can implement a maximum power amplification multiple, specifically, 13.

In an embodiment of this disclosure, an association between a 26-tone DRU (indirectly a 52-tone DRU) and a 106-tone DRU in 320 MHz is described by using Table 41. It may be understood that the foregoing described manner of determining a 106-tone DRU based on a 26-tone DRU is merely an example, and subcarriers in the 106-tone DRU can be fully discrete. In another embodiment, a 106-tone DRU may alternatively be determined in another manner based on a 26-tone DRU. For example, a combination of four 26-tone DRUs whose identifiers are 1 to 4 is determined as the first part of data subcarriers of the 106-tone DRU whose identifier is 1. This is not limited in this disclosure. Details are not described again. In addition, it may be understood that if the lowest-frequency index of the data subcarrier included in the 26-tone DRU is another value other than −2035, correspondingly the lowest-frequency index of the data subcarrier included in the 106-tone DRU also adaptively changes to another value.

In a tone plan solution of a DRU, the 320 MHz bandwidth includes 16 242-tone DRUs, and each 242-tone DRU includes 234 data subcarriers and eight pilot subcarriers. For example, Table 42 shows an example of 16 242-tone DRUs corresponding to the 320 MHz bandwidth, and shows indices of 234 data subcarriers and indices of eight pilot subcarriers included in each 242-tone DRU. The 234 data subcarriers may be considered as three parts. A first part of data subcarriers includes 192 data subcarriers, a second part of data subcarriers includes 24 data subcarriers, a third part of data subcarriers includes 18 data subcarriers, and a lowest-frequency index of a data subcarrier in a 242-tone DRU whose identifier is 1 is −2035. It should be understood that, although the data subcarriers are divided into the first part, the second part, and the third part in Table 42 and are separately listed, in this embodiment of this disclosure, the data subcarriers are presented as a plurality of parts only for ease of description, and are not actually used as division of data subcarriers included in each 242-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 242-tone DRU.

TABLE 42

| Identifier of a 242-tone DRU | Index of a data subcarrier | | | Index of a pilot subcarrier |
|---|---|---|---|---|
| | First part | Second part | Third part | |
| 1 | −2035, −2017, −1999, −1981, −1963, −1945, −1912, −1894, −1876, −1858, −1840, −1822, −1779, −1761, −1743, −1725, −1707, −1689, −1656, −1638, −1620, −1602, −1584, −1566, −1523, −1505, −1487, −1469, −1451, −1433, −1400, −1382, −1364, −1346, −1328, −1310, 1267, −1249, −1231, −1213, −1195, −1177, −1144, −1126, −1108, −1090, −1072, −1054, −1011, −993, −975, −957, −939, −921, −888, −870, −852, −834, −816, −798, −755, −737, −719, −701, −683, −665, −632, −614, −596, −578, −560, −542, −499, −481, −463, −445, −427, −409, −376, −358, −340, −322, −304, −286, −243, −225, −207, −189, −171, −153, −120, −102, −84, −66, −48, −30, 13, 31, 49, 67, 85, 103, 136, 154, 172, 190, 208, 226, 269, 287, 305, 323, 341, 359, 392, 410, 428, 446, 464, 482, 525, 543, 561, 579, 597, 615, 648, 666, 684, 702, 720, 738, 781, 799, 817, 835, 853, 871, 904, 922, 940, 958, 976, 994, 1037, 1055, 1073, 1091, 1109, 1127, 1160, 1178, 1196, 1214, 1232, 1250, 1293, 1311, 1329, 1347, 1365, 1383, 1416, 1434, 1452, 1470, 1488, 1506, 1549, 1567, 1585, 1603, 1621, 1639, 1672, 1690, 1708, 1726, 1744, 1762, 1805, 1823, 1841, 1859, 1877, 1895, 1928, 1946, 1964, 1982, 2000, 2018 | −2031, −2013, −1995, −1977, −1959, −1941, −1908, −1890, −1872, −1854, −1836, −1818, −1775, −1757, −1739, −1721, −1703, −1685, −1652, −1634, −1616, −1598, −1580, −1562 | −1671, −1548, −647, 244, 500, 1268, −1159, −524, −135, 756, 1524, 1780, −1527, −1415, −1036, −637, −1800, −1667 | −1804, −780, 377, 1401, −1292, −268, 889, 1913 |
| 2 | −2034, −2016, −1998, −1980, −1962, −1944, −1911, −1893, −1875, −1857, −1839, −1821, −1778, −1760, −1742, −1724, −1706, −1688, −1655, −1637, −1619, −1601, −1583, −1565, −1522, −1504, −1486, −1468, −1450, −1432, −1399, −1381, −1363, −1345, −1327, −1309, −1266, | −2022, −2004, −1986, −1968, −1950, −1932, −1899, −1881, −1863, −1845, −1827, −1809, −1766, | −1670, −1547, −646, 245, 501, 1269, −1158, −523, −134, 757, 1525, 1781, −1526, −1414, −1012, −636, | −1803, −779, 378, 1402, −1291, −267, 890, 1914 |

TABLE 42-continued

| Identifier of a 242-tone DRU | Index of a data subcarrier | | | Index of a pilot subcarrier |
|---|---|---|---|---|
| | First part | Second part | Third part | |
| | 1248, −1230, −1212, −1194, −1176, −1143, −1125, −1107, −1089, −1071, −1053, −1010, −992, −974, −956, −938, −920, −887, −869, −851, −833, −815, −797, −754, −736, −718, −700, −682, −664, −631, −613, −595, −577, −559, −541, −498, −480, −462, −444, −426, −408, −375, −357, −339, −321, −303, −285, −242, −224, −206, −188, −170, −152, −119, −101, −83, −65, −47, −29, 14, 32, 50, 68, 86, 104, 137, 155, 173, 191, 209, 227, 270, 288, 306, 324, 342, 360, 393, 411, 429, 447, 465, 483, 526, 544, 562, 580, 598, 616, 649, 667, 685, 703, 721, 739, 782, 800, 818, 836, 854, 872, 905, 923, 941, 959, 977, 995, 1038, 1056, 1074, 1092, 1110, 1128, 1161, 1179, 1197, 1215, 1233, 1251, 1294, 1312, 1330, 1348, 1366, 1384, 1417, 1435, 1453, 1471, 1489, 1507, 1550, 1568, 1586, 1604, 1622, 1640, 1673, 1691, 1709, 1727, 1745, 1763, 1806, 1824, 1842, 1860, 1878, 1896, 1929, 1947, 1965, 1983, 2001, 2019 | −1748, −1730, −1712, −1694, −1676, −1643, −1625, −1607, −1589, −1571, −1553 | −1917, −1786 | |
| 3 | −2033, −2015, −1997, −1979, −1961, −1943, −1910, −1892, −1874, −1856, −1838, −1820, −1777, −1759, −1741, −1723, −1705, −1687, −1654, −1636, −1618, −1600, −1582, −1564, −1521, −1503, −1485, −1467, −1449, −1431, −1398, −1380, −1362, −1344, −1326, −1308, −1265, −1247, −1229, −1211, −1193, −1175, −1142, −1124, −1106, −1088, −1070, −1052, −1009, −991, −973, −955, −937, −919, −886, −868, −850, −832, −814, −796, −753, −735, −717, −699, −681, −663, −630, −612, −594, −576, −558, −540, −497, −479, −461, −443, −425, −407, −374, −356, −338, −320, −302, −284, −241, −223, −205, −187, −169, −151, −118, −100, −82, −64, −46, −28, 15, 33, 51, 69, 87, 105, 138, 156, 174, 192, 210, 228, 271, 289, 307, 325, 343, 361, 394, 412, 430, 448, 466, 484, 527, 545, 563, 581, 599, 617, 650, 668, 686, 704, 722, 740, 783, 801, 819, 837, 855, 873, 906, 924, 942, 960, 978, 996, 1039, 1057, 1075, 1093, 1111, 1129, 1162, 1180, 1198, 1216, 1234, 1252, 1295, 1313, 1331, 1349, 1367, 1385, 1418, 1436, 1454, 1472, 1490, 1508, 1551, 1569, 1587, 1605, 1623, 1641, 1674, 1692, 1710, 1728, 1746, 1764, 1807, 1825, 1843, 1861, 1879, 1897, 1930, 1948, 1966, 1984, 2002, 2020 | −1519, −1501, −1483, −1465, −1447, −1429, −1396, −1378, −1360, −1342, −1324, −1306, −1263, −1245, −1227, −1209, −1191, −1173, −1140, −1122, −1104, −1086, −1068, −1050 | −1669, −1546, −645, 246, 502, 1270, −1157, −522, −133, 758, 1526, 1782, −1781, −1413, −903, −635, −1288, −1155 | −1802, −778, 379, 1403, −1290, −266, 891, 1915 |
| 4 | −2032, −2014, −1996, −1978, −1960, −1942, −1909, −1891, −1873, −1855, −1837, −1819, −1776, −1758, −1740, −1722, −1704, −1686, −1653, −1635, −1617, −1599, −1581, −1563, −1520, −1502, −1484, −1466, −1448, −1430, −1397, −1379, −1361, −1343, −1325, −1307, | −1510, −1492, −1474, −1456, −1438, −1420, −1387, −1369, −1351, −1333, −1315, −1297, −1254, | −1668, −1545, −644, 247, 503, 1271, −1156, −521, −132, 759, 1527, 1783, −1780, −1412, −902, −634, −1405, | −1801, −777, 380, 1404, −1289, −265, 892, 1916 |

TABLE 42-continued

| Identifier of a 242-tone DRU | Index of a data subcarrier: First part | Index of a data subcarrier: Second part | Index of a data subcarrier: Third part | Index of a pilot subcarrier |
|---|---|---|---|---|
| | −1264, −1246, −1228, −1210, −1192, −1174, −1141, −1123, −1105, −1087, −1069, −1051, −1008, −990, −972, −954, −936, −918, −885, −867, −849, −831, −813, −795, −752, −734, −716, −698, −680, −662, −629, −611, −593, −575, −557, −539, −496, −478, −460, −442, −424, −406, −373, −355, −337, −319, −301, −283, −240, −222, −204, −186, −168, −150, −117, −99, −81, −63, −45, −27, 16, 34, 52, 70, 88, 106, 139, 157, 175, 193, 211, 229, 272, 290, 308, 326, 344, 362, 395, 413, 431, 449, 467, 485, 528, 546, 564, 582, 600, 618, 651, 669, 687, 705, 723, 741, 784, 802, 820, 838, 856, 874, 907, 925, 943, 961, 979, 997, 1040, 1058, 1076, 1094, 1112, 1130, 1163, 1181, 1199, 1217, 1235, 1253, 1296, 1314, 1332, 1350, 1368, 1386, 1419, 1437, 1455, 1473, 1491, 1509, 1552, 1570, 1588, 1606, 1624, 1642, 1675, 1693, 1711, 1729, 1747, 1765, 1808, 1826, 1844, 1862, 1880, 1898, 1931, 1949, 1967, 1985, 2003, 2021 | −1236, −1218, −1200, −1182, −1164, −1131, −1113, −1095, −1077, −1059, −1041 | −1274 | |
| 5 | −2030, −2012, −1994, −1976, −1958, −1940, −1907, −1889, −1871, −1853, −1835, −1817, −1774, −1756, −1738, −1720, −1702, −1684, −1651, −1633, −1615, −1597, −1579, −1561, −1518, −1500, −1482, −1464, −1446, −1428, −1395, −1377, −1359, −1341, −1323, −1305, 1262, −1244, −1226, −1208, −1190, −1172, −1139, −1121, −1103, −1085, −1067, −1049, −1006, −988, −970, −952, −934, −916, −883, −865, −847, −829, −811, −793, −750, −732, −714, −696, −678, −660, −627, −609, −591, −573, −555, −537, −494, −476, −458, −440, −422, −404, −371, −353, −335, −317, −299, −281, −238, −220, −202, −184, −166, −148, −115, −97, −79, −61, −43, −25, 18, 36, 54, 72, 90, 108, 141, 159, 177, 195, 213, 231, 274, 292, 310, 328, 346, 364, 397, 415, 433, 451, 469, 487, 530, 548, 566, 584, 602, 620, 653, 671, 689, 707, 725, 743, 786, 804, 822, 840, 858, 876, 909, 927, 945, 963, 981, 999, 1042, 1060, 1078, 1096, 1114, 1132, 1165, 1183, 1201, 1219, 1237, 1255, 1298, 1316, 1334, 1352, 1370, 1388, 1421, 1439, 1457, 1475, 1493, 1511, 1554, 1572, 1590, 1608, 1626, 1644, 1677, 1695, 1713, 1731, 1749, 1767, 1810, 1828, 1846, 1864, 1882, 1900, 1933, 1951, 1969, 1987, 2005, 2023 | −1007, −989, −971, −953, −935, −917, −884, −866, −848, −830, −812, −794, −751, −733, −715, −697, −679, −661, −628, −610, −592, −574, −556, −538 | −1666, −1544, −642, 249, 504, 1273, −1154, −520, −130, 761, 1528, 1785, −1792, −1411, −901, −503, −776, −643 | −1799, −775, 382, 1406, −1287, −263, 894, 1918 |
| 6 | −2029, −2011, −1993, −1975, −1957, −1939, −1906, −1888, −1870, −1852, −1834, −1816, −1773, −1755, −1737, −1719, −1701, −1683, −1650, −1632, −1614, −1596, −1578, −1560, −1517, −1499, −1481, −1463, −1445, −1427, −1394, −1376, −1358, −1340, −1322, −1304, | −998, −980, −962, −944, −926, −908, −875, −857, −839, −821, −803, −785, −742, −724, −706, −688, −670, −652, | −1665, −1543, −641, 250, 505, 1274, −1153, −519, −129, 762, 1529, 1786, −1791, −1410, −900, −502, −893, | −1798, −774, 383, 1407, −1286, −262, 895, 1919 |

TABLE 42-continued

| Identifier of a 242-tone DRU | Index of a data subcarrier — First part | Index of a data subcarrier — Second part | Index of a data subcarrier — Third part | Index of a pilot subcarrier |
|---|---|---|---|---|
| | 1261, −1243, −1225, −1207, −1189, −1171, −1138, −1120, −1102, −1084, −1066, −1048, −1005, −987, −969, −951, −933, −915, −882, −864, −846, −828, −810, −792, −749, −731, −713, −695, −677, −659, −626, −608, −590, −572, −554, −536, −493, −475, −457, −439, −421, −403, −370, −352, −334, −316, −298, −280, −237, −219, −201, −183, −165, −147, −114, −96, −78, −60, −42, −24, 19, 37, 55, 73, 91, 109, 142, 160, 178, 196, 214, 232, 275, 293, 311, 329, 347, 365, 398, 416, 434, 452, 470, 488, 531, 549, 567, 585, 603, 621, 654, 672, 690, 708, 726, 744, 787, 805, 823, 841, 859, 877, 910, 928, 946, 964, 982, 1000, 1043, 1061, 1079, 1097, 1115, 1133, 1166, 1184, 1202, 1220, 1238, 1256, 1299, 1317, 1335, 1353, 1371, 1389, 1422, 1440, 1458, 1476, 1494, 1512, 1555, 1573, 1591, 1609, 1627, 1645, 1678, 1696, 1714, 1732, 1750, 1768, 1811, 1829, 1847, 1865, 1883, 1901, 1934, 1952, 1970, 1988, 2006, 2024 | −619, −601, −583, −565, −547, −529 | −762 | |
| 7 | −2028, −2010, −1992, −1974, −1956, −1938, −1905, −1887, −1869, −1851, −1833, −1815, −1772, −1754, −1736, −1718, −1700, −1682, −1649, −1631, −1613, −1595, −1577, −1559, −1516, −1498, −1480, −1462, −1444, −1426, −1393, −1375, −1357, −1339, −1321, −1303, −1260, −1242, −1224, −1206, −1188, −1170, −1137, −1119, −1101, −1083, −1065, −1047, −1004, −986, −968, −950, −932, −914, −881, −863, −845, −827, −809, −791, −748, −730, −712, −694, −676, −658, −625, −607, −589, −571, −553, −535, −492, −474, −456, −438, −420, −402, −369, −351, −333, −315, −297, −279, −236, −218, −200, −182, −164, −146, −113, −95, −77, −59, −41, −23, 20, 38, 56, 74, 92, 110, 143, 161, 179, 197, 215, 233, 276, 294, 312, 330, 348, 366, 399, 417, 435, 453, 471, 489, 532, 550, 568, 586, 604, 622, 655, 673, 691, 709, 727, 745, 788, 806, 824, 842, 860, 878, 911, 929, 947, 965, 983, 1001, 1044, 1062, 1080, 1098, 1116, 1134, 1167, 1185, 1203, 1221, 1239, 1257, 1300, 1318, 1336, 1354, 1372, 1390, 1423, 1441, 1459, 1477, 1495, 1513, 1556, 1574, 1592, 1610, 1628, 1646, 1679, 1697, 1715, 1733, 1751, 1769, 1812, 1830, 1848, 1866, 1884, 1902, 1935, 1953, 1971, 1989, 2007, 2025 | −495, −477, −459, −441, −423, −405, −372, −354, −336, −318, −300, −282, −239, −221, −203, −185, −167, −149, −116, −98, −80, −62, −44, −26 | −1664, −1542, −640, 251, 506, 1275, −1152, −518, −128, 763, 1530, 1787, −1790, −1409, −899, −12, −264, −131 | −1797, −773, 384, 1408, −1285, −261, 896, 1920 |
| 8 | −2027, −2009, −1991, −1973, −1955, −1937, −1904, −1886, −1868, −1850, −1832, −1814, −1771, −1753, −1735, −1717, −1699, −1681, −1648, −1630, −1612, −1594, −1576, −1558, −1515, −1497, −1479, −1461, −1443, −1425, −1392, −1374, −1356, −1338, −1320, −1302, | −486, −468, −450, −432, −414, −396, −363, −345, −327, −309, −291, −273, −230, −212, −194, −176, −158, −140, | −1663, −1541, −639, 252, 507, 1276, −1151, −517, −127, 764, 1531, 1788, −1927, −1282, −898, 12, −381, | −1796, −772, 385, 1409, −1284, −260, 897, 1921 |

TABLE 42-continued

| Identifier of a 242-tone DRU | Index of a data subcarrier First part | Second part | Third part | Index of a pilot subcarrier |
|---|---|---|---|---|
| | −1259, −1241, −1223, −1205, −1187, −1169, −1136, −1118, −1100, −1082, −1064, −1046, −1003, −985, −967, −949, −931, −913, −880, −862, −844, −826, −808, −790, −747, −729, −711, −693, −675, −657, −624, −606, −588, −570, −552, −534, −491, −473, −455, −437, −419, −401, −368, −350, −332, −314, −296, −278, −235, −217, −199, −181, −163, −145, −112, −94, −76, −58, −40, −22, 21, 39, 57, 75, 93, 111, 144, 162, 180, 198, 216, 234, 277, 295, 313, 331, 349, 367, 400, 418, 436, 454, 472, 490, 533, 551, 569, 587, 605, 623, 656, 674, 692, 710, 728, 746, 789, 807, 825, 843, 861, 879, 912, 930, 948, 966, 984, 1002, 1045, 1063, 1081, 1099, 1117, 1135, 1168, 1186, 1204, 1222, 1240, 1258, 1301, 1319, 1337, 1355, 1373, 1391, 1424, 1442, 1460, 1478, 1496, 1514, 1557, 1575, 1593, 1611, 1629, 1647, 1680, 1698, 1716, 1734, 1752, 1770, 1813, 1831, 1849, 1867, 1885, 1903, 1936, 1954, 1972, 1990, 2008, 2026 | −107, −89, −71, −53, −35, −17 | −250 | |
| 9 | −2026, −2008, −1990, −1972, −1954, −1936, −1903, −1885, −1867, −1849, −1831, −1813, −1770, −1752, −1734, −1716, −1698, −1680, −1647, −1629, −1611, −1593, −1575, −1557, −1514, −1496, −1478, −1460, −1442, −1424, −1391, −1373, −1355, −1337, −1319, −1301, −1258, 1240, −1222, −1204, −1186, −1168, −1135, −1117, −1099, −1081, −1063, −1045, −1002, −984, −966, −948, −930, −912, −879, −861, −843, −825, −807, −789, −746, −728, −710, −692, −674, −656, −623, −605, −587, −569, −551, −533, −490, −472, −454, −436, −418, −400, −367, −349, −331, −313, −295, −277, −234, −216, −198, −180, −162, −144, −111, −93, −75, −57, −39, −21, 22, 40, 58, 76, 94, 112, 145, 163, 181, 199, 217, 235, 278, 296, 314, 332, 350, 368, 401, 419, 437, 455, 473, 491, 534, 552, 570, 588, 606, 624, 657, 675, 693, 711, 729, 747, 790, 808, 826, 844, 862, 880, 913, 931, 949, 967, 985, 1003, 1046, 1064, 1082, 1100, 1118, 1136, 1169, 1187, 1205, 1223, 1241, 1259, 1302, 1320, 1338, 1356, 1374, 1392, 1425, 1443, 1461, 1479, 1497, 1515, 1558, 1576, 1594, 1612, 1630, 1648, 1681, 1699, 1717, 1735, 1753, 1771, 1814, 1832, 1850, 1868, 1886, 1904, 1937, 1955, 1973, 1991, 2009, 2027 | 17, 35, 53, 71, 89, 107, 140, 158, 176, 194, 212, 230, 273, 291, 309, 327, 345, 363, 396, 414, 432, 450, 468, 486 | −1662, −1540, −638, 253, 508, 1277, −1150, −516, −126, 765, 1532, 1789, −1926, −1281, −897, 521, 248, 381 | −1795, −771, 386, 1410, −1283, −259, 898, 1922 |
| 10 | −2025, −2007, −1989, −1971, −1953, −1935, −1902, −1884, −1866, −1848, −1830, −1812, −1769, −1751, −1733, −1715, −1697, −1679, −1646, −1628, −1610, −1592, −1574, −1556, −1513, −1495, −1477, −1459, −1441, −1423, −1390, −1372, −1354, −1336, −1318, −1300, | 26, 44, 62, 80, 98, 116, 149, 167, 185, 203, 221, 239, 282, 300, 318, 336, 354, 372, 405, 423, 441, | −1789, −1539, −765, 128, 509, 1152, −1277, −515, −253, 640, 1533, 1664, −1925, −1280, −770, 522, 131, 262 | −1920, −896, 259, 1283, −1408, −384, 771, 1795 |

TABLE 42-continued

| Identifier of a 242-tone | Index of a data subcarrier | | | Index of a pilot |
|---|---|---|---|---|
| DRU | First part | Second part | Third part | subcarrier |
| | −1257, −1239, −1221, −1203, −1185, −1167, −1134, −1116, −1098, −1080, −1062, −1044, −1001, −983, −965, −947, −929, −911, −878, −860, −842, −824, −806, −788, −745, −727, −709, −691, −673, −655, −622, −604, −586, −568, −550, −532, −489, −471, −453, −435, −417, −399, −366, −348, −330, −312, −294, −276, −233, −215, −197, −179, −161, −143, −110, −92, −74, −56, −38, −20, 23, 41, 59, 77, 95, 113, 146, 164, 182, 200, 218, 236, 279, 297, 315, 333, 351, 369, 402, 420, 438, 456, 474, 492, 535, 553, 571, 589, 607, 625, 658, 676, 694, 712, 730, 748, 791, 809, 827, 845, 863, 881, 914, 932, 950, 968, 986, 1004, 1047, 1065, 1083, 1101, 1119, 1137, 1170, 1188, 1206, 1224, 1242, 1260, 1303, 1321, 1339, 1357, 1375, 1393, 1426, 1444, 1462, 1480, 1498, 1516, 1559, 1577, 1595, 1613, 1631, 1649, 1682, 1700, 1718, 1736, 1754, 1772, 1815, 1833, 1851, 1869, 1887, 1905, 1938, 1956, 1974, 1992, 2010, 2028 | 459, 477, 495 | | |
| 11 | −2024, −2006, −1988, −1970, −1952, −1934, −1901, −1883, −1865, −1847, −1829, −1811, −1768, −1750, −1732, −1714, −1696, −1678, −1645, −1627, −1609, −1591, −1573, −1555, −1512, −1494, −1476, −1458, −1440, −1422, −1389, −1371, −1353, −1335, −1317, −1299, −1256, −1238, −1220, −1202, −1184, −1166, −1133, −1115, −1097, −1079, −1061, −1043, −1000, −982, −964, −946, −928, −910, −877, −859, −841, −823, −805, −787, −744, −726, −708, −690, −672, −654, −621, −603, −585, −567, −549, −531, −488, −470, −452, −434, −416, −398, −365, −347, −329, −311, −293, −275, 232, −214, −196, −178, −160, −142, −109, −91, −73, −55, −37, −19, 24, 42, 60, 78, 96, 114, 147, 165, 183, 201, 219, 237, 280, 298, 316, 334, 352, 370, 403, 421, 439, 457, 475, 493, 536, 554, 572, 590, 608, 626, 659, 677, 695, 713, 731, 749, 792, 810, 828, 846, 864, 882, 915, 933, 951, 969, 987, 1005, 1048, 1066, 1084, 1102, 1120, 1138, 1171, 1189, 1207, 1225, 1243, 1261, 1304, 1322, 1340, 1358, 1376, 1394, 1427, 1445, 1463, 1481, 1499, 1517, 1560, 1578, 1596, 1614, 1632, 1650, 1683, 1701, 1719, 1737, 1755, 1773, 1816, 1834, 1852, 1870, 1888, 1906, 1939, 1957, 1975, 1993, 2011, 2029 | 529, 547, 565, 583, 601, 619, 652, 670, 688, 706, 724, 742, 785, 803, 821, 839, 857, 875, 908, 926, 944, 962, 980, 998 | −1788, −1533, −764, 129, 515, 1153, −1276, −509, −252, 641, 1539, 1665, −1924, −1279, −769, 1145, 760, 893 | −1919, −895, 260, 1284, 1407, −383, 772, 1796 |
| 12 | −2023, −2005, −1987, −1969, −1951, −1933, −1900, −1882, −1864, −1846, −1828, −1810, −1767, −1749, −1731, −1713, −1695, −1677, −1644, −1626, −1608, −1590, −1572, −1554, −1511, −1493, −1475, −1457, −1439, −1421, −1388, −1370, −1352, −1334, −1316, −1298, −1255, | 538, 556, 574, 592, 610, 628, 661, 679, 697, 715, 733, 751, 794, 812, 830, 848, 866, 884, | −1787, −1532, −763, 130, 516, 1154, −1275, −508, −251, 642, 1540, 1666, −1923, −1278, −768, 1146, 643, | −1918, −894, 261, 1285, −1406, −382, 773, 1797 |

TABLE 42-continued

| Identifier of a 242-tone DRU | Index of a data subcarrier | | | Index of a pilot subcarrier |
|---|---|---|---|---|
| | First part | Second part | Third part | |
| | −1237, −1219, −1201, −1183, −1165, −1132, −1114, −1096, −1078, −1060, −1042, −999, −981, −963, −945, −927, −909, −876, −858, −840, −822, −804, −786, −743, −725, −707, −689, −671, −653, −620, −602, −584, −566, −548, −530, −487, −469, −451, −433, −415, −397, −364, −346, −328, −310, −292, −274, −231, −213, −195, −177, −159, −141, −108, −90, −72, −54, −36, −18, 25, 43, 61, 79, 97, 115, 148, 166, 184, 202, 220, 238, 281, 299, 317, 335, 353, 371, 404, 422, 440, 458, 476, 494, 537, 555, 573, 591, 609, 627, 660, 678, 696, 714, 732, 750, 793, 811, 829, 847, 865, 883, 916, 934, 952, 970, 988, 1006, 1049, 1067, 1085, 1103, 1121, 1139, 1172, 1190, 1208, 1226, 1244, 1262, 1305, 1323, 1341, 1359, 1377, 1395, 1428, 1446, 1464, 1482, 1500, 1518, 1561, 1579, 1597, 1615, 1633, 1651, 1684, 1702, 1720, 1738, 1756, 1774, 1817, 1835, 1853, 1871, 1889, 1907, 1940, 1958, 1976, 1994, 2012, 2030 | 917, 935, 953, 971, 989, 1007 | 774 | |
| 13 | −2021, −2003, −1985, −1967, −1949, −1931, −1898, −1880, −1862, −1844, −1826, −1808, −1765, −1747, −1729, −1711, −1693, −1675, −1642, −1624, −1606, −1588, −1570, −1552, −1509, −1491, −1473, −1455, −1437, −1419, −1386, −1368, −1350, −1332, −1314, −1296, −1253, −1235, −1217, −1199, −1181, −1163, −1130, −1112, −1094, −1076, −1058, −1040, −997, −979, −961, −943, −925, −907, −874, −856, −838, −820, −802, −784, −741, −723, −705, −687, −669, −651, −618, −600, −582, −564, −546, −528, −485, −467, −449, −431, −413, −395, −362, −344, −326, −308, −290, −272, −229, −211, −193, −175, −157, −139, −106, −88, −70, −52, −34, −16, 27, 45, 63, 81, 99, 117, 150, 168, 186, 204, 222, 240, 283, 301, 319, 337, 355, 373, 406, 424, 442, 460, 478, 496, 539, 557, 575, 593, 611, 629, 662, 680, 698, 716, 734, 752, 795, 813, 831, 849, 867, 885, 918, 936, 954, 972, 990, 1008, 1051, 1069, 1087, 1105, 1123, 1141, 1174, 1192, 1210, 1228, 1246, 1264, 1307, 1325, 1343, 1361, 1379, 1397, 1430, 1448, 1466, 1484, 1502, 1520, 1563, 1581, 1599, 1617, 1635, 1653, 1686, 1704, 1722, 1740, 1758, 1776, 1819, 1837, 1855, 1873, 1891, 1909, 1942, 1960, 1978, 1996, 2014, 2032 | 1041, 1059, 1077, 1095, 1113, 1131, 1164, 1182, 1200, 1218, 1236, 1254, 1297, 1315, 1333, 1351, 1369, 1387, 1420, 1438, 1456, 1474, 1492, 1510 | −1785, −1531, −761, 132, 517, 1156, −1273, −507, −249, 644, 1541, 1668, −1922, −1269, −767, 1411, 1272, 1405 | −1916, −892, 263, 1287, −1404, −380, 775, 1799 |
| 14 | −2020, −2002, −1984, −1966, −1948, −1930, −1897, −1879, −1861, −1843, −1825, −1807, −1764, −1746, −1728, −1710, −1692, −1674, −1641, −1623, −1605, −1587, −1569, −1551, −1508, −1490, −1472, −1454, −1436, −1418, −1385, −1367, −1349, −1331, −1313, −1295, | 1050, 1068, 1086, 1104, 1122, 1140, 1173, 1191, 1209, 1227, 1245, 1263, 1306, 1324, 1342, 1360, 1378, 1396, | −1784, −1530, −760, 133, 518, 1157, −1272, −506, −248, 645, 1542, 1669, −1921, −1268, −766, 1412, 1155, | −1915, −891, 264, 1288, −1403, −379, 776, 1800 |

TABLE 42-continued

| Identifier of a 242-tone DRU | Index of a data subcarrier First part | Second part | Third part | Index of a pilot subcarrier |
|---|---|---|---|---|
| | −1252, −1234, −1216, −1198, −1180, −1162, −1129, −1111, −1093, −1075, −1057, −1039, −996, −978, −960, −942, −924, −906, −873, −855, −837, −819, −801, −783, −740, −722, −704, −686, −668, −650, −617, −599, −581, −563, −545, −527, −484, −466, −448, −430, −412, −394, −361, −343, −325, −307, −289, −271, −228, −210, −192, −174, −156, −138, −105, −87, −69, −51, −33, −15, 28, 46, 64, 82, 100, 118, 151, 169, 187, 205, 223, 241, 284, 302, 320, 338, 356, 374, 407, 425, 443, 461, 479, 497, 540, 558, 576, 594, 612, 630, 663, 681, 699, 717, 735, 753, 796, 814, 832, 850, 868, 886, 919, 937, 955, 973, 991, 1009, 1052, 1070, 1088, 1106, 1124, 1142, 1175, 1193, 1211, 1229, 1247, 1265, 1308, 1326, 1344, 1362, 1380, 1398, 1431, 1449, 1467, 1485, 1503, 1521, 1564, 1582, 1600, 1618, 1636, 1654, 1687, 1705, 1723, 1741, 1759, 1777, 1820, 1838, 1856, 1874, 1892, 1910, 1943, 1961, 1979, 1997, 2015, 2033 | 1429, 1447, 1465, 1483, 1501, 1519 | 1286 | |
| 15 | −2019, −2001, −1983, −1965, −1947, −1929, −1896, −1878, −1860, −1842, −1824, −1806, −1763, −1745, −1727, −1709, −1691, −1673, −1640, −1622, −1604, −1586, −1568, −1550, −1507, −1489, −1471, −1453, −1435, −1417, −1384, −1366, −1348, −1330, −1312, −1294, 1251, −1233, −1215, −1197, −1179, −1161, −1128, −1110, −1092, −1074, −1056, −1038, −995, −977, −959, −941, −923, −905, −872, −854, −836, −818, −800, −782, −739, −721, −703, −685, −667, −649, −616, −598, −580, −562, −544, −526, −483, −465, −447, −429, −411, −393, −360, −342, −324, −306, −288, −270, −227, −209, −191, −173, −155, −137, −104, −86, −68, −50, −32, −14, 29, 47, 65, 83, 101, 119, 152, 170, 188, 206, 224, 242, 285, 303, 321, 339, 357, 375, 408, 426, 444, 462, 480, 498, 541, 559, 577, 595, 613, 631, 664, 682, 700, 718, 736, 754, 797, 815, 833, 851, 869, 887, 920, 938, 956, 974, 992, 1010, 1053, 1071, 1089, 1107, 1125, 1143, 1176, 1194, 1212, 1230, 1248, 1266, 1309, 1327, 1345, 1363, 1381, 1399, 1432, 1450, 1468, 1486, 1504, 1522, 1565, 1583, 1601, 1619, 1637, 1655, 1688, 1706, 1724, 1742, 1760, 1778, 1821, 1839, 1857, 1875, 1893, 1911, 1944, 1962, 1980, 1998, 2016, 2034 | 1553, 1571, 1589, 1607, 1625, 1643, 1676, 1694, 1712, 1730, 1748, 1766, 1809, 1827, 1845, 1863, 1881, 1899, 1932, 1950, 1968, 1986, 2004, 2022 | −1783, −1529, −759, 134, 519, 1158, −1271, −505, −247, 646, 1543, 1670, −1794, −1149, −757, 1413, 1784, 1917 | −1914, −890, 265, 1289, −1402, −378, 777, 1801 |
| 16 | −2018, −2000, −1982, −1964, −1946, −1928, −1895, −1877, −1859, −1841, −1823, −1805, −1762, −1744, −1726, −1708, −1690, −1672, −1639, −1621, −1603, −1585, −1567, −1549, −1506, −1488, −1470, −1452, −1434, −1416, −1383, −1365, | 1562, 1580, 1598, 1616, 1634, 1652, 1685, 1703, 1721, 1739, 1757, 1775, 1818, 1836, 1854, 1872, | −1782, −1528, −758, 135, 520, 1159, −1270, −504, −246, 647, 1544, 1671, −1793, −1148, −756, | −1913, −889, 266, 1290, −1401, −377, 778, 1802 |

TABLE 42-continued

| Identifier of a 242-tone DRU | Index of a data subcarrier: First part | Second part | Third part | Index of a pilot subcarrier |
|---|---|---|---|---|
| | −1347, −1329, −1311, −1293, −1250, −1232, −1214, −1196, −1178, −1160, −1127, −1109, −1091, −1073, −1055, −1037, −994, −976, −958, −940, −922, −904, −871, −853, −835, −817, −799, −781, −738, −720, −702, −684, −666, −648, −615, −597, −579, −561, −543, −525, −482, −464, −446, −428, −410, −392, −359, −341, −323, −305, −287, −269, −226, −208, −190, −172, −154, −136, −103, −85, −67, −49, −31, −13, 30, 48, 66, 84, 102, 120, 153, 171, 189, 207, 225, 243, 286, 304, 322, 340, 358, 376, 409, 427, 445, 463, 481, 499, 542, 560, 578, 596, 614, 632, 665, 683, 701, 719, 737, 755, 798, 816, 834, 852, 870, 888, 921, 939, 957, 975, 993, 1011, 1054, 1072, 1090, 1108, 1126, 1144, 1177, 1195, 1213, 1231, 1249, 1267, 1310, 1328, 1346, 1364, 1382, 1400, 1433, 1451, 1469, 1487, 1505, 1523, 1566, 1584, 1602, 1620, 1638, 1656, 1689, 1707, 1725, 1743, 1761, 1779, 1822, 1840, 1858, 1876, 1894, 1912, 1945, 1963, 1981, 1999, 2017, 2035 | 1890, 1908, 1941, 1959, 1977, 1995, 2013, 2031 | 1414, 1667, 1798 | |

As shown in Table 42, a first part of (192) data subcarriers in each 242-tone DRU include 96 high-frequency subcarriers (whose subcarrier indices are positive values) and 96 low-frequency subcarriers (whose subcarrier indices are negative values). If every six data subcarriers of the 192 data subcarriers (the first part) are considered as one group in a frequency direction (for example, from low to high) (or understood as an ascending order of indices), absolute values of index differences between adjacent data subcarriers in a same group are 18, and absolute values of index differences between data subcarriers in two adjacent groups are alternately 33 and 43.

In Table 42, for identifiers 1 to 4, 5 to 12, or 13 to 16, there is a fixed offset between indices of 192 data subcarriers (the first part) included in two 242-tone DRUs having adjacent identifiers, and the fixed offset is 1. For example, indices of 192 data subcarriers in a 242-tone DRU whose identifier is i (i=1 to 3, 5 to 11, or 13 to 15) all plus 1, to obtain indices of 192 data subcarriers in a 242-tone DRU whose identifier is i+1. An offset between indices of 192 data subcarriers (the first part) in a 242-tone DRU whose identifier is 4 and indices of 192 data subcarriers in a 242-tone DRU whose identifier is 5 is 2. Similarly, an offset between indices of 192 data subcarriers (the first part) in a 242-tone DRU whose identifier is 12 and indices of 192 data subcarriers in a 242-tone DRU whose identifier is 13 is 2.

As shown in Table 42, 234 data subcarriers of each 242-tone DRU further include a second part of data subcarriers (24 data subcarriers). If every six data subcarriers may be considered as one group in a frequency direction (for example, from low to high) (or understood as an ascending order of indices), absolute values of index differences between adjacent data subcarriers in a same group are all 18, and absolute values of index differences between data subcarriers in two adjacent groups are sequentially 33, 43, and 33. In addition, indices of 24 data subcarriers in a second part of a 242-tone DRU whose identifier is i (i=1, 3, 5, 7, . . . , or 15) all plus 9, to obtain indices of 24 data subcarriers in a second part of a 242-tone DRU whose identifier is i+1. Indices of 24 data subcarriers in a second part of a 242-tone DRU whose identifier is i (i=2, 4, 6, . . . , or 14) all plus 503, to obtain indices of 24 data subcarriers in a second part of a 242-tone DRU whose identifier is i+1.

In addition to the 192 data subcarriers in the first part column and the 24 data subcarriers in the second part column, each 242-tone DRU further includes 18 data subcarriers (the third part) and eight pilot subcarriers. In some embodiments, 18 data subcarriers and eight pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 42 shows an example, so that subcarriers included in the 242-tone DRU can be fully discrete.

Similar to the 242-tone DRU in the 80 MHz bandwidth or the 160 MHz bandwidth, the first part of data subcarriers may be obtained based on a 26-tone DRU or a 52-tone DRU, and the second part of data subcarriers may be obtained based on a 26-tone DRU. For brevity, as shown in Table 43, indices of the first part of data subcarriers included in the 242-tone DRU may be simplified and shown by using identifiers of 26-tone DRUs in Table 37, and indices of the second part of data subcarriers included in the 242-tone DRU may be simplified and shown by using identifiers of 26-tone DRUs in Table 37.

TABLE 43

| Identifier of a 242-tone DRU | Index of a data subcarrier: First part (identifier of a 26-tone DRU) | Index of a data subcarrier: Second part (identifier of a 26-tone DRU) | Index of a data subcarrier: Third part | Index of a pilot subcarrier |
|---|---|---|---|---|
| 1 | 1, 37, 73, 109, 19, 55, 91, 127 | 5 | −1671, −1548, −647, 244, 500, 1268, −1159, −524, −135, 756, 1524, 1780, −1527, −1415, −1036, −637, −1800, −1667 | −1804, −780, 377, 1401, −1292, −268, 889, 1913 |
| 2 | 2, 38, 74, 110, 20, 56, 92, 128 | 14 | −1670, −1547, −646, 245, 501, 1269, −1158, −523, −134, 757, 1525, 1781, −1526, −1414, −1012, −636, −1917, −1786 | −1803, −779, 378, 1402, −1291, −267, 890, 1914 |
| 3 | 3, 39, 75, 111, 21, 57, 93, 129 | 23 | −1669, −1546, −645, 246, 502, 1270, −1157, −522, −133, 758, 1526, 1782, −1781, −1413, −903, −635, −1288, −1155 | −1802, −778, 379, 1403, −1290, −266, 891, 1915 |
| 4 | 4, 40, 76, 112, 22, 58, 94, 130 | 32 | −1668, −1545, −644, 247, 503, 1271, −1156, −521, −132, 759, 1527, 1783, −1780, −1412, −902, −634, −1405, −1274 | −1801, −777, 380, 1404, −1289, −265, 892, 1916 |
| 5 | 6, 42, 78, 114, 24, 60, 96, 132 | 41 | −1666, −1544, −642, 249, 504, 1273, −1154, −520, −130, 761, 1528, 1785, −1792, −1411, −901, −503, −776, −643 | −1799, −775, 382, 1406, −1287, −263, 894, 1918 |
| 6 | 7, 43, 79, 115, 25, 61, 97, 133 | 50 | −1665, −1543, −641, 250, 505, 1274, −1153, −519, −129, 762, 1529, 1786, −1791, −1410, −900, −502, −893, −762 | −1798, −774, 383, 1407, −1286, −262, 895, 1919 |
| 7 | 8, 44, 80, 116, 26, 62, 98, 134 | 59 | −1664, −1542, −640, 251, 506, 1275, −1152, −518, −128, 763, 1530, 1787, −1790, −1409, −899, −12, −264, −131 | −1797, −773, 384, 1408, −1285, −261, 896, 1920 |
| 8 | 9, 45, 81, 117, 27, 63, 99, 135 | 68 | −1663, −1541, −639, 252, 507, 1276, −1151, −517, −127, 764, 1531, 1788, −1927, −1282, −898, 12, −381, −250 | −1796, −772, 385, 1409, −1284, −260, 897, 1921 |
| 9 | 10, 46, 82, 118, 28, 64, 100, 136 | 77 | −1662, −1540, −638, 253, 508, 1277, −1150, −516, −126, 765, 1532, 1789, −1926, −1281, −897, 521, 248, 381 | −1795, −771, 386, 1410, −1283, −259, 898, 1922 |
| 10 | 11, 47, 83, 119, 29, 65, 101, 137 | 86 | −1789, −1539, −765, 128, 509, 1152, −1277, −515, −253, 640, 1533, 1664, −1925, −1280, −770, 522, 131, 262 | −1920, −896, 259, 1283, −1408, −384, 771, 1795 |
| 11 | 12, 48, 84, 120, 30, 66, 102, 138 | 95 | −1788, −1533, −764, 129, 515, 1153, −1276, −509, −252, 641, 1539, 1665, −1924, −1279, −769, 1145, 760, 893 | −1919, −895, 260, 1284, −1407, −383, 772, 1796 |
| 12 | 13, 49, 85, 121, 31, 67, 103, 139 | 104 | −1787, −1532, −763, 130, 516, 1154, −1275, −508, −251, 642, 1540, 1666, −1923, −1278, −768, 1146, 643, 774 | −1918, −894, 261, 1285, −1406, −382, 773, 1797 |
| 13 | 15, 51, 87, 123, 33, 69, 105, 141 | 113 | −1785, −1531, −761, 132, 517, 1156, −1273, −507, −249, 644, 1541, 1668, −1922, −1269, −767, 1411, 1272, 1405 | −1916, −892, 263, 1287, −1404, −380, 775, 1799 |
| 14 | 16, 52, 88, 124, 34, 70, 106, 142 | 122 | −1784, −1530, −760, 133, 518, 1157, −1272, −506, −248, 645, 1542, 1669, −1921, −1268, −766, 1412, 1155, 1286 | −1915, −891, 264, 1288, −1403, −379, 776, 1800 |

TABLE 43-continued

| Identifier of a 242-tone DRU | Index of a data subcarrier: First part (identifier of a 26-tone DRU) | Second part (identifier of a 26-tone DRU) | Third part | Index of a pilot subcarrier |
|---|---|---|---|---|
| 15 | 17, 53, 89, 125, 35, 71, 107, 143 | 131 | −1783, −1529, −759, 134, 519, 1158, −1271, −505, −247, 646, 1543, 1670, −1794, −1149, −757, 1413, 1784, 1917 | −1914, −890, 265, 1289, −1402, −378, 777, 1801 |
| 16 | 18, 54, 90, 126, 36, 72, 108, 144 | 140 | −1782, −1528, −758, 135, 520, 1159, −1270, −504, −246, 647, 1544, 1671, −1793, −1148, −756, 1414, 1667, 1798 | −1913, −889, 266, 1290, −1401, −377, 778, 1802 |

In Table 43, the "first part" column means that the first part of (192) data subcarriers in the 242-tone DRU include a combination of data subcarriers in corresponding 26-tone DRUs. For example, a 242-tone DRU whose identifier is 1 is used as an example. The first part of 192 data subcarriers included in the 242-tone DRU include all data subcarriers in eight 26-tone DRUs whose identifiers are 1, 37, 73, 109, 19, 55, 91, and 127 shown in Table 37. Similarly, the "second part" column means that the second part of (24) data subcarriers in the 242-tone DRU include a combination of data subcarriers in corresponding 26-tone DRUs. For example, a 242-tone DRU whose identifier is 1 is used as an example. The second part of 24 data subcarriers included in the 242-tone DRU includes data subcarriers in a 26-tone DRU whose identifier is 5 shown in Table 37.

For example, the eight pilot subcarriers included in the 242-tone DRU may be a part of a set of 18 pilot subcarriers included in the corresponding nine 26-tone DRUs (the first part and the second part). Alternatively, in some embodiments, the eight pilot subcarriers included in the 242-tone DRU may be a part of a set of 16 pilot subcarriers included in the eight 26-tone DRUs in the corresponding first part. In addition, the other 18 data subcarriers included in the 242-tone DRU may be selected from remaining subcarriers of all the subcarriers of the entire bandwidth other than the guard subcarriers, the DC subcarriers, the data subcarriers in the first part column, the data subcarriers in the second part column, and the pilot subcarriers, and the data subcarriers may be fully discrete.

As shown in Table 42 or Table 43, each 242-tone DRU includes eight pilot subcarriers, and any two pilot subcarriers in a same DRU are not adjacent. The pilot subcarriers shown in Table 42 or Table 43 implement full discretization of pilot subcarriers in a same DRU, thereby implementing frequency domain diversity.

In addition, in an embodiment of this disclosure, the identifier of the 242-tone DRU may be based on a lowest-frequency index of a data subcarrier included in each 242-tone DRU. For example, an identifier of a 242-tone DRU having a lowest-frequency index −2035 is 1.

In addition, it should be noted that the 242-tone DRU in 320 MHz described with reference to Table 42 or Table 43 is merely an example. For example, 234 data subcarriers in the 242-tone DRU may alternatively be divided into three parts in another manner, for example, a first part, a second part, and a third part shown in Table 44 below. In Table 44, the "first part" column means that a first part of data subcarriers (204) in the 242-tone DRU include a combination of data subcarriers in corresponding 106-tone DRUs. For example, a 242-tone DRU whose identifier is 1 is used as an example. The first part of (204) data subcarriers included in the 242-tone DRU include all data subcarriers of 106-tone DRUs whose identifiers are 1 and 17 shown in Table 40. In Table 44, the "second part" column means that the second part of (24) data subcarriers in the 242-tone DRU include a combination of data subcarriers in corresponding 26-tone DRUs. For example, a 242-tone DRU whose identifier is 1 is used as an example. The second part of (24) data subcarriers included in the 242-tone DRU include data subcarriers in a 26-tone DRU whose identifier is 5 shown in Table 37.

TABLE 44

| Identifier of a 242-tone DRU | Index of a data subcarrier: First part (identifier of a 106-tone DRU) | Second part (identifier of a 26-tone DRU) | Third part | Index of a pilot subcarrier |
|---|---|---|---|---|
| 1 | 1, 17 | 5 | −1671,−1548, −647, 244, 500, 1268, −1159, −524, −135, 756, 1524, 1780, −1527, −1415, −1036, −637, −1800, −1667 | −1804, −780, 377, 1401, −1292, −268, 889, 1913 |
| 2 | 2, 18 | 14 | −1670, −1547, −646, 245, 501, 1269, −1158, −523, −134, 757, 1525, 1781, −1526, −1414, −1012, −636, −1917, −1786 | −1803, −779, 378, 1402, −1291, −267, 890, 1914 |

TABLE 44-continued

| Identifier of a 242-tone DRU | Index of a data subcarrier: First part (identifier of a 106-tone DRU) | Index of a data subcarrier: Second part (identifier of a 26-tone DRU) | Index of a data subcarrier: Third part | Index of a pilot subcarrier |
|---|---|---|---|---|
| 3 | 3, 19 | 23 | −1669, −1546, −645, 246, 502, 1270, −1157, −522, −133, 758, 1526, 1782, −1781, −1413, −903, −635, −1288, −1155 | −1802, −778, 379, 1403, −1290, −266, 891, 1915 |
| 4 | 4, 20 | 32 | −1668, −1545, −644, 247, 503, 1271, −1156, −521, −132, 759, 1527, 1783, −1780, −1412, −902, −634, −1405, −1274 | −1801, −777, 380, 1404, −1289, −265, 892, 1916 |
| 5 | 5, 21 | 41 | −1666, −1544, −642, 249, 504, 1273, −1154, −520, −130, 761, 1528, 1785, −1792, −1411, −901, −503, −776, −643 | −1799, −775, 382, 1406, −1287, −263, 894, 1918 |
| 6 | 6, 22 | 50 | −1665, −1543, −641, 250, 505, 1274, −1153, −519, −129, 762, 1529, 1786, −1791, −1410, −900, −502, −893, −762 | −1798, −774, 383, 1407, −1286, −262, 895, 1919 |
| 7 | 7, 23 | 59 | −1664, −1542, −640, 251, 506, 1275, −1152, −518, −128, 763, 1530, 1787, −1790, −1409, −899, −12, −264, −131 | −1797, −773, 384, 1408, −1285, −261, 896, 1920 |
| 8 | 8, 24 | 68 | −1663, −1541, −639, 252, 507, 1276, −1151, −517, −127, 764, 1531, 1788, −1927, −1282, −898, 12, −381, −250 | −1796, −772, 385, 1409, −1284, −260, 897, 1921 |
| 9 | 9, 25 | 77 | −1662, −1540, −638, 253, 508, 1277, −1150, −516, −126, 765, 1532, 1789, −1926, −1281, −897, 521, 248, 381 | −1795, −771, 386, 1410, −1283, −259, 898, 1922 |
| 10 | 10, 26 | 86 | −1789, −1539, −765, 128, 509, 1152, −1277, −515, −253, 640, 1533, 1664, −1925, −1280, −770, 522, 131, 262 | −1920, −896, 259, 1283, −1408, −384, 771, 1795 |
| 11 | 11, 27 | 95 | −1788, −1533, −764, 129, 515, 1153, −1276, −509, −252, 641, 1539, 1665, −1924, −1279, −769, 1145, 760, 893 | −1919, −895, 260, 1284, −1407, −383, 772, 1796 |
| 12 | 12, 28 | 104 | −1787,−1532,−763, 130, 516, 1154, −1275, −508, −251, 642, 1540, 1666, −1923, −1278, −768, 1146, 643, 774 | −1406, −382, 773, 1797 −1918, −894, 261, 1285, |
| 13 | 13, 29 | 113 | −1785, −1531,−761, 132, 517, 1156, −1273, −507, −249, 644, 1541, 1668, −1922, −1269, −767, 1411, 1272, 1405 | −1916, −892, 263, 1287, −1404, −380, 775, 1799 |
| 14 | 14, 30 | 122 | −1784, −1530, −760, 133, 518, 1157, −1272, −506, −248, 645, 1542, 1669, −1921, −1268, −766, 1412, 1155, 1286 | −1915, −891, 264, 1288, −1403, −379, 776, 1800 |
| 15 | 15, 31 | 131 | −1783, −1529, −759, 134, 519, 1158, −1271, −505, −247, 646, 1543, 1670, −1794, −1149, −757, 1413, 1784, 1917 | −1914, −890, 265, 1289, −1402, −378, 777, 1801 |
| 16 | 16, 32 | 140 | −1782, −1528, −758, 135, 520, 1159, −1270, −504, −246, 647, 1544, 1671, −1793, −1148, −756, 1414, 1667, 1798 | −1913, −889, 266, 1290, −1401, −377, 778, 1802 |

In this way, for the 320 MHz bandwidth, through the design of the 242-tone DRU shown in Table 42 to Table 44, compared with the continuous 242-tone RU in the 320 MHz obtained based on the 80 MHz in FIG. 3, at a same power spectral density, this embodiment of this disclosure can implement a maximum power amplification multiple, for example, 6.5.

In an embodiment of this disclosure, an association between a 26-tone DRU (indirectly a 52-tone DRU) and a 242-tone DRU in 320 MHz is described by using Table 43. It may be understood that the foregoing described manner of determining a 242-tone DRU based on a 26-tone DRU is merely an example, and subcarriers in the 242-tone DRU can be fully discrete. In another embodiment, a 242-tone DRU may alternatively be determined in another manner based on a 26-tone DRU. This is not limited in this disclosure. Details are not described again.

In an embodiment of this disclosure, an association between a 106-tone DRU and a 26-tone DRU in 320 MHz is described by using Table 44. It may be understood that the foregoing described manner of determining a 242-tone DRU based on a 106-tone DRU and a 26-tone DRU is merely an example, and subcarriers in the 242-tone DRU can be fully discrete. In another embodiment, the 242-tone DRU may alternatively be determined in another manner. This is not limited in this disclosure. Details are not described again.

In addition, it may be understood that if the lowest-frequency index of the data subcarrier included in the 26-tone DRU is another value other than −2035, correspondingly the lowest-frequency index of the data subcarrier included in the 242-tone DRU also adaptively changes to another value.

In a tone plan solution of a DRU, the 320 MHz bandwidth includes eight 484-tone DRUs, and each 484-tone DRU includes 468 data subcarriers and 16 pilot subcarriers. For example, Table 45 shows an example of eight 484-tone DRUs corresponding to the 320 MHz bandwidth, and shows 468 data subcarriers and 16 pilot subcarriers included in each 484-tone DRU. The 468 data subcarriers may be divided into three parts. A first part includes 384 data subcarriers, a second part includes 48 data subcarriers, a third part includes 36 data subcarriers, and a lowest-frequency index of a data subcarrier in a 484-tone DRU whose identifier is 1 is −2035. It should be understood that, although the data subcarriers are divided into the first part, the second part, and the third part in Table 45 and are separately listed, in this embodiment of this disclosure, the data subcarriers are presented as a plurality of parts only for ease of description, and are not actually used as division of data subcarriers included in each 484-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 484-tone DRU.

TABLE 45

| Identifier of a 484-tone DRU | Index of a data subcarrier | | | Index of a pilot subcarrier |
|---|---|---|---|---|
| | First part | Second part | Third part | |
| 1 | −2035, −2026, −2017, −2008, −1999, −1990, −1981, −1972, −1963, −1954, −1945, −1936, −1912, −1903, −1894, −1885, −1876, −1867, −1858, −1849, −1840, −1831, −1822, −1813, −1779, −1770, −1761, −1752, −1743, −1734, −1725, −1716, −1707, −1698, −1689, −1680, −1656, −1647, −1638, −1629, −1620, −1611, −1602, −1593, −1584, −1575, −1566, −1557, −1523, −1514, −1505, −1496, −1487, −1478, −1469, −1460, −1451, −1442, −1433, −1424, −1400, −1391, −1382, −1373, −1364, −1355, −1346, −1337, −1328, −1319, −1310, −1301, −1267, −1258, −1249, −1240, −1231, −1222, −1213, −1204, −1195, −1186, −1177, −1168, −1144, −1135, −1126, −1117, −1108, −1099, −1090, −1081, −1072, −1063, −1054, −1045, −1011, −1002, −993, −984, −975, −966, −957, −948, −939, −930, −921, −912, −888, −879, −870, −861, −852, −843, −834, −825, −816, −807, −798, −789, −755, −746, −737, −728, −719, −710, −701, −692, −683, −674, −665, −656, −632, −623, −614, −605, −596, −587, −578, −569, −560, −551, −542, −533, −499, −490, −481, −472, −463, −454, −445, −436, −427, −418, −409, −400, −376, −367, −358, −349, −340, −331, −322, −313, −304, −295, −286, −277, −243, −234, −225, −216, −207, −198, −189, −180, −171, −162, −153, −144, −120, −111, −102, −93, −84, −75, −66, −57, −48, −39, −30, −21, 13, 22, 31, 40, 49, | −2031, −2013, −1995, −1977, −1959, −1941, −1908, −1890, −1872, −1854, −1836, −1818, −1775, −1757,−1739, −1721, −1703, −1685, −1652, −1634, −1616, −1598, −1580, −1562, 17, 35, 53, 71, 89, 107, 140, 158, 176, 194, 212, 230, 273, 291, 309, 327, 345, 363, 396, 414, 432, 450, 468, 486 | −1671, −1548, −647, 244, 500, 1268, −1159, −524, −135, 756, 1524, 1780, −1527, −1415, −1036, −637, −1800, −1667, −1662, −1540, −638, 253, 508, 1277,−1150, −516, −126, 765, 1532, 1789, −1926, −1281, −897, 521, 248, 381 | −1804, −780, 377, 1401, −1292, −268, 889, 1913, −1795, −771, 386, 1410, −1283, −259, 898, 1922 |

TABLE 45-continued

| Identifier of a 484-tone DRU | Index of a data subcarrier — First part | Index of a data subcarrier — Second part | Index of a data subcarrier — Third part | Index of a pilot subcarrier |
|---|---|---|---|---|
| | 58, 67, 76, 85, 94, 103, 112, 136, 145, 154, 163, 172, 181, 190, 199, 208, 217, 226, 235, 269, 278, 287, 296, 305, 314, 323, 332, 341, 350, 359, 368, 392, 401, 410, 419, 428, 437, 446, 455, 464, 473, 482, 491, 525, 534, 543, 552, 561, 570, 579, 588, 597, 606, 615, 624, 648, 657, 666, 675, 684, 693, 702, 711, 720, 729, 738, 747, 781, 790, 799, 808, 817, 826, 835, 844, 853, 862, 871, 880, 904, 913, 922, 931, 940, 949, 958, 967, 976, 985, 994, 1003, 1037, 1046, 1055, 1064, 1073, 1082, 1091, 1100, 1109, 1118, 1127, 1136, 1160, 1169, 1178, 1187, 1196, 1205, 1214, 1223, 1232, 1241, 1250, 1259, 1293, 1302, 1311, 1320, 1329, 1338, 1347, 1356, 1365, 1374, 1383, 1392, 1416, 1425, 1434, 1443, 1452, 1461, 1470, 1479, 1488, 1497, 1506, 1515, 1549, 1558, 1567, 1576, 1585, 1594, 1603, 1612, 1621, 1630, 1639, 1648, 1672, 1681, 1690, 1699, 1708, 1717, 1726, 1735, 1744, 1753, 1762, 1771, 1805, 1814, 1823, 1832, 1841, 1850, 1859, 1868, 1877, 1886, 1895, 1904, 1928, 1937, 1946, 1955, 1964, 1973, 1982, 1991, 2000, 2009, 2018, 2027 | | | |
| 2 | −2034, −2025, −2016, −2007, −1998, −1989, −1980, −1971, −1962, −1953, −1944, −1935, −1911, −1902, −1893, −1884, −1875, −1866, −1857, −1848, −1839, −1830, −1821, −1812, −1778, −1769, −1760, −1751, −1742, −1733, −1724, −1715, −1706, −1697, −1688, −1679, −1655, −1646, −1637, −1628, −1619, −1610, −1601, −1592, −1583, −1574, −1565, −1556, −1522, −1513, −1504, −1495, −1486, −1477, −1468, −1459, −1450, −1441, −1432, −1423, −1399, −1390, −1381, −1372, −1363, −1354, −1345, −1336, −1327, −1318, −1309, −1300, −1266, −1257, −1248, −1239, −1230, −1221, −1212, −1203, −1194, −1185, −1176, −1167, −1143, −1134, −1125, −1116, −1107, −1098, −1089, −1080, −1071, −1062, −1053, −1044, −1010, −1001, −992, −983, −974, −965, −956, −947, −938, −929, −920, −911, −887, −878, −869, −860, −851, −842, −833, −824, −815, −806, −797, −788, −754, −745, −736, −727, −718, −709, −700, −691, −682, −673, −664, −655, −631, −622, −613, −604, −595, −586, −577, −568, −559, −550, −541, −532, −498, −489, −480, −471, −462, −453, −444, −435, −426, −417, −408, −399, −375, −366, −357, −348, −339, −330, −321, −312, −303, −294, −285, −276, −242, −233, −224, −215, −206, −197, −188, −179, −170, −161, −152, −143, −119, −110, −101, −92, −83, −74, −65, −56, −47, −38, −29, −20, 14, 23, 32, 41, 50, 59, 68, 77, 86, 95, 104, 113, 137, 146, 155, 164, 173, 182, 191, 200, 209, 218, 227, 236, 270, 279, 288, 297, 306, 315, 324, 333, 342, 351, | −2022, −2004, −1986, −1968, −1950, −1932, −1899, −1881, −1863, −1845, −1827, −1809, −1766, −1748, −1730, −1712, −1694, −1676, −1643, −1625, −1607, −1589, −1571, −1553, 26, 44, 62, 80, 98, 116, 149, 167, 185, 203, 221, 239, 282, 300, 318, 336, 354, 372, 405, 423, 441, 459, 477, 495 | −1670, −1547, −646, 245, 501, 1269, −1158, −523, −134, 757, 1525, 1781, −1526, −1414, −1012, −636, −1917, −1786, −1789, −1539, −765, 128, 509, 1152, −1277, −515, −253, 640, 1533, 1664, −1925, −1280, −770, 522, 131, 262 | −1803, −779, 378, 1402, −1291,−267, 890, 1914, −1920, −896, 259, 1283, −1408, −384, 771, 1795 |

TABLE 45-continued

| Identifier of a 484-tone DRU | Index of a data subcarrier First part | Second part | Third part | Index of a pilot subcarrier |
|---|---|---|---|---|
| | 360, 369, 393, 402, 411, 420, 429, 438, 447, 456, 465, 474, 483, 492, 526, 535, 544, 553, 562, 571, 580, 589, 598, 607, 616, 625, 649, 658, 667, 676, 685, 694, 703, 712, 721, 730, 739, 748, 782, 791, 800, 809, 818, 827, 836, 845, 854, 863, 872, 881, 905, 914, 923, 932, 941, 950, 959, 968, 977, 986, 995, 1004, 1038, 1047, 1056, 1065, 1074, 1083, 1092, 1101, 1110, 1119, 1128, 1137, 1161, 1170, 1179, 1188, 1197, 1206, 1215, 1224, 1233, 1242, 1251, 1260, 1294, 1303, 1312, 1321, 1330, 1339, 1348, 1357, 1366, 1375, 1384, 1393, 1417, 1426, 1435, 1444, 1453, 1462, 1471, 1480, 1489, 1498, 1507, 1516, 1550, 1559, 1568, 1577, 1586, 1595, 1604, 1613, 1622, 1631, 1640, 1649, 1673, 1682, 1691, 1700, 1709, 1718, 1727, 1736, 1745, 1754, 1763, 1772, 1806, 1815, 1824, 1833, 1842, 1851, 1860, 1869, 1878, 1887, 1896, 1905, 1929, 1938, 1947, 1956, 1965, 1974, 1983, 1992, 2001, 2010, 2019, 2028 | | | |
| 3 | −2033, −2024, −2015, −2006, −1997, −1988, −1979, −1970, −1961, −1952, −1943, −1934, −1910, −1901, −1892, −1883, −1874, −1865, −1856, −1847, −1838, −1829, −1820, −1811, −1777, −1768, −1759, −1750, −1741, −1732, −1723, −1714, −1705, −1696, −1687, −1678, −1654, −1645, −1636, −1627, −1618, −1609, −1600, −1591, −1582, −1573, −1564, −1555, −1521, −1512, −1503, −1494, −1485, −1476, −1467, −1458, −1449, −1440, −1431, −1422, −1398, −1389, −1380, −1371, −1362, −1353, −1344, −1335, −1326, −1317, −1308, −1299, −1265, −1256, −1247, −1238, −1229, −1220, −1211, −1202, −1193, −1184, −1175, −1166, −1142, −1133, −1124, −1115, −1106, −1097, −1088, −1079, −1070, −1061, −1052, −1043, −1009, −1000, −991, −982, −973, −964, −955, −946, −937, −928, −919, −910, −886, −877, −868, −859, −850, −841, −832, −823, −814, −805, −796, −787, −753, −744, −735, −726, −717, −708, −699, −690, −681, −672, −663, −654, −630, −621, −612, −603, −594, −585, −576, −567, −558, −549, −540, −531, −497, −488, −479, −470, −461, −452, −443, −434, −425, −416, −407, −398, −374, −365, −356, −347, −338, −329, −320, −311, −302, −293, −284, −275, −241, −232, −223, −214, −205, −196, −187, −178, −169, −160, −151, −142, −118, −109, −100, −91, −82, −73, −64, −55, −46, −37, −28, −19, 15, 24, 33, 42, 51, 60, 69, 78, 87, 96, 105, 114, 138, 147, 156, 165, 174, 183, 192, 201, 210, 219, 228, 237, 271, 280, 289, 298, 307, 316, 325, 334, 343, 352, 361, 370, 394, 403, 412, 421, 430, 439, 448, 457, 466, 475, 484, 493, 527, 536, 545, 554, 563, 572, 581, 590, 599, 608, 617, 626, 650, 659, | −1519, −1501, −1483, −1465, −1447, −1429, −1396, −1378, −1360, −1342, −1324, −1306, −1263, −1245,−1227, −1209, −1191, −1173, −1140, −1122, −1104, −1086, −1068, −1050, 529, 547, 565, 583, 601, 619, 652, 670, 688, 706, 724, 742, 785, 803, 821, 839, 857, 875, 908, 926, 944, 962, 980, 998 | −1669, −1546, −645, 246, 502, 1270, −1157, −522,−133, 758, 1526, 1782, −1781, −1413, −903, −635, −1288, −1155, −1788, −1533, −764, 129, 515, 1153, −1276, −509, −252, 641, 1539, 1665, −1924, −1279, −769, 1145, 760, 893 | −1802, −778, 379, 1403, −1290, −266, 891, 1915, −1919, −895, 260, 1284, −1407, −383, 772, 1796 |

TABLE 45-continued

| Identifier of a 484-tone DRU | Index of a data subcarrier First part | Second part | Third part | Index of a pilot subcarrier |
|---|---|---|---|---|
| | 668, 677, 686, 695, 704, 713, 722, 731, 740, 749, 783, 792, 801, 810, 819, 828, 837, 846, 855, 864, 873, 882, 906, 915, 924, 933, 942, 951, 960, 969, 978, 987, 996, 1005, 1039, 1048, 1057, 1066, 1075, 1084, 1093, 1102, 1111, 1120, 1129, 1138, 1162, 1171, 1180, 1189, 1198, 1207, 1216, 1225, 1234, 1243, 1252, 1261, 1295, 1304, 1313, 1322, 1331, 1340, 1349, 1358, 1367, 1376, 1385, 1394, 1418, 1427, 1436, 1445, 1454, 1463, 1472, 1481, 1490, 1499, 1508, 1517, 1551, 1560, 1569, 1578, 1587, 1596, 1605, 1614, 1623, 1632, 1641, 1650, 1674, 1683, 1692, 1701, 1710, 1719, 1728, 1737, 1746, 1755, 1764, 1773, 1807, 1816, 1825, 1834, 1843, 1852, 1861, 1870, 1879, 1888, 1897, 1906, 1930, 1939, 1948, 1957, 1966, 1975, 1984, 1993, 2002, 2011, 2020, 2029 | | | |
| 4 | −2032, −2023, −2014, −2005, −1996, −1987, −1978, −1969, −1960, −1951, −1942, −1933, −1909, −1900, −1891, −1882, −1873, −1864, −1855, −1846, −1837, −1828, −1819, −1810, −1776, −1767, −1758, −1749, −1740, −1731, −1722, −1713, −1704, −1695, −1686, −1677, −1653, −1644, −1635, −1626, −1617, −1608, −1599, −1590, −1581, −1572, −1563, −1554, −1520, −1511, −1502, −1493, −1484, −1475, −1466, −1457, −1448, −1439, −1430, −1421, −1397, −1388, −1379, −1370, −1361, −1352, −1343, −1334, −1325, −1316, −1307, −1298, −1264, −1255, −1246, −1237, −1228, −1219, −1210, −1201, −1192, −1183, −1174, −1165, −1141, −1132, −1123, −1114, −1105, −1096, −1087, −1078, −1069, −1060, −1051, −1042, −1008, −999, −990, −981, −972, −963, −954, −945, −936, −927, −918, −909, −885, −876, −867, −858, −849, −840, −831, −822, −813, −804, −795, −786, −752, −743, −734, −725, −716, −707, −698, −689, −680, −671, −662, −653, −629, −620, −611, −602, −593, −584, −575, −566, −557, −548, −539, −530, −496, −487, −478, −469, −460, −451, −442, −433, −424, −415, −406, −397, −373, −364, −355, −346, −337, −328, −319, −310, −301, −292, −283, −274, −240, −231, −222, −213, −204, −195, −186, −177, −168, −159, −150, −141, −117, −108, −99, −90, −81, −72, −63, −54, −45, −36, −27, −18, 16, 25, 34, 43, 52, 61, 70, 79, 88, 97, 106, 115, 139, 148, 157, 166, 175, 184, 193, 202, 211, 220, 229, 238, 272, 281, 290, 299, 308, 317, 326, 335, 344, 353, 362, 371, 395, 404, 413, 422, 431, 440, 449, 458, 467, 476, 485, 494, 528, 537, 546, 555, 564, 573, 582, 591, 600, 609, 618, 627, 651, 660, 669, 678, 687, 696, 705, 714, 723, 732, 741, 750, 784, 793, 802, 811, 820, 829, 838, 847, 856, 865, 874, 883, 907, 916, 925, 934, 943, 952, 961, | −1510, −1492, −1474, −1456, −1438, −1420, −1387, −1369, −1351, −1333, −1315, −1297, −1254, −1236, −1218, −1200, −1182, −1164, −1131, −1113, −1095, −1077, −1059, −1041, 538, 556, 574, 592, 610, 628, 661, 679, 697, 715, 733, 751, 794, 812, 830, 848, 866, 884, 917, 935, 953, 971, 989, 1007 | −1668, −1545, −644, 247, 503, 1271, −1156, −521 ,−132, 759, 1527, 1783, −1780, −1412, −902, −634, −1405, −1274, −1787, −1532, −763, 130, 516, 1154, −1275, −508, −251, 642, 1540, 1666, −1923, −1278, −768, 1146, 643, 774 | −1801, −777, 380, 1404, −1289, −265, 892, 1916, −1918, −894, 261, 1285, −1406, −382, 773, 1797 |

TABLE 45-continued

| Identifier of a 484-tone DRU | Index of a data subcarrier — First part | Index of a data subcarrier — Second part | Index of a data subcarrier — Third part | Index of a pilot subcarrier |
|---|---|---|---|---|
| | 970, 979, 988, 997, 1006, 1040, 1049, 1058, 1067, 1076, 1085, 1094, 1103, 1112, 1121, 1130, 1139, 1163, 1172, 1181, 1190, 1199, 1208, 1217, 1226, 1235, 1244, 1253, 1262, 1296, 1305, 1314, 1323, 1332, 1341, 1350, 1359, 1368, 1377, 1386, 1395, 1419, 1428, 1437, 1446, 1455, 1464, 1473, 1482, 1491, 1500, 1509, 1518, 1552, 1561, 1570, 1579, 1588, 1597, 1606, 1615, 1624, 1633, 1642, 1651, 1675, 1684, 1693, 1702, 1711, 1720, 1729, 1738, 1747, 1756, 1765, 1774, 1808, 1817, 1826, 1835, 1844, 1853, 1862, 1871, 1880, 1889, 1898, 1907, 1931, 1940, 1949, 1958, 1967, 1976, 1985, 1994, 2003, 2012, 2021, 2030 | | | |
| 5 | −2030, −2021, −2012, −2003, −1994, −1985, −1976, −1967, −1958, −1949, −1940, −1931, −1907, −1898, −1889, −1880, −1871, −1862, −1853, −1844, −1835, −1826, −1817, −1808, −1774, −1765, −1756, −1747, −1738, −1729, −1720, −1711, −1702, −1693, −1684, −1675, −1651, −1642, −1633, −1624, −1615, −1606, −1597, −1588, −1579, −1570, −1561, −1552, −1518, −1509, −1500, −1491, −1482, −1473, −1464, −1455, −1446, −1437, −1428, −1419, −1395, −1386, −1377, −1368, −1359, −1350, −1341, −1332, −1323, −1314, −1305, −1296, −1262, −1253, −1244, −1235, −1226, −1217, −1208, −1199, −1190, −1181, −1172, −1163, −1139, −1130, −1121, −1112, −1103, −1094, −1085, −1076, −1067, −1058, −1049, −1040, −1006, −997, −988, −979, −970, −961, −952, −943, −934, −925, −916, −907, −883, −874, −865, −856, −847, −838, −829, −820, −811, −802, −793, −784, −750, −741, −732, −723, −714, −705, −696, −687, −678, −669, −660, −651, −627, −618, −609, −600, −591, −582, −573, −564, −555, −546, −537, −528, −494, −485, −476, −467, −458, −449, −440, −431, −422, −413, −404, −395, −371, −362, −353, −344, −335, −326, −317, −308, −299, −290, −281, −272, −238, −229, −220, −211, −202, −193, −184,−175, −166, −157, −148, −139, −115, −106, −97, −88, −79, −70, −61, −52, −43, −34, −25, −16, 18, 27, 36, 45, 54, 63, 72, 81, 90, 99, 108, 117, 141, 150, 159, 168, 177, 186, 195, 204, 213, 222, 231, 240, 274, 283, 292, 301, 310, 319, 328, 337, 346, 355, 364, 373, 397, 406, 415, 424, 433, 442, 451, 460, 469, 478, 487, 496, 530, 539, 548, 557, 566, 575, 584, 593, 602, 611, 620, 629, 653, 662, 671, 680, 689, 698, 707, 716, 725, 734, 743, 752, 786, 795, 804, 813, 822, 831, 840, 849, 858, 867, 876, 885, 909, 918, 927, 936, 945, 954, 963, 972, 981, 990, 999, 1008, 1042, 1051, 1060, 1069, 1078, 1087, 1096, 1105, 1114, 1123, 1132, 1141, 1165, 1174, 1183, 1192, 1201, | −1007, −989, −971, −953, −935, −917, −884, −866, −848, −830, −812, −794, −751, −733, −715, −697, −679, −661, −628, −610, −592, −574, −556, −538, 1041, 1059, 1077, 1095, 1113, 1131, 1164, 1182, 1200, 1218, 1236, 1254, 1297, 1315, 1333, 1351, 1369, 1387, 1420, 1438, 1456, 1474, 1492, 1510 | −1666, −1544, −642, 249, 504, 1273, −1154, −520, −130, 761, 1528, 1785, −1792, −1411, −901, −503, −776, −643, −1785, −1531, −761, 132, 517, 1156, −1273, −507, −249, 644, 1541, 1668, −1922, −1269, −767, 1411, 1272, 1405 | −1799, −775, 382, 1406, −1287, −263, 894, 1918, −1916, −892, 263, 1287, −1404, −380, 775, 1799 |

TABLE 45-continued

| Identifier of a 484-tone DRU | Index of a data subcarrier | | | Index of a pilot subcarrier |
|---|---|---|---|---|
| | First part | Second part | Third part | |
| | 1210, 1219, 1228, 1237, 1246, 1255, 1264, 1298, 1307, 1316, 1325, 1334, 1343, 1352, 1361, 1370, 1379, 1388, 1397, 1421, 1430, 1439, 1448, 1457, 1466, 1475, 1484, 1493, 1502, 1511, 1520, 1554, 1563, 1572, 1581, 1590, 1599, 1608, 1617, 1626, 1635, 1644, 1653, 1677, 1686, 1695, 1704, 1713, 1722, 1731, 1740, 1749, 1758, 1767, 1776, 1810, 1819, 1828, 1837, 1846, 1855, 1864, 1873, 1882, 1891, 1900, 1909, 1933, 1942, 1951, 1960, 1969, 1978, 1987, 1996, 2005, 2014, 2023, 2032 | | | |
| 6 | −2029, −2020, −2011, −2002, −1993, −1984, −1975, −1966, −1957, −1948, −1939, −1930, −1906, −1897, −1888, −1879, −1870, −1861, −1852, −1843, −1834, −1825, −1816, −1807, −1773, −1764, −1755, −1746, −1737, −1728, −1719, −1710, −1701, −1692, −1683, −1674, −1650, −1641, −1632, −1623, −1614, −1605, −1596, −1587, −1578, −1569, −1560, −1551,−1517, −1508, −1499, −1490, −1481, −1472, −1463, −1454, −1445, −1436, −1427, −1418, −1394, −1385, −1376, −1367, −1358, −1349, −1340, −1331, −1322, −1313, −1304, −1295, −1261, −1252, −1243, −1234, −1225, −1216, −1207, −1198, −1189, −1180, −1171, −1162, −1138, −1129, −1120, −1111, −1102, −1093, −1084, −1075, −1066, −1057, −1048, −1039, −1005, −996, −987, −978, −969, −960, −951, −942, −933, −924, −915, −906, −882, −873, −864, −855, −846, −837, −828, −819, −810, −801, −792, −783, −749, −740, −731, −722, −713, −704, −695, −686, −677, −668, −659, −650, −626, −617, −608, −599, −590, −581, −572, −563, −554, −545, −536, −527, −493, −484, −475, −466, −457, −448, −439, −430, −421, −412, −403, −394, −370, −361, −352, −343, −334, −325, −316, −307, −298, −289, −280, −271, −237, −228, −219, −210, −201, −192, −183, −174, −165, −156, −147, −138, −114, −105, −96, −87, −78, −69, −60, −51, −42, −33, −24, −15, 19, 28, 37, 46, 55, 64, 73, 82, 91, 100, 109, 118, 142, 151, 160, 169, 178, 187, 196, 205, 214, 223, 232, 241, 275, 284, 293, 302, 311, 320, 329, 338, 347, 356, 365, 374, 398, 407, 416, 425, 434, 443, 452, 461, 470, 479, 488, 497, 531, 540, 549, 558, 567, 576, 585, 594, 603, 612, 621, 630, 654, 663, 672, 681, 690, 699, 708, 717, 726, 735, 744, 753, 787, 796, 805, 814, 823, 832, 841, 850, 859, 868, 877, 886, 910, 919, 928, 937, 946, 955, 964, 973, 982, 991, 1000, 1009, 1043, 1052, 1061, 1070, 1079, 1088, 1097, 1106, 1115, 1124, 1133, 1142, 1166, 1175, 1184, 1193, 1202, 1211, 1220, 1229, 1238, 1247, 1256, 1265, 1299, 1308, 1317, 1326, 1335, 1344, 1353, 1362, 1371, 1380, 1389, 1398, 1422, 1431, | −998, −980, −962, −944, −926, −908, −875, −857, −839, −821, −803, −785, −742, −724, −706, −688, −670, −652, −619, −601, −583, −565, −547, −529, 1050, 1068, 1086, 1104, 1122, 1140, 1173, 1191, 1209, 1227, 1245, 1263, 1306, 1324, 1342, 1360, 1378, 1396, 1429, 1447, 1465, 1483, 1501, 1519 | −1665, −1543, −641, 250, 505, 1274, −1153, −519, −129, 762, 1529, 1786, −1791, −1410, −900, −502, −893, −762, −1784, −1530, −760, 133, 518, 1157, −1272, −506, −248, 645, 1542, 1669, −1921, −1268, −766, 1412, 1155, 1286 | −1798, −774, 383, 1407, −1286, −262, 895, 1919, −1915, −891, 264, 1288, −1403, −379, 776, 1800 |

TABLE 45-continued

| Identifier of a 484-tone DRU | Index of a data subcarrier First part | Second part | Third part | Index of a pilot subcarrier |
|---|---|---|---|---|
| | 1440, 1449, 1458, 1467, 1476, 1485, 1494, 1503, 1512, 1521, 1555, 1564, 1573, 1582, 1591, 1600, 1609, 1618, 1627, 1636, 1645, 1654, 1678, 1687, 1696, 1705, 1714, 1723, 1732, 1741, 1750, 1759, 1768, 1777, 1811, 1820, 1829, 1838, 1847, 1856, 1865, 1874, 1883, 1892, 1901, 1910, 1934, 1943, 1952, 1961, 1970, 1979, 1988, 1997, 2006, 2015, 2024, 2033 | | | |
| 7 | −2028, −2019, −2010, −2001, −1992, −1983, −1974, −1965, −1956, −1947, −1938, −1929, −1905, −1896, −1887, −1878, −1869, −1860, −1851, −1842, −1833, −1824, −1815, −1806, −1772, −1763, −1754, −1745, −1736, −1727, −1718, −1709, −1700, −1691, −1682, −1673, −1649, −1640, −1631, −1622, −1613, −1604, −1595, −1586, −1577, −1568, −1559, −1550, −1516, −1507, −1498, −1489, −1480, −1471, −1462, −1453, −1444, −1435, −1426, −1417, −1393, −1384, −1375, −1366, −1357, −1348, −1339, −1330, −1321, −1312, −1303, −1294, −1260, −1251, −1242, −1233, −1224, −1215, −1206, −1197, −1188, −1179, −1170, −1161, −1137, −1128, −1119, −1110, −1101, −1092, −1083, −1074, −1065, −1056, −1047, −1038, −1004, −995, −986, −977, −968, −959, −950, −941, −932, −923, −914, −905, −881, −872, −863, −854, −845, −836, −827, −818, −809, −800, −791, −782, −748, −739, −730, −721, −712, −703, −694, −685, −676, −667, −658, −649, −625, −616, −607, −598, −589, −580, −571, −562, −553, −544, −535, −526, −492, −483, −474, −465, −456, −447, −438, −429, −420, −411, −402, −393, −369, −360, −351, −342, −333, −324, −315, −306, −297, −288, −279, −270, −236, −227, −218, −209, −200, −191, −182, −173, −164, −155, −146, −137, −113, −104, −95, −86, −77, −68, −59, −50, −41, −32, −23, −14, 20, 29, 38, 47, 56, 65, 74, 83, 92, 101, 110, 119, 143, 152, 161, 170, 179, 188, 197, 206, 215, 224, 233, 242, 276, 285, 294, 303, 312, 321, 330, 339, 348, 357, 366, 375, 399, 408, 417, 426, 435, 444, 453, 462, 471, 480, 489, 498, 532, 541, 550, 559, 568, 577, 586, 595, 604, 613, 622, 631, 655, 664, 673, 682, 691, 700, 709, 718, 727, 736, 745, 754, 788, 797, 806, 815, 824, 833, 842, 851, 860, 869, 878, 887, 911, 920, 929, 938, 947, 956, 965, 974, 983, 992, 1001, 1010, 1044, 1053, 1062, 1071, 1080, 1089, 1098, 1107, 1116, 1125, 1134, 1143, 1167, 1176, 1185, 1194, 1203, 1212, 1221, 1230, 1239, 1248, 1257, 1266, 1300, 1309, 1318, 1327, 1336, 1345, 1354, 1363, 1372, 1381, 1390, 1399, 1423, 1432, 1441, 1450, 1459, 1468, 1477, 1486, 1495, 1504, 1513, 1522, 1556, 1565, 1574, 1583, 1592, 1601, 1610, 1619, 1628, | −495, −477, −459, −441, −423, −405, −372, −354, −336, −318, −300, −282, −239, −221, −203, −185, −167, −149, −116, −98, −80, −62, −44, −26, 1553, 1571, 1589, 1607, 1625, 1643, 1676, 1694, 1712, 1730, 1748, 1766, 1809, 1827, 1845, 1863, 1881, 1899, 1932, 1950, 1968, 1986, 2004, 2022 | −1664, −1542, −640, 251, 506, 1275, −1152, −518, −128, 763, 1530, 1787, −1790, −1409, −899, −12, −264, −131, −1783, −1529, −759, 134, 519, 1158, −1271, −505, −247, 646, 1543, 1670, −1794, −1149, −757, 1413, 1784, 1917 | −1797, −773, 384, 1408, −1285, −261, 896, 1920, −1914, −890, 265, 1289, −1402, −378, 777, 1801 |

TABLE 45-continued

| Identifier of a 484-tone DRU | Index of a data subcarrier First part | Second part | Third part | Index of a pilot subcarrier |
|---|---|---|---|---|
| | 1637, 1646, 1655, 1679, 1688, 1697, 1706, 1715, 1724, 1733, 1742, 1751, 1760, 1769, 1778, 1812, 1821, 1830, 1839, 1848, 1857, 1866, 1875, 1884, 1893, 1902, 1911, 1935, 1944, 1953, 1962, 1971, 1980, 1989, 1998, 2007, 2016, 2025, 2034 | | | |
| 8 | −2027, −2018, −2009, −2000, −1991, −1982, −1973, −1964, −1955, −1946, −1937, −1928, −1904, −1895, −1886, −1877, −1868, −1859, −1850, −1841, −1832, −1823, −1814, −1805, −1771, −1762, −1753, −1744, −1735, −1726, −1717, −1708, −1699, −1690, −1681, −1672, −1648, −1639, −1630, −1621, −1612, −1603, −1594, −1585, −1576, −1567, −1558, −1549, −1515, −1506, −1497, −1488, −1479, −1470, −1461, −1452, −1443, −1434, −1425, −1416, −1392, −1383, −1374, −1365, −1356, −1347, −1338, −1329, −1320, −1311, −1302, −1293, −1259, −1250, −1241, −1232, −1223, −1214, −1205, −1196, −1187, −1178, −1169, −1160, −1136, −1127, −1118, −1109, −1100, −1091, −1082, −1073, −1064, −1055, −1046, −1037, −1003, −994, −985, −976, −967, −958, −949, −940, −931, −922, −913, −904, −880, −871, −862, −853, −844, −835, −826, −817, −808, −799, −790, −781, −747, −738, −729, −720, −711, −702, −693, −684, −675, −666, −657, −648, −624, −615, −606, −597, −588, −579, −570, −561, −552, −543, −534, −525, −491, −482, −473, −464, −455, −446, −437, −428, −419, −410, −401, −392, −368, −359, −350, −341, −332, −323, −314, −305, −296, −287, −278, −269, −235, −226, −217, −208, −199, −190, −181, −172, −163, −154, −145, −136, −112, −103, −94, −85, −76, −67, −58, −49, −40, −31, −22, −13, 21, 30, 39, 48, 57, 66, 75, 84, 93, 102, 111, 120, 144, 153, 162, 171, 180, 189, 198, 207, 216, 225, 234, 243, 277, 286, 295, 304, 313, 322, 331, 340, 349, 358, 367, 376, 400, 409, 418, 427, 436, 445, 454, 463, 472, 481, 490, 499, 533, 542, 551, 560, 569, 578, 587, 596, 605, 614, 623, 632, 656, 665, 674, 683, 692, 701, 710, 719, 728, 737, 746, 755, 789, 798, 807, 816, 825, 834, 843, 852, 861, 870, 879, 888, 912, 921, 930, 939, 948, 957, 966, 975, 984, 993, 1002, 1011, 1045, 1054, 1063, 1072, 1081, 1090, 1099, 1108, 1117, 1126, 1135, 1144, 1168, 1177, 1186, 1195, 1204, 1213, 1222, 1231, 1240, 1249, 1258, 1267, 1301, 1310, 1319, 1328, 1337, 1346, 1355, 1364, 1373, 1382, 1391, 1400, 1424, 1433, 1442, 1451, 1460, 1469, 1478, 1487, 1496, 1505, 1514, 1523, 1557, 1566, 1575, 1584, 1593, 1602, 1611, 1620, 1629, 1638, 1647, 1656, 1680, 1689, 1698, 1707, 1716, 1725, 1734, 1743, 1752, 1761, 1770, 1779, 1813, 1822, 1831, 1840, 1849, | −486, −468, −450, −432, −414, −396, −363, −345, −327, −309, −291, −273, −230, −212, −194, −176, −158, −140, −107, −89, −71, −53, −35, −17, 1562, 1580, 1598, 1616, 1634, 1652, 1685, 1703, 1721, 1739, 1757, 1775, 1818, 1836, 1854, 1872, 1890, 1908, 1941, 1959, 1977, 1995, 2013, 2031 | −1663, −1541, −639, 252, 507, 1276, −1151, −517, −127, 764, 1531, 1788, −1927, −1282, −898, 12, −381, −250, −1782, −1528, −758, 135, 520, 1159, −1270, −504, −246, 647, 1544, 1671, −1793, −1148, −756, 1414, 1667, 1798 | −1796, −772, 385, 1409, −1284, −260, −897, 1921, 1913, −889, −266, 1290, 1401, −377, 778, 1802 |

TABLE 45-continued

| Identifier of a 484-tone | Index of a data subcarrier | | | Index of a |
|---|---|---|---|---|
| DRU | First part | Second part | Third part | pilot subcarrier |
| | 1858, 1867, 1876, 1885, 1894, 1903, 1912, 1936, 1945, 1954, 1963, 1972, 1981, 1990, 1999, 2008, 2017, 2026, 2035 | | | |

For the first part of data subcarriers (384 data subcarriers) in the 484-tone DRU, as shown in Table 45, the 384 data subcarriers include 192 high-frequency subcarriers (whose subcarrier indices are positive values) and 192 low-frequency subcarriers (whose subcarrier indices are negative values). If every 12 of the 384 data subcarriers are considered as one group in a frequency direction (for example, from low to high) (or understood as an ascending order of indices), absolute values of index differences between adjacent data subcarriers in a same group are 9, and absolute values of index differences between data subcarriers in two adjacent groups are alternately 24 and 34.

As shown in Table 45, for identifiers 1 to 4, or 5 to 8, there is a fixed offset between indices of 384 data subcarriers (the first part) included in two 484-tone DRUs having adjacent identifiers, and the fixed offset is 1. For example, indices of 384 data subcarriers in a 484-tone DRU whose identifier is i (i=1 to 3, or 5 to 7) all plus 1, to obtain indices of 384 data subcarriers in a 484-tone DRU whose identifier is i+1. An offset between indices of 384 data subcarriers (the first part) in a 484-tone DRU whose identifier is 4 and indices of 384 data subcarriers in a 484-tone DRU whose identifier is 5 is 2.

The second part of data subcarriers (48 data subcarriers) in the 484-tone DRU includes 24 high-frequency subcarriers (whose subcarrier indices are positive values) and 24 low-frequency subcarriers (whose subcarrier indices are negative values). If every six data subcarriers of the second part (48 data subcarriers) are considered as one group in a frequency direction (for example, from low to high) (or understood as an ascending order of indices), the 48 data subcarriers may be considered as eight groups, including four low-frequency groups and four high-frequency groups. An index of each data subcarrier in a low-frequency group is a negative value, and an index of each data subcarrier in a high-frequency group is a positive value. Absolute values of index differences between adjacent data subcarriers in a same group are 18, absolute values of index differences between data subcarriers in two adjacent low-frequency groups or two adjacent high-frequency groups are sequentially 33, 43, and 33, and absolute values of index differences between data subcarriers in a high-frequency group and a low-frequency group (an absolute value of a difference between a minimum index of all data subcarriers in a high-frequency group and a maximum index of all data subcarriers in a low-frequency group) are 1579.

In addition, indices of 48 data subcarriers in a second part of a 484-tone DRU whose identifier is i (i=1, 3, 5, or 7) all plus 9, to obtain indices of 48 data subcarriers in a second part of a 484-tone DRU whose identifier is i+1. Indices of 48 data subcarriers in a second part of a 484-tone DRU whose identifier is i (i=2, 4, or 6) all plus 503, to obtain indices of 48 data subcarriers in a second part of a 484-tone DRU whose identifier is i+1.

In addition to the 384 data subcarriers in the first part column and the 48 data subcarriers in the second part column of the foregoing table, each 484-tone DRU further includes 36 data subcarriers (the third part) and 16 pilot subcarriers. In some embodiments, 36 data subcarriers and 16 pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 45 shows an example, so that subcarriers included in the 484-tone DRU can be fully discrete.

As shown in Table 45, each 484-tone DRU includes 16 pilot subcarriers, including eight high-frequency subcarriers and eight low-frequency subcarriers. In this way, pilot subcarriers included in a same DRU can be fully discrete, thereby implementing frequency domain diversity.

As shown in Table 42, a 484-tone DRU whose identifier is i (i=1 to 8) may be considered as a combination of a 242-tone DRU whose identifier is i and a 242-tone DRU whose identifier is i+8. In this way, subcarriers in the 484-tone DRU can be fully discrete. For example, data subcarriers in a 484-tone DRU whose identifier is 1 are a combination of data subcarriers in a 242-tone DRU whose identifier is 1 and data subcarriers in a 242-tone DRU whose identifier is 9 in Table 42. 16 pilot subcarriers in the 484-tone DRU whose identifier is 1 are a combination of eight pilot subcarriers in the 242-tone DRU whose identifier is 1 and eight pilot subcarriers in the 242-tone DRU whose identifier is 9 in Table 42. Correspondingly, Table 45 may also be simplified and represented as the following Table 46 based on Table 42.

TABLE 46

| Identifier of a 484-tone DRU | Identifier of a 242-tone DRU |
|---|---|
| 1 | 1, 9 |
| 2 | 2, 10 |
| 3 | 3, 11 |
| 4 | 4, 12 |
| 5 | 5, 13 |
| 6 | 6, 14 |
| 7 | 7, 15 |
| 8 | 8, 16 |

In addition, in an embodiment of this disclosure, the identifier of the 484-tone DRU may be based on a lowest-frequency index of a data subcarrier included in each 484-tone DRU. For example, an identifier of a 484-tone DRU having a lowest-frequency index −2035 is 1.

According to the design of the 484-tone DRU shown in Table 45 or Table 46 in an embodiment of this disclosure, compared with the continuous 484-tone RU in the 320 MHz obtained based on the 80 MHz in FIG. 3, at a same power spectral density, this embodiment of this disclosure can implement a maximum power amplification multiple, specifically, 4.33.

In an embodiment of this disclosure, an association between a 242-tone DRU and a 484-tone DRU in 320 MHz is described by using Table 46. It may be understood that the foregoing described manner of determining a 484-tone DRU based on a 242-tone DRU is merely an example, and subcarriers in the 484-tone DRU can be fully discrete. In another embodiment, the 484-tone DRU may alternatively be determined in another manner. This is not limited in this disclosure. Details are not described again.

In addition, with reference to the description of the 242-tone DRU in Table 43 or Table 44, it may be understood that the 484-tone DRU may alternatively be determined based on a 26-tone DRU or based on a 26-tone DRU and a 106-tone DRU (or a 52-tone DRU). For brevity, details are not described in this disclosure again. In addition, it may be understood that if the lowest-frequency index of the data subcarrier included in the 26-tone DRU is another value other than −2035, correspondingly the lowest-frequency index of the data subcarrier included in the 484-tone DRU also adaptively changes to another value.

In a tone plan solution of a DRU, the 320 MHz bandwidth includes four 996-tone DRUs, and each 996-tone DRU includes 980 data subcarriers and 16 pilot subcarriers. For example, Table 47 shows an example of four 996-tone DRUs corresponding to the 320 MHz bandwidth, and shows 980 data subcarriers and 16 pilot subcarriers included in each 996-tone DRU. The 980 data subcarriers may be considered as three parts. A first part of data subcarriers includes 768 data subcarriers, a second part of data subcarriers includes 96 data subcarriers, a third part of data subcarriers includes 132 data subcarriers, and a lowest-frequency index of a data subcarrier in a 996-tone DRU whose identifier is 1 is −2035. It should be understood that, although the data subcarriers are divided into the first part, the second part, and the third part in Table 47 and are separately listed, in this embodiment of this disclosure, the data subcarriers are presented as a plurality of parts only for ease of description, and are not actually used as division of data subcarriers included in each 996-tone DRU. During actual application, the data subcarriers include a combination of data subcarriers in three parts, and do not need to be distinguished. In other words, the first part, the second part, and the third part do not need to be distinguished, but are considered as a whole, namely, a data subcarrier index included in each 996-tone DRU.

TABLE 47

| Identifier of a 996-tone | Index of a data subcarrier | | | Index of a pilot |
|---|---|---|---|---|
| DRU | First part | Second part | Third part | subcarrier |
| 1 | −2035, −2030, −2026, −2021, −2017, | −2031, | −1926, −1922, | −1916, |
| | −2012, −2008, −2003, −1999, −1994, | −2013, −1995, | −1800, −1799, | −1804, |
| | −1990, −1985, −1981, −1976, −1972, | −1977, | −1795, −1792, | −1404 |
| | −1967, −1963, −1958, −1954, −1949, | −1959, −1941, | −1785, −1671, | −1292, |
| | −1945, −1940, −1936, −1931, −1912, | −1908, | −1667, −1666, | −892, |
| | −1907, −1903, −1898, −1894, −1889, | −1890, −1872, | −1662, −1658, | −780, |
| | −1885, −1880, −1876, −1871, −1867, | −1854, | −1548, −1544, | −380, |
| | −1862, −1858, −1853, −1849, −1844, | −1836, −1818, | −1540, −1531, | 268, 263, |
| | −1840, −1835, −1831, −1826, −1822, | −1775, | −1527, −1415, | 377, 775, |
| | −1817, −1813, −1808, −1779, −1774, | −1757, −1739, | −1411, −1287, | 889, |
| | −1770, −1765, −1761, −1756, −1752, | −1721, | −1283, −1281, | 1287, |
| | −1747, −1743, −1738, −1734, −1729, | −1703, −1685, | −1273, −1269, | 1401, |
| | −1725, −1720, −1716, −1711, −1707, | −1652, | −1159, −1154, | 1799, |
| | −1702, −1698, −1693, −1689, −1684, | −1634, −1616, | −1150, −1147, | 1913 |
| | −1680, −1675, −1656, −1651, −1647, | −1598, | −1036, −901, | |
| | −1642, −1638, −1633, −1629, −1624, | −1580, −1562, | −897, −776, | |
| | −1620, −1615, −1611, −1606, −1602, | −1007, −989, | −775, −771, | |
| | −1597, −1593, −1588, −1584, −1579, | −971, −953, | −767, −761, | |
| | −1575, −1570, −1566, −1561, −1557, | −935, −917, | −647, −643, | |
| | −1552, −1523, −1518, −1514, −1509, | −884, −866, | −642, −638, | |
| | −1505, −1500, −1496, −1491, −1487, | −848, −830, | −637, −524, | |
| | −1482, −1478, −1473, −1469, −1464, | −812, −794, | −520, −516, | |
| | −1460, −1455, −1451, −1446, −1442, | −751, −733, | −507, −503, | |
| | −1437, −1433, −1428, −1424, −1419, | −715, −697, | −501, −389, | |
| | −1400, −1395, −1391, −1386, −1382, | −679, −661, | −385, −263, | |
| | −1377, −1373, −1368, −1364, −1359, | −628, −610, | −259, −255, | |
| | −1355, −1350, −1346, −1341, −1337, | −592, −574, | −249, −135, | |
| | −1332, −1328, −1323, −1319, −1314, | −556, −538, | −130, −126, | |
| | −1310, −1305, −1301, −1296, −1267, | 17, 35, 53, | −125, −121, 124, | |
| | −1262, −1258, −1253, −1249, −1244, | 71, 89, 107, | 132, 244, 248, | |
| | −1240, −1235, −1231, −1226, −1222, | 140, 158, | 249, 253, 254, | |
| | −1217, −1213, −1208, −1204, −1199, | 176, 194, | 258, 381, 382, | |
| | −1195, −1190, −1186, −1181, −1177, | 212, 230, | 386, 388, 500, | |
| | −1172, −1168, −1163, −1144, −1139, | 273, 291, | 504, 508, 517, | |
| | −1135, −1130, −1126, −1121, −1117, | 309, 327, | 521, 523, 635, | |
| | −1112, −1108, −1103, −1099, −1094, | 345, 363, | 639, 644, 756, | |
| | −1090, −1085, −1081, −1076, −1072, | 396, 414, | 761, 765, 769, | |
| | −1067, −1063, −1058, −1054, −1049, | 432, 450, | 894, 898, 899, | |
| | −1045, −1040, −1011, −1006, −1002, | 468, 486, | 903, 1148, | |
| | −997, −993, −988, −984, −979, −975, | 1041, 1059, | 1156, 1268, | |
| | −970, −966, −961, −957, −952, −948, | 1077, 1095, | 1272, 1273, | |
| | −943, −939, −934, −930, −925, −921, | 1113, 1131, | 1277, 1278, | |

TABLE 47-continued

| Identifier of a 996-tone DRU | Index of a data subcarrier First part | Second part | Third part | Index of a pilot subcarrier |
|---|---|---|---|---|
| | −916, −912, −907, −888, −883, −879, −874, −870, −865, −861, −856, −852, −847, −843, −838, −834, −829, −825, −820, −816, −811, −807, −802, −798, −793, −789, −784, −755, −750, −746, −741, −737, −732, −728, −723, −719, −714, −710, −705, −701, −696, −692, −687, −683, −678, −674, −669, −665, −660, −656, −651, −632, −627, −623, −618, −614, −609, −605, −600, −596, −591, −587, −582, −578, −573, −569, −564, −560, −555, −551, −546, −542, −537, −533, −528, −499, −494, −490, −485, −481, −476, −472, −467, −463, −458, −454, −449, −445, −440, −436, −431, −427, −422, −418, −413, −409, −404, −400, −395, −376, −371, −367, −362, −358, −353, −349, −344, −340, −335, −331, −326, −322, −317, −313, −308, −304, −299, −295, −290, −286, −281, −277, −272, −243, −238, −234, −229, −225, −220, −216, −211, −207, −202, −198, −193, −189, −184, −180, −175, −171, −166, −162, −157, −153, −148, −144, −139, −120, −115, −111, −106, −102, −97, −93, −88, −84, −79, −75, −70, −66, −61, −57, −52, −48, −43, −39, −34, −30, −25, −21, −16, 13, 18, 22, 27, 31, 36, 40, 45, 49, 54, 58, 63, 67, 72, 76, 81, 85, 90, 94, 99, 103, 108, 112, 117, 136, 141, 145, 150, 154, 159, 163, 168, 172, 177, 181, 186, 190, 195, 199, 204, 208, 213, 217, 222, 226, 231, 235, 240, 269, 274, 278, 283, 287, 292, 296, 301, 305, 310, 314, 319, 323, 328, 332, 337, 341, 346, 350, 355, 359, 364, 368, 373, 392, 397, 401, 406, 410, 415, 419, 424, 428, 433, 437, 442, 446, 451, 455, 460, 464, 469, 473, 478, 482, 487, 491, 496, 525, 530, 534, 539, 543, 548, 552, 557, 561, 566, 570, 575, 579, 584, 588, 593, 597, 602, 606, 611, 615, 620, 624, 629, 648, 653, 657, 662, 666, 671, 675, 680, 684, 689, 693, 698, 702, 707, 711, 716, 720, 725, 729, 734, 738, 743, 747, 752, 781, 786, 790, 795, 799, 804, 808, 813, 817, 822, 826, 831, 835, 840, 844, 849, 853, 858, 862, 867, 871, 876, 880, 885, 904, 909, 913, 918, 922, 927, 931, 936, 940, 945, 949, 954, 958, 963, 967, 972, 976, 981, 985, 990, 994, 999, 1003, 1008, 1037, 1042, 1046, 1051, 1055, 1060, 1064, 1069, 1073, 1078, 1082, 1087, 1091, 1096, 1100, 1105, 1109, 1114, 1118, 1123, 1127, 1132, 1136, 1141, 1160, 1165, 1169, 1174, 1178, 1183, 1187, 1192, 1196, 1201, 1205, 1210, 1214, 1219, 1223, 1228, 1232, 1237, 1241, 1246, 1250, 1255, 1259, 1264, 1293, 1298, 1302, 1307, 1311, 1316, 1320, 1325, 1329, 1334, 1338, 1343, 1347, 1352, 1356, 1361, 1365, 1370, 1374, 1379, 1383, 1388, 1392, 1397, 1416, 1421, 1425, 1430, 1434, 1439, 1443, 1448, 1452, 1457, 1461, 1466, 1470, 1475, 1479, 1484, 1488, 1493, 1497, 1502, 1506, 1511, 1515, 1520, 1549, 1554, 1558, 1563, 1567, 1572, 1576, 1581, 1585, 1590, 1594, 1599, 1603, 1608, 1612, 1617, 1621, 1626, 1630, 1635, 1639, 1644, 1648, 1653, 1672, 1677, 1681, 1686, 1690, 1695, 1699, 1704, 1708, 1713, 1717, 1722, 1726, 1731, 1735, 1740, | 1164, 1182, 1200, 1218, 1236, 1254, 1297, 1315, 1333, 1351, 1369, 1387, 1420, 1438, 1456, 1474, 1492, 1510 | 1282, 1405, 1406, 1410, 1411, 1524, 1528, 1532, 1541, 1545, 1657, 1661, 1668, 1780, 1785, 1789, 1791, 1803, 1918, 1922, 1925, 2036 | |

TABLE 47-continued

| Identifier of a 996-tone DRU | Index of a data subcarrier: First part | Index of a data subcarrier: Second part | Index of a data subcarrier: Third part | Index of a pilot subcarrier |
|---|---|---|---|---|
| | 1744, 1749, 1753, 1758, 1762, 1767, 1771, 1776, 1805, 1810, 1814, 1819, 1823, 1828, 1832, 1837, 1841, 1846, 1850, 1855, 1859, 1864, 1868, 1873, 1877, 1882, 1886, 1891, 1895, 1900, 1904, 1909, 1928, 1933, 1937, 1942, 1946, 1951, 1955, 1960, 1964, 1969, 1973, 1978, 1982, 1987, 1991, 1996, 2000, 2005, 2009, 2014, 2018, 2023, 2027, 2032 | | | |
| 2 | −2034, −2029, −2025, −2020, −2016, −2011, −2007, −2002, −1998, −1993, −1989, −1984, −1980, −1975, −1971, −1966, −1962, −1957, −1953, −1948, −1944, −1939, −1935, −1930, −1911, −1906, −1902, −1897, −1893, −1888, −1884, −1879, −1875, −1870, −1866, −1861, −1857, −1852, −1848, −1843, −1839, −1834, −1830, −1825, −1821, −1816, −1812, −1807, −1778, −1773, −1769, −1764, −1760, −1755, −1751, −1746, −1742, −1737, −1733, −1728, −1724, −1719, −1715, −1710, −1706, −1701, −1697, −1692, −1688, −1683, −1679, −1674, −1655, −1650, −1646, −1641, −1637, −1632, −1628, −1623, −1619, −1614, −1610, −1605, −1601, −1596, −1592, −1587, −1583, −1578, −1574, −1569, −1565, −1560, −1556, −1551, −1522, −1517, −1513, −1508, −1504, −1499, −1495, −1490, −1486, −1481, −1477, −1472, −1468, −1463, −1459, −1454, −1450, −1445, −1441, −1436, −1432, −1427, −1423, −1418, −1399, −1394, −1390, −1385, −1381, −1376, −1372, −1367, −1363, −1358, −1354, −1349, −1345, −1340, −1336, −1331, −1327, −1322, −1318, −1313, −1309, −1304, −1300, −1295, −1266, −1261, −1257, −1252, −1248, −1243, −1239, −1234, −1230, −1225, −1221, −1216, −1212, −1207, −1203, −1198, −1194, −1189, −1185, −1180, −1176, −1171, −1167, −1162, −1143, −1138, −1134, −1129, −1125, −1120, −1116, −1111, −1107, −1102, −1098, −1093, −1089, −1084, −1080, −1075, −1071, −1066, −1062, −1057, −1053, −1048, −1044, −1039, −1010, −1005, −1001, −996, −992, −987, −983, −978, −974, −969, −965, −960, −956, −951, −947, −942, −938, −933, −929, −924, −920, −915, −911, −906, −887, −882, −878, −873, −869, −864, −860, −855, −851, −846, −842, −837, −833, −828, −824, −819, −815, −810, −806, −801, −797, −792, −788, −783, −754, −749, −745, −740, −736, −731, −727, −722, −718, −713, −709, −704, −700, −695, −691, −686, −682, −677, −673, −668, −664, −659, −655, −650, −631, −626, −622, −617, −613, −608, −604, −599, −595, −590, −586, −581, −577, −572, −568, −563, −559, −554, −550, −545, −541, −536, −532, −527, −498, −493, −489, −484, −480, −475, −471, −466, −462, −457, −453, −448, −444, −439, −435, −430, −426, −421, −417, −412, −408, −403, −399, −394, −375, −370, −366, −361, −357, −352, −348, −343, −339, −334, −330, −325, −321, −316, −312, −307, −303, −298, −294, −289, −285, −280, −276, −271, −242, −237, −233, −228, −224, −219, −215, −210, −206, | −2022, −2004, −1986, −1968, −1950, −1932, −1899, −1881, −1863, −1845, −1827, −1809, −1766, −1748, −1730, −1712, −1694, −1676, −1643, −1625, −1607, −1589, −1571, −1553, −998, −980, −962, −944, −926, −908, −875, −857, −839, −821, −803, −785, −742, −724, −706, −688, −670, −652, −619, −601, −583, −565, −547, −529, 26, 44, 62, 80, 98, 116, 149, 167, 185, 203, 221, 239, 282, 300, 318, 336, 354, 372, 405, 423, 441, 459, 477, 495, 1050, 1068, 1086, 1104, 1122, 1140, 1173, 1191, 1209, 1227, 1245, 1263, 1306, 1324, 1342, 1360, 1378, 1396, 1429, 1447, 1465, 1483, 1501, 1519 | −1925, −1921, −1917, −1915, −1798, −1791, −1789, −1786, −1784, −1670, −1665, −1661, −1657, −1547, −1543, −1539, −1530, −1526, −1414, −1410, −1403, −1286, −1280, −1277, −1272, −1268, −1158, −1153, −1146, −1012, −900, −893, −891, −774, −770, −766, −765, −762, −760, −646, −641, −636, −523, −519, −515, −506, −502, −500, −388, −379, −262, −258, −254, −253, −248, −134, −129, −124, 121, 125, 128, 131, 133, 245, 250, 255, 262, 264, 267, 383, 389, 501, 505, 509, 518, 522, 524, 636, 640, 645, 757, 762, 766, 770, 776, 895, 900, 1012, 1149, 1152, 1155, 1157, 1269, 1274, 1279, 1286, 1288, 1291, 1407, 1412, 1525, 1529, 1533, 1542, 1546, 1658, 1662, 1664, 1669, 1781, 1786, 1792, 1800, 1804, 1919, 1926 | −1920, −1803, −1408, −1291, −896, −779, −384, −267, 259, 378, 771, 890, 1283, 1402, 1795, 1914 |

TABLE 47-continued

| Identifier of a 996-tone DRU | Index of a data subcarrier: First part | Second part | Third part | Index of a pilot subcarrier |
|---|---|---|---|---|
| | −201, −197, −192, −188, −183, −179, −174, −170, −165, −161, −156, −152, −147, −143, −138, −119, −114, −110, −105, −101, −96, −92, −87, −83, −78, −74, −69, −65, −60, −56, −51, −47, −42, −38, −33, −29, −24, −20, −15, 14, 19, 23, 28, 32, 37, 41, 46, 50, 55, 59, 64, 68, 73, 77, 82, 86, 91, 95, 100, 104, 109, 113, 118, 137, 142, 146, 151, 155, 160, 164, 169, 173, 178, 182, 187, 191, 196, 200, 205, 209, 214, 218, 223, 227, 232, 236, 241, 270, 275, 279, 284, 288, 293, 297, 302, 306, 311, 315, 320, 324, 329, 333, 338, 342, 347, 351, 356, 360, 365, 369, 374, 393, 398, 402, 407, 411, 416, 420, 425, 429, 434, 438, 443, 447, 452, 456, 461, 465, 470, 474, 479, 483, 488, 492, 497, 526, 531, 535, 540, 544, 549, 553, 558, 562, 567, 571, 576, 580, 585, 589, 594, 598, 603, 607, 612, 616, 621, 625, 630, 649, 654, 658, 663, 667, 672, 676, 681, 685, 690, 694, 699, 703, 708, 712, 717, 721, 726, 730, 735, 739, 744, 748, 753, 782, 787, 791, 796, 800, 805, 809, 814, 818, 823, 827, 832, 836, 841, 845, 850, 854, 859, 863, 868, 872, 877, 881, 886, 905, 910, 914, 919, 923, 928, 932, 937, 941, 946, 950, 955, 959, 964, 968, 973, 977, 982, 986, 991, 995, 1000, 1004, 1009, 1038, 1043, 1047, 1052, 1056, 1061, 1065, 1070, 1074, 1079, 1083, 1088, 1092, 1097, 1101, 1106, 1110, 1115, 1119, 1124, 1128, 1133, 1137, 1142, 1161, 1166, 1170, 1175, 1179, 1184, 1188, 1193, 1197, 1202, 1206, 1211, 1215, 1220, 1224, 1229, 1233, 1238, 1242, 1247, 1251, 1256, 1260, 1265, 1294, 1299, 1303, 1308, 1312, 1317, 1321, 1326, 1330, 1335, 1339, 1344, 1348, 1353, 1357, 1362, 1366, 1371, 1375, 1380, 1384, 1389, 1393, 1398, 1417, 1422, 1426, 1431, 1435, 1440, 1444, 1449, 1453, 1458, 1462, 1467, 1471, 1476, 1480, 1485, 1489, 1494, 1498, 1503, 1507, 1512, 1516, 1521, 1550, 1555, 1559, 1564, 1568, 1573, 1577, 1582, 1586, 1591, 1595, 1600, 1604, 1609, 1613, 1618, 1622, 1627, 1631, 1636, 1640, 1645, 1649, 1654, 1673, 1678, 1682, 1687, 1691, 1696, 1700, 1705, 1709, 1714, 1718, 1723, 1727, 1732, 1736, 1741, 1745, 1750, 1754, 1759, 1763, 1768, 1772, 1777, 1806, 1811, 1815, 1820, 1824, 1829, 1833, 1838, 1842, 1847, 1851, 1856, 1860, 1865, 1869, 1874, 1878, 1883, 1887, 1892, 1896, 1901, 1905, 1910, 1929, 1934, 1938, 1943, 1947, 1952, 1956, 1961, 1965, 1970, 1974, 1979, 1983, 1988, 1992, 1997, 2001, 2006, 2010, 2015, 2019, 2024, 2028, 2033 | | | |
| 3 | −2033, −2028, −2024, −2019, −2015, −2010, −2006, −2001, −1997, −1992, −1988, −1983, −1979, −1974, −1970, −1965, −1961, −1956, −1952, −1947, −1943, −1938, −1934, −1929, −1910, −1905, −1901, −1896, −1892, −1887, −1883, −1878, −1874, −1869, −1865, −1860, −1856, −1851, −1847, −1842, −1838, −1833, −1829, −1824, −1820, −1815, −1811, −1806, −1777, −1772, −1768, −1763, −1759, −1754, −1750, −1745, −1741, −1736, −1732, −1727, | −1519, −1501, −1483, −1465, −1447, −1429, −1396, −1378, −1360, −1342, −1324, −1306, −1263, −1245, −1227, −1209, −1191, −1173, | −1924, −1914, −1797, −1794, −1790, −1788, −1783, −1781, −1669, −1664, −1660, −1546, −1542, −1533, −1529, −1525, −1413, −1409, −1402, −1288, −1285, −1279, −1276, −1271, | −1919, −1802, −1407, −1290, −895, −778, −383, 266, 260, 379, 772, 891, 1284, 1403, |

TABLE 47-continued

| Identifier of a 996-tone DRU | Index of a data subcarrier | | | Index of a pilot subcarrier |
|---|---|---|---|---|
| | First part | Second part | Third part | |
| | −1723, −1718, −1714, −1709, −1705, −1700, −1696, −1691, −1687, −1682, −1678, −1673, −1654, −1649, −1645, −1640, −1636, −1631, −1627, −1622, −1618, −1613, −1609, −1604, −1600, −1595, −1591, −1586, −1582, −1577, −1573, −1568, −1564, −1559, −1555, −1550, −1521, −1516, −1512, −1507, −1503, −1498, −1494, −1489, −1485, −1480, −1476, −1471, −1467, −1462, −1458, −1453, −1449, −1444, −1440, −1435, −1431, −1426, −1422, −1417, −1398, −1393, −1389, −1384, −1380, −1375, −1371, −1366, −1362, −1357, −1353, −1348, −1344, −1339, −1335, −1330, −1326, −1321, −1317, −1312, −1308, −1303, −1299, −1294, −1265, −1260, −1256, −1251, −1247, −1242, −1238, −1233, −1229, −1224, −1220, −1215, −1211, −1206, −1202, −1197, −1193, −1188, −1184, −1179, −1175, −1170, −1166, −1161, −1142, −1137, −1133, −1128, −1124, −1119, −1115, −1110, −1106, −1101, −1097, −1092, −1088, −1083, −1079, −1074, −1070, −1065, −1061, −1056, −1052, −1047, −1043, −1038, −1009, −1004, −1000, −995, −991, −986, −982, −977, −973, −968, −964, −959, −955, −950, −946, −941, −937, −932, −928, −923, −919, −914, −910, −905, −886, −881, −877, −872, −868, −863, −859, −854, −850, −845, −841, −836, −832, −827, −823, −818, −814, −809, −805, −800, −796, −791, −787, −782, −753, −748, −744, −739, −735, −730, −726, −721, −717, −712, −708, −703, −699, −694, −690, −685, −681, −676, −672, −667, −663, −658, −654, −649, −630, −625, −621, −616, −612, −607, −603, −598, −594, −589, −585, −580, −576, −571, −567, −562, −558, −553, −549, −544, −540, −535, −531, −526, −497, −492, −488, −483, −479, −474, −470, −465, −461, −456, −452, −447, −443, −438, −434, −429, −425, −420, −416, −411, −407, −402, −398, −393, −374, −369, −365, −360, −356, −351, −347, −342, −338, −333, −329, −324, −320, −315, −311, −306, −302, −297, −293, −288, −284, −279, −275, −270, −241, −236, −232, −227, −223, −218, −214, −209, −205, −200, −196, −191, −187, −182, −178, −173, −169, −164, −160, −155, −151, −146, −142, −137, −118, −113, −109, −104, −100, −95, −91, −86, −82, −77, −73, −68, −64, −59, −55, −50, −46, −41, −37, −32, −28, −23, −19, −14, 15, 20, 24, 29, 33, 38, 42, 47, 51, 56, 60, 65, 69, 74, 78, 83, 87, 92, 96, 101, 105, 110, 114, 119, 138, 143, 147, 152, 156, 161, 165, 170, 174, 179, 183, 188, 192, 197, 201, 206, 210, 215, 219, 224, 228, 233, 237, 242, 271, 276, 280, 285, 289, 294, 298, 303, 307, 312, 316, 321, 325, 330, 334, 339, 343, 348, 352, 357, 361, 366, 370, 375, 394, 399, 403, 408, 412, 417, 421, 426, 430, 435, 439, 444, 448, 453, 457, 462, 466, 471, 475, 480, 484, 489, 493, 498, 527, 532, 536, 541, 545, 550, 554, 559, 563, 568, 572, 577, 581, 586, 590, 595, 599, 604, 608, 613, 617, 622, 626, 631, 650, 655, 659, 664, 668, 673, 677, 682, 686, 691, 695, 700, 704, 709, 713, | −1140, −1122, −1104, −1086, −1068, −1050, −495, −477, −459, −441, −423, −405, −372, −354, −336, −318, −300, −282, −239, −221, −203, −185, −167, −149, −116, −98, −80, −62, −44, −26, 529, 547, 565, 583, 601, 619, 652, 670, 688, 706, 724, 742, 785, 803, 821, 839, 857, 875, 908, 926, 944, 962, 980, 998, 1553, 1571, 1589, 1607, 1625, 1643, 1676, 1694, 1712, 1730, 1748, 1766, 1809, 1827, 1845, 1863, 1881, 1899, 1932, 1950, 1968, 1986, 2004, 2022 | −1157, −1155, −1152, −1149, −1145, −903, −899, −890, −773, −769, −764, −759, −757, −645, −640, −635, −522, −518, −509, −505, −391, −387, −378, −264, −261, −257, −252, −247, −245, −133, −131, −128, −123, −12, 122, 126, 129, 134, 246, 251, 256, 265, 268, 384, 390, 502, 506, 515, 519, 633, 637, 641, 646, 758, 760, 763, 767, 777, 779, 893, 896, 901, 1036, 1145, 1150, 1153, 1158, 1270, 1275, 1280, 1289, 1292, 1408, 1413, 1526, 1530, 1539, 1543, 1547, 1659, 1663, 1665, 1670, 1782, 1784, 1787, 1793, 1801, 1917, 1920, 1923, 1927 | 1796, 1915 |

TABLE 47-continued

| Identifier of a 996-tone DRU | Index of a data subcarrier: First part | Second part | Third part | Index of a pilot subcarrier |
|---|---|---|---|---|
| | 718, 722, 727, 731, 736, 740, 745, 749, 754, 783, 788, 792, 797, 801, 806, 810, 815, 819, 824, 828, 833, 837, 842, 846, 851, 855, 860, 864, 869, 873, 878, 882, 887, 906, 911, 915, 920, 924, 929, 933, 938, 942, 947, 951, 956, 960, 965, 969, 974, 978, 983, 987, 992, 996, 1001, 1005, 1010, 1039, 1044, 1048, 1053, 1057, 1062, 1066, 1071, 1075, 1080, 1084, 1089, 1093, 1098, 1102, 1107, 1111, 1116, 1120, 1125, 1129, 1134, 1138, 1143, 1162, 1167, 1171, 1176, 1180, 1185, 1189, 1194, 1198, 1203, 1207, 1212, 1216, 1221, 1225, 1230, 1234, 1239, 1243, 1248, 1252, 1257, 1261, 1266, 1295, 1300, 1304, 1309, 1313, 1318, 1322, 1327, 1331, 1336, 1340, 1345, 1349, 1354, 1358, 1363, 1367, 1372, 1376, 1381, 1385, 1390, 1394, 1399, 1418, 1423, 1427, 1432, 1436, 1441, 1445, 1450, 1454, 1459, 1463, 1468, 1472, 1477, 1481, 1486, 1490, 1495, 1499, 1504, 1508, 1513, 1517, 1522, 1551, 1556, 1560, 1565, 1569, 1574, 1578, 1583, 1587, 1592, 1596, 1601, 1605, 1610, 1614, 1619, 1623, 1628, 1632, 1637, 1641, 1646, 1650, 1655, 1674, 1679, 1683, 1688, 1692, 1697, 1701, 1706, 1710, 1715, 1719, 1724, 1728, 1733, 1737, 1742, 1746, 1751, 1755, 1760, 1764, 1769, 1773, 1778, 1807, 1812, 1816, 1821, 1825, 1830, 1834, 1839, 1843, 1848, 1852, 1857, 1861, 1866, 1870, 1875, 1879, 1884, 1888, 1893, 1897, 1902, 1906, 1911, 1930, 1935, 1939, 1944, 1948, 1953, 1957, 1962, 1966, 1971, 1975, 1980, 1984, 1989, 1993, 1998, 2002, 2007, 2011, 2016, 2020, 2025, 2029, 2034 | | | |
| 4 | −2032, −2027, −2023, −2018, −2014, −2009, −2005, −2000, −1996, −1991, −1987, −1982, −1978, −1973, −1969, −1964, −1960, −1955, −1951, −1946, −1942, −1937, −1933, −1928, −1909, −1904, −1900, −1895, −1891, −1886, −1882, −1877, −1873, −1868, −1864, −1859, −1855, −1850, −1846, −1841, −1837, −1832, −1828, −1823, −1819, −1814, −1810, −1805, −1776, −1771, −1767, −1762, −1758, −1753, −1749, −1744, −1740, −1735, −1731, −1726, −1722, −1717, −1713, −1708, −1704, −1699, −1695, −1690, −1686, −1681, −1677, −1672, −1653, −1648, −1644, −1639, −1635, −1630, −1626, −1621, −1617, −1612, −1608, −1603, −1599, −1594, −1590, −1585, −1581, −1576, −1572, −1567, −1563, −1558, −1554, −1549, −1520, −1515, −1511, −1506, −1502, −1497, −1493, −1488, −1484, −1479, −1475, −1470, −1466, −1461, −1457, −1452, −1448, −1443, −1439, −1434, −1430, −1425, −1421, −1416, −1397, −1392, −1388, −1383, −1379, −1374, −1370, −1365, −1361, −1356, −1352, −1347, −1343, −1338, −1334, −1329, −1325, −1320, −1316, −1311, −1307, −1302, −1298, −1293, −1264, −1259, −1255, −1250, −1246, −1241, −1237, −1232, −1228, −1223, −1219, −1214, −1210, −1205, −1201, −1196, −1192, −1187, −1183, −1178, −1174, −1169, −1165, −1160, −1141, −1136, | −1510, −1492, −1474, −1456, −1438, −1420, −1387, −1369, −1351, −1333, −1315, −1297, −1254, −1236, −1218, −1200, −1182, −1164, −1131, −1113, −1095, −1077, −1059, −1041, −486, −468, −450, −432, −414, −396, −363, −345, −327, −309, −291, −273, −230, −212, −194, −176, −158, −140, −107, −89, −71, −53, −35, −17, 538, 556, 574, 592, 610, 628, 661, 679, 697, 715, 733, 751, 794, 812, | −2036, −1927, −1923, −1913, −1796, −1793, −1787, −1782, −1780, −1668, −1663, −1659, −1545, −1541, −1532, −1528, −1524, −1412, −1405, −1401, −1284, −1282, −1278, −1275, −1274, −1270, −1156, −1151, −1148, −902, −898, −889, −772, −768, −763, −758, −756, −644, −639, −634, −633, −521, −517, −508, −504, −390, −386, −381, −377, −260, −256, −251, −250, −246, −244, −132, −127, −122, 12, 123, 127, 130, 135, 247, 252, 257, 266, 385, 387, 391, 503, 507, 516, 520, | −1918, −1801, −1406, −1289, −894, −777, −382, 265, 261, 380, 773, 892, 1285, 1404, 1797, 1916 |

TABLE 47-continued

| Identifier of a 996-tone | Index of a data subcarrier | | | Index of a pilot |
|---|---|---|---|---|
| DRU | First part | Second part | Third part | subcarrier |
| | −1132, −1127, −1123, −1118, −1114, −1109, −1105, −1100, −1096, −1091, −1087, −1082, −1078, −1073, −1069, −1064, −1060, −1055, −1051, −1046, −1042, −1037, −1008, −1003, −999, −994, −990, −985, −981, −976, −972, −967, −963, −958, −954, −949, −945, −940, −936, −931, −927, −922, −918, −913, −909, −904, −885, −880, −876, −871, −867, −862, −858, −853, −849, −844, −840, −835, −831, −826, −822, −817, −813, −808, −804, −799, −795, −790, −786, −781, −752, −747, −743, −738, −734, −729, −725, −720, −716, −711, −707, −702, −698, −693, −689, −684, −680, −675, −671, −666, −662, −657, −653, −648, −629, −624, −620, −615, −611, −606, −602, −597, −593, −588, −584, −579, −575, −570, −566, −561, −557, −552, −548, −543, −539, −534, −530, −525, −496, −491, −487, −482, −478, −473, −469, −464, −460, −455, −451, −446, −442, −437, −433, −428, −424, −419, −415, −410, −406, −401, −397, −392, −373, −368, −364, −359, −355, −350, −346, −341, −337, −332, −328, −323, −319, −314, −310, −305, −301, −296, −292, −287, −283, −278, −274, −269, −240, −235, −231, −226, −222, −217, −213, −208, −204, −199, −195, −190, −186, −181, −177, −172, −168, −163, −159, −154, −150, −145, −141, −136, −117, −112, −108, −103, −99, −94, −90, −85, −81, −76, −72, −67, −63, −58, −54, −49, −45, −40, −36, −31, −27, −22, −18, −13, 16, 21, 25,30, 34, 39, 43, 48, 52, 57, 61, 66, 70, 75, 79, 84, 88, 93, 97, 102, 106, 111, 115, 120, 139, 144, 148, 153, 157, 162, 166, 171, 175, 180, 184, 189, 193, 198, 202, 207, 211, 216, 220, 225, 229, 234, 238, 243, 272, 277, 281, 286, 290, 295, 299, 304, 308, 313, 317, 322, 326, 331, 335, 340, 344, 349, 353, 358, 362, 367, 371, 376, 395, 400, 404, 409, 413, 418, 422, 427, 431, 436, 440, 445, 449, 454, 458, 463, 467, 472, 476, 481, 485, 490, 494, 499, 528, 533, 537, 542, 546, 551, 555, 560, 564, 569, 573, 578, 582, 587, 591, 596, 600, 605, 609, 614, 618, 623, 627, 632, 651, 656, 660, 665, 669, 674, 678, 683, 687, 692, 696, 701, 705, 710, 714, 719, 723, 728, 732, 737, 741, 746, 750, 755, 784, 789, 793, 798, 802, 807, 811, 816, 820, 825, 829, 834, 838, 843, 847, 852, 856, 861, 865, 870, 874, 879, 883, 888, 907, 912, 916, 921, 925, 930, 934, 939, 943, 948, 952, 957, 961, 966, 970, 975, 979, 984, 988, 993, 997, 1002, 1006, 1011, 1040, 1045, 1049, 1054, 1058, 1063, 1067, 1072, 1076, 1081, 1085, 1090, 1094, 1099, 1103, 1108, 1112, 1117, 1121, 1126, 1130, 1135, 1139, 1144, 1163, 1168, 1172, 1177, 1181, 1186, 1190, 1195, 1199, 1204, 1208, 1213, 1217, 1222, 1226, 1231, 1235, 1240, 1244, 1249, 1253, 1258, 1262, 1267, 1296, 1301, 1305, 1310, 1314, 1319, 1323, 1328, 1332, 1337, 1341, 1346, 1350, 1355, 1359, 1364, 1368, 1373, 1377, 1382, 1386, 1391, 1395, 1400, 1419, 1424, 1428, 1433, 1437, 1442, 1446, 1451, 1455, 1460, 1464, 1469, 1473, 1478, 1482, 1487, 1491, | 830, 848, 866, 884, 917, 935, 953, 971, 989, 1007, 1562, 1580, 1598, 1616, 1634, 1652, 1685, 1703, 1721, 1739, 1757, 1775, 1818, 1836, 1854, 1872, 1890, 1908, 1941, 1959, 1977, 1995, 2013, 2031 | 634, 638, 642, 643, 647, 759, 764, 768, 774, 778, 780, 897, 902, 1146, 1147, 1151, 1154, 1159, 1271, 1276, 1281, 1290, 1409, 1414, 1415, 1527, 1531, 1540, 1544, 1548, 1660, 1666, 1667, 1671, 1783, 1788, 1790, 1794, 1798, 1802, 1921, 1924 | |

TABLE 47-continued

| Identifier of a 996-tone DRU | Index of a data subcarrier | | | Index of a pilot subcarrier |
|---|---|---|---|---|
| | First part | Second part | Third part | |
| | 1496, 1500, 1505, 1509, 1514, 1518, 1523, 1552, 1557, 1561, 1566, 1570, 1575, 1579, 1584, 1588, 1593, 1597, 1602, 1606, 1611, 1615, 1620, 1624, 1629, 1633, 1638, 1642, 1647, 1651, 1656, 1675, 1680, 1684, 1689, 1693, 1698, 1702, 1707, 1711, 1716, 1720, 1725, 1729, 1734, 1738, 1743, 1747, 1752, 1756, 1761, 1765, 1770, 1774, 1779, 1808, 1813, 1817, 1822, 1826, 1831, 1835, 1840, 1844, 1849, 1853, 1858, 1862, 1867, 1871, 1876, 1880, 1885, 1889, 1894, 1898, 1903, 1907, 1912, 1931, 1936, 1940, 1945, 1949, 1954, 1958, 1963, 1967, 1972, 1976, 1981, 1985, 1990, 1994, 1999, 2003, 2008, 2012, 2017, 2021, 2026, 2030, 2035 | | | |

For the first part of data subcarriers (768 data subcarriers) in the 996-tone DRU, as shown in Table 47, the 384 data subcarriers include 192 high-frequency subcarriers (whose subcarrier indices are positive values) and 192 low-frequency subcarriers (whose subcarrier indices are negative values). If every 24 of the 384 data subcarriers are considered as one group in a frequency direction (for example, from low to high) (or understood as an ascending order of indices), absolute values of index differences between adjacent data subcarriers in a same group are alternately 5 and 4, and absolute values of index differences between data subcarriers in two adjacent groups are alternately 19 and 29.

In other words, for the 24 data subcarriers in the same group, an absolute value of an index difference between adjacent subcarriers of 12 data subcarriers in odd-numbered locations is 9, and an absolute value of an index difference between adjacent subcarriers of 12 data subcarriers in even-numbered locations is 9. An absolute value of an index difference between a data subcarrier in an even-numbered location and a previous adjacent data subcarrier is 5. Correspondingly, an absolute value of an index difference between a data subcarrier in an odd-numbered location and a previous adjacent data subcarrier is 4. In some embodiments, the 24 data subcarriers in the same group may be considered to include two sequences, for example, an odd-numbered location sequence and an even-numbered location sequence. An absolute value of an index difference between adjacent data subcarriers in each sequence is 9. For example, indices of the first 24 data subcarriers of the first part of data subcarriers of the 996-tone DRU whose identifier is 1 include −2035, −2030, −2026, −2021, −2017, −2012, −2008, −2003, −1999, −1994, −1990, −1985, −1981, −1976, −1972, −1967, −1963, −1958, −1954, −1949, −1945, −1940, −1936, and −1931, and may be represented as a combination of two sequences [−2035: 9: −1936] and [−2030: 9: −1931].

In other words, it is assumed that indices of 768 data subcarriers (e.g., the first part) included in each 996-tone DRU are sequentially arranged in a frequency direction and then divided into 32 groups, and each group includes 24 data subcarriers. Absolute values of index differences between 24 data subcarriers in a same group are alternately 5 and 4.

As shown in Table 47, there is a fixed offset between indices of 768 data subcarriers (the first part) included in two 996-tone DRUs having adjacent identifiers, and the fixed offset is 1. For example, indices of 768 data subcarriers in a 996-tone DRU whose identifier is i (i=1, 2, or 3) all plus 1, to obtain indices of 768 data subcarriers in a 996-tone DRU whose identifier is i+1.

The second part of data subcarriers (96 data subcarriers) in the 996-tone DRU includes 48 high-frequency subcarriers (whose subcarrier indices are positive values) and 48 low-frequency subcarriers (whose subcarrier indices are negative values). If every six data subcarriers of the second part (96 data subcarriers) are considered as one group in a frequency direction (for example, from low to high) (or understood as an ascending order of indices), the 96 data subcarriers may be considered as 16 groups. An absolute value of an index difference between adjacent data subcarriers in a same group is 18. In addition, absolute values of index differences between data subcarriers of two adjacent groups are sequentially 33, 43, 33, 555, and the like. In other words, in an ascending order of frequencies, an absolute value of an index difference between data subcarriers in an even-numbered group and a previous adjacent odd-numbered group is equal to 33. An absolute value of an index difference between data subcarriers in a $(4i+1)^{th}$ group (i=1, 2, or 3) and a previous $(4i)^{th}$ group is equal to 555. An absolute value of an index difference between data subcarriers in a $(4i-1)^{th}$ group (i=1, 2, 3, or 4) and a previous $(4i-2)^{th}$ group is equal to 43.

In addition, indices of 96 data subcarriers in the second part of the 996-tone DRU whose identifier is i (i=1 or 3) all plus 9, to obtain indices of 96 data subcarriers in the second part of the 996-tone DRU whose identifier is i+1. Indices of 96 data subcarriers in the second part of the 996-tone DRU whose identifier is 2 all plus 503, to obtain indices of 96 data subcarriers in the second part of the 996-tone DRU whose identifier is 3.

In addition to the 768 data subcarriers in the first part column and the 96 data subcarriers in the second part column of the foregoing table, each 996-tone DRU further includes 132 data subcarriers (the third part) and 16 pilot subcarriers. In some embodiments, 132 data subcarriers and 16 pilot subcarriers may be separately selected from remaining subcarriers of all subcarriers of the entire bandwidth other than guard subcarriers, DC subcarriers, data subcarriers in the first part column, and data subcarriers in the second part column. A specific selection manner is not limited in this embodiment of this disclosure. For example, Table 47 shows an example, so that subcarriers included in the 996-tone DRU can be fully discrete.

As shown in Table 47, each 996-tone DRU includes 16 pilot subcarriers, including eight high-frequency subcarriers and eight low-frequency subcarriers. In this way, pilot subcarriers included in a same DRU can be fully discrete, thereby implementing frequency domain diversity.

Similar to the 242-tone DRU and the 484-tone DRU, the first part of data subcarriers of the 996-tone DRU may be considered as being obtained based on a 26-tone DRU or a 52-tone DRU, and the second part of data subcarriers of the 996-tone DRU may be considered as being obtained based on a 26-tone DRU. For brevity, as shown in Table 48, indices of the first part of data subcarriers included in the 996-tone DRU may be simplified and shown by using identifiers of 26-tone DRUs in Table 37, and indices of the second part of data subcarriers included in the 996-tone DRU may be simplified and shown by using identifiers of 26-tone DRUs in Table 37.

TABLE 48

| | Index of a data subcarrier | | | |
|---|---|---|---|---|
| Identifier of a 996-tone DRU | First part (identifier of a 26-tone DRU) | Second part (identifier of a 26-tone DRU) | Third part | Index of a pilot subcarrier |
| 1 | 1, 37, 73, 109, 6, 42, 78, 114, 10, 46, 82, 118, 15, 51, 87, 123, 19, 55, 91, 127, 24, 60, 96, 132, 28, 64, 100, 136, 33, 69, 105, 141 | 5, 41, 73, 113 | −1926, −1922, −1800, −1799, −1795, −1792, −1785, −1671, −1667, −1666, −1662, −1658, −1548, −1544, −1540, −1531, −1527, −1415, −1411, −1287, −1283, −1281, −1273, −1269, −1159, −1154, −1150, −1147, −1036, −901, −897, −776, −775, −771, −767, −761, −647, −643, −642, −638, −637, −524, −520, −516, −507, −503, −501, −389, −385, −263, −259, −255, −249, −135, −130, −126, −125, −121, 124, 132, 244, 248, 249, 253, 254, 258, 381, 382, 386, 388, 500, 504, 508, 517, 521, 523, 635, 639, 644, 756, 761, 765, 769, 894, 898, 899, 903, 1148, 1156, 1268, 1272, 1273, 1277, 1278, 1282, 1405, 1406, 1410, 1411, 1524, 1528, 1532, 1541, 1545, 1657, 1661, 1668, 1780, 1785, 1789, 1791, 1803, 1918, 1922, 1925, 2036 | −1916, −1804, −1404 −1292, −892, −780, −380, −268, 263, 377, 775, 889, 1287, 1401, 1799, 1913 |
| 2 | 2, 38, 74, 110, 7, 43, 79, 115, 11, 47, 83, 119, 16, 52, 88, 124, 20, 56, 92, 128, 25, 61, 97, 133, 29, 65, 101, 137, 34, 70, 106, 142 | 14, 50, 86, 122 | −1925, −1921, −1917, −1915, −1798, −1791, −1789, −1786, −1784, −1670, −1665, −1661, −1657, −1547, −1543, −1539, −1530, −1526, −1414, −1410, −1403, −1286, −1280, −1277, −1272, −1268, −1158, −1153, −1146, −1012, −900, −893, −891, −774, −770, −766, −765, −762, −760, −646, −641, −636, −523, −519, −515, −506, −502, −500, −388, −379, −262, −258, −254, −253, −248, −134, −129, −124, 121, 125, 128, 131, 133, 245, 250, 255, 262, 264, 267, 383, 389, 501, 505, 509, 518, 522, 524, 636, 640, 645, 757, 762, 766, 770, 776, 895, 900, 1012, 1149, 1152, 1155, 1157, 1269, 1274, 1279, 1286, 1288, 1291, 1407, 1412, 1525, 1529, 1533, 1542, 1546, 1658, 1662, 1664, 1669, 1781, 1786, 1792, 1800, 1804, 1919, 1926 | −1920, −1803, −1408, −1291, −896, −779, −384, −267, 259, 378, 771, 890, 1283, 1402, 1795, 1914 |
| 3 | 3, 39, 75, 111, 8, 44, 80, 116, 12, 48, 84, 120, 17, 53, 89, 125, 21, 57, 93, 129, 26, 62, 98, 134, 30, 66, 102, 138, 35, 71, 107, 143 | 23, 59, 95, 131 | −1924, −1914, −1797, −1794, −1790, −1788, −1783, −1781, −1669, −1664, −1660, −1546, −1542, −1533, −1529, −1525, −1413, −1409, −1402, −1288, −1285, −1279, −1276, −1271, −1157, −1155, −1152, −1149, −1145, −903, −899, −890, −773, −769, −764, −759, −757, −645, −640, −635, −522, −518, −509, −505, −391, −387, −378, −264, −261, −257, −252, −247, −245, −133, −131, −128, −123, −12, 122, 126, 129, 134, 246, 251, 256, 265, 268, 384, | −1919, −1802, −1407, −1290, −895, −778, −383, −266, 260, 379, 772, 891, 1284, 1403, 1796, 1915 |

TABLE 48-continued

| Identifier of a 996-tone DRU | Index of a data subcarrier: First part (identifier of a 26-tone DRU) | Index of a data subcarrier: Second part (identifier of a 26-tone DRU) | Index of a data subcarrier: Third part | Index of a pilot subcarrier |
|---|---|---|---|---|
| | | | 390, 502, 506, 515, 519, 633, 637, 641, 646, 758, 760, 763, 767, 777, 779, 893, 896, 901, 1036, 1145, 1150, 1153, 1158, 1270, 1275, 1280, 1289, 1292, 1408, 1413, 1526, 1530, 1539, 1543, 1547, 1659, 1663, 1665, 1670, 1782, 1784, 1787, 1793, 1801, 1917, 1920, 1923, 1927 | |
| 4 | 4, 40, 76, 112, 9, 45, 81, 117, 13, 49, 85, 121, 18, 54, 90, 126, 22, 58, 94, 130, 27, 63, 99, 135, 31, 67, 103, 139, 36, 72, 108, 144 | 32, 68, 104, 140 | −2036, −1927, −1923, −1913, −1796, −1793, −1787, −1782, −1780, −1668, −1663, −1659, −1545, −1541, −1532, −1528, −1524, −1412, −1405, −1401, −1284, −1282, −1278, −1275, −1274, −1270, −1156, −1151, −1148, −902, −898, −889, −772, −768, −763, −758, −756, −644, −639, −634, −633, −521, −517, −508, −504, −390, −386, −381, −377, −260, −256, −251, −250, −246, −244, −132, −127, −122, 12, 123, 127, 130, 135, 247, 252, 257, 266, 385, 387, 391, 503, 507, 516, 520, 634, 638, 642, 643, 647, 759, 764, 768, 774, 778, 780, 897, 902, 1146, 1147, 1151, 1154, 1159, 1271, 1276, 1281, 1290, 1409, 1414, 1415, 1527, 1531, 1540, 1544, 1548, 1660, 1666, 1667, 1671, 1783, 1788, 1790, 1794, 1798, 1802, 1921, 1924 | −1918, −1801, −1406, −1289, −894, −777, −382, −265, 261, 380, 773, 892, 1285, 1404, 1797, 1916 |

In Table 48, the "first part" column means that the first part of (768) data subcarriers in the 996-tone DRU include a combination of data subcarriers in corresponding 26-tone DRUs. For example, a 996-tone DRU whose identifier is 1 is used as an example. The first part of 768 data subcarriers included in the 996-tone DRU include all data subcarriers in 32 26-tone DRUs whose identifiers are 1, 37, 73, 109, 6, 42, 78, 114, 10, 46, 82, 118, 13, 49, 85, 121, 19, 55, 91, 127, 24, 60, 96, 132, 28, 64, 100, 136, 33, 69, 105, and 141 shown in Table 37. Similarly, the "second part" column means that the second part of (96) data subcarriers in the 996-tone DRU include a combination of data subcarriers in corresponding 26-tone DRUs. For example, a 996-tone DRU whose identifier is 1 is used as an example. 96 data subcarriers in the second part included in the 996-tone DRU include all data subcarriers in four 26-tone DRUs whose identifiers are 5, 41, 73, and 113 shown in Table 37.

For example, the 16 pilot subcarriers included in the 996-tone DRU may be a part of a set of 72 pilot subcarriers included in the corresponding 36 26-tone DRUs. Alternatively, in some embodiments, the 16 pilot subcarriers included in the 996-tone DRU may be a part of a set of 64 pilot subcarriers included in the 32 26-tone DRUs in the corresponding first part. In addition, the other 132 data subcarriers (the third part) included in the 996-tone DRU may be selected from remaining subcarriers of all the subcarriers of the entire bandwidth other than the guard subcarriers, the DC subcarriers, the data subcarriers in the first part column, the data subcarriers in the second part column, and the pilot subcarriers, and the data subcarriers may be fully discrete.

As shown in Table 47 or Table 48, each 996-tone DRU includes 16 pilot subcarriers, and any two pilot subcarriers in a same DRU are not adjacent. The pilot subcarriers shown in Table 47 or Table 48 implement full discretization of pilot subcarriers in a same DRU, thereby implementing frequency domain diversity.

In addition, in this embodiment of this disclosure, the identifier of the 996-tone DRU may be based on a lowest-frequency index of a data subcarrier included in each 996-tone DRU. For example, an identifier of a 996-tone DRU having a lowest-frequency index −2035 is 1.

In addition, it should be noted that the 996-tone DRU in 320 MHz described with reference to Table 47 or Table 48 is merely an example. For example, 980 data subcarriers in the 996-tone DRU may alternatively be divided into a first part and a second part shown in Table 49 below in another manner. In Table 49, the "first part" column means that a first part of data subcarriers (936) in the 996-tone DRU include a combination of data subcarriers in corresponding 484-tone DRUs. For example, a 996-tone DRU whose identifier is 1 is used as an example. The first part of (936) data subcarriers included in the 996-tone DRU include all data subcarriers of 484-tone DRUs whose identifiers are 1 and 5 shown in Table 45.

TABLE 49

| Identifier of a 996-tone DRU | Index of a data subcarrier: First part (identifier of a 484-tone DRU) | Index of a data subcarrier: Second part | Index of a pilot subcarrier |
|---|---|---|---|
| 1 | 1, 5 | −1799, −1795, −1658, −1287, −1283, −1147, −775, −771, −501, −389, −385, −263, −259, −255, −125, −121, 124, 254, 258, 382, 386, 388, 523, 635, 639, 769, 894, 898, 899, 903, 1148, 1278, 1282, 1406, 1410, 1545, 1657, 1661, 1791, 1803, 1918, 1922, 1925, 2036 | −1916, −1804, −1404 −1292, −892, −780, −380, −268, 263, 377, 775, 889, 1287, 1401, 1799, 1913 |
| 2 | 2, 6 | −1915, −1798, −1661, −1657, −1403, −1286, −1146, −891, −774, −500, −388, −379, −262, −258, −254, −124, 121, 125, 255, 264, 267, 383, 389, 524, 636, 766, 770, 776, 895, 900, 1012, 1149, 1279, 1288, 1291, 1407, 1546, 1658, 1662, 1792, 1800, 1804, 1919, 1926 | −1920, −1803, −1408, −1291, −896, −779, −384, −267, 259, 378, 771, 890, 1283, 1402, 1795, 1914 |
| 3 | 3, 7 | −1914, −1797, −1660, −1525, −1402, −1285, −1145, −890, −773, −391, −387, −378, −261, −257, −245, −123, 122, 126, 256, 265, 268, 384, 390, 633, 637, 767, 777, 779, 896, 901, 1036, 1150, 1280, 1289, 1292, 1408, 1547, 1659, 1663, 1793, 1801, 1920, 1923, 1927 | −1919, −1802, −1407, −1290, −895, −778, −383, −266, 260, 379, 772, 891, 1284, 1403, 1796, 1915 |
| 4 | 4, 8 | −2036, −1913, −1796, −1659, −1524, −1401, −1284, −889, −772, −633, −390, −386, −377, −260, −256, −244, −122, 123, 127, 257, 266, 385, 387, 391, 634, 638, 768, 778, 780, 897, 902, 1147, 1151, 1281, 1290, 1409, 1415, 1548, 1660, 1790, 1794, 1802, 1921, 1924 | −1918, −1801, −1406, −1289, −894, −777, −382, −265, 261, 380, 773, 892, 1285, 1404, 1797, 1916 |

In this way, for the 320 MHz bandwidth, through the design of the 996-tone DRU shown in Table 47 to Table 49, compared with the continuous 996-tone RU in the 320 MHz obtained based on the 80 MHz in FIG. 3, at a same power spectral density, this embodiment of this disclosure can implement a maximum power amplification multiple, for example, 2.6.

In an embodiment of this disclosure, an association between a 26-tone DRU (indirectly a 52-tone DRU) and a 996-tone DRU in 320 MHz is described by using Table 48. It may be understood that the foregoing described manner of determining a 996-tone DRU based on a 26-tone DRU is merely an example, and subcarriers in the 996-tone DRU can be fully discrete. In another embodiment, a 996-tone DRU may alternatively be determined in another manner based on a 26-tone DRU. This is not limited in this disclosure. Details are not described again.

In an embodiment of this disclosure, an association between a 484-tone DRU and a 996-tone DRU in 320 MHz is described by using Table 49. It may be understood that the foregoing described manner of determining a 996-tone DRU based on a 484-tone DRU is merely an example, and subcarriers in the 996-tone DRU can be fully discrete. In another embodiment, the 996-tone DRU may alternatively be determined in another manner. This is not limited in this disclosure. Details are not described again.

In addition, it may be understood that if the lowest-frequency index of the data subcarrier included in the 26-tone DRU is another value other than −2035, correspondingly the lowest-frequency index of the data subcarrier included in the 996-tone DRU also adaptively changes to another value.

Tone plans of 26-tone DRUs, 52-tone DRUs, 106-tone DRUs, 242-tone DRUs, 484-tone DRUs, and 996-tone DRUs in 320 MHz are separately described above with reference to Table 37 to Table 49. An index −2035 is used as a lowest-frequency index of a data subcarrier.

The foregoing content describes in detail subcarriers (data subcarriers and pilot subcarriers) separately included in different DRUs in the 320 MHz bandwidth. Further, for a characteristic followed by a tone plan of the DRUs in the 320 MHz bandwidth and related description, refer to descriptions of the 40 MHz bandwidth. Details are not described again.

In some embodiments, data subcarriers included in the 26-tone DRU in 320 MHz may be obtained by shifting leftward by n11, shifting rightward by n12, shifting leftward by n21, shifting rightward by n22, shifting leftward by n31, shifting rightward by n32, shifting leftward by n41, and shifting rightward by n42 based on Table 12. Alternatively, if n11=n12=128, n21=n22=256, and n31=n32=512, data subcarriers included in the 26-tone DRU in 320 MHz may be obtained by shifting leftward by n41 and/or shifting rightward by n42 based on the 26-tone DRU in 160 MHz (Table 26). In an example of Table 37, n41=n42=1024. However, n41 and n42 may alternatively be other values, and are not listed herein again.

Correspondingly, Table 37 may also be simplified and represented as the following Table 50, where numbers in brackets { } are group numbers shown in Table 12, and include a combination of indices of subcarriers in the group numbers shown in Table 12, and may be understood as being obtained by shifting leftward/rightward by 512 based on Table 26.

TABLE 50

| Identifier of a 26-tone DRU | Index of a data subcarrier | Index of a pilot subcarrier |
|---|---|---|
| 1 | {1} −1664, {1} −1920 | −1804, −1671 |
| 2 | {2} −1664, {2} −1920 | −1803, −1670 |
| 3 | {3} −1664, {3} −1920 | −1802, −1669 |
| 4 | {4} −1664, {4} −1920 | −1801, −1668 |
| 5 | {5} −1664, {5} −1920 | −1800, −1667 |

TABLE 50-continued

| Identifier of a 26-tone DRU | Index of a data subcarrier | Index of a pilot subcarrier |
|---|---|---|
| 6 | {6} −1664, {6} −1920 | −1799, −1666 |
| 7 | {7} −1664, {7} −1920 | −1798, −1665 |
| 8 | {8} −1664, {8} −1920 | −1797, −1664 |
| 9 | {9} −1664, {9} −1920 | −1796, −1663 |
| 10 | {10} −1664, {10} −1920 | −1795, −1662 |
| 11 | {11} −1664, {11} −1920 | −1920, −1789 |
| 12 | {12} −1664, {12} −1920 | −1919, −1788 |
| 13 | {13} −1664, {13} −1920 | −1918, −1787 |
| 14 | {14} −1664, {14} −1920 | −1917, −1786 |
| 15 | {15} −1664, {15} −1920 | −1916, −1785 |
| 16 | {16} −1664, {16} −1920 | −1915, −1784 |
| 17 | {17} −1664, {17} −1920 | −1914, −1783 |
| 18 | {18} −1664, {18} −1920 | −1913, −1782 |
| 19 | {1} −1408, {1} −1152 | −1292, −1159 |
| 20 | {2} −1408, {2} −1152 | −1291, −1158 |
| 21 | {3} −1408, {3} −1152 | −1290, −1157 |
| 22 | {4} −1408, {4} −1152 | −1289, −1156 |
| 23 | {5} −1408, {5} −1152 | −1288, −1155 |
| 24 | {6} −1408, {6} −1152 | −1287, −1154 |
| 25 | {7} −1408, {7} −1152 | −1286, −1153 |
| 26 | {8} −1408, {8} −1152 | −1285, −1152 |
| 27 | {9} −1408, {9} −1152 | −1284, −1151 |
| 28 | {10} −1408, {10} −1152 | −1283, −1150 |
| 29 | {11} −1408, {11} −1152 | −1408, −1277 |
| 30 | {12} −1408, {12} −1152 | −1407, −1276 |
| 31 | {13} −1408, {13} −1152 | −1406, −1275 |
| 32 | {14} −1408, {14} −1152 | −1405, −1274 |
| 33 | {15} −1408, {15} −1152 | −1404, −1273 |
| 34 | {16} −1408, {16} −1152 | −1403, −1272 |
| 35 | {17} −1408, {17} −1152 | −1402, −1271 |
| 36 | {18} −1408, {18} −1152 | −1401, −1270 |
| 37 | {1} −640, {1} −896 | −780, −647 |
| 38 | {2} −640, {2} −896 | −779, −646 |
| 39 | {3} −640, {3} −896 | −778, −645 |
| 40 | {4} −640, {4} −896 | −777, −644 |
| 41 | {5} −640, {5} −896 | −776, −643 |
| 42 | {6} −640, {6} −896 | −775, −642 |
| 43 | {7} −640, {7} −896 | −774, −641 |
| 44 | {8} −640, {8} −896 | −773, −640 |
| 45 | {9} −640, {9} −896 | −772, −639 |
| 46 | {10} −640, {10} −896 | −771, −638 |
| 47 | {11} −640, {11} −896 | −896, −765 |
| 48 | {12} −640, {12} −896 | −895, −764 |
| 49 | {13} −640, {13} −896 | −894, −763 |
| 50 | {14} −640, {14} −896 | −893, −762 |
| 51 | {15} −640, {15} −896 | −892, −761 |
| 52 | {16} −640, {16} −896 | −891, −760 |
| 53 | {17} −640, {17} −896 | −890, −759 |
| 54 | {18} −640, {18} −896 | −889, −758 |
| 55 | {1} −384, {1} −128 | −268, −135 |
| 56 | {2} −384, {2} −128 | −267, −134 |
| 57 | {3} −384, {3} −128 | −266, −133 |
| 58 | {4} −384, {4} −128 | −265, −132 |
| 59 | {5} −384, {5} −128 | −264, −131 |
| 60 | {6} −384, {6} −128 | −263, −130 |
| 61 | {7} −384, {7} −128 | −262, −129 |
| 62 | {8} −384, {8} −128 | −261, −128 |
| 63 | {9} −384, {9} −128 | −260, −127 |
| 64 | {10} −384, {10} −128 | −259, −126 |
| 65 | {11} −384, {11} −128 | −384, −253 |
| 66 | {12} −384, {12} −128 | −383, −252 |
| 67 | {13} −384, {13} −128 | −382, −251 |
| 68 | {14} −384, {14} −128 | −381, −250 |
| 69 | {15} −384, {15} −128 | −380, −249 |
| 70 | {16} −384, {16} −128 | −379, −248 |
| 71 | {17} −384, {17} −128 | −378, −247 |
| 72 | {18} −384, {18} −128 | −377, −246 |
| 73 | {1} +128, {1} +384 | 244, 377 |
| 74 | {2} +128, {2} +384 | 245, 378 |
| 75 | {3} +128, {3} +384 | 246, 379 |
| 76 | {4} +128, {4} +384 | 247, 380 |
| 77 | {5} +128, {5} +384 | 248, 381 |
| 78 | {6} +128, {6} +384 | 249, 382 |
| 79 | {7} +128, {7} +384 | 250, 383 |
| 80 | {8} +128, {8} +384 | 251, 384 |
| 81 | {9} +128, {9} +384 | 252, 385 |
| 82 | {10} +128, {10} +384 | 253, 386 |

TABLE 50-continued

| Identifier of a 26-tone DRU | Index of a data subcarrier | Index of a pilot subcarrier |
|---|---|---|
| 83 | {11} +128, {11} +384 | 128, 259 |
| 84 | {12} +128, {12} +384 | 129, 260 |
| 85 | {13} +128, {13} +384 | 130, 261 |
| 86 | {14} +128, {14} +384 | 131, 262 |
| 87 | {15} +128, {15} +384 | 132, 263 |
| 88 | {16} +128, {16} +384 | 133, 264 |
| 89 | {17} +128, {17} +384 | 134, 265 |
| 90 | {18} +128, {18} +384 | 135, 266 |
| 91 | {1} +640, {1} +896 | 756, 889 |
| 92 | {2} +640, {2} +896 | 757, 890 |
| 93 | {3} +640, {3} +896 | 758, 891 |
| 94 | {4} +640, {4} +896 | 759, 892 |
| 95 | {5} +640, {5} +896 | 760, 893 |
| 96 | {6} +640, {6} +896 | 761, 894 |
| 97 | {7} +640, {7} +896 | 762, 895 |
| 98 | {8} +640, {8} +896 | 763, 896 |
| 99 | {9} +640, {9} +896 | 764, 897 |
| 100 | {10} +640, {10} +896 | 765, 898 |
| 101 | {11} +640, {11} +896 | 640, 771 |
| 102 | {12} +640, {12} +896 | 641, 772 |
| 103 | {13} +640, {13} +896 | 642, 773 |
| 104 | {14} +640, {14} +896 | 643, 774 |
| 105 | {15} +640, {15} +896 | 644, 775 |
| 106 | {16} +640, {16} +896 | 645, 776 |
| 107 | {17} +640, {17} +896 | 646, 777 |
| 108 | {18} +640, {18} +896 | 647, 778 |
| 109 | {1} +1408, {1} +1152 | 1268, 1401 |
| 110 | {2} +1408, {2} +1152 | 1269, 1402 |
| 111 | {3} +1408, {3} +1152 | 1270, 1403 |
| 112 | {4} +1408, {4} +1152 | 1271, 1404 |
| 113 | {5} +1408, {5} +1152 | 1272, 1405 |
| 114 | {6} +1408, {6} +1152 | 1273, 1406 |
| 115 | {7} +1408, {7} +1152 | 1274, 1407 |
| 116 | {8} +1408, {8} +1152 | 1275, 1408 |
| 117 | {9} +1408, {9} +1152 | 1276, 1409 |
| 118 | {10} +1408, {10} +1152 | 1277, 1410 |
| 119 | {11} +1408, {11} +1152 | 1152, 1283 |
| 120 | {12} +1408, {12} +1152 | 1153, 1284 |
| 121 | {13} +1408, {13} +1152 | 1154, 1285 |
| 122 | {14} +1408, {14} +1152 | 1155, 1286 |
| 123 | {15} +1408, {15} +1152 | 1156, 1287 |
| 124 | {16} +1408, {16} +1152 | 1157, 1288 |
| 125 | {17} +1408, {17} +1152 | 1158, 1289 |
| 126 | {18} +1408, {18} +1152 | 1159, 1290 |
| 127 | {1} +1664, {1} +1920 | 1780, 1913 |
| 128 | {2} +1664, {2} +1920 | 1781, 1914 |
| 129 | {3} +1664, {3} +1920 | 1782, 1915 |
| 130 | {4} +1664, {4} +1920 | 1783, 1916 |
| 131 | {5} +1664, {5} +1920 | 1784, 1917 |
| 132 | {6} +1664, {6} +1920 | 1785, 1918 |
| 133 | {7} +1664, {7} +1920 | 1786, 1919 |
| 134 | {8} +1664, {8} +1920 | 1787, 1920 |
| 135 | {9} +1664, {9} +1920 | 1788, 1921 |
| 136 | {10} +1664, {10} +1920 | 1789, 1922 |
| 137 | {11} +1664, {11} +1920 | 1664, 1795 |
| 138 | {12} +1664, {12} +1920 | 1665, 1796 |
| 139 | {13} +1664, {13} +1920 | 1666, 1797 |
| 140 | {14} +1664, {14} +1920 | 1667, 1798 |
| 141 | {15} +1664, {15} +1920 | 1668, 1799 |
| 142 | {16} +1664, {16} +1920 | 1669, 1800 |
| 143 | {17} +1664, {17} +1920 | 1670, 1801 |
| 144 | {18} +1664, {18} +1920 | 1671, 1802 |

It may be understood that, for the 52-tone DRU, the 106-tone DRU, the 242-tone DRU, the 484-tone DRU, and the 996-tone DRU in 320 MHz, with reference to the foregoing Table 39, Table 41, Table 43, Table 46, and Table 48, indices of data subcarriers (or the first part) included in the 52-tone DRU, the 106-tone DRU, the 242-tone DRU, the 484-tone DRU, and the 996-tone DRU may also be represented as variations based on Table 12. For brevity, the examples are not elaborated herein.

In addition, it may be understood that, although an embodiment of obtaining DRUs of various sizes in 320 MHz based on Table 12 is described, this disclosure is not limited thereto. For example, an index of a subcarrier included in each DRU may be determined without considering the grouping in Table 12. For example, an index of a subcarrier included in each DRU may be determined based on another grouping form. This is not limited in this disclosure.

In an embodiment of this disclosure, for each bandwidth, how subcarriers included in DRUs of different sizes are distributed is described. As described above, indices of subcarriers included in the DRUs are shown in the tables. In this manner, subcarriers included in a DRU can be fully discrete, and pilot subcarriers included in the DRU can also be fully discrete pairwise, thereby implementing frequency domain diversity. In addition, compared with an RU with continuous subcarriers, the solution in this embodiment of this disclosure can implement a maximum power amplification multiple at a same power spectral density, thereby improving transmission efficiency.

It should be further understood that the descriptions of the foregoing content focus on emphasizing a difference between embodiments, and for the same or similar content of embodiments, refer to each other. For simplicity, details are not further described herein.

Figure 8:
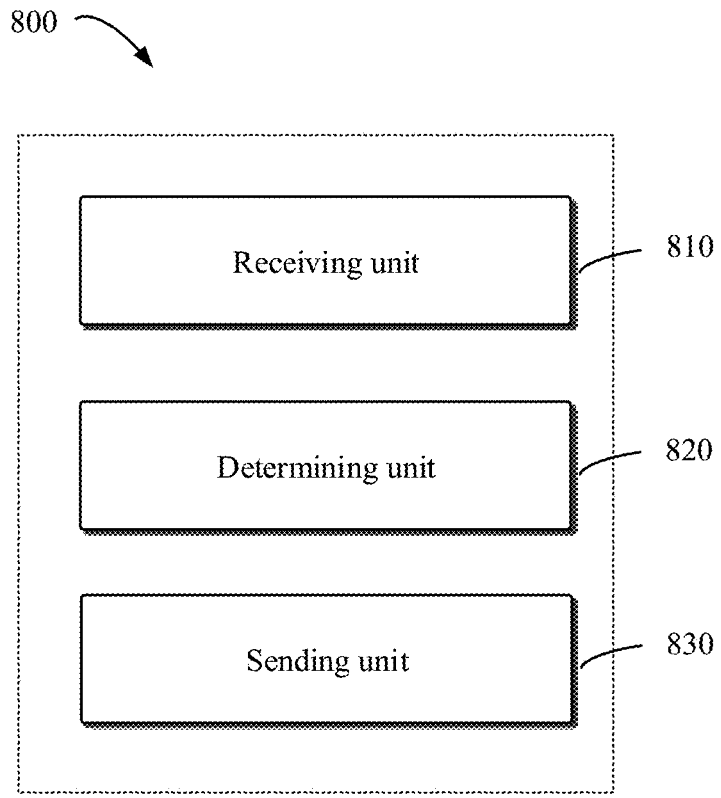
FIG. 8 is a schematic block diagram of a communication apparatus according to an embodiment of this disclosure.

FIG. 8 is a schematic block diagram of a communication apparatus 800 according to an embodiment of this disclosure. The apparatus 800 may be implemented in a first device, or may be implemented as a chip or a chip system in a first device. The scope of this disclosure is not limited in this aspect.

As shown in FIG. 8, the apparatus 800 includes a receiving unit 810, a determining unit 820, and a sending unit 830. The determining unit 820 may alternatively be implemented as a processing unit. This is not limited in this disclosure. The receiving unit 810 is configured to receive a trigger-based frame from a second device, where the trigger-based frame includes distributed resource unit indication information, and the distributed resource unit indication information indicates information about a distributed resource unit allocated to the communication apparatus. The determining unit 820 is configured to determine one or more distributed resource blocks based on the distributed resource unit indication information, where each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1. The sending unit 830 is configured to send a response to the trigger-based frame to the second device on the one or more distributed resource blocks.

In some embodiments, the sending unit 830 may be configured to send a TB PPDU.

Figure 9:
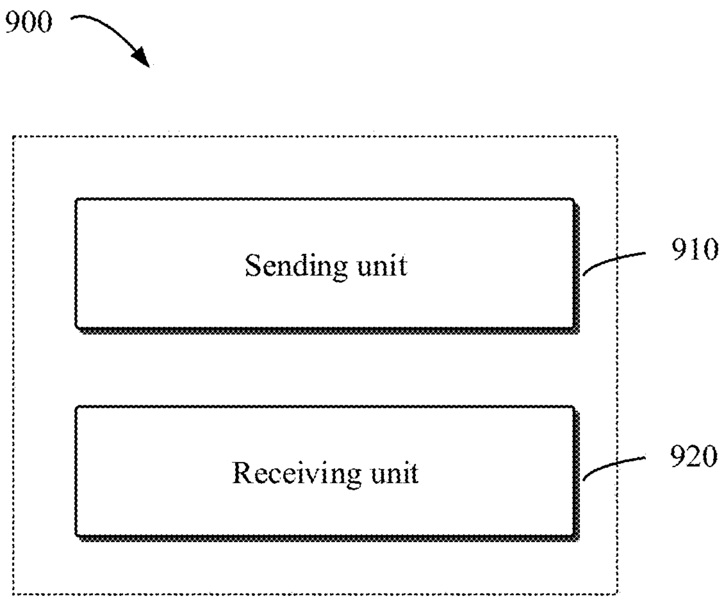
FIG. 9 is another schematic block diagram of a communication apparatus according to an embodiment of this disclosure.

FIG. 9 is another schematic block diagram of a communication apparatus 900 according to an embodiment of this disclosure. The apparatus 900 may be implemented in a second device, or may be implemented as a chip or a chip system in a second device. The scope of this disclosure is not limited in this aspect.

As shown in FIG. 9, the apparatus 900 may include a sending unit 910 and a receiving unit 920. The sending unit 910 is configured to send a trigger-based frame to a first device, where the trigger-based frame includes distributed resource unit indication information, and the distributed resource unit indication information indicates information about a distributed resource unit allocated to the first device. The receiving unit 920 is configured to receive a response to the trigger-based frame from the first device on one or more distributed resource blocks, where the one or more distributed resource blocks are determined based on the distributed resource unit indication information, each of the one or more distributed resource blocks includes N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and N2<N3≤N1.

In some embodiments, the receiving unit 920 may be configured to receive a TB PPDU. In some embodiments, the sending unit 910 may be configured to send the trigger-based frame to the first device and at least one device other than the first device.

In some embodiments of this disclosure, the one or more distributed resource blocks may be determined from a predetermined quantity of distributed resource blocks, where the predetermined quantity of distributed resource blocks is predefined or preconfigured. In some embodiments, a specific value of the predetermined quantity is related to a bandwidth and a size of the distributed resource block.

If an operating bandwidth of the first device is 40 MHz, the predetermined quantity of distributed resource blocks includes 18 distributed resource blocks DRU26 whose subcarrier quantity is 26, where an index of a subcarrier included in each DRU26 satisfies Table 5 in the description of embodiments above. Details are not described herein again. The predetermined quantity of distributed resource blocks includes eight distributed resource blocks DRU52 whose subcarrier quantity is 52, where an index of a subcarrier included in each DRU52 satisfies Table 6 in the description of embodiments above. Details are not described herein again. The predetermined quantity of distributed resource blocks includes four distributed resource blocks DRU106 whose subcarrier quantity is 106, where an index of a subcarrier included in each DRU106 satisfies Table 8 in the description of embodiments above. Details are not described herein again.

If an operating bandwidth of the first device is 80 MHz, the predetermined quantity of distributed resource blocks includes 36 distributed resource blocks DRU26 whose subcarrier quantity is 26, where an index of a subcarrier included in each DRU26 satisfies Table 16 in the description of embodiments above. Details are not described herein again. The predetermined quantity of distributed resource blocks includes 16 distributed resource blocks DRU52 whose subcarrier quantity is 52, where an index of a subcarrier included in each DRU52 satisfies Table 17 in the description of embodiments above. Details are not described herein again. The predetermined quantity of distributed resource blocks includes eight distributed resource blocks DRU106 whose subcarrier quantity is 106, where an index of a subcarrier included in each DRU106 satisfies Table 19 in the description of embodiments above. Details are not described herein again. The predetermined quantity of distributed resource blocks includes four distributed resource blocks DRU242 whose subcarrier quantity is 242, where an index of a subcarrier included in each DRU242 satisfies Table 21 in the description of embodiments above. Details are not described herein again.

If an operating bandwidth of the first device is 160 MHz, the predetermined quantity of distributed resource blocks includes 72 distributed resource blocks DRU26 whose subcarrier quantity is 26, where an index of a subcarrier included in each DRU26 satisfies Table 26 in the description of embodiments above. Details are not described herein again. The predetermined quantity of distributed resource blocks includes 32 distributed resource blocks DRU52 whose subcarrier quantity is 52, where an index of a subcarrier included in each DRU52 satisfies Table 27 in the description of embodiments above. Details are not described herein again. The predetermined quantity of distributed resource blocks includes 16 distributed resource blocks DRU106 whose subcarrier quantity is 106, where an index of a subcarrier included in each DRU106 satisfies Table 29 in the description of embodiments above. Details are not described herein again. The predetermined quantity of distributed resource blocks includes eight distributed resource blocks DRU242 whose subcarrier quantity is 242, where an index of a subcarrier included in each DRU242 satisfies Table 31 in the description of embodiments above. Details are not described herein again. The predetermined quantity of distributed resource blocks includes four distributed resource blocks DRU484 whose subcarrier quantity is 484, where an index of a subcarrier included in each DRU484 satisfies Table 34 in the description of embodiments above. Details are not described herein again.

If an operating bandwidth of the first device is 320 MHz, the predetermined quantity of distributed resource blocks includes 144 distributed resource blocks DRU26 whose subcarrier quantity is 26, where an index of a subcarrier included in each DRU26 satisfies Table 37 in the description of embodiments above. Details are not described herein again. The predetermined quantity of distributed resource blocks includes 64 distributed resource blocks DRU52 whose subcarrier quantity is 52, where an index of a subcarrier included in each DRU52 satisfies Table 38 in the description of embodiments above. Details are not described herein again. The predetermined quantity of distributed resource blocks includes 32 distributed resource blocks DRU106 whose subcarrier quantity is 106, where an index of a subcarrier included in each DRU106 satisfies Table 40 in the description of embodiments above. Details are not described herein again. The predetermined quantity of distributed resource blocks includes 16 distributed resource blocks DRU242 whose subcarrier quantity is 242, where an index of a subcarrier included in each DRU242 satisfies Table 42 in the description of embodiments above. Details are not described herein again. The predetermined quantity of distributed resource blocks includes eight distributed resource blocks DRU484 whose subcarrier quantity is 484, where an index of a subcarrier included in each DRU484 satisfies Table 45 in the description of embodiments above. Details are not described herein again. The predetermined quantity of distributed resource blocks includes four distributed resource blocks DRU996 whose subcarrier quantity is 996, where an index of a subcarrier included in each DRU996 satisfies Table 47 in the description of embodiments above. Details are not described herein again.

It should be noted that the apparatus 800 in FIG. 8 can be configured to implement the processes of the first device in the foregoing method embodiments. For brevity, details are not described herein again. The apparatus 900 in FIG. 9 can be configured to implement the processes of the second device in the foregoing method embodiments. For brevity, details are not described herein again.

Figure 10:
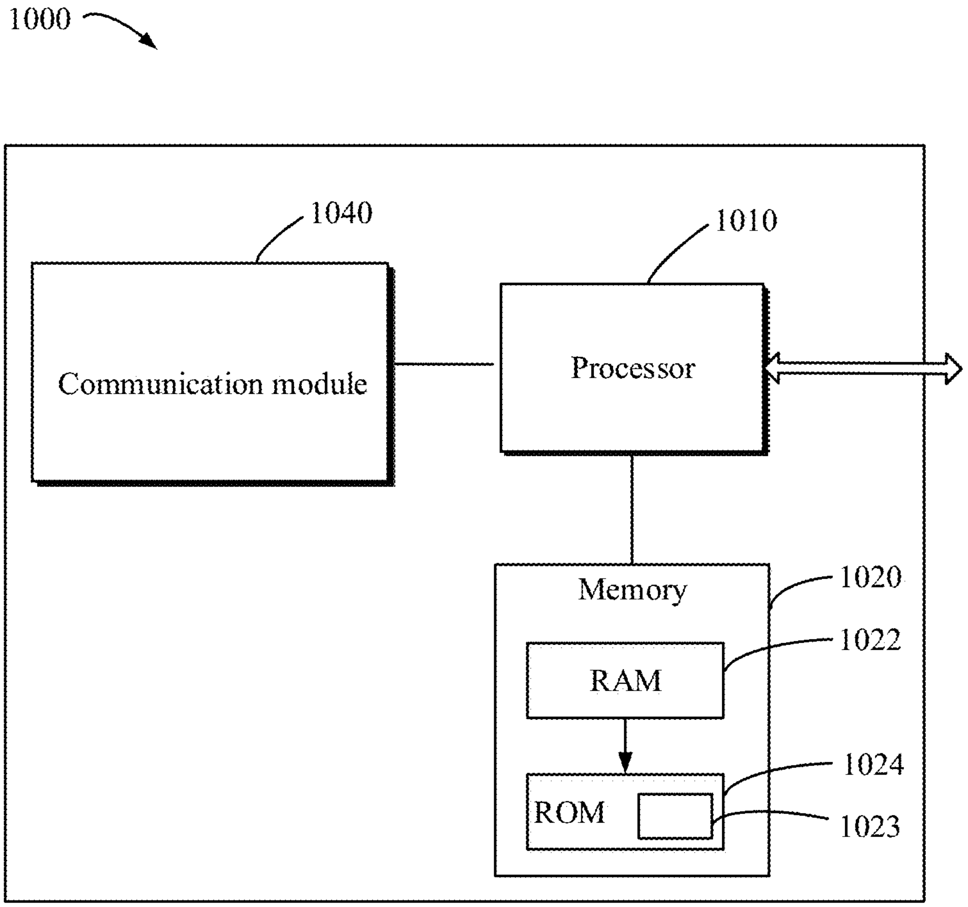
FIG. 10 is a schematic block diagram of an example device according to an embodiment of this disclosure.

FIG. 10 is a schematic block diagram of an example device 1000 according to an embodiment of this disclosure. The device 1000 may be configured to implement the first device and the second device in the foregoing embodiments, for example, may be configured to implement the AP 60 and the STA 62. As shown in the figure, the device 1000 includes one or more processors 1010, one or more memories 1020 coupled to the processor 1010, and a communication module 1040 coupled to the processor 1010.

The communication module 1040 may be configured to perform bidirectional communication. The communication module 1040 may have at least one communication interface for communication. The communication interface may include any interface necessary for communicating with another device.

The processor 1010 may be of any type suitable for a local technology network, and may include but is not limited to at least one of the following: one or more of a general-purpose computer, a dedicated computer, a microcontroller, a digital signal processor (Digital Signal Processor, DSP), or a controller-based multi-core controller architecture. The device 1000 may have a plurality of processors, such as application-specific integrated circuit chips, which in time belong to a clock synchronized with a main processor.

The memory 1020 may include one or more nonvolatile memories and one or more volatile memories. An example of the nonvolatile memory includes but is not limited to at least one of the following: a read-only memory (Read-Only Memory, ROM) 1024, an erasable programmable read-only memory (Erasable Programmable Read Only Memory, EPROM), a flash memory, a hard disk, a compact disc (Compact Disc, CD), a digital versatile disc (Digital Versatile Disc, DVD), or another magnetic storage and/or optical storage. An example of the volatile memory includes but is not limited to at least one of the following: a random access memory (RAM) 1022, or another volatile memory that does not last for power-off duration.

A computer program 1030 includes computer-executable instructions executed by the associated processor 1010. The program 1030 may be stored in the ROM 1024. The processor 1010 may perform any suitable action and processing by loading the program 1030 into the RAM 1022.

Embodiments of this disclosure may be implemented by using the program 1030, so that the device 1000 may perform any process described with reference to FIG. 7. Embodiments of this disclosure may alternatively be implemented by using hardware or a combination of software and hardware.

In some embodiments, the program 1030 may be tangibly included in a computer-readable medium, and the computer-readable medium may be included in the device 1000 (for example, in the memory 1020) or another storage device that can be accessed by the device 1000. The program 1030 may be loaded from the computer-readable medium into the RAM 1022 for execution. The computer-readable medium may include any type of tangible nonvolatile memory, such as a ROM, an EPROM, a flash memory, a hard disk, a CD, or a DVD.

In some embodiments, the communication module 1040 in the device 1000 may be implemented as a transmitter and a receiver (or a transceiver), and may be configured to send/receive system information, such as a management frame or an acknowledgment frame. In addition, the device 1000 may further include one or more of a scheduler, a controller, and a radio frequency/an antenna. Details are not described in this disclosure again.

In another embodiment, the radio frequency/antenna may be disposed independent of the processor that performs baseband processing. For example, in a distributed scenario, the radio frequency/antenna may be separately disposed independent of the device 1000.

For example, the device 1000 in FIG. 10 may be implemented as the first device or the second device, or may be implemented as a chip or a chip system in the first device, or may be implemented as a chip or a chip system in the second device. This is not limited in this embodiment of this disclosure.

For example, the device 1000 in FIG. 10 may be implemented as the AP 60 or the STA 62, or may be implemented as a chip or a chip system in the AP 60, or may be implemented as a chip or a chip system in the STA 62. This is not limited in this embodiment of this disclosure.

An embodiment of this disclosure further provides a chip. The chip may include an input interface, an output interface, and a processing circuit. In this embodiment of this disclosure, the input interface and the output interface may complete the foregoing signaling or data interaction, and the processing circuit may complete generation and processing of signaling or data information.

An embodiment of this disclosure further provides a chip system. The chip system includes a processor, configured to support a first device or a second device in implementing a function in any one of the foregoing embodiments. In a possible design, the chip system may further include a memory. The memory is configured to store necessary program instructions and data. When the processor runs the program instructions, a device on which the chip system is installed is enabled to perform the method in any one of the foregoing embodiments. The chip system may include a chip, or may include a chip and another discrete component.

An embodiment of this disclosure further provides a processor, configured to be coupled to a memory. The memory stores instructions. When the processor runs the instructions, the processor is enabled to perform the method and functions related to the first device or the second device in any one of the foregoing embodiments.

An embodiment of this application further provides a computer program product including instructions. When the computer program product runs on a computer, the computer is enabled to perform the method and functions related to the first device or the second device in any one of the foregoing embodiments.

An embodiment of this disclosure further provides a computer-readable storage medium. The computer-readable storage medium stores computer instructions. When a processor runs the instructions, the processor is enabled to perform the method and functions related to the first device or the second device in any one of the foregoing embodiments.

An embodiment of this disclosure further provides a wireless communication system. The system includes a first device and a second device. In some examples, the system may include an AP 60 and a STA 62.

Generally, various embodiments of this disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of this disclosure are shown and illustrated as block diagrams, flowcharts, or other diagrams, it should be understood that the blocks, apparatuses, systems, technologies, or methods described in this specification may be implemented as, for example, non-limiting examples, hardware, software, firmware, dedicated circuits, logic, general-purpose hardware, controllers, other computing devices, or a combination thereof.

This disclosure further provides at least one computer program product tangibly stored on a non-transitory computer-readable storage medium. The computer program product includes computer-executable instructions, such as instructions included in a program module. The instructions are executed in a device on a target real or virtual processor to perform the processes/methods described above. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program modules may be located in local and remote storage media.

Computer program code used to implement the methods disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of this disclosure, the computer program code or related data may be carried by any appropriate carrier, so that a device, an apparatus, or a processor can perform various processing and operations described above. Examples of the carrier include a signal, a computer-readable medium, and the like. For example, the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in this disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Addition or optionally, some steps may be omitted, a plurality of steps may be combined into one step for execution, and/or one step may be decomposed into a plurality of steps for execution. It should further be noted that features and functions of two or more apparatuses according to this disclosure may be specified in one apparatus. On the contrary, features and functions of one apparatus described above may be further divided into a plurality of apparatuses for materialization.

The implementations of this disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. An information transmission method, comprising:

receiving, by a first device, a trigger-based frame from a second device, wherein the trigger-based frame comprises distributed resource unit indication information indicating a distributed resource unit allocated to the first device;

determining, by the first device, one or more distributed resource blocks based on the distributed resource unit indication information, wherein each of the one or more distributed resource blocks comprises N1 data subcarriers and N2 pilot subcarriers, an absolute value of an index difference between every two data subcarriers of N3 data subcarriers in the N1 data subcarriers is greater than or equal to 4, N1, N2, and N3 are all positive integers, and 1≤N2<N3, and wherein N1=N3=24, or N1=N3=48, or N1=102 and N3=96, or N1=234 and N3=192, or N1=468 and N3=384, or N1=980 and N3=768; and sending, by the first device, a response to the trigger-based frame to the second device based on the one or more distributed resource blocks.

2. The method according to claim 1, wherein when a bandwidth is 40 MHz, 80 MHz, 160 MHz, or 320 MHz, N1=24, N2=2, and N3=24, or when a bandwidth is 80 MHz, 160 MHz, or 320 MHz, N1=48, N2=4, and N3=48, or when a bandwidth is 160 MHz or 320 MHz, N1=102, N2=4, and N3=96, or when a bandwidth is 320 MHz, N1=234, N2=8, and N3=192, the N3 data subcarriers satisfy: if the N3 data subcarriers are divided into N3/6 groups in an ascending order of indices, every six data subcarriers form one group, and an absolute value of an index difference between two adjacent data subcarriers in a same group is 18.

3. The method according to claim 1, wherein when a bandwidth is 40 MHz, N1=48, N2=4, and N3=48, or when a bandwidth is 80 MHz, N1=102, N2=4, and N3=96, or when a bandwidth is 160 MHz, N1=234, N2=8, and N3=192, or when a bandwidth is 320 MHz, N1=468, N2=16, and N3=384, the N3 data subcarriers satisfy: if the N3 data subcarriers are divided into N3/12 groups in an ascending order of indices, every 12 data subcarriers form one group, an absolute value of an index difference between two adjacent data subcarriers in a same group is 9, and absolute values of index differences between two most adjacent data subcarriers in two adjacent groups are alternately 24 and 34.

4. The method according to claim 1, wherein when a bandwidth is 40 MHz, N1=102, N2=4, and N3=96, or when a bandwidth is 80 MHz, N1=234, N2=8, and N3=192, or when a bandwidth is 160 MHz, N1=468, N2=16, and N3=384, or when a bandwidth is 320 MHz, N1=980, N2=16, and N3=768, the N3 data subcarriers satisfy: if the N3 data subcarriers are divided into N3/24 groups in an ascending order of indices, every 24 data subcarriers form one group, absolute values of index differences between two adjacent data subcarriers in a same group are alternately 5 and 4, and absolute values of index differences between two most adjacent data subcarriers in two adjacent groups are alternately 19 and 29.

5. The method according to claim 1, wherein when a bandwidth is 80 MHz, 160 MHz, or 320 MHz, N1=234, N2=8, N3=192, and N4=24, or when the bandwidth is 160 MHz or 320 MHz, N1=468, N2=16, N3=384, and N4=48, or when the bandwidth is 320 MHz, N1=980, N2=16, N3=768, and N4=96, N4 data subcarriers of remaining data subcarriers other than the N3 data subcarriers in the N1 data subcarriers satisfy: if the N4 data subcarriers are divided into N4/6 groups in an ascending order of indices, every six data subcarriers form one group, an absolute value of an index difference between two adjacent data subcarriers in a same group is 18, N4 is a positive integer, N4<N3, and N3+N4<N1.

6. The method according to claim 1, wherein a lowest-frequency index of a data subcarrier at a lowest frequency in the N3 data subcarriers satisfies:

when a bandwidth is 40 MHz, the lowest-frequency index is −a−128;

when the bandwidth is 80 MHz, the lowest-frequency index is −a−128−256;

when the bandwidth is 160 MHz, the lowest-frequency index is −a−128−256−512; or when the bandwidth is 320 MHz, the lowest-frequency index is −a−128−256−512−1024; and a is any positive integer from 110 to 122.

7. The method according to claim 1, wherein an absolute value of an index difference between every two pilot subcarriers of the N2 pilot subcarriers is greater than 1.

8. A communication apparatus, comprising:

a processor; and a communication interface to perform information exchange with another communication device, wherein when program instructions are executed by the processor, the communication device is enabled to perform:

receiving a trigger-based frame from a second device, wherein the trigger-based frame comprises distributed resource unit indication information indicating a distributed resource unit allocated to the communication apparatus;

determining one or more distributed resource blocks based on the distributed resource unit indication information, wherein each of the one or more distributed resource blocks comprises N1 data subcarriers and N2 pilot subcarriers, an absolute value of an index difference between every two data subcarriers of N3 data subcarriers in the NI data subcarriers is greater than or equal to 4, N1, N2, and N3 are all positive integers, and 1≤N2<N3, and wherein N1=N3=24, or N1=N3=48, or N1=102 and N3=96, or N1=234 and N3=192, or N1=468 and N3=384, or N1=980 and N3=768; and sending a response to the trigger-based frame to the second device based on the one or more distributed resource blocks.

9. The apparatus according to claim 8, wherein when a bandwidth is 40 MHz, 80 MHz, 160 MHz, or 320 MHz, N1=24, N2=2, and N3=24, or when a bandwidth is 80 MHz, 160 MHz, or 320 MHz, N1=48, N2=4, and N3=48, or when a bandwidth is 160 MHz or 320 MHz, N1=102, N2=4, and N3=96, or when a bandwidth is 320 MHz, N1=234, N2=8, and N3=192, the N3 data subcarriers satisfy: if the N3 data subcarriers are divided into N3/6 groups in an ascending order of indices, every six data subcarriers form one group, and an absolute value of an index difference between two adjacent data subcarriers in a same group is 18.

10. The apparatus according to claim 8, wherein when a bandwidth is 40 MHz, N1=48, N2=4, and N3=48, or when a bandwidth is 80 MHz, N1=102, N2=4, and N3=96, or when a bandwidth is 160 MHz, N1=234, N2=8, and N3=192, or when a bandwidth is 320 MHz, N1=468, N2=16, and N3=384, the N3 data subcarriers satisfy: if the N3 data subcarriers are divided into N3/12 groups in an ascending order of indices, every 12 data subcarriers form one group, an absolute value of an index difference between two adjacent data subcarriers in a same group is 9, and absolute values of index differences between two most adjacent data subcarriers in two adjacent groups are alternately 24 and 34.

11. The apparatus according to claim 8, wherein when a bandwidth is 40 MHz, N1=102, N2=4, and N3=96, or when a bandwidth is 80 MHz, N1=234, N2=8, and N3=192, or when a bandwidth is 160 MHz, N1=468, N2=16, and N3=384, or when a bandwidth is 320 MHz, N1=980, N2=16, and N3=768, the N3 data subcarriers satisfy: if the N3 data subcarriers are divided into N3/24 groups in an ascending order of indices, every 24 data subcarriers form one group, absolute values of index differences between two adjacent data subcarriers in a same group are alternately 5 and 4, and absolute values of index differences between two most adjacent data subcarriers in two adjacent groups are alternately 19 and 29.

12. The apparatus according to claim 8, wherein when a bandwidth is 80 MHz, 160 MHz, or 320 MHz, N1=234, N2=8, N3=192, and N4=24, or when the bandwidth is 160 MHz or 320 MHz, N1=468, N2=16, N3=384, and N4=48, or when the bandwidth is 320 MHz, N1=980, N2=16, N3=768, and N4=96, N4 data subcarriers of remaining data subcarriers other than the N3 data subcarriers in the N1 data subcarriers satisfy: if the N4 data subcarriers are divided into N4/6 groups in an ascending order of indices, every six data subcarriers form one group, an absolute value of an index difference between two adjacent data subcarriers in a same group is 18, N4 is a positive integer, N4<N3, and N3+N4<N1.

13. The apparatus according to claim 8, wherein a lowest-frequency index of a data subcarrier at a lowest frequency in the N3 data subcarriers satisfies:

when a bandwidth is 40 MHz, the lowest-frequency index is −a−128;

when the bandwidth is 80 MHz, the lowest-frequency index is −a−128−256;

when the bandwidth is 160 MHz, the lowest-frequency index is −a−128−256−512; or when the bandwidth is 320 MHz, the lowest-frequency index is −a−128−256−512−1024; and a is any positive integer from 110 to 122.

14. The apparatus according to claim 8, wherein an absolute value of an index difference between every two pilot subcarriers of the N2 pilot subcarriers is greater than 1.

15. A chip, comprising:

a communication interface; and a processing circuit configured to perform:

receiving a trigger-based frame from a second device, wherein the trigger-based frame comprises distributed resource unit indication information indicating a distributed resource unit allocated to the chip;

determining one or more distributed resource blocks based on the distributed resource unit indication information, wherein each of the one or more distributed resource blocks comprises N1 data subcarriers and N2 pilot subcarriers, an absolute value of an index difference between every two data subcarriers of N3 data subcarriers in the NI data subcarriers is greater than or equal to 4, N1, N2, and N3 are all positive integers, and 1≤N2<N3, and wherein N1=N3=24, or N1=N3=48, or N1=102 and N3=96, or N1=234 and N3=192, or N1=468 and N3=384, or N1=980 and N3=768; and outputting a response to the trigger-based frame to the second device based on the one or more distributed resource blocks.

16. The chip according to claim 15, wherein when a bandwidth is 40 MHz, 80 MHz, 160 MHz, or 320 MHz, N1=24, N2=2, and N3=24, or when a bandwidth is 80 MHz, 160 MHz, or 320 MHz, N1=48, N2=4, and N3=48, or when a bandwidth is 160 MHz or 320 MHz, N1=102, N2=4, and N3=96, or when a bandwidth is 320 MHz, N1=234, N2=8, and N3=192, the N3 data subcarriers satisfy: if the N3 data subcarriers are divided into N3/6 groups in an ascending order of indices, every six data subcarriers form one group, and an absolute value of an index difference between two adjacent data subcarriers in a same group is 18.

17. The chip according to claim 15, wherein when a bandwidth is 40 MHz, N1=48, N2=4, and N3=48, or when a bandwidth is 80 MHz, N1=102, N2=4, and N3=96, or when a bandwidth is 160 MHz, N1=234, N2=8, and N3=192, or when a bandwidth is 320 MHz, N1=468, N2=16, and N3=384, the N3 data subcarriers satisfy: if the N3 data subcarriers are divided into N3/12 groups in an ascending order of indices, every 12 data subcarriers form one group, an absolute value of an index difference between two adjacent data subcarriers in a same group is 9, and absolute values of index differences between two most adjacent data subcarriers in two adjacent groups are alternately 24 and 34.

18. The chip according to claim 15, wherein when a bandwidth is 40 MHz, N1=102, N2=4, and N3=96, or when a bandwidth is 80 MHz, N1=234, N2=8, and N3=192, or when a bandwidth is 160 MHz, N1=468, N2=16, and N3=384, or when a bandwidth is 320 MHz, N1=980, N2=16, and N3=768, the N3 data subcarriers satisfy: if the N3 data subcarriers are divided into N3/24 groups in an ascending order of indices, every 24 data subcarriers form one group, absolute values of index differences between two adjacent data subcarriers in a same group are alternately 5 and 4, and absolute values of index differences between two most adjacent data subcarriers in two adjacent groups are alternately 19 and 29.

19. The chip according to claim 15, wherein when a bandwidth is 80 MHz, 160 MHz, or 320 MHz, N1=234, N2=8, N3=192, and N4=24, or when the bandwidth is 160 MHz or 320 MHz, N1=468, N2=16, N3=384, and N4=48, or when the bandwidth is 320 MHz, N1=980, N2=16, N3=768, and N4=96, N4 data subcarriers of remaining data subcarriers other than the N3 data subcarriers in the N1 data subcarriers satisfy: if the N4 data subcarriers are divided into N4/6 groups in an ascending order of indices, every six data subcarriers form one group, an absolute value of an index difference between two adjacent data subcarriers in a same group is 18, N4 is a positive integer, N4<N3, and N3+N4<N1.

20. The chip according to claim 15, wherein a lowest-frequency index of a data subcarrier at a lowest frequency in the N3 data subcarriers satisfies:

when a bandwidth is 40 MHz, the lowest-frequency index is −a−128;

when the bandwidth is 80 MHz, the lowest-frequency index is −a−128−256;

when the bandwidth is 160 MHz, the lowest-frequency index is −a−128−256−512; or when the bandwidth is 320 MHz, the lowest-frequency index is −a−128−256−512−1024; and a is any positive integer from 110 to 122.

* * * * *